US006304958B1

(12) United States Patent
Kiuchi et al.

(10) Patent No.: US 6,304,958 B1
(45) Date of Patent: Oct. 16, 2001

(54) MICROCOMPUTER HAVING DATA EXECUTION UNITS MOUNTED THEREON

(75) Inventors: Atsushi Kiuchi, Higashimurayama; Tetsuya Nakagawa, Koganei, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/210,886

(22) Filed: Dec. 15, 1998

(30) Foreign Application Priority Data

Dec. 17, 1997 (JP) .................................................. 9-347527

(51) Int. Cl.$^7$ .......................................................... G06F 9/38
(52) U.S. Cl. .............................. 712/229; 712/33; 712/35; 712/43; 712/244
(58) Field of Search .................................... 345/501, 502, 345/503, 504, 505, 506, 519; 710/260, 261, 262, 263, 264, 265, 266, 267, 268, 269; 712/33, 34, 35, 39, 43, 229, 244

(56) References Cited

U.S. PATENT DOCUMENTS

| | | | |
|---|---|---|---|
| 4,803,620 | * | 2/1989 | Inagami et al. ...................... 712/203 |
| 5,440,703 | * | 8/1995 | Ray et al. ............................ 712/228 |
| 5,561,775 | * | 10/1996 | Kurosawa et al. ................... 712/23 |
| 5,590,365 | | 12/1996 | Ide et al. . |
| 5,638,524 | * | 6/1997 | Kiuchi et al. ........................ 712/221 |
| 5,784,630 | * | 7/1998 | Saito et al. ........................... 712/30 |
| 5,854,636 | * | 12/1998 | Watanabe et al. ................... 345/519 |
| 5,867,726 | * | 2/1999 | Ohsuga et al. ....................... 712/32 |
| 6,026,479 | * | 2/2000 | Fisher et al. .......................... 712/24 |

FOREIGN PATENT DOCUMENTS 3-94328 4/1991 (JP) .
3-282926 12/1991 (JP) .
6-83624 3/1994 (JP) .

OTHER PUBLICATIONS

Nikkei Electronics, Nov. 23, 1992, pp. 99–112.

* cited by examiner

Primary Examiner—William M. Treat
(74) Attorney, Agent, or Firm—Mattingly, Stanger & Malur, P.C.

(57) ABSTRACT

A microcomputer for feeding source data necessary for operations without any delay while retaining the consistency on instruction lines between the ordinary single operations and the SIMD (Single Instruction Multiple Data) type parallel operations.

The microcomputer comprises: a first memory and a second memory adapted to be individually fed with a common address from the address generating unit; a first execution unit coupled to the first memory and the second memory; and a second execution unit coupled to the first memory and the second memory. The second execution unit is mounted together with the central processing unit, the first memory, the second memory and the first execution unit on a common semiconductor substrate. The microcomputer is provided with:

a first operating mode, in which data are fed from one of the first and second memories to the first execution unit and in which the first execution unit executes the operations whereas the second execution unit interrupts the operations; and a second operating mode, in which the data are fed from the first memory to the first execution unit and fed from the second memory to the second execution unit and in which the first execution unit and the second execution unit execute the operations.

33 Claims, 53 Drawing Sheets

TRUTH TABLE OF THE CONTROL UNIT (MDDEC1)

| NO. | INPUT | | | | OUTPUT | | | | | REMARK |
|---|---|---|---|---|---|---|---|---|---|---|
| | MD[1] | MD[0] | RDMDR | WTMDR | DCT1 | DCT2 | DCT3 | DCT4 | DCT5 | |
| 1 | 0 | 0 | 0 | 0 | 0 | 0 | 0 | 0 | 0 | |
| 2 | 0 | 0 | 0 | 1 | 0 | 0 | 0 | 1 | 1 | MODE1 |
| 3 | 0 | 0 | 1 | * | 0 | 1 | 0 | 0 | 0 | |
| 4 | 0 | 1 | 0 | 0 | 0 | 0 | 0 | 0 | 0 | |
| 5 | 0 | 1 | 0 | 1 | 0 | 0 | 0 | 1 | 1 | MODE2 |
| 6 | 0 | 1 | 1 | * | 0 | 1 | 0 | 0 | 0 | |
| 7 | 1 | 0 | 0 | 0 | 0 | 0 | 0 | 0 | 0 | |
| 8 | 1 | 0 | 0 | 1 | 0 | 0 | 1 | 0 | 1 | MODE3 |
| 9 | 1 | 0 | 1 | * | 1 | 0 | 0 | 0 | 0 | |
| 10 | 1 | 1 | * | * | * | * | * | * | * | UN-DEFINED CODE |

"*" INDICATES "Don't care"

FIG. 9

| ADDRESS | ACCESS FIELD IN A MEMORY | REMARK |
|---|---|---|
| H'08000000 | 0 ADDRESS OF THE MEMORY MAT M0 | 4×0+0 |
| H'08000001 | 0 ADDRESS OF THE MEMORY MAT M1 | 4×0+1 |
| H'08000002 | 0 ADDRESS OF THE MEMORY MAT M2 | 4×0+2 |
| H'08000003 | 0 ADDRESS OF THE MEMORY MAT M3 | 4×0+3 |
| H'08000004 | 1 ADDRESS OF THE MEMORY MAT M0 | 4×1+0 |
| H'08000005 | 1 ADDRESS OF THE MEMORY MAT M1 | 4×1+1 |
| H'08000006 | 1 ADDRESS OF THE MEMORY MAT M2 | 4×1+2 |
| ⋮ | ⋮ | ⋮ |
| H'08003FFE | FFF ADDRESS OF THE MEMORY MAT M2 | 4×4095+2 |
| H'08003FFF | FFF ADDRESS OF THE MEMORY MAT M3 | 4×4095+3 |

FIG. 10

| NO. | MV[2] | MV[1] | MV[0] | CODE DEFINITION | |
|---|---|---|---|---|---|
| 1 | 0 | 0 | 0 | INSTRUCTION FETCH ACCESS | A DATA TRANSMISSION WITH THE EXCEPTION OF THE FIRST AND THE SECOND EXECUTION UNIT |
| 2 | 0 | 0 | 1 | BYTE DATA (8 BITS) ACCESS | |
| 3 | 0 | 1 | 0 | WORD DATA (16 BITS) ACCESS | |
| 4 | 0 | 1 | 1 | LONG WORD DATA (32 BITS) ACCESS | |
| 5 | 1 | 0 | 0 | UNUSED CODE | |
| 6 | 1 | 0 | 1 | | |
| 7 | 1 | 1 | 0 | WORD DATA (16 BITS) ACCESS | A DATA TRANSMISSION OF THE FIRST AND THE SECOND EXECUTION UNIT |
| 8 | 1 | 1 | 1 | LONG WORD DATA (32 BITS) ACCESS | |

FIG. 11

| NO. | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT14 | MCT15 | MCT16 | MCT17 | MCT18 | MCT19 | MCT20 | MCT21 |
|---|---|---|---|---|---|---|---|---|---|---|---|---|---|---|---|---|---|---|---|---|---|---|---|---|---|---|---|---|---|---|---|---|
| 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 0 | * | 0 | 0 | * | * | * | 1 | 1 | 1 | 0 | 0 | 0 | 1 | 0 | 0 | 0 | 0 | 0 | 1 | 0 | 0 | 0 | 0 | 0 | 1 | 0 | 1 | 0 | 1 | 0 |
| 3 | 1 | 0 | * | 0 | 1 | 0 | 0 | 0 | 1 | 0 | 1 | 0 | 0 | 1 | 1 | 0 | 0 | 0 | 0 | 0 | 0 | 0 | 0 | 0 | 0 | 0 | 1 | 0 | 0 | 0 | 0 | 0 |
| 4 | 1 | 0 | * | 0 | 1 | 0 | 0 | 1 | 1 | 0 | 1 | 0 | 1 | 0 | 0 | 0 | 0 | 0 | 0 | 0 | 0 | 0 | 0 | 0 | 0 | 0 | 1 | 0 | 0 | 0 | 0 | 0 |
| 5 | 1 | 0 | * | 0 | 1 | 0 | 1 | 0 | 1 | 0 | 1 | 1 | 0 | 0 | 0 | 0 | 0 | 0 | 0 | 0 | 0 | 0 | 0 | 0 | 0 | 0 | 1 | 0 | 0 | 0 | 0 | 0 |
| 6 | 1 | 0 | * | 0 | 1 | 0 | 1 | 1 | 1 | 0 | 1 | 0 | 0 | 0 | 0 | 0 | 1 | 0 | 0 | 0 | 0 | 0 | 0 | 0 | 0 | 1 | 1 | 0 | 0 | 0 | 0 | 0 |
| 7 | 1 | 0 | * | 0 | 1 | 1 | 0 | 0 | 1 | 0 | 1 | 0 | 0 | 0 | 0 | 0 | 0 | 1 | 0 | 0 | 0 | 0 | 0 | 0 | 0 | 1 | 1 | 0 | 0 | 0 | 0 | 0 |
| 8 | 1 | 0 | * | 0 | 1 | 1 | 0 | 1 | 1 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 |
| 9 | 1 | 0 | * | 0 | 1 | 1 | 1 | 0 | 1 | 0 | 1 | 0 | 0 | 0 | 0 | 0 | 0 | 0 | 0 | 1 | 0 | 0 | 0 | 0 | 0 | 0 | 0 | 0 | 0 | 0 | 0 | 0 |
| 10 | 1 | 0 | * | 1 | 0 | 1 | 0 | 1 | 1 | 1 | 0 | 0 | 1 | 0 | 0 | 1 | 0 | 0 | 0 | 0 | 1 | 1 | 0 | 0 | 0 | 0 | 1 | 0 | 0 | 0 | 0 | 0 |
| 11 | 1 | 0 | * | 1 | 0 | 0 | 1 | * | 1 | 1 | 0 | 0 | 0 | 0 | 0 | 0 | 0 | 1 | 0 | 0 | 0 | 1 | 0 | 0 | 0 | 0 | 1 | 0 | 1 | 0 | 0 | 0 |
| 12 | 1 | 0 | * | 1 | 0 | 1 | 0 | * | 1 | 1 | 0 | 0 | 0 | 0 | 0 | 1 | 0 | 0 | 0 | 0 | 0 | 0 | 1 | 0 | 0 | 1 | 0 | 0 | 0 | 0 | 0 | 0 |
| 13 | 1 | 0 | * | 1 | 1 | 0 | 1 | * | 1 | 1 | 0 | 0 | 0 | 0 | 1 | 0 | 0 | 0 | 0 | 0 | 0 | 0 | 0 | 1 | 0 | 0 | 1 | 0 | 0 | 0 | 1 | 0 |
| 14 | 1 | 0 | * | 1 | 1 | 1 | 0 | * | 1 | 1 | 0 | 0 | 0 | 0 | 0 | 1 | 0 | 1 | 0 | 0 | 0 | 1 | 0 | 0 | 0 | 1 | 0 | 0 | 0 | 0 | 0 | 0 |
| 15 | 1 | 0 | * | 1 | 1 | 0 | * | * | 1 | 1 | 1 | 0 | 0 | 0 | 0 | 0 | 0 | 0 | 0 | 0 | 0 | 0 | 0 | 0 | 0 | 1 | 1 | 0 | 1 | 0 | 1 | 0 |
| 16 | 1 | 0 | * | 1 | 1 | 1 | * | * | 1 | 1 | 1 | 0 | 0 | 0 | 1 | 1 | 0 | 1 | 0 | 0 | 1 | 1 | 0 | 0 | 0 | 0 | 0 | 0 | 0 | 0 | 0 | 0 |
| 17 | 1 | 1 | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |

Inputs group: MSEL, IAB[14], MV[2], MV[1], MV[0], WE, IAB[1], IAB[0], AS, ML[1], ML[0]
Outputs group: MCT1–MCT21

"*" INDICATES "Don't care"

FIG. 12

| NO. | INPUT | | | | | | | | | | OUTPUT | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT14 | MCT15 | MCT16 | MCT17 | MCT18 | MCT19 | MCT20 | MCT21 |
| 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 0 | * | 0 | 0 | * | * | * | 1 | 1 | 1 | 0 | 0 | 0 | 1 | 0 | 0 | 0 | 0 | 0 | 1 | 0 | 0 | 0 | 0 | 0 | 1 | 0 | 1 | 0 | 1 | 0 |
| 3 | 1 | 0 | * | 0 | 1 | 0 | 0 | 0 | 1 | 0 | 1 | 0 | 0 | 1 | 1 | 0 | 0 | 0 | 0 | 0 | 0 | 0 | 0 | 0 | 0 | 0 | 1 | 0 | 0 | 0 | 0 | 0 |
| 4 | 1 | 0 | * | 0 | 1 | 0 | 0 | 1 | 1 | 1 | 1 | 0 | 0 | 0 | 0 | 0 | 0 | 0 | 0 | 0 | 0 | 0 | 0 | 0 | 0 | 0 | 1 | 0 | 0 | 0 | 0 | 0 |
| 5 | 1 | 0 | * | 0 | 1 | 0 | 1 | 0 | 1 | 0 | 1 | 0 | 1 | 0 | 0 | 0 | 0 | 0 | 0 | 0 | 0 | 0 | 0 | 0 | 0 | 0 | 1 | 0 | 0 | 0 | 0 | 0 |
| 6 | 1 | 0 | * | 0 | 1 | 0 | 1 | 1 | 1 | 0 | 1 | 0 | 0 | 0 | 0 | 0 | 0 | 0 | 0 | 0 | 0 | 0 | 0 | 0 | 0 | 1 | 1 | 0 | 0 | 0 | 0 | 0 |
| 7 | 1 | 0 | * | 0 | 0 | 1 | 0 | 0 | 1 | 0 | 1 | 0 | 0 | 0 | 0 | 0 | 1 | 1 | 0 | 0 | 0 | 0 | 0 | 0 | 0 | 0 | 0 | 0 | 0 | 0 | 0 | 0 |
| 8 | 1 | 0 | * | 0 | 1 | 1 | 0 | 0 | 1 | 0 | 1 | 0 | 0 | 0 | 0 | 0 | 0 | 1 | 0 | 1 | 0 | 0 | 0 | 0 | 0 | 0 | 0 | 0 | 0 | 0 | 0 | 0 |
| 9 | 1 | 0 | * | 0 | 1 | 1 | 0 | 1 | 1 | 0 | 1 | 0 | 0 | 0 | 0 | 0 | 0 | 0 | 0 | 0 | 0 | 1 | 0 | 0 | 0 | 0 | 1 | 0 | 1 | 0 | 0 | 0 |
| 10 | 1 | 0 | * | 1 | 0 | 0 | 1 | 0 | 1 | 1 | 0 | 0 | 1 | 0 | 1 | 0 | 0 | 0 | 0 | 0 | 0 | 0 | 0 | 1 | 0 | 1 | 1 | 0 | 0 | 0 | 0 | 0 |
| 11 | 1 | 0 | * | 1 | 0 | 0 | 0 | 1 | 1 | 1 | 0 | 0 | 0 | 0 | 0 | 0 | 0 | 0 | 0 | 0 | 0 | 1 | 0 | 0 | 0 | 1 | 1 | 0 | 0 | 0 | 0 | 0 |
| 12 | 1 | 0 | * | 1 | 0 | 1 | 0 | 1 | 1 | 1 | 1 | 0 | 0 | 0 | 1 | 0 | 0 | 1 | 0 | 0 | 0 | 0 | 0 | 0 | 0 | 1 | 1 | 0 | 1 | 0 | 0 | 0 |
| 13 | 1 | 0 | * | 1 | 0 | 0 | 1 | 1 | 1 | 1 | 1 | 0 | 0 | 0 | 0 | 0 | 0 | 0 | 0 | 0 | 0 | 1 | 0 | 1 | 0 | 0 | 1 | 0 | 0 | 0 | 0 | 0 |
| 14 | 1 | 0 | * | 1 | 1 | 1 | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 1 | 0 | * | 0 | * | * | * | * | 1 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 1 | 0 | 1 | 0 | 0 | 0 | 1 | 0 | 1 | 1 | 1 | 0 | 0 | 0 | 0 | 0 | 0 | 0 | 0 | 0 | 0 | 1 | 0 | 0 | 0 | 0 | 1 | 0 | 0 | 0 | 0 | 0 |
| 18 | 1 | 1 | 1 | 1 | 0 | 1 | 0 | 1 | 1 | 1 | 1 | 0 | 0 | 0 | 0 | 0 | 0 | 1 | 0 | 0 | 0 | 0 | 0 | 0 | 0 | 1 | 1 | 0 | 1 | 0 | 0 | 0 |
| 19 | 1 | 1 | 1 | 1 | 0 | 1 | 0 | 1 | 1 | 1 | 1 | 0 | 0 | 0 | 0 | 0 | 0 | 0 | 0 | 0 | 0 | 1 | 0 | 0 | 0 | 1 | 1 | 0 | 0 | 0 | 0 | 0 |
| 20 | 1 | 1 | 1 | 1 | 0 | 0 | 1 | 0 | 1 | 1 | 1 | 0 | 0 | 0 | 0 | 0 | 0 | 0 | 0 | 0 | 0 | 0 | 0 | 1 | 0 | 0 | 1 | 0 | 0 | 0 | 0 | 0 |
| 21 | 1 | 1 | 1 | 1 | 0 | 1 | 1 | 1 | 1 | 1 | 1 | 0 | 0 | 0 | 0 | 0 | 0 | 0 | 0 | 0 | 0 | 0 | 0 | 0 | 0 | 1 | 1 | 0 | 1 | 0 | 0 | 0 |
| 22 | 1 | 1 | 1 | 1 | 1 | 0 | * | * | 1 | 1 | 1 | 0 | 0 | 0 | 0 | 1 | 0 | 0 | 0 | 0 | 1 | 1 | 1 | 0 | 0 | 1 | 0 | 0 | 0 | 0 | 1 | 0 |
| 23 | 1 | 1 | 1 | 1 | 1 | 1 | 0 | * | 1 | 1 | 1 | 0 | 0 | 0 | 1 | 0 | 1 | 0 | 0 | 0 | 0 | 1 | 0 | 0 | 0 | 1 | 1 | 0 | 1 | 0 | 0 | 0 |
| 24 | 1 | 1 | 1 | 1 | 1 | 1 | 1 | * | 1 | 1 | 1 | 0 | 0 | 0 | 0 | 1 | 0 | 0 | 0 | 0 | 0 | 1 | 0 | 1 | 0 | 1 | 0 | 0 | 0 | 0 | 0 | 0 |

"*" INDICATES "Don't care"

FIG. 13

| NO. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| INPUT | | | | | | | | | | | | | | | | | |
| MSEL | 0 | 1 | 1 | 1 | 1 | 1 | 1 | 1 | 1 | 1 | 1 | 1 | 1 | 1 | 1 | 1 | 1 |
| IAB[14] | * | 0 | 0 | 0 | 0 | 0 | 0 | 0 | 0 | 0 | 0 | 0 | 0 | 0 | 0 | 1 | 1 |
| MV[2] | * | * | * | * | * | * | * | * | * | * | * | * | * | * | * | * | * |
| MV[1] | * | 0 | 0 | 0 | 0 | 0 | 0 | 0 | 0 | 1 | 1 | 1 | 1 | 1 | 1 | 1 | * |
| MV[0] | * | 0 | 1 | 1 | 1 | 1 | 1 | 1 | 1 | 0 | 0 | 0 | 1 | 1 | 1 | 1 | * |
| WE | * | * | 0 | 0 | 0 | 0 | 1 | 1 | 1 | 1 | 0 | 0 | 1 | 1 | 0 | 1 | * |
| IAB[1] | * | * | 0 | 0 | 1 | 1 | 0 | 0 | 1 | 1 | 0 | 1 | 0 | 1 | * | * | * |
| IAB[0] | * | * | 0 | 1 | 0 | 1 | 0 | 1 | 0 | 1 | * | * | * | * | * | * | * |
| AS | 0 | 1 | 1 | 1 | 1 | 1 | 1 | 1 | 1 | 1 | 1 | 1 | 1 | 1 | 1 | 1 | 0 |
| ML[1] | * | 1 | 0 | 0 | 0 | 0 | 0 | 0 | 0 | 1 | 1 | 1 | 1 | 1 | 1 | 1 | * |
| ML[0] | * | 1 | 1 | 1 | 1 | 1 | 1 | 1 | 1 | 0 | 0 | 0 | 0 | 1 | 1 | 1 | * |
| OUTPUT | | | | | | | | | | | | | | | | | |
| MCT1 | 0 | 0 | 0 | 0 | 0 | 1 | 0 | 0 | 0 | 0 | 0 | 0 | 0 | 0 | 0 | 0 | 0 |
| MCT2 | 0 | 0 | 0 | 0 | 1 | 0 | 0 | 0 | 0 | 0 | 0 | 1 | 0 | 0 | 0 | 0 | 0 |
| MCT3 | 0 | 0 | 0 | 1 | 0 | 0 | 0 | 0 | 0 | 0 | 0 | 0 | 0 | 0 | 0 | 0 | 0 |
| MCT4 | 0 | 1 | 1 | 0 | 0 | 0 | 0 | 0 | 0 | 1 | 0 | 0 | 0 | 1 | 0 | 0 | 0 |
| MCT5 | 0 | 0 | 0 | 0 | 0 | 1 | 0 | 0 | 0 | 0 | 1 | 0 | 0 | 1 | 0 | 0 | 0 |
| MCT6 | 0 | 0 | 0 | 0 | 0 | 0 | 1 | 0 | 0 | 0 | 0 | 0 | 0 | 0 | 0 | 0 | 0 |
| MCT7 | 0 | 1 | 0 | 0 | 0 | 0 | 0 | 1 | 0 | 0 | 0 | 1 | 0 | 0 | 0 | 0 | 0 |
| MCT8 | 0 | 0 | 0 | 0 | 0 | 0 | 1 | 0 | 0 | 0 | 0 | 0 | 0 | 0 | 0 | 0 | 0 |
| MCT9 | 0 | 0 | 0 | 0 | 0 | 0 | 0 | 0 | 0 | 1 | 0 | 0 | 0 | 0 | 0 | 0 | 0 |
| MCT10 | 0 | 1 | 0 | 0 | 0 | 0 | 0 | 0 | 0 | 1 | 0 | 0 | 1 | 0 | 0 | 0 | 0 |
| MCT11 | 0 | 0 | 0 | 0 | 0 | 0 | 0 | 0 | 0 | 0 | 1 | 0 | 0 | 1 | 0 | 0 | 0 |
| MCT12 | 0 | 0 | 0 | 0 | 0 | 0 | 0 | 0 | 0 | 0 | 0 | 1 | 0 | 0 | 0 | 0 | 0 |
| MCT13 | 0 | 0 | 0 | 0 | 0 | 0 | 0 | 0 | 0 | 0 | 0 | 0 | 0 | 0 | 0 | 1 | 0 |
| MCT14 | 0 | 0 | 0 | 0 | 0 | 1 | 1 | 1 | 0 | 0 | 1 | 0 | 0 | 1 | 0 | 1 | 0 |
| MCT15 | 0 | 0 | 0 | 0 | 0 | 0 | 0 | 0 | 0 | 0 | 0 | 0 | 0 | 0 | 0 | 0 | 0 |
| MCT16 | 0 | 0 | 0 | 0 | 0 | 0 | 0 | 0 | 0 | 0 | 0 | 0 | 0 | 0 | 0 | 0 | 0 |
| MCT17 | 0 | 1 | 1 | 1 | 1 | 1 | 0 | 0 | 0 | 1 | 1 | 0 | 0 | 1 | 0 | 0 | 0 |
| MCT18 | 0 | 0 | 0 | 0 | 0 | 0 | 0 | 0 | 0 | 0 | 0 | 0 | 0 | 0 | 0 | 0 | 0 |
| MCT19 | 0 | 1 | 0 | 0 | 0 | 0 | 0 | 0 | 0 | 1 | 1 | 0 | 0 | 1 | 0 | 0 | 0 |
| MCT20 | 0 | 0 | 0 | 0 | 0 | 0 | 0 | 0 | 0 | 0 | 0 | 0 | 0 | 0 | 0 | 0 | 0 |
| MCT21 | 0 | 1 | 0 | 0 | 0 | 0 | 0 | 0 | 0 | 0 | 0 | 0 | 0 | 0 | 1 | 0 | 0 |

"*" INDICATES "Don't care"

FIG. 15

| ADDRESS | ACCESS FIELD IN A MEMORY | REMARK |
|---|---|---|
| H'08004000 | 0 ADDRESS OF THE MEMORY MAT M0 | 4×0+0 |
| H'08004001 | 0 ADDRESS OF THE MEMORY MAT M1 | 4×0+1 |
| H'08004002 | 0 ADDRESS OF THE MEMORY MAT M2 | 4×0+2 |
| H'08004003 | 0 ADDRESS OF THE MEMORY MAT M3 | 4×0+3 |
| H'08004004 | 1 ADDRESS OF THE MEMORY MAT M0 | 4×1+0 |
| H'08004005 | 1 ADDRESS OF THE MEMORY MAT M1 | 4×1+1 |
| H'08004006 | 1 ADDRESS OF THE MEMORY MAT M2 | 4×1+2 |
| ⋮ | ⋮ | ⋮ |
| H'08007FFE | FFF ADDRESS OF THE MEMORY MAT M2 | 4×4095+2 |
| H'08007FFF | FFF ADDRESS OF THE MEMORY MAT M3 | 4×4095+3 |

FIG. 16

"*" INDICATES "Don't care"

| NO. | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT14 | MCT15 | MCT16 | MCT17 | MCT18 | MCT19 | MCT20 | MCT21 |
|---|---|---|---|---|---|---|---|---|---|---|---|---|---|---|---|---|---|---|---|---|---|---|---|---|---|---|---|---|---|---|---|---|
| 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 0 | * | * | * | * | * | * | 0 | * | * | 0 | 0 | 0 | 0 | 0 | 0 | 0 | 0 | 0 | 1 | 0 | 0 | 0 | 0 | 0 | 0 | 0 | 1 | 0 | 1 | 0 |
| 3 | 1 | 1 | * | 0 | 0 | 0 | 0 | * | 1 | 1 | 1 | 0 | 0 | 0 | 1 | 0 | 0 | 0 | 0 | 0 | 1 | 0 | 0 | 0 | 0 | 0 | 0 | 0 | 1 | 0 | 0 | 0 |
| 4 | 1 | 1 | * | 0 | 1 | 0 | 0 | 0 | 1 | 0 | 1 | 0 | 0 | 1 | 0 | 0 | 0 | 0 | 0 | 0 | 0 | 0 | 0 | 0 | 0 | 0 | 1 | 0 | 0 | 0 | 0 | 0 |
| 5 | 1 | 1 | * | 0 | 1 | 0 | 0 | 1 | 1 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 |
| 6 | 1 | 1 | * | 1 | 1 | 0 | 0 | 0 | 1 | 1 | 1 | 1 | 0 | 0 | 0 | 0 | 0 | 0 | 0 | 0 | 0 | 0 | 0 | 0 | 0 | 1 | 1 | 0 | 0 | 0 | 0 | 0 |
| 7 | 1 | 1 | * | 1 | 1 | 1 | 0 | 1 | 1 | 1 | 1 | 0 | 0 | 0 | 0 | 1 | 1 | 1 | 0 | 0 | 0 | 0 | 0 | 0 | 0 | 1 | 1 | 0 | 0 | 0 | 0 | 0 |
| 8 | 1 | 1 | * | 0 | 1 | 1 | 0 | 0 | 1 | 1 | 1 | 0 | 0 | 0 | 0 | 0 | 0 | 0 | 1 | 0 | 0 | 0 | 0 | 0 | 0 | 0 | 0 | 0 | 0 | 0 | 0 | 0 |
| 9 | 1 | 1 | * | 0 | 1 | 1 | 0 | 1 | 1 | 1 | 1 | 0 | 0 | 0 | 0 | 0 | 0 | 0 | 0 | 1 | 0 | 0 | 0 | 0 | 0 | 0 | 0 | 0 | 0 | 0 | 0 | 0 |
| 10 | 1 | 1 | * | 0 | 0 | 0 | 1 | 0 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 |
| 11 | 1 | 1 | * | 1 | 0 | 0 | 1 | 1 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 12 | 1 | 1 | * | 1 | 0 | 0 | 0 | * | 1 | 1 | 0 | 0 | 0 | 0 | 0 | 0 | 0 | 0 | 0 | 0 | 0 | 0 | 1 | 0 | 0 | 1 | 0 | 0 | 0 | 0 | 0 | 0 |
| 13 | 1 | 1 | * | 1 | 0 | 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| 14 | 1 | 1 | * | 1 | 1 | 0 | * | * | 1 | 1 | 0 | 0 | 0 | 0 | 0 | 0 | 0 | 0 | 0 | 0 | 1 | 0 | 1 | 0 | 0 | 1 | 1 | 0 | 1 | 0 | 0 | 0 |
| 15 | 1 | 1 | * | 1 | 1 | 1 | * | * | 1 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 |
| 16 | 1 | 1 | * | 1 | 1 | 0 | * | * | 1 | 1 | 1 | 1 | 0 | 0 | 0 | 0 | 0 | 0 | 0 | 0 | 0 | 0 | 0 | 0 | 0 | 1 | 1 | 0 | 1 | 0 | 1 | 0 |
| 17 | 1 | 1 | * | 1 | 1 | 1 | * | * | 1 | 1 | 1 | 0 | 0 | 0 | 0 | 1 | 0 | 0 | 0 | 0 | 0 | 1 | 0 | 1 | 0 | 1 | 0 | 0 | 0 | 0 | 0 | 0 |

INPUT / OUTPUT

FIG. 17

| NO. | INPUT | | | | | | | | | | OUTPUT | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT14 | MCT15 | MCT16 | MCT17 | MCT18 | MCT19 | MCT20 | MCT21 |
| 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | * | * | 0 | 0 | 0 | 0 | 0 | 0 | 0 | 0 | 0 | 0 | 0 | 0 | 0 | 0 | 0 | 1 | 0 | 0 | 0 | 1 | 0 |
| 3 | 1 | 1 | 0 | 0 | 0 | 0 | 0 | 0 | 1 | 1 | 1 | 0 | 0 | 0 | 1 | 0 | 0 | 0 | 0 | 0 | 1 | 0 | 0 | 0 | 0 | 0 | 1 | 0 | 1 | 0 | 1 | 0 |
| 4 | 1 | 1 | 0 | 0 | 1 | 0 | 0 | 1 | 1 | 1 | 1 | 0 | 0 | 1 | 0 | 0 | 0 | 0 | 0 | 0 | 0 | 0 | 0 | 0 | 0 | 0 | 1 | 0 | 1 | 0 | 0 | 0 |
| 5 | 1 | 1 | 0 | 0 | 1 | 0 | 0 | 0 | 1 | 1 | 1 | 0 | 0 | 0 | 0 | 0 | 0 | 0 | 0 | 0 | 0 | 0 | 0 | 0 | 0 | 0 | 1 | 0 | 0 | 0 | 0 | 0 |
| 6 | 1 | 1 | 0 | 0 | 1 | 0 | 1 | 1 | 1 | 1 | 1 | 1 | 0 | 0 | 0 | 0 | 0 | 0 | 0 | 0 | 0 | 0 | 0 | 0 | 0 | 0 | 1 | 0 | 0 | 0 | 0 | 0 |
| 7 | 1 | 1 | 0 | 0 | 1 | 0 | 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 1 | 1 | 0 | 0 | 1 | 1 | 0 | 1 | 1 | 0 | 0 | 0 | 0 | 0 | 0 | 0 | 1 | 1 | 1 | 0 | 0 | 0 | 0 | 0 | 0 | 0 | 0 | 0 | 0 | 0 | 0 | 0 |
| 9 | 1 | 1 | 0 | 0 | 1 | 1 | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 10 | 1 | 1 | 0 | 1 | 1 | 1 | 1 | 1 | 1 | 0 | 0 | 0 | 0 | 0 | 0 | 0 | 0 | 1 | 0 | 1 | 0 | 0 | 0 | 0 | 0 | 0 | 1 | 0 | 1 | 0 | 0 | 0 |
| 11 | 1 | 1 | 0 | 1 | 1 | 1 | 1 | 0 | 1 | 0 | 0 | 0 | 1 | 0 | 0 | 1 | 0 | 0 | 0 | 0 | 0 | 1 | 0 | 0 | 0 | 0 | 1 | 0 | 1 | 0 | 0 | 0 |
| 12 | 1 | 1 | 0 | 1 | 0 | 1 | 0 | * | 1 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 13 | 1 | 1 | 1 | 1 | 0 | 0 | 1 | * | 1 | 1 | 0 | 0 | 0 | 0 | 0 | 0 | 0 | 0 | 0 | 0 | 0 | 0 | 0 | 1 | 0 | 1 | 0 | 0 | 0 | 0 | 0 | 0 |
| 14 | 1 | 1 | 1 | 1 | 0 | 0 | 0 | * | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 1 | 1 | 1 | 1 | 0 | 1 | 1 | * | 1 | 1 | 1 | 0 | 0 | 0 | 0 | 0 | 0 | 0 | 0 | 0 | 1 | 0 | 0 | 0 | 0 | 1 | 0 | 0 | 0 | 0 | 0 | 0 |
| 16 | 1 | 1 | 1 | 0 | 0 | 0 | 0 | * | 1 | 1 | 1 | 0 | 0 | 0 | 1 | 0 | 0 | 0 | 0 | 0 | 0 | 0 | 0 | 0 | 0 | 0 | 0 | 0 | 0 | 0 | 0 | 0 |
| 17 | 1 | 1 | 1 | 0 | 0 | 0 | 1 | * | 1 | 1 | 1 | 0 | 0 | 0 | 0 | 0 | 0 | 1 | 0 | 0 | 0 | 1 | 0 | 0 | 0 | 0 | 0 | 1 | 0 | 0 | 0 | 0 |
| 18 | 1 | * | 1 | 0 | 0 | 1 | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 1 | * | 1 | 0 | 0 | 0 | 0 | * | 1 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 20 | 1 | * | 1 | 1 | 0 | 0 | 1 | * | 1 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |
| 21 | 1 | * | 1 | 1 | 0 | 1 | 0 | * | 1 | 1 | 0 | 0 | 0 | 0 | 0 | 0 | 0 | 1 | 0 | 0 | 0 | 0 | 0 | 0 | 1 | 0 | 0 | 1 | 0 | 0 | 0 | 0 |
| 22 | 1 | * | 1 | 1 | 1 | 0 | 1 | * | 1 | 1 | 1 | 0 | 0 | 0 | 1 | 0 | 0 | 0 | 0 | 0 | 0 | 0 | 0 | 0 | 1 | 0 | 0 | 0 | 0 | 1 | 0 | 1 |
| 23 | 1 | * | 1 | 1 | 1 | 1 | * | * | 1 | 1 | 1 | 0 | 0 | 0 | 0 | 0 | 0 | 1 | 0 | 0 | 0 | 0 | 1 | 0 | 1 | 0 | 0 | 0 | 0 | 1 | 0 | 1 |
| 24 | 1 | * | 1 | 1 | 1 | 1 | * | * | 1 | 1 | 1 | 0 | 0 | 0 | 0 | 1 | 0 | 0 | 0 | 0 | 0 | 1 | 0 | 1 | 1 | 0 | 0 | 0 | 0 | 0 | 0 | 0 |

"*" INDICATES "Don't care"

FIG. 18

| NO. | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT14 | MCT15 | MCT16 | MCT17 | MCT18 | MCT19 | MCT20 | MCT21 |
|---|---|---|---|---|---|---|---|---|---|---|---|---|---|---|---|---|---|---|---|---|---|---|---|---|---|---|---|---|---|---|---|---|
| 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | 0 | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 1 | 1 | * | 0 | 0 | 0 | * | * | 1 | 1 | 1 | 0 | 0 | 0 | 1 | 0 | 0 | 0 | 0 | 0 | 1 | 0 | 0 | 0 | 0 | 0 | 0 | 1 | 0 | 1 | 0 | 1 |
| 4 | 1 | 1 | * | 0 | 1 | 0 | 0 | 0 | 1 | 0 | 1 | 0 | 0 | 1 | 1 | 0 | 0 | 0 | 0 | 0 | 0 | 0 | 0 | 0 | 0 | 0 | 0 | 1 | 0 | 0 | 0 | 1 |
| 5 | 1 | 1 | * | 0 | 1 | 0 | 0 | 1 | 1 | 0 | 1 | 0 | 1 | 0 | 0 | 0 | 0 | 0 | 0 | 0 | 0 | 0 | 0 | 0 | 0 | 0 | 0 | 1 | 0 | 0 | 0 | 0 |
| 6 | 1 | 1 | * | 0 | 1 | 1 | 1 | 0 | 1 | 0 | 1 | 1 | 0 | 0 | 0 | 1 | 0 | 0 | 0 | 0 | 0 | 0 | 0 | 0 | 0 | 0 | 0 | 1 | 0 | 0 | 0 | 0 |
| 7 | 1 | 1 | * | 0 | 1 | 1 | 1 | 1 | 1 | 0 | 1 | 0 | 0 | 0 | 0 | 0 | 1 | 0 | 0 | 0 | 0 | 0 | 0 | 0 | 1 | 0 | 0 | 1 | 0 | 0 | 0 | 0 |
| 8 | 1 | 1 | * | 0 | 1 | 1 | 0 | 0 | 1 | 0 | 1 | 0 | 0 | 0 | 0 | 0 | 0 | 1 | 0 | 0 | 0 | 0 | 0 | 0 | 0 | 0 | 0 | 0 | 0 | 0 | 0 | 0 |
| 9 | 1 | 1 | * | 0 | 1 | 1 | 0 | 1 | 1 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 |
| 10 | 1 | 1 | * | 0 | 1 | 1 | 1 | 0 | 1 | 0 | 1 | 0 | 0 | 0 | 0 | 0 | 0 | 0 | 1 | 0 | 1 | 0 | 0 | 0 | 0 | 0 | 0 | 1 | 0 | 0 | 0 | 0 |
| 11 | 1 | 1 | * | 1 | 0 | 0 | 1 | 1 | 1 | 1 | 0 | 0 | 1 | 0 | 1 | 0 | 0 | 0 | 1 | 0 | 1 | 0 | 0 | 0 | 0 | 0 | 0 | 0 | 0 | 0 | 0 | 0 |
| 12 | 1 | 1 | * | 1 | 0 | 0 | 0 | * | 1 | 1 | 0 | 0 | 0 | 0 | 0 | 0 | 0 | 0 | 0 | 0 | 0 | 1 | 0 | 0 | 0 | 0 | 0 | 1 | 0 | 1 | 0 | 0 |
| 13 | 1 | 1 | * | 1 | 0 | 1 | 1 | * | 1 | 1 | 0 | 0 | 0 | 0 | 0 | 1 | 0 | 1 | 0 | 0 | 0 | 0 | 1 | 0 | 1 | 0 | 0 | 1 | 0 | 1 | 0 | 0 |
| 14 | 1 | 1 | * | 1 | 1 | 0 | 0 | * | 1 | 1 | 0 | 0 | 0 | 0 | 0 | 0 | 0 | 0 | 0 | 0 | 0 | 0 | 0 | 0 | 1 | 0 | 0 | 0 | 0 | 0 | 1 | 0 |
| 15 | 1 | 1 | * | 1 | 1 | 1 | 1 | * | 1 | 1 | 1 | 0 | 0 | 0 | 1 | 0 | 0 | 0 | 1 | 0 | 0 | 1 | 0 | 0 | 0 | 0 | 0 | 0 | 0 | 0 | 0 | 0 |
| 16 | 1 | 1 | * | 1 | 1 | 0 | * | * | 1 | 1 | 1 | 0 | 0 | 0 | 0 | 0 | 0 | 0 | 0 | 0 | 0 | 0 | 0 | 0 | 1 | 0 | 0 | 1 | 0 | 1 | 0 | 1 |
| 17 | 1 | 1 | * | 1 | 1 | 1 | * | * | 1 | 1 | 1 | 0 | 0 | 1 | 1 | 1 | 0 | 0 | 0 | 0 | 0 | 1 | 0 | 1 | 1 | 0 | 0 | 0 | 0 | 0 | 0 | 0 |

"*" INDICATES "Don't care"

FIG. 21a

| NO. | INPUT | | | | | OUTPUT | | | | | | | REMARK |
|---|---|---|---|---|---|---|---|---|---|---|---|---|---|
| | MD[1] | MD[0] | EMV | EDIO | EDL | EN | ECT1 | ECT2 | ECT3 | ECT4 | ECT5 | ECT6 | |
| 1 | 0 | * | 0 | * | * | 1 | 0 | 0 | 0 | 0 | 0 | 0 | MODE1 OR MODE2 |
| 2 | 0 | * | 1 | 0 | 0 | 1 | 0 | 1 | 0 | 0 | 1 | 0 | |
| 3 | 0 | * | 1 | 0 | 1 | 1 | 1 | 0 | 0 | 0 | 1 | 0 | |
| 4 | 0 | * | 1 | 1 | 0 | 1 | 0 | 0 | 0 | 1 | 0 | 1 | |
| 5 | 0 | * | 1 | 1 | 1 | 1 | 0 | 0 | 1 | 0 | 0 | 1 | |
| 6 | 1 | * | * | * | * | 0 | 0 | 0 | 0 | 0 | 0 | 0 | MODE3 |

"*" INDICATES "Don't care"

FIG. 21b

| NO. | INPUT | | | | | OUTPUT | | | | | | | REMARK |
|---|---|---|---|---|---|---|---|---|---|---|---|---|---|
| | MD[1] | MD[0] | EMV | EDIO | EDL | EN | ECT1 | ECT2 | ECT3 | ECT4 | ECT5 | ECT6 | |
| 1 | 0 | 0 | * | * | * | 0 | 0 | 0 | 0 | 0 | 0 | 0 | MODE1 |
| 2 | 0 | 1 | 0 | * | * | 1 | 0 | 0 | 0 | 0 | 0 | 0 | MODE2 |
| 3 | 0 | 1 | 1 | 0 | 0 | 1 | 0 | 1 | 0 | 0 | 1 | 0 | |
| 4 | 0 | 1 | 1 | 0 | 1 | 1 | 1 | 0 | 0 | 0 | 1 | 0 | |
| 5 | 0 | 1 | 1 | 1 | 0 | 1 | 0 | 0 | 0 | 1 | 0 | 1 | |
| 6 | 0 | 1 | 1 | 1 | 1 | 1 | 0 | 0 | 1 | 0 | 0 | 1 | |
| 7 | 1 | 0 | 0 | * | * | 1 | 0 | 0 | 0 | 0 | 0 | 0 | MODE3 |
| 8 | 1 | 0 | 1 | 0 | 0 | 1 | 0 | 1 | 0 | 0 | 1 | 0 | |
| 9 | 1 | 0 | 1 | 0 | 1 | 1 | 1 | 0 | 0 | 0 | 1 | 0 | |
| 10 | 1 | 0 | 1 | 1 | 0 | 1 | 0 | 0 | 0 | 1 | 0 | 1 | |
| 11 | 1 | 0 | 1 | 1 | 1 | 1 | 0 | 0 | 1 | 0 | 0 | 1 | |
| 12 | 1 | 1 | * | * | * | 0 | 0 | 0 | 0 | 0 | 0 | 0 | UN-DEFINED CODE |

"*" INDICATES "Don't care"

| NO. | INPUT | | OUTPUT | | |
|---|---|---|---|---|---|
| | RDMDR | WTMDR | DCT1 | DCT2 | DCT3 |
| 1 | 0 | 0 | 0 | 0 | 0 |
| 2 | 0 | 1 | 0 | 1 | 1 |
| 3 | 1 | * | 1 | 0 | 0 |

"*" INDICATES "Don't care"

FIG. 28

| | NO. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| INPUT | MSEL | 0 | 1 | 1 | 1 | 1 | 1 | 1 | 1 | 1 | 1 | 1 | 1 | 1 | 1 | 1 | 1 | 1 |
| | IAB[14] | * | 0 | 0 | 0 | 0 | 0 | 0 | 0 | 0 | 0 | 0 | 1 | 0 | 1 | 0 | 0 | 1 |
| | MV[2] | * | * | * | * | * | * | * | * | * | * | * | * | * | * | * | * | * |
| | MV[1] | * | 0 | 0 | 0 | 0 | 0 | 0 | 0 | 1 | 1 | 1 | 1 | 1 | 1 | 1 | 1 | * |
| | MV[0] | * | 0 | 1 | 1 | 1 | 1 | 1 | 1 | 1 | 0 | 0 | 0 | 0 | 1 | 1 | 1 | * |
| | WE | * | * | 0 | 0 | 0 | 0 | 1 | 1 | 1 | 1 | 0 | 0 | 1 | 1 | 0 | 1 | * |
| | IAB[1] | * | * | 0 | 0 | 1 | 1 | 0 | 0 | 1 | 1 | 0 | 1 | 0 | 1 | * | * | * |
| | IAB[0] | * | * | 0 | 1 | 0 | 1 | 0 | 1 | 0 | 1 | * | * | * | * | * | * | * |
| | AS | 0 | 1 | 1 | 1 | 1 | 1 | 1 | 1 | 1 | 1 | 1 | 1 | 1 | 1 | 1 | 1 | 0 |
| | ML[1] | * | 1 | 0 | 0 | 0 | 0 | 0 | 0 | 0 | 1 | 1 | 1 | 1 | 1 | 1 | 1 | * |
| | ML[0] | * | 1 | 1 | 1 | 1 | 1 | 1 | 1 | 1 | 0 | 0 | 0 | 0 | 0 | 1 | 1 | * |
| OUTPUT | MCT1 | 0 | 0 | 0 | 0 | 1 | 0 | 0 | 0 | 0 | 0 | 0 | 0 | 0 | 0 | 0 | 0 | 0 |
| | MCT2 | 0 | 0 | 0 | 0 | 0 | 1 | 0 | 0 | 0 | 0 | 1 | 0 | 0 | 0 | 0 | 0 | 0 |
| | MCT3 | 0 | 0 | 0 | 1 | 0 | 0 | 0 | 0 | 0 | 0 | 0 | 0 | 0 | 0 | 0 | 0 | 0 |
| | MCT4 | 0 | 1 | 1 | 0 | 0 | 0 | 0 | 0 | 0 | 0 | 1 | 0 | 0 | 0 | 1 | 0 | 0 |
| | MCT5 | 0 | 0 | 0 | 0 | 0 | 0 | 1 | 0 | 0 | 0 | 0 | 0 | 1 | 0 | 0 | 1 | 0 |
| | MCT6 | 0 | 0 | 0 | 0 | 0 | 1 | 0 | 0 | 0 | 0 | 0 | 0 | 0 | 0 | 0 | 0 | 0 |
| | MCT7 | 0 | 0 | 0 | 0 | 0 | 0 | 1 | 0 | 0 | 0 | 0 | 1 | 0 | 0 | 0 | 0 | 0 |
| | MCT8 | 0 | 0 | 0 | 0 | 0 | 0 | 1 | 0 | 0 | 0 | 0 | 0 | 0 | 0 | 0 | 0 | 0 |
| | MCT9 | 0 | 0 | 0 | 0 | 0 | 0 | 0 | 1 | 0 | 0 | 0 | 0 | 0 | 0 | 0 | 0 | 0 |
| | MCT10 | 0 | 1 | 0 | 0 | 0 | 0 | 0 | 0 | 1 | 0 | 0 | 1 | 0 | 0 | 1 | 0 | 0 |
| | MCT11 | 0 | 0 | 0 | 0 | 0 | 0 | 0 | 0 | 0 | 0 | 1 | 0 | 1 | 0 | 1 | 0 | 0 |
| | MCT12 | 0 | 0 | 0 | 0 | 0 | 0 | 0 | 0 | 0 | 0 | 0 | 0 | 1 | 0 | 0 | 0 | 0 |
| | MCT13 | 0 | 0 | 0 | 0 | 0 | 0 | 0 | 0 | 0 | 0 | 0 | 0 | 0 | 0 | 0 | 1 | 0 |
| | MCT31 | 0 | 0 | 0 | 0 | 0 | 0 | 1 | 1 | 1 | 1 | 0 | 0 | 1 | 1 | 0 | 1 | 0 |
| | MCT32 | 0 | 1 | 1 | 1 | 1 | 1 | 0 | 0 | 0 | 0 | 1 | 1 | 0 | 0 | 1 | 0 | 0 |
| | MCT33 | 0 | 1 | 0 | 0 | 0 | 0 | 0 | 0 | 0 | 0 | 1 | 1 | 0 | 0 | 1 | 0 | 0 |
| | MCT34 | 0 | 1 | 0 | 0 | 0 | 0 | 0 | 0 | 0 | 0 | 0 | 0 | 0 | 0 | 1 | 0 | 0 |

"*" INDICATES "Don't care"

| | NO. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| INPUT | MSEL | 0 | 1 | 1 | 1 | 1 | 1 | 1 | 1 | 1 | 1 | 1 | 1 | 1 | 1 | 1 | 1 | 1 |
| | IAB[14] | * | 0 | 1 | 1 | 1 | 1 | 1 | 1 | 1 | 1 | 1 | 1 | 1 | 1 | 1 | 1 | 1 |
| | MV[2] | * | * | * | * | * | * | * | * | * | * | * | * | * | * | * | * | * |
| | MV[1] | * | * | 0 | 0 | 0 | 0 | 0 | 0 | 0 | 1 | 1 | 1 | 1 | 1 | 1 | 1 | 1 |
| | MV[0] | * | * | 0 | 1 | 1 | 1 | 1 | 1 | 1 | 0 | 0 | 1 | 0 | 1 | 0 | 1 | 1 |
| | WE | * | * | * | 0 | 0 | 0 | 1 | 1 | 1 | 1 | 0 | 0 | 1 | 0 | 1 | 1 | 1 |
| | IAB[1] | * | * | * | 0 | 0 | 1 | 1 | 0 | 0 | 1 | 1 | 0 | 1 | 0 | 1 | * | * |
| | IAB[0] | * | * | * | 0 | 1 | 0 | 1 | 0 | 1 | 0 | 1 | * | * | * | * | * | * |
| | AS | 0 | 0 | 1 | 1 | 1 | 1 | 1 | 1 | 1 | 1 | 1 | 1 | 1 | 1 | 1 | 1 | 1 |
| | ML[1] | * | * | 1 | 0 | 0 | 0 | 0 | 0 | 0 | 0 | 0 | 1 | 1 | 1 | 1 | 1 | 1 |
| | ML[0] | * | * | 1 | 1 | 1 | 1 | 1 | 1 | 1 | 0 | 0 | 0 | 0 | 0 | 1 | 1 | 1 |
| OUTPUT | MCT1 | 0 | 0 | 0 | 0 | 0 | 1 | 0 | 0 | 0 | 0 | 0 | 0 | 0 | 0 | 0 | 0 | 0 |
| | MCT2 | 0 | 0 | 0 | 0 | 1 | 0 | 0 | 0 | 0 | 0 | 0 | 1 | 0 | 0 | 0 | 0 | 0 |
| | MCT3 | 0 | 0 | 0 | 1 | 0 | 0 | 0 | 0 | 0 | 0 | 0 | 0 | 0 | 0 | 0 | 0 | 0 |
| | MCT4 | 0 | 0 | 1 | 1 | 0 | 0 | 0 | 0 | 0 | 0 | 1 | 0 | 0 | 1 | 0 | 1 | 0 |
| | MCT5 | 0 | 0 | 0 | 0 | 0 | 0 | 1 | 0 | 0 | 0 | 0 | 0 | 1 | 0 | 0 | 1 | 1 |
| | MCT6 | 0 | 0 | 0 | 0 | 0 | 0 | 0 | 1 | 0 | 0 | 0 | 0 | 0 | 0 | 0 | 0 | 0 |
| | MCT7 | 0 | 0 | 0 | 0 | 0 | 0 | 0 | 0 | 1 | 0 | 0 | 0 | 0 | 1 | 0 | 0 | 0 |
| | MCT8 | 0 | 0 | 0 | 0 | 0 | 0 | 0 | 0 | 0 | 1 | 0 | 0 | 0 | 0 | 0 | 0 | 0 |
| | MCT9 | 0 | 0 | 0 | 0 | 0 | 0 | 0 | 0 | 0 | 0 | 1 | 0 | 0 | 0 | 0 | 0 | 0 |
| | MCT10 | 0 | 0 | 1 | 0 | 0 | 0 | 0 | 0 | 0 | 0 | 1 | 0 | 0 | 1 | 0 | 1 | 0 |
| | MCT11 | 0 | 0 | 0 | 0 | 0 | 0 | 0 | 0 | 0 | 0 | 0 | 1 | 0 | 1 | 0 | 1 | 1 |
| | MCT12 | 0 | 0 | 0 | 0 | 0 | 0 | 0 | 0 | 0 | 0 | 0 | 0 | 0 | 1 | 0 | 0 | 0 |
| | MCT13 | 0 | 0 | 0 | 0 | 0 | 0 | 0 | 0 | 0 | 0 | 0 | 0 | 0 | 0 | 0 | 1 | 0 |
| | MCT41 | 0 | 0 | 0 | 0 | 0 | 0 | 0 | 0 | 0 | 0 | 0 | 0 | 0 | 0 | 0 | 0 | 0 |
| | MCT42 | 0 | 0 | 0 | 0 | 0 | 0 | 0 | 1 | 1 | 1 | 0 | 0 | 1 | 1 | 0 | 0 | 1 |
| | MCT43 | 0 | 0 | 1 | 1 | 1 | 1 | 1 | 0 | 0 | 0 | 1 | 1 | 0 | 0 | 1 | 1 | 0 |
| | MCT44 | 0 | 0 | 0 | 0 | 0 | 0 | 0 | 0 | 0 | 0 | 0 | 0 | 0 | 0 | 0 | 0 | 0 |
| | MCT45 | 0 | 0 | 1 | 0 | 0 | 0 | 0 | 0 | 0 | 0 | 1 | 1 | 0 | 0 | 1 | 0 | 0 |
| | MCT46 | 0 | 0 | 0 | 0 | 0 | 0 | 0 | 0 | 0 | 0 | 0 | 0 | 0 | 0 | 0 | 0 | 0 |
| | MCT47 | 0 | 1 | 0 | 1 | 0 | 0 | 0 | 0 | 0 | 0 | 0 | 0 | 0 | 0 | 0 | 1 | 0 |
| | MCT48 | 0 | 0 | 0 | 0 | 0 | 0 | 0 | 0 | 0 | 0 | 0 | 0 | 0 | 0 | 0 | 0 | 0 |

"*" INDICATES "Don't care"

FIG. 31

| | NO. | MSEL | IAB[14] | MV[2] | MV[1] | MV[0] | WE | IAB[1] | IAB[0] | AS | ML[1] | ML[0] | MCT1 | MCT2 | MCT3 | MCT4 | MCT5 | MCT6 | MCT7 | MCT8 | MCT9 | MCT10 | MCT11 | MCT12 | MCT13 | MCT41 | MCT42 | MCT43 | MCT44 | MCT45 | MCT46 | MCT47 | MCT48 |
|---|---|---|---|---|---|---|---|---|---|---|---|---|---|---|---|---|---|---|---|---|---|---|---|---|---|---|---|---|---|---|---|---|---|
| INPUT | 1 | 0 | * | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| | 2 | 1 | 0 | * | * | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| | 3 | 1 | 1 | 0 | 0 | 0 | 0 | 0 | * | 1 | 1 | 1 | 0 | 0 | 0 | 1 | 0 | 0 | 0 | 0 | 0 | 1 | 0 | 0 | 0 | 0 | 0 | 1 | 0 | 1 | 0 | 1 | 0 |
| | 4 | 1 | 1 | 0 | 0 | 0 | 0 | 0 | 0 | 1 | 0 | 1 | 0 | 0 | 1 | 1 | 0 | 0 | 0 | 0 | 0 | 0 | 0 | 0 | 0 | 0 | 0 | 0 | 0 | 0 | 0 | 0 | 0 |
| | 5 | 1 | 1 | 0 | 0 | 0 | 1 | 0 | 1 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 6 | 1 | 1 | 0 | 0 | 0 | 1 | 0 | 0 | 1 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 |
| | 7 | 1 | 1 | 0 | 0 | 0 | 1 | 0 | 1 | 1 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 |
| | 8 | 1 | 1 | 0 | 0 | 0 | 1 | 1 | 0 | 1 | 0 | 1 | 0 | 0 | 0 | 0 | 0 | 0 | 1 | 0 | 0 | 0 | 0 | 0 | 0 | 0 | 0 | 1 | 0 | 0 | 0 | 0 | 0 |
| | 9 | 1 | 1 | 0 | 0 | 0 | 1 | 1 | 1 | 1 | 0 | 1 | 0 | 0 | 0 | 0 | 0 | 0 | 0 | 0 | 0 | 0 | 0 | 0 | 0 | 0 | 1 | 1 | 0 | 0 | 0 | 0 | 0 |
| | 10 | 1 | 1 | 0 | 0 | 1 | 1 | 1 | 0 | 1 | 0 | 1 | 0 | 0 | 0 | 0 | 0 | 0 | 0 | 0 | 0 | 0 | 0 | 0 | 1 | 0 | 1 | 0 | 0 | 1 | 0 | 0 | 0 |
| | 11 | 1 | 1 | 0 | 1 | 1 | 1 | 0 | * | 1 | 1 | 0 | 0 | 1 | 0 | 0 | 1 | 0 | 0 | 0 | 1 | 0 | 1 | 1 | 0 | 0 | 1 | 0 | 0 | 0 | 0 | 0 | 0 |
| | 12 | 1 | 1 | 0 | 1 | 1 | 0 | 0 | * | 1 | 1 | 0 | 0 | 0 | 0 | 0 | 0 | 0 | 0 | 1 | 0 | 0 | 0 | 1 | 1 | 0 | 1 | 1 | 0 | 0 | 0 | 0 | 0 |
| | 13 | 1 | 1 | 0 | 1 | 0 | 0 | 0 | 0 | 1 | 1 | 0 | 0 | 0 | 0 | 0 | 1 | 0 | 0 | 0 | 0 | 1 | 0 | 1 | 0 | 0 | 1 | 0 | 0 | 0 | 0 | 0 | 0 |
| | 14 | 1 | 1 | 0 | 1 | 1 | 0 | 0 | 1 | 1 | 1 | 0 | 0 | 0 | 0 | 0 | 0 | 0 | 0 | 0 | 0 | 0 | 1 | 0 | 0 | 0 | 0 | 1 | 0 | 1 | 0 | 0 | 0 |
| | 15 | 1 | 1 | 0 | 1 | 1 | 1 | 1 | 0 | 1 | 1 | 0 | 0 | 0 | 0 | 0 | 1 | 0 | 1 | 0 | 0 | 0 | 0 | 1 | 0 | 0 | 0 | 0 | 1 | 0 | 0 | 0 | 0 |
| | 16 | 1 | 1 | 0 | 1 | 1 | 1 | 0 | 1 | 1 | 1 | 0 | 0 | 0 | 0 | 0 | 0 | 0 | 0 | 0 | 0 | 1 | 1 | 0 | 0 | 0 | 0 | 0 | 1 | 0 | 0 | 1 | 0 |
| | 17 | 1 | 1 | 0 | 1 | 1 | 1 | 1 | 1 | 1 | 1 | 0 | 0 | 0 | 0 | 0 | 0 | 0 | 1 | 0 | 0 | 0 | 0 | 1 | 0 | 0 | 0 | 0 | 0 | 0 | 0 | 1 | 0 |
| | 18 | 1 | * | * | 1 | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 |
| | 19 | 1 | * | 1 | 1 | 0 | 0 | 0 | 1 | 1 | 1 | 0 | 0 | 0 | 0 | 0 | 1 | 0 | 0 | 0 | 0 | 0 | 0 | 0 | 0 | 0 | 0 | 0 | 0 | 0 | 1 | 1 | 0 |
| | 20 | 1 | * | 1 | 1 | 0 | 0 | 1 | 0 | 1 | 1 | 0 | 0 | 0 | 0 | 0 | 0 | 0 | 0 | 0 | 0 | 0 | 0 | 0 | 0 | 1 | 0 | 0 | 1 | 0 | 0 | 0 | 0 |
| | 21 | 1 | * | 1 | 1 | 1 | 1 | 0 | 1 | 1 | 1 | 1 | 0 | 0 | 0 | 0 | 1 | 0 | 0 | 0 | 0 | 0 | 1 | 0 | 0 | 0 | 0 | 0 | 0 | 1 | 0 | 0 | 0 |
| | 22 | 1 | * | 1 | 1 | 1 | 0 | 0 | * | 1 | 1 | 1 | 0 | 0 | 0 | 1 | 1 | 0 | 0 | 0 | 0 | 0 | 0 | 0 | 0 | 0 | 0 | 0 | 0 | 0 | 1 | 0 | 1 |
| | 23 | 1 | * | 1 | 1 | 1 | 1 | 1 | * | 1 | 1 | 1 | 0 | 0 | 0 | 0 | 0 | 0 | 0 | 0 | 0 | 1 | 0 | 0 | 0 | 0 | 0 | 0 | 1 | 0 | 1 | 0 | 1 |
| | 24 | 1 | * | 1 | 1 | 1 | 1 | 1 | * | 1 | 1 | 1 | 0 | 0 | 0 | 0 | 1 | 0 | 0 | 0 | 0 | 0 | 1 | 1 | 0 | 0 | 0 | 0 | 0 | 0 | 0 | 0 | 0 |

"*" INDICATES "Don't care"

FIG. 33

| NO. | MD[1] | MD[0] | EMV | EDIO | EDL | EN | ECT11 | ECT12 | ECT13 | ECT14 | ECT15 | ECT16 | ECT17 | ECT18 | ECT15 | ECT16 | REMARK |
|---|---|---|---|---|---|---|---|---|---|---|---|---|---|---|---|---|---|
| | | | INPUT | | | | | | | | OUTPUT | | | | | | REMARK |
| 1 | 0 | 0 | * | * | * | 0 | 0 | 0 | 0 | 0 | 0 | 0 | 0 | 0 | 0 | 0 | MODE1 |
| 2 | 0 | 1 | 0 | * | * | 1 | 0 | 0 | 0 | 0 | 0 | 0 | 0 | 0 | 0 | 0 | MODE1 |
| 3 | 0 | 1 | 1 | 0 | 0 | 1 | 0 | 1 | 0 | 0 | 0 | 0 | 0 | 0 | 1 | 0 | MODE2 |
| 4 | 0 | 1 | 1 | 0 | 1 | 1 | 1 | 0 | 0 | 0 | 0 | 0 | 0 | 0 | 1 | 1 | MODE2 |
| 5 | 0 | 1 | 1 | 1 | 0 | 1 | 0 | 0 | 0 | 0 | 1 | 1 | 0 | 0 | 0 | 1 | MODE2 |
| 6 | 0 | 1 | 1 | 1 | 1 | 1 | 0 | 0 | 0 | 1 | 0 | 0 | 0 | 0 | 0 | 0 | MODE2 |
| 7 | 1 | 0 | 0 | * | * | 1 | 0 | 0 | 0 | 0 | 0 | 0 | 0 | 0 | 0 | 0 | MODE3 |
| 8 | 1 | 0 | 1 | 0 | 0 | 1 | 0 | 0 | 1 | 0 | 0 | 0 | 0 | 0 | 1 | 0 | MODE3 |
| 9 | 1 | 0 | 1 | 0 | 1 | 1 | 0 | 0 | 0 | 1 | 0 | 0 | 0 | 0 | 1 | 1 | MODE3 |
| 10 | 1 | 1 | 1 | 1 | 0 | 1 | 0 | 0 | 0 | 0 | 0 | 1 | 1 | 0 | 0 | 1 | MODE3 |
| 11 | 1 | 1 | 1 | 1 | 1 | 1 | 0 | 0 | 0 | 0 | 0 | 0 | 1 | 1 | 0 | 1 | MODE3 |
| 12 | 1 | 1 | * | * | * | 0 | 0 | 0 | 0 | 0 | 0 | 0 | 0 | 0 | 0 | 0 | UN-DEFINED CODE |

"*" INDICATES "Don't care"

FIG. 40

| NO. | MD[1] | MD[0] | MSELX | XAB[14] | MVX | IAB[14] | MVI[2] | MVI[1] | MVI[0] | IAB[13:0] | XAB[13:0] | ASX | MLX[1] | MLX[0] | ABX[13:0] | REMARK |
|---|---|---|---|---|---|---|---|---|---|---|---|---|---|---|---|---|
| 1 | * | 0 | 0 | * | * | * | * | * | * | * | * | 0 | * | * | * | MODE1 OR MODE3 |
| 2 | * | 0 | 1 | 0 | 0 | 0 | * | 0 | 0 | A | B | 1 | 1 | 1 | A | |
| 3 | * | 0 | 1 | 0 | 0 | 0 | * | 0 | 1 | A | B | 1 | 0 | 1 | A | |
| 4 | * | 0 | 1 | 0 | 0 | 0 | * | 1 | 0 | A | B | 1 | 1 | 0 | A | |
| 5 | * | 0 | 1 | 0 | 0 | 0 | * | 1 | 1 | A | B | 1 | 1 | 1 | A | |
| 6 | * | 0 | 1 | 0 | 1 | * | * | * | * | A | B | 0 | * | * | * | |
| 7 | * | 0 | 1 | 1 | * | * | * | * | * | A | B | 1 | * | 0 | B | |
| 8 | * | 1 | 0 | * | * | * | * | * | * | * | * | 0 | * | * | * | MODE2 |
| 9 | 0 | 1 | 1 | * | 0 | 0 | 0 | 0 | 0 | A | B | 1 | 1 | 1 | A | |
| 10 | 0 | 1 | 1 | * | 0 | 0 | 0 | 0 | 1 | A | B | 1 | 0 | 1 | A | |
| 11 | 0 | 1 | 1 | * | 0 | 0 | 0 | 1 | 0 | A | B | 1 | 1 | 0 | A | |
| 12 | 0 | 1 | 1 | * | 0 | 0 | 0 | 1 | 1 | A | B | 1 | 1 | 1 | A | |
| 13 | 0 | 1 | 1 | * | 0 | 0 | 1 | * | * | * | * | 0 | * | * | * | |
| 14 | 0 | 1 | 1 | * | 0 | 1 | 1 | * | * | * | * | 0 | * | * | * | |
| 15 | 0 | 1 | 1 | * | 0 | 1 | 1 | 0 | 0 | A | B | 1 | 1 | 1 | A | |
| 16 | 0 | 1 | 1 | * | 0 | 1 | 1 | 0 | 1 | A | B | 1 | 0 | 1 | A | |
| 17 | 0 | 1 | 1 | * | 0 | 1 | 1 | 1 | 0 | A | B | 1 | 1 | 0 | A | |
| 18 | 1 | 1 | 1 | * | 1 | * | * | * | * | A | B | 1 | * | 0 | B | |
| 19 | 1 | 1 | * | * | * | * | * | * | * | * | * | * | * | * | * | UN-DEFINED CODE |

"*" INDICATES "Don't care"

FIG. 41

| NO. | MSELX | XAB[14] | MVX | IAB[14] | MVI[2] | MVI[1] | MVI[0] | WEX | ABX[1] | ABX[0] | MCT51 | MCT52 | MCT53 | MCT54 | MCT55 | MCT56 | MCT57 | MCT58 | MCT59 | MCT60 | MCT61 | MCT62 | MCT63 | MCT64 | MCT65 | MCT66 | MCT67 | MCT68 | MCT69 | MCT70 | MCT71 | MCT72 | MCT73 | MCT74 | MCT75 |
|---|---|---|---|---|---|---|---|---|---|---|---|---|---|---|---|---|---|---|---|---|---|---|---|---|---|---|---|---|---|---|---|---|---|---|---|
| INPUT | | | | | | | | | | | OUTPUT | | | | | | | | | | | | | | | | | | | | | | | | |
| 1 | 0 | * | * | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | * | 0 | 0 | * | 0 | 0 | * | * | * | 0 | 0 | 0 | 1 | 0 | 0 | 0 | 0 | 0 | 1 | 0 | 0 | 0 | 0 | 0 | 0 | 0 | 1 | 0 | 1 | 0 | 0 | 0 | 1 | 0 |
| 3 | 1 | * | 0 | 0 | * | 0 | 1 | 0 | 0 | 0 | 0 | 0 | 1 | 1 | 0 | 0 | 0 | 0 | 0 | 0 | 0 | 0 | 0 | 0 | 0 | 0 | 0 | 1 | 0 | 0 | 0 | 0 | 0 | 0 | 0 |
| 4 | 1 | * | 0 | 0 | * | 0 | 1 | 0 | 0 | 1 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 5 | 1 | * | 0 | 0 | * | 0 | 1 | 0 | 1 | 0 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 6 | 1 | * | 0 | 0 | * | 1 | 0 | 1 | 1 | 1 | 0 | 0 | 0 | 0 | 0 | 1 | 0 | 0 | 0 | 0 | 0 | 0 | 0 | 0 | 0 | 0 | 1 | 1 | 0 | 0 | 0 | 0 | 0 | 0 | 0 |
| 7 | 1 | * | 0 | 0 | * | 1 | 0 | 1 | 0 | 1 | 0 | 0 | 0 | 0 | 0 | 0 | 1 | 0 | 0 | 0 | 0 | 0 | 0 | 0 | 0 | 0 | 1 | 1 | 0 | 0 | 0 | 0 | 0 | 0 | 0 |
| 8 | 1 | * | 0 | 0 | * | 1 | 0 | 1 | 1 | 0 | 0 | 0 | 0 | 0 | 1 | 0 | 0 | 1 | 0 | 0 | 0 | 0 | 0 | 0 | 0 | 0 | 1 | 1 | 0 | 0 | 0 | 0 | 0 | 0 | 0 |
| 9 | 1 | * | 0 | 0 | * | 1 | 1 | 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 10 | 1 | * | 0 | 0 | * | 0 | 1 | 0 | 0 | 1 | 0 | 1 | 0 | 1 | 0 | 0 | 0 | 0 | 0 | 1 | 0 | 0 | 0 | 0 | 0 | 0 | 0 | 1 | 0 | 1 | 0 | 0 | 0 | 0 | 0 |
| 11 | 1 | * | 0 | 0 | * | 1 | 0 | 0 | 1 | 0 | 0 | 0 | 0 | 0 | 1 | 0 | 0 | 0 | 0 | 0 | 0 | 0 | 0 | 0 | 0 | 0 | 0 | 1 | 0 | 0 | 0 | 0 | 0 | 0 | 0 |
| 12 | 1 | * | 0 | 0 | 0 | 1 | 1 | 1 | 0 | 1 | 0 | 1 | 0 | 0 | 0 | 0 | 1 | 0 | 0 | 0 | 1 | 0 | 0 | 0 | 0 | 0 | 1 | 1 | 0 | 0 | 0 | 0 | 0 | 0 | 0 |
| 13 | 1 | * | 0 | 0 | 0 | 1 | 0 | 0 | 1 | 1 | 0 | 0 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 |
| 14 | 1 | * | 0 | 0 | 0 | 1 | 1 | 1 | 1 | 0 | 0 | 0 | 0 | 0 | 1 | 0 | 1 | 0 | 0 | 1 | 1 | 0 | 1 | 0 | 0 | 0 | 1 | 1 | 0 | 1 | 0 | 0 | 0 | 0 | 0 |
| 15 | 1 | * | 0 | 0 | 0 | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 1 | * | 0 | 1 | * | * | * | * | * | * | 0 | 0 | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 |
| 17 | 1 | 0 | 1 | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 1 | 0 | 1 | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 1 | 1 | 1 | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 1 | 1 | 1 | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

"*" INDICATES "Don't care"

| NO. | INPUT | | | | | | | | | | | OUTPUT | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| | MSELX | XAB[14] | MVX | IAB[14] | MVI[2] | MVI[1] | MVI[0] | WEX | ABX[1] | ABX[0] | | MCT51 | MCT52 | MCT53 | MCT54 | MCT55 | MCT56 | MCT57 | MCT58 | MCT59 | MCT60 | MCT61 | MCT62 | MCT63 | MCT64 | MCT65 | MCT66 | MCT67 | MCT68 | MCT69 | MCT70 | MCT71 | MCT72 | MCT73 | MCT74 | MCT75 |
| 1 | 0 | * | * | * | * | * | * | * | * | * | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | * | 0 | 0 | * | 0 | 0 | * | * | * | | 0 | 0 | 0 | 1 | 0 | 0 | 0 | 0 | 0 | 1 | 0 | 0 | 0 | 0 | 0 | 0 | 0 | 0 | 1 | 0 | 1 | 0 | 0 | 0 | 1 |
| 3 | 1 | * | 0 | 0 | * | 0 | 1 | 0 | 0 | 0 | | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 4 | 1 | * | 0 | 0 | * | 0 | 1 | 0 | 0 | 1 | | 0 | 0 | 1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 5 | 1 | * | 0 | 0 | * | 0 | 1 | 0 | 1 | 0 | | 0 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 6 | 1 | * | 0 | 0 | * | 0 | 1 | 1 | 1 | 1 | | 1 | 0 | 0 | 0 | 1 | 1 | 0 | 0 | 0 | 0 | 0 | 0 | 0 | 0 | 0 | 1 | 0 | 0 | 1 | 0 | 0 | 0 | 0 | 0 | 0 |
| 7 | 1 | * | 0 | 0 | * | 0 | 1 | 1 | 0 | 1 | | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 8 | 1 | * | 0 | 0 | * | 0 | 1 | 1 | 0 | 0 | | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 9 | 1 | * | 0 | 0 | * | 0 | 1 | 1 | 1 | 1 | | 0 | 0 | 0 | 0 | 1 | 0 | 0 | 0 | 1 | 0 | 0 | 0 | 0 | 0 | 0 | 1 | 0 | 0 | 0 | 0 | 0 | 0 | 0 | 0 | 0 |
| 10 | 1 | * | 0 | 0 | * | 1 | 0 | 1 | * | * | | 0 | 1 | 0 | 0 | 1 | 0 | 1 | 0 | 0 | 1 | 0 | 0 | 0 | 0 | 0 | 0 | 0 | 0 | 1 | 0 | 1 | 0 | 0 | 0 | 0 |
| 11 | 1 | * | 0 | 0 | * | 1 | 0 | 0 | 0 | * | | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 12 | 1 | * | 0 | 0 | * | 1 | 1 | 1 | 1 | * | | 0 | 0 | 0 | 1 | 0 | 0 | 0 | 0 | 1 | 0 | 1 | 1 | 1 | 0 | 0 | 1 | 0 | 0 | 0 | 0 | 0 | 0 | 0 | 0 | 0 |
| 13 | 1 | * | 0 | 0 | * | 1 | 1 | 0 | 0 | * | | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 14 | 1 | * | 0 | 0 | * | 1 | 1 | 1 | 1 | * | | 0 | 0 | 0 | 0 | 1 | 0 | 0 | 0 | 1 | 0 | 1 | 0 | 1 | 0 | 0 | 1 | 0 | 0 | 0 | 0 | 0 | 0 | 0 | 0 | 0 |
| 15 | 1 | * | 0 | 0 | * | 1 | 0 | 1 | * | * | | 0 | 0 | 0 | 1 | 0 | 0 | 0 | 0 | 0 | 1 | 0 | 1 | 0 | 0 | 0 | 0 | 0 | 0 | 0 | 0 | 0 | 0 | 0 | 0 | 0 |
| 16 | 1 | * | 0 | 0 | * | * | * | * | * | * | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 1 | * | 0 | 1 | * | * | * | 0 | * | * | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 1 | 0 | 1 | * | * | * | * | 1 | * | * | | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 0 | 0 |
| 19 | 1 | 1 | 1 | * | * | * | * | 0 | * | * | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 1 | 1 | 1 | * | * | * | * | * | * | * | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

"*" INDICATES "Don't care"

FIG. 44

| NO. | MD[1] | MD[0] | MSELX | XAB[14] | MVX | IAB[14] | MVI[2] | MVI[1] | MVI[0] | IAB[13:0] | XAB[13:0] | ASX | MLX[1] | MLX[0] | ABX[13:0] | REMARK |
|---|---|---|---|---|---|---|---|---|---|---|---|---|---|---|---|---|
| 1 | * | 0 | 0 | * | * | * | * | * | * | * | * | 0 | * | * | * | |
| 2 | * | 0 | 1 | 0 | * | * | * | * | * | A | B | 0 | * | * | * | MODE1 OR MODE3 |
| 3 | * | 0 | 1 | 1 | 0 | 0 | * | 0 | 0 | A | B | 1 | 1 | 1 | A | |
| 4 | * | 0 | 1 | 1 | 0 | 0 | * | 0 | 1 | A | B | 1 | 0 | 1 | A | |
| 5 | * | 0 | 1 | 1 | 0 | 0 | * | 1 | 0 | A | B | 1 | 1 | 0 | A | |
| 6 | * | 0 | 1 | 1 | 0 | 0 | * | 1 | 1 | A | B | 1 | 1 | 1 | A | |
| 7 | * | 0 | 1 | 1 | 0 | 1 | * | * | * | A | B | 1 | * | * | * | |
| 8 | * | 0 | 1 | 1 | 1 | * | * | * | * | A | B | 0 | 1 | 1 | B | |
| 9 | 0 | 1 | 0 | * | * | * | 0 | * | * | * | * | 0 | * | * | * | MODE2 |
| 10 | 0 | 1 | 1 | * | 0 | 0 | 1 | 0 | 0 | A | B | 1 | 1 | 0 | A | |
| 11 | 0 | 1 | 1 | * | 0 | 0 | 1 | 1 | 1 | A | B | 1 | 1 | 1 | A | |
| 12 | 0 | 1 | 1 | * | 0 | 0 | * | 0 | 0 | A | B | 1 | 1 | 0 | A | |
| 13 | 0 | 1 | 1 | * | 0 | 1 | * | 0 | 1 | A | B | 1 | 0 | 1 | A | |
| 14 | 0 | 1 | 1 | * | 0 | 0 | * | 1 | 0 | A | B | 1 | 1 | 0 | A | |
| 15 | 0 | 1 | 1 | * | 0 | 1 | * | 1 | 1 | A | B | 1 | 1 | 1 | A | |
| 16 | 0 | 1 | 1 | * | 0 | 1 | * | 0 | 0 | A | B | 1 | 0 | 1 | A | |
| 17 | 0 | 1 | 1 | * | 0 | 1 | * | 1 | 0 | A | B | 1 | 1 | 0 | A | |
| 18 | 0 | 1 | 1 | * | 1 | * | * | * | * | A | B | 0 | 1 | 1 | B | |
| 19 | 1 | 1 | * | * | * | * | * | * | * | * | * | * | * | * | * | UN-DEFINED CODE |

"*" INDICATES "Don't care"

FIG. 45

| NO. | INPUT | | | | | | | | | | | OUTPUT | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| | MSELX | XAB[14] | MVX | IAB[14] | MV[2] | MV[1] | MV[0] | WEX | ABX[1] | ABX[0] | MCT51 | MCT52 | MCT53 | MCT54 | MCT55 | MCT56 | MCT57 | MCT58 | MCT59 | MCT60 | MCT61 | MCT62 | MCT63 | MCT64 | MCT65 | MCT66 | MCT67 | MCT68 | MCT69 | MCT70 | MCT71 | MCT72 | MCT73 | MCT74 | MCT75 |
| 1 | 0 | * | * | * | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 1 | * | 0 | 0 | * | * | * | * | * | * | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 1 | 0 |
| 3 | 1 | * | 0 | 1 | * | 0 | 0 | 0 | * | * | 0 | 0 | 0 | 1 | 0 | 0 | 0 | 0 | 0 | 0 | 0 | 0 | 0 | 0 | 0 | 0 | 0 | 1 | 0 | 0 | 0 | 0 | 0 | 0 | 0 |
| 4 | 1 | * | 0 | 1 | * | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 5 | 1 | * | 0 | 1 | * | 0 | 1 | 0 | 1 | 1 | 1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 6 | 1 | * | 0 | 1 | * | 0 | 1 | 1 | 0 | 0 | 0 | 0 | 0 | 0 | 0 | 1 | 0 | 0 | 0 | 0 | 0 | 0 | 0 | 0 | 0 | 0 | 1 | 1 | 0 | 0 | 0 | 0 | 0 | 0 | 0 |
| 7 | 1 | * | 0 | 1 | * | 0 | 1 | 1 | 0 | 1 | 0 | 0 | 0 | 0 | 0 | 0 | 1 | 0 | 0 | 0 | 0 | 0 | 0 | 0 | 0 | 0 | 1 | 0 | 0 | 0 | 0 | 0 | 0 | 0 | 0 |
| 8 | 1 | * | 0 | 1 | * | 0 | 1 | 1 | 1 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | 0 | 0 | 0 |
| 9 | 1 | * | 0 | 1 | * | 0 | 1 | 1 | 1 | 1 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | 0 | 0 |
| 10 | 1 | * | 0 | 1 | * | 1 | 0 | 0 | 0 | * | 0 | 0 | 0 | 1 | 0 | 0 | 0 | 0 | 0 | 1 | 0 | 0 | 0 | 0 | 0 | 0 | 0 | 1 | 0 | 1 | 0 | 0 | 0 | 0 | 0 |
| 11 | 1 | * | 0 | 1 | * | 1 | 0 | 0 | 1 | * | 0 | 1 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| 12 | 1 | * | 0 | 1 | * | 1 | 0 | 1 | 0 | 1 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 |
| 13 | 1 | * | 0 | 1 | * | 1 | 0 | 1 | 1 | 0 | 0 | 0 | 0 | 1 | 0 | 0 | 0 | 0 | 0 | 1 | 1 | 0 | 0 | 0 | 0 | 0 | 1 | 1 | 0 | 0 | 0 | 0 | 0 | 0 | 0 |
| 14 | 1 | * | 0 | 1 | * | 1 | 0 | 0 | * | * | 0 | 0 | 0 | 0 | 1 | 0 | 0 | 0 | 0 | 0 | 0 | 0 | 0 | 0 | 0 | 0 | 0 | 1 | 0 | 1 | 0 | 0 | 0 | 0 | 0 |
| 15 | 1 | * | 0 | 1 | * | 1 | 0 | 1 | * | * | 0 | 0 | 0 | 1 | 0 | 0 | 0 | 0 | 0 | 0 | 1 | 1 | 1 | 0 | 0 | 0 | 1 | 0 | 0 | 0 | 0 | 0 | 0 | 0 | 0 |
| 16 | 1 | 0 | 1 | * | * | * | * | 0 | * | * | 0 | 0 | 0 | 0 | 1 | 0 | 0 | 0 | 0 | 1 | 0 | 0 | 1 | 0 | 0 | 0 | 0 | 0 | 0 | 0 | 0 | 0 | 0 | 0 | 0 |
| 17 | 1 | 1 | 1 | * | * | * | * | 1 | * | * | 0 | 0 | 0 | 0 | 0 | 0 | 0 | 0 | 0 | 0 | 0 | 0 | 1 | 0 | 0 | 0 | 1 | 1 | 0 | 1 | 0 | 0 | 0 | 0 | 0 |
| 18 | 1 | 1 | 1 | * | * | * | * | 0 | * | * | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 19 | 1 | 1 | 1 | * | * | * | * | 0 | * | * | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 20 | 1 | 1 | 1 | * | * | * | * | 1 | * | * | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |

"*" INDICATES "Don't care"

"*" INDICATES "Don't care"

FIG. 50

| NO. | INPUT | | | | | | | | | OUTPUT | | | | | | | | | | | REMARK |
|---|---|---|---|---|---|---|---|---|---|---|---|---|---|---|---|---|---|---|---|---|---|
| | MD[1] | MD[0] | EMVY | EMVX | EMV | EDIOX | EDIOY | EDLI | EN | ECT21 | ECT22 | ECT23 | ECT24 | ECT25 | ECT26 | ECT27 | ECT28 | ECT29 | ECT30 | ECT31 | |
| 1 | 0 | * | 0 | 0 | 0 | * | * | * | 1 | 0 | 0 | 0 | 0 | 0 | 0 | 0 | 0 | 0 | 0 | 0 | MODE1 OR MODE2 |
| 2 | 0 | * | 0 | 0 | 1 | 0 | * | 0 | 1 | 0 | 1 | 0 | 0 | 0 | 0 | 0 | 0 | 1 | 0 | 0 | |
| 3 | 0 | * | 0 | 0 | 1 | 0 | * | 1 | 1 | 1 | 0 | 0 | 0 | 0 | 1 | 0 | 0 | 1 | 0 | 0 | |
| 4 | 0 | * | 0 | 0 | 1 | 1 | * | 0 | 1 | 0 | 0 | 0 | 0 | 0 | 0 | 0 | 0 | 0 | 1 | 0 | |
| 5 | 0 | * | 0 | 0 | 1 | 1 | * | 1 | 1 | 0 | 0 | 0 | 0 | 1 | 0 | 0 | 0 | 0 | 1 | 0 | |
| 6 | 0 | * | 0 | 1 | * | 0 | * | * | 1 | 0 | 0 | 1 | 1 | 0 | 0 | 1 | 0 | 1 | 0 | 1 | |
| 7 | 0 | * | 1 | 1 | * | 1 | 0 | * | 1 | 0 | 0 | 0 | 0 | 0 | 0 | 0 | 1 | 0 | 0 | 0 | |
| 8 | 0 | * | 1 | 0 | * | * | 1 | * | 1 | 0 | 0 | 0 | 1 | 0 | 0 | 0 | 0 | 0 | 1 | 0 | |
| 9 | 0 | * | 1 | 0 | * | 0 | 0 | * | 1 | 0 | 0 | 1 | 0 | 0 | 0 | 0 | 1 | 1 | 0 | 1 | |
| 10 | 0 | * | 1 | 1 | * | 0 | 1 | * | 1 | 0 | 0 | 1 | 1 | 0 | 0 | 0 | 0 | 0 | 1 | 1 | |
| 11 | 0 | * | 1 | 1 | * | 1 | 0 | * | 1 | 0 | 0 | 0 | 0 | 0 | 0 | 1 | 1 | 0 | 0 | 1 | |
| 12 | 0 | * | 1 | 1 | * | 1 | 1 | * | 1 | 0 | 0 | 0 | 1 | 0 | 0 | 1 | 0 | 0 | 1 | 1 | |
| 13 | 0 | * | 1 | 1 | * | 1 | 1 | * | 1 | 0 | 0 | 0 | 0 | 0 | 0 | 1 | 1 | 0 | 0 | 1 | |
| 14 | 1 | * | * | * | * | * | * | * | 0 | 0 | 0 | 0 | 0 | 0 | 0 | 0 | 0 | 0 | 0 | 0 | MODE3 |

"*" INDICATES "Don't care"

FIG. 51

| NO. | MD[1] | MD[0] | EMVY | EMVX | EMV | EDIOX | EDIOY | EDLU | EN | ECT21 | ECT22 | ECT23 | ECT24 | ECT25 | ECT26 | ECT27 | ECT28 | ECT29 | ECT30 | ECT31 | REMARK |
|---|---|---|---|---|---|---|---|---|---|---|---|---|---|---|---|---|---|---|---|---|---|
| 1 | 0 | 0 | * | * | * | * | * | * | 0 | 0 | 0 | 0 | 0 | 0 | 0 | 0 | 0 | 0 | 0 | 0 | MODE1 |
| 2 | 0 | 1 | 0 | 0 | 0 | 0 | * | * | 1 | 0 | 0 | 0 | 0 | 0 | 0 | 0 | 0 | 0 | 0 | 0 | MODE2 |
| 3 | 0 | 1 | 0 | 0 | 1 | 0 | * | * | 1 | 1 | 1 | 0 | 0 | 0 | 0 | 0 | 0 | 1 | 0 | 0 | |
| 4 | 0 | 1 | 0 | 0 | 1 | 1 | * | * | 1 | 1 | 0 | 0 | 0 | 0 | 0 | 0 | 0 | 1 | 0 | 0 | |
| 5 | 0 | 1 | 0 | 0 | 1 | 1 | * | * | 1 | 0 | 0 | 0 | 0 | 0 | 1 | 0 | 0 | 0 | 1 | 0 | |
| 6 | 0 | 1 | 0 | 0 | 1 | 0 | * | * | 1 | 0 | 0 | 1 | 0 | 0 | 0 | 0 | 0 | 0 | 0 | 0 | |
| 7 | 0 | 1 | 0 | 1 | * | 1 | * | * | 1 | 0 | 0 | 0 | 0 | 0 | 0 | 1 | 0 | 1 | 0 | 1 | |
| 8 | 0 | 1 | 1 | 1 | * | * | * | * | 1 | 0 | 0 | 0 | 1 | 0 | 0 | 0 | 1 | 0 | 0 | 0 | |
| 9 | 0 | 1 | 1 | 0 | * | * | 0 | * | 1 | 0 | 0 | 0 | 1 | 0 | 0 | 0 | 1 | 0 | 1 | 0 | |
| 10 | 0 | 1 | 1 | 1 | * | 0 | 1 | * | 1 | 0 | 0 | 1 | 1 | 0 | 0 | 0 | 1 | 1 | 0 | 1 | |
| 11 | 0 | 1 | 1 | 1 | * | 1 | 0 | * | 1 | 0 | 0 | 1 | 0 | 0 | 0 | 0 | 1 | 0 | 1 | 0 | |
| 12 | 0 | 1 | 1 | 1 | * | 1 | 1 | * | 1 | 0 | 0 | 1 | 1 | 0 | 0 | 1 | 1 | 1 | 0 | 1 | |
| 13 | 0 | 1 | 1 | 1 | * | * | * | * | 1 | 0 | 0 | 0 | 0 | 0 | 0 | 0 | 0 | 1 | 1 | 1 | |
| 14 | 0 | 1 | 1 | 1 | * | * | * | * | 1 | 0 | 0 | 0 | 0 | 0 | 0 | 0 | 0 | 0 | 0 | 0 | |
| 15 | 1 | 0 | 0 | 0 | 0 | 0 | * | 0 | 1 | 0 | 1 | 0 | 0 | 0 | 0 | 0 | 0 | 0 | 0 | 0 | MODE3 |
| 16 | 1 | 0 | 0 | 0 | 1 | 0 | * | 1 | 1 | 0 | 0 | 0 | 0 | 0 | 1 | 0 | 0 | 1 | 1 | 0 | |
| 17 | 1 | 0 | 0 | 0 | 1 | 1 | * | 0 | 1 | 0 | 0 | 0 | 0 | 0 | 0 | 0 | 0 | 1 | 0 | 0 | |
| 18 | 1 | 0 | 0 | 0 | 1 | 1 | * | 1 | 1 | 0 | 0 | 0 | 0 | 0 | 0 | 0 | 0 | 0 | 1 | 1 | |
| 19 | 1 | 0 | 0 | 0 | 1 | 0 | * | * | 1 | 0 | 0 | 1 | 0 | 0 | 0 | 0 | 0 | 0 | 0 | 0 | |
| 20 | 1 | 0 | 0 | 1 | * | * | * | * | 1 | 0 | 0 | 0 | 0 | 0 | 0 | 1 | 0 | 1 | 0 | 1 | |
| 21 | 1 | 0 | 1 | 1 | * | * | * | * | 1 | 0 | 0 | 1 | 1 | 0 | 0 | 0 | 1 | 0 | 0 | 0 | |
| 22 | 1 | 1 | 1 | 0 | * | * | * | * | 1 | 0 | 0 | 0 | 1 | 0 | 0 | 0 | 1 | 0 | 1 | 0 | |
| 23 | 1 | 1 | 1 | 1 | * | * | * | * | 1 | 0 | 0 | 1 | 1 | 0 | 0 | 0 | 1 | 1 | 0 | 1 | |
| 24 | 1 | 0 | 1 | 1 | * | * | * | * | 1 | 0 | 0 | 1 | 0 | 0 | 0 | 0 | 1 | 1 | 1 | 0 | |
| 25 | 1 | 1 | 1 | 0 | * | * | * | * | 1 | 0 | 0 | 0 | 1 | 0 | 0 | 0 | 1 | 0 | 1 | 1 | |
| 26 | 1 | 0 | 1 | 1 | * | * | * | * | 1 | 0 | 0 | 0 | 1 | 0 | 0 | 0 | 0 | 1 | 0 | 1 | |
| 27 | 1 | 1 | 1 | 1 | * | * | * | * | 1 | 0 | 0 | 0 | 0 | 0 | 0 | 0 | 1 | 1 | 1 | 1 | |
| 28 | 1 | 1 | * | * | * | * | * | * | 0 | 0 | 0 | 0 | 0 | 0 | 0 | 0 | 0 | 0 | 0 | 0 | UN-DEFINED CODE |

"*" INDICATES "Don't care"

FIG. 55

MSB          LSB   MODE DESIGNATED FIELD

| INSTRUCTION CODE | 2 BIT |
|---|---|

DEFINITION OF THE MODE DESIGNATED FIELD
00 : MODE1
01 : MODE2
10 : MODE3
11 : RESERVED CODE

FIG. 56

SAMPLE OF CPU INSTRUCTIONS

| INSTRUCTION DESCRIPTION | INSTRUCTION CODE |
|---|---|
| MAC.L @Rs+, @Rn+ | 0000nnnnssss1111 |
| MOV.L Rs, @(disp, Rn) | 0001nnnnssssdddd |
| AND Rs, Rn | 0010nnnnssss1001 |
| ADD Rs, Rn | 0011nnnnssss1100 |
| SHLL Rn | 0100nnnn00000000 |
| MOV.L @(disp, Rs), Rn | 0101nnnnssssdddd |
| MOV.L @Rs, Rn | 0110nnnnssss0010 |
| ADD #imm, Rn | 0111nnnniiiiiiii |
| MOV.B R0, @(disp, Rn) | 10000000nnnndddd |
| MOV.W @(disp, PC), Rn | 1001nnnndddddddd |
| BRA Label | 1010dddddddddddd |
| BSR Label | 1011dddddddddddd |
| OR #imm, R0 | 11001011iiiiiiii |
| MOV.L @(disp, PC),Rn | 1101nnnndddddddd |
| MOV #imm, Rn | 1110nnnniiiiiiii |

SAMPLE OF DSP INSTRUCTIONS

| INSTRUCTION DESCRIPTION | MSB INSTRUCTION CODE LSB |
|---|---|
| PMULS Se, Sf, Dg<br>MOVX.W @Aa, Db   MOVY.W @Ac, Dd | 111110acbd000101 0100eeff0000gg00 |
| PADD Sx, Sy, Du   PMULS Se, Sf, Dg<br>MOVX.W @Aa+,Db MOVY.W @Ac+, Dd | 111110acbd001010 0111eeffxxyygguu |
| PSUB Sx, Sy, Du   PMULS Se, Sf, Dg<br>MOVX.W Da, @Ab MOVY.W Dc, @Ad | 111110bdac110101 0110eeffxxyygguu |

MICROCOMPUTER HAVING DATA EXECUTION UNITS MOUNTED THEREON

BACKGROUND OF THE INVENTION

In order to improve the operating performance, there is in the prior art a one-chip microcomputer which has a multiply and accumulation unit mounted thereon for executing a specific operation with a smaller cycle number. On the so-called "RISC processor", as described on pp. 99 to 112 of Nikkei Electronics published on Nov. 23, 1992, there is mounted a multiply and accumulation module in addition to the general-purpose CPU so that the multiply and accumulation operations to be frequently executed in the digital signal processing may be executed in a smaller number of cycles.

For the higher performance, moreover, there is an example which is equipped with the multiply and accumulation unit capable of executing a plurality of identical operations simultaneously in parallel.

An example of Japanese Patent Laid-Open No. 83624/1994 is equipped with first and second execution lines which have a set of a data memory and an execution unit so that they can be simultaneously processed and independently processed, if necessary, with control signals coming from an instruction decoder.

In another publication of Japanese Patent Laid-Open No. 282926/1991, a floating point operation unit is provided as the data operation module so that the individual functions of the single-precision data operation/double-precision data operation/single-precision two-parallel data operation are realized with a common execution unit by switching modes.

In still another publication of Japanese Patent Laid-Open No. 94328/1991, the multiplier is exemplified by realizing the individual functions of the single-precision data operation/double-precision data operation/single-precision two-parallel data operation with a common hardware.

The techniques, as disclosed in the above-specified three Laid-Opens, are intended to improve the performance while suppressing the enlarged scale of the hardware by realizing the single-precision data operation and the single-precision two-parallel data operation by the common hardware.

SUMMARY OF THE INVENTION

In the invention disclosed in Japanese Patent Laid-Open No. 83624/1994, however, the first execution line and the second execution line are made independent so that the data of the first data memory cannot be executed by the second execution unit. Nor can be executed the data of the second data memory by the first execution unit. On the other hand, the remaining two Laid-Opens have disclosed means for the single-precision two-parallel data operation but not means for feeding source data necessary for the operations and specific means for storing the operation result in the memories.

In the inventions disclosed in the three Laid-Opens, therefore, the data transfer is obstructed to raise a problem in feeding the source data necessary for the operations to the execution means without fail so that the parallel operations of the microcomputer having the SIMD (Single Instruction Multiple Data) type parallel operation functions cannot be exhibited to the maximum. For the data transfer, on the other hand, it is important to retain the consistency on the instruction lines between the single operations and the parallel operations.

It is, therefore, an object of the invention to provide a microcomputer for feeding the source data necessary for operations without any delay while retaining the consistency on instruction lines between the ordinary single operations and the SIMD type parallel operations.

Here will be summarized the representatives of the invention to be disclosed herein.

According to the invention, there is provided a microcomputer comprising: a central processing unit including an address generating unit; a first memory and a second memory adapted to be individually fed with a common address from the address generating unit; a first execution unit coupled to the first memory and the second memory; and a second execution unit coupled to the first memory and the second memory and mounted together with the central processing unit, the first memory, the second memory and the first execution unit on a common semiconductor substrate, wherein the microcomputer is provided with: a first operating mode, in which data are fed from one of the first and second memories to the first execution unit and in which the first execution unit executes the operations whereas the second execution unit interrupts the operations; and a second operating mode, in which the data are fed from the first memory to the first execution unit and fed from the second memory to the second execution unit and in which the first execution unit and the second execution unit execute the operations.

According to the above-specified means, in the first operating mode, the data are fed from one of the first and second memories to the first execution unit, and the first execution unit executes the operations whereas the second execution unit interrupts the operations, so that the single operation can be executed. With the two memories for feeding the data to the execution unit, moreover, the amount of the data to be handled by the execution unit can be doubled from that of the prior art using memories of an equal degree of integration.

In the second operating mode, the data are fed from the first memory to the first execution unit and fed from the second memory to the second execution unit, and the first execution unit and the second execution unit execute the operations, so that a plurality of parallel operations can be executed. In this case, the first memory and the second memory can be accessed to with one address.

In a more specific memory construction, the first memory and the second memory may be switched to be address-mapped to different spaces in the first operating mode to identical spaces in the second operating mode.

In this case, in the first operating mode, the first memory and the second memory are address-mapped to the different spaces so that the data corresponding to the address in consideration are present in one of the first memory and the second memory and fed to the first execution unit. In the second operating mode, on the other hand, the first memory and the second memory are address-mapped to the identical spaces so that the data corresponding to the address in consideration are individually present in the first memory and the second memory and fed from the first memory to the first execution unit and from the second memory to the second execution unit.

There are a variety methods for switching the address mapping of the memories for the operating modes, but the following means can be specifically conceived.

As the construction of the memories, more specifically; each of the first memory and the second memory includes an address decoder and a control unit; the common address to be fed to the first memory and the second memory is composed of a plurality of bits, a portion of which are partially inputted to the control units and the remaining one of which are inputted to the address decoders; in the first operating mode, one of the first memory and the second memory is selected on the basis of the portion of bits; the control unit contained in the selected memory feeds the data corresponding to the remaining bits; and in the second operating mode, the data corresponding to the remaining bits are fed from the first memory and the second memory.

In the above-specified means, in the first operating mode, one of the first memory and the second memory is selected on the basis of the portion of bits so that the data corresponding to the remaining bits are outputted only from the selected memory. In the second operating mode, on the other hand, the selection of the memories on the portion of bits is not made, but the data corresponding to the remaining bits are outputted individually from the first memory and the second memory. Thus, it is possible to switch the address mappings of the memories for the operating modes. The aforementioned portion of bits are specified by a more significant 1 bit of the address but may be either a less significant 1 bit or another bit and can naturally be a plurality of bits.

Noting the mode switching, the information on which operating mode the first operating mode and the second operating mode belongs to may be contained in the control instruction coming from the central processing unit and may be transmitted to the individual modules such as the execution unit each time the instruction is to be executed. As another more specific realizing means, however, the microcomputer may preferably further comprise a mode set circuit including means for latching information on which of the first one or the second one the operating mode belongs to so that the control may be made by transmitting the control signal based on the latched information from the mode set circuit to the individual modules.

In order to transmit the mode information each time the instruction containing the mode information is to be executed, each mode is required to have the instruction. If the microcomputer is provided with the mode set circuit including the means for latching the information on which of the operating modes, it is sufficient to provide a mode select instruction for designating the information on which of the operating modes and an operation instruction shared between the two modes. In short, it is possible to reduce the number of instructions in the instruction set. If each of the first mode and the second mode has 50 operations instructions, for example, the total number of instructions is 100. In case the mode select instructions and the operation instructions are separate, the number of mode select instructions 2, and the operation instructions are 50 so that the total number can be drastically reduced to 52. The instruction to be considered are decreased by reducing their number so that the load at the program generating time is lightened.

As the more specific means noting the interruption of the execution unit, each of the first execution unit and the execution unit may include output means for outputting the data selectively to the outside of the execution unit, and in the first operating mode, the output means of the second execution unit may inhibit the data output to the outside of the second execution unit.

As a result, the data from the second execution unit interrupted can be prevented from adversely affecting the data to be fed to the first execution unit.

The operation result may be written back in the memory having fed the data. In the first operating mode, alternatively, the data of the operation result may be transmitted to the other memory different from such one of the first memory and the second memory as has fed the data for the first execution unit to operate.

As to the kind of modes, to the first operating mode and the second operating mode, there may be added a third operating mode in which the data are fed from one of the first and second memories to the second execution unit and in which the first execution unit interrupts the operations.

As the more specific realizing means noting the interactions between the individual modules such as the execution units, according to the invention, there is provided a microcomputer comprising: a central processing unit including an address generating unit; an address bus to be fed with an address from the address generating unit; a first memory connected with the address bus; a second memory connection with the address bus; a first data bus connected with the first memory and the second memory; a second data bus connected with the first memory and the second memory; a first execution unit connected with the first data bus; and a second execution unit connected with the second data bus, wherein the microcomputer is provided with: a first operating mode, in which data are fed from one of the first memory and the second memory to the first execution unit and in which the first execution unit executes the operations whereas the second execution unit interrupts the operations; and a second operating mode, in which the data are fed from the fist memory to the first execution unit, in which the data are fed from the first memory to the first execution unit and fed from the second memory to the second execution unit and in which the first execution unit and the second execution unit execute the operations.

According to the above-specified means, the data buses can be made so independent for the individual execution units that the data are fed to the first execution unit through the first data bus and to the second execution unit through the second data bus, thereby to transfer the data efficiently.

As the more specific means noting the instruction set, there is provided a microcomputer comprising: a central processing unit; a plurality of memories to be accessed to by addresses outputted by the central processing unit; and a first execution unit and a second execution unit for operating on the basis of data to be fed from one of the plurality of memories, wherein the microcomputer is provided with: a first operating mode in which one of the first execution unit and the execution unit executes operations whereas the other interrupts the operation; a second operating mode in which both the first execution unit and the second execution unit execute the operations; and an instruction set which is commonly used in both of the first operating mode and the second operating mode.

In either the first mode or the second mode, as described hereinbefore, the instruction set to be commonly used reduces the number of total instructions and accordingly the number of instructions to be considered, thereby to lighten the load on the programming of the programmer.

Although the invention has been described on the case of two memories, it should not be limited thereto but may be modified to have three or more memories.

As the specific realizing means of the case of four memories, according to the invention, there is provided a microcomputer comprising: a central processing unit including an address generating unit; a first memory, a second memory, a third memory and a fourth memory adapted to be individually fed with a common address from the address generating unit; a first execution unit coupled to the first memory and the second memory; and a second execution unit coupled to the first memory and the second memory and mounted together with the central processing unit, the first memory, the second memory and the first execution unit on a common semiconductor substrate, wherein the microcomputer is provided with: a first operating mode, in which data are fed from either any one or any two of the first to fourth memories to the first execution unit and in which the first execution unit executes the operations whereas the second execution unit interrupts the operations; and a second operating mode, either: in which the data are fed from any one of the first memory to the fourth memory to the first execution unit and are fed from any of the remaining ones of the memory, having fed the data to the first execution unit, to the second execution unit and in which the first execution unit and the second execution unit execute the operations; or in which the data are fed from any two of the first to fourth memories to the first first execution unit and are fed from the remaining two to the second execution unit and in which the first execution unit and the second execution unit execute the operations.

According to the above-specified means, two data can be fed to one execution unit by generating two addresses simultaneously from the address generating unit. Since the single operations/plural parallel operations can naturally be switched and executed, the four data corresponding to the two addresses are fed by two individuals from the four memories to the two execution units so that they can be executed in parallel.

In the first operating mode, when the first to fourth memories are address-mapped in the different spaces, the data corresponding to the address in consideration are present in only one of the first to fourth memories so that they can be fed to and operated by the first execution unit. When the first memory and the second memory in a set are address-mapped in a space and when the third memory and the fourth memory in a set are address-mapped in a space, the data corresponding to the address in consideration are present in each set so that the two data can be fed to and operated by the first execution unit.

In the second operating mode, on the other hand, the first memory and the second memory in a set are address-mapped in a space, and the third memory and the fourth memory in a set are address-mapped in a space. When one address is generated from the address generating unit, therefore, the data corresponding to the address in consideration can be fed from the first memory to the first execution unit and from the second memory to the second execution unit so that they can be operated, if they are present in each of the first memory and the second memory. When the two addresses are generated from the address generating unit, on the other hand, the data corresponding to the two addresses are present in the set of the first memory and the second memory and in the set of the third memory and the fourth memory. As a result, the data from the first memory and the third memory can be fed to and operated by the first execution unit, and the data from the second memory and the fourth memory can be fed to and operated by the second execution unit.

In short, the data to be fed to each execution unit are fed from any one or two of the first memory to the fourth memory. Here in dependence upon the operation instruction in each mode, the data latched in the registers in each execution unit may be operated as the sources. In this case, it is needless to say that the operations may be executed by feeding the data from none of the first to fourth memories.

The individual specific means, as described in the preceding examples of the two memories, can naturally be likewise applied to the case of four memories.

As the more specific means noting the interactions between the individual modules such as the execution units, according to the invention, there is provided a microcomputer comprising: a central processing unit including an address generating unit;

a first address bus, a second address bus and a third address bus to be fed with addresses from the address generating unit; a first memory connected with the first address bus and the second address bus; a second memory connection with the first address bus and the second address bus; a third memory connected with the first address bus and the third address bus; a fourth memory connected with the first address bus and the third address bus; a first data bus connected with the first memory to the fourth memory; a second data bus connected with the first memory to the fourth memory; a third data bus connected with the first memory and the second memory; a fourth data bus connected with the first memory and the second memory; a fifth data bus connected with the third memory and the fifth memory; a sixth data bus connected with the third memory and the fourth memory; a first execution unit connected with the first data bus, the third data bus and the fifth data bus; and a second execution unit connected with the second data bus, the fourth data bus and the sixth data bus, and wherein the microcomputer is provided with: a first operating mode, either: in which data are fed from any one of the memories, as connected with the third data bus or the fifth data bus, to the first execution unit and in which the first execution unit executes the operations whereas the second execution unit interrupts the operations; or in which the data are fed either from either of the memories, as connected with the third data bus, or either of the memories, as connected with the fifth data bus, to the first execution unit and in which the first execution unit executes the operations whereas the second execution unit interrupts the operations; and a second operating mode, either: in which the data are fed through the third data bus or the fifth data bus from any one of the first to fourth memories to the first execution unit and are fed through the fourth data bus or the sixth data bus from such ones of the first to fourth memories, as have failed to feed the data to the first execution unit, to the second execution unit, and in which the first execution unit and the second execution unit execute the operations; or in which the data are fed through the third data bus from one of the first memory and the second memory and through the fifth data bus from one of the third memory and the fourth memory to the first execution unit and are fed through the fourth data bus from the other of the first memory and the second memory and through the sixth data bus from the other of the third third memory and the fourth memory to the second execution unit and in which the first execution unit and the second execution unit execute the operations.

According to the above-specified means, for example, the data feed to the first execution unit is made from the first memory through the data bus and from the third memory through the fifth data bus, and the data feed to the second execution unit is made from the second memory through the fourth data bus and from the fourth memory through the sixth data bus. Thus, it is possible to make independent the data buses which are passed through when the data are fed from the memories to the execution units.

The connections of the individual modules need not be the aforementioned ones. As another specific realizing means: the first memory may be connected with only the first data bus and the third data bus; the third memory may be connected with only the first data bus and the fifth data bus;

and the second data execution unit may be connected not only with the second, fourth and sixth data buses but also with the fifth data bus. Here, the remaining connections are identical to those of the foregoing means.

When the data are fed in parallel by the other means from the first and second memories to the first and second data execution units, they are fed from the first memory through the third data bus to the first data execution unit and from the second memory through the fourth data bus to the second data execution unit. As a result, no data is fed from the first memory through the fourth data bus and from the second memory through the third data bus. In short, what is different from the preceding realizing means is that the data bus to be used for feeding the data in parallel to the two data execution units is not selected.

BRIEF DESCRIPTION OF THE DRAWINGS

FIG. 9 shows a correspondence of an address of the first on-chip memory to an access field in a memory;

FIG. 10 shows a code definition table of a memory access control signal MV [2:0] of the first and second on-chip memories;

FIG. 11 shows a truth table of a control unit (MDC1) of the first on-chip memory in Mode 1;

FIG. 12 shows a truth table of a control unit (MDC1) of the first on-chip memory in Mode 2;

FIG. 13 shows a truth table of a control unit (MDC1) of the first on-chip memory in Mode 3;

FIG. 15 shows a correspondence of an address of the second on-chip memory to an access field in a memory;

FIG. 16 shows a truth table of a control unit (MDC1) of the second on-chip memory in Mode 1;

FIG. 17 shows a truth table of a control unit (MDC1) of the second on-chip memory in Mode 2;

FIG. 18 shows a truth table of a control unit (MDC1) of the second on-chip memory in Mode 3;

FIG. 21a shows a truth table of a control unit (E1DEC1) in the first data execution unit, and FIG. 21b shows a truth table of a control unit (E2DEC1) in the second data execution unit;

FIG. 28 shows a truth table of a control unit (MDEC2) in the first on-chip memory in Mode 1 or Mode 3;

FIG. 29 shows a truth table of the control unit (MDEC2) in the first on-chip memory in Mode 2;

FIG. 30 shows a truth table of a control unit (MDEC3) in the second on-chip memory in Mode 1 or Mode 3;

FIG. 31 shows a truth table of the control unit (MDEC3) in the second on-chip memory in Mode 2;

FIG. 33 shows a truth table of a control unit (E3DEC1) in the second data execution unit;

FIG. 40 shows a truth table of a control unit (MDEC4) in the first on-chip memory for an address decoder;

FIG. 41 shows a truth table of the control unit (MDEC4) in the first on-chip memory in Mode 1;

FIG. 42 shows a truth table of the control unit (MDEC4) in the first on-chip memory in Mode 2;

FIG. 43 shows a truth table of the control unit (MDEC4) in the first on-chip memory in Mode 3;

FIG. 44 shows a truth table of a control unit (MDEC4) in the second on-chip memory for an address decoder;

FIG. 45 shows a truth table of the control unit (MDEC4) in the second on-chip memory in Mode 1;

FIG. 46 shows a truth table of the control unit (MDEC4) in the second on-chip memory in Mode 2;

FIG. 47 shows a truth table of the control unit (MDEC4) in the second on-chip memory in Mode 3;

FIG. 50 shows a truth table of a control unit (E4DEC1) of the first data execution unit;

FIG. 51 shows a truth table of a control unit (E5DEC1) of the second data execution unit;

FIG. 55 shows one sample in which an operating mode field is formed in place of the mode set circuit over an instruction code;

FIG. 56 shows a sample of an instruction format and the instruction code;

DETAILED DESCRIPTION OF THE PREFERRED EMBODIMENTS

<Embodiment 1>

Figure 1:
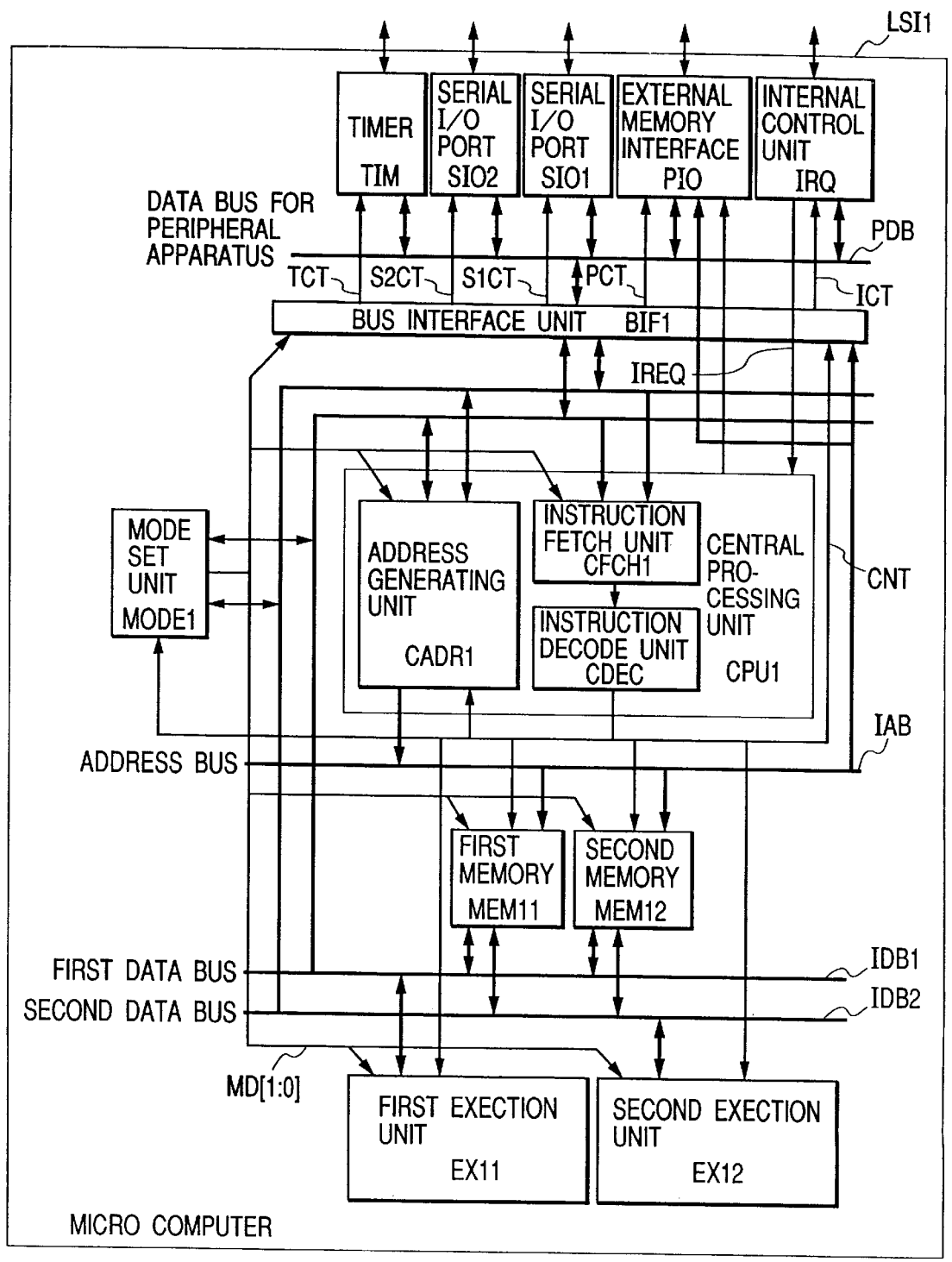
FIG. 1 shows a first embodiment of a one-chip microcomputer according to the invention.

FIG. 1 shows one sample of the block diagram of a one-chip microcomputer according to the invention. In FIG. 1: letters LSI1 designates a microcomputer according to the invention; letters CPU1 a central processing unit including a circuit for fetching and decoding an instruction to generate a desired control signal; letters CFCH1 an instruction fetch unit included in CPU1; letters CDEC an instruction decode unit included in CPU1; letters CNT a set of control signals generated by CDEC; letters MODE1 a mode set circuit for setting the microcomputer LSI1 to a mode, designated by the control signals, to hold the state; letters MD[1:0] designates a mode signal for transmitting the present mode state from MODE1 to a necessary module; letters CADR1 an address generating unit included in CPU1 for generating the designated address; letters IAB an address bus for outputting an address generated in CADR1; letters MEM11 a first on-chip memory packaged over the chip; letters MEM12 a second on-chip memory packaged over the chip; letters EX11 a first data execution unit for executing the data operations; letters EX12 a second data execution unit for executing the data operations; letters IDB1 a first data bus connected with MEM 11, MEM12, EX11, MODE1 and a bus interface unit BIF1 and used for the data transfer; letters IDB2 a second data bus connected with MEM11, MEM12, EX12, MODE1 and the bus interface unit BIF1 and used for the data transfer; letters BIF1 a bus interface unit for the data transfer between the individual buses IDB1 and IDB2 and a data bus PDB, as connected with peripheral modules, and for generating a data transfer control signal to the peripheral modules; letters IRQ an internal control unit; letters PIO an external parallel interface unit; letters SIO1 a first serial interface unit; letters SIO2 a second serial interface unit; letters TIM a timer unit; letters ICT a signal to be generated by BIF1 for controlling the data transfer with the IRQ module; letters PC a signal to be generated by BIF1 for controlling the data transfer wit the PIO module; letters S1CT to be generated by BIF1 for controlling the data transfer with the SIO1 module; letters S2CT to be generated by BIF1 for controlling the data transfer with the SIO2 module; letters TCT a signal to be generated by BIF1 for controlling the data transfer with the TIM module; and letters IREQ a signal for transmitting an interrupt demand for CPU1 from the IRQ module.

Of these function, the timer unit TIM, the serial interface units SIO1 and SIO2, the external parallel interface unit, the internal control unit IRQ and the data bus for peripheral apparatus will not be detailed in the following description of operations, although they are important components for the microcomputer LSI1 according to the invention.

[Operations and Instructions in Different Modes]

Here will be described the operations of FIG. 1 in the difference modes.

The first data execution unit EX11 and the second data execution unit EX12 are functionally equivalent, and their execution functions and the registers in their modules are distinguished not on the instruction code but by the modes. The mode set circuit MODE1 sets one of the following three modes and holds the state. Here, the modes may be Mode 1 and Mode 2.

Mode 1: Can execute a single operation by the first data execution unit. A reset initial value.

Mode 2: Can execute two parallel operations by the first and second data execution unit.

Mode 3: Can execute a single operation by the second data execution unit.

These Modes are displayed with two state signals MD[1] and MD[0] to indicate the state of Mode 1 for MD[1]=MD[0]=low, the state of Mode 2 for MD[1]=low and MD[0]=high, and the state of Mode 3 for MD[1]=high and MD[0]=low. Here, the state of MD[1]=MD[0]=high is an unused code in this embodiment. In this embodiment, moreover, the state signal is encoded and displayed, but it is apparent that the code definitions may be different or that the Modes may be individually displayed with independent state enable signals. Even with the different code definitions and with the Modes being displayed by the independent state enable signals, the first and second data execution units EX11 and EX12 may possibly be realized including the control units with the absolutely identical circuit structure, as will be detailed hereinafter.

In order to describe a sample of specific instructions, FIG. 56 shows a sample of instruction formats and instruction codes, as contained in the instruction set of the microcomputer.

In this embodiment, there are coarsely supported two kinds of instructions, i.e., CPU instructions and DSP instructions. All the CPU instructions and a part of the DSP instructions are instruction codes having a length of 16 bits, and the remaining DSP instructions are instruction codes having a length of 32 bits.

The CPU instructions are executed exclusively by the CPU core without operating the aforementioned data execution units and execute the same single operation commonly in any Mode.

The DSP instructions cause the data execution units to execute the operations while causing the CPU core to bear a part of operations such as the address operations or the operand accesses, or execute the data transfer operations with the registers in the data execution units. Depending on the Modes, the operations may be executed by the single data execution unit, or the same operations may be executed in parallel by the two data execution units.

In the CPU instruction format of FIG. 56: letters nnnn designates a field of a destination operand; letters ssss a field of a source operand; letters dddd a field of a displacement; and letters iiii a field of immediate data. In the case of the ADD instruction, for example, the field nnnn is shared with the field of the source operand, and the executed result is stored in the field nnnn.

In a sample of the DSP instructions, there are described in the uppermost row three instructions, i.e., a multiply instruction "PMULS" and data transfer instructions "MOVX.W" and "MOVY.W". These three instructions can be designated by one instruction code and executed in parallel. By this instruction code, more specifically: there are executed in parallel in the data execution units the operations in which the hold data are fed from registers Se and Sf in the data execution units to and operated by a multiplier so that the operated result is written in a register Dg; the operations in which the data designated by an address pointer As are transferred to a destination operand Db; and the operations in which the data designated by an address pointer Pc are transferred to a destination operand Dd. Here, the address pointers Aa and Ac are the registers in the CPU core, and the remaining operands are registers in the data execution units.

In the second row, there are described four instructions, i.e., an add instruction "PADD", a multiply instruction "PMULS" and data transfer instructions "MOVX.W" and "MOVY.W". By this instruction code, more specifically: there are executed in parallel in the data execution units the four operations in which the hold data are fed from registers Sx and Sy to and operated by an arithmetic logic unit so that the operated result is written in a register Du, in which the hold data are fed from registers Se and Sf in the data execution units to and operated by a multiplier so that the operated result is written in a register Dg; the operations in which the data designated by an address pointer As are transferred to a destination operand Db; and the operations in which the data designated by an address pointer Pc are transferred to a destination operand Dd. A third line is generally identical to the second low but is different in that the instruction "PADD" is replaced by a subtract instruction "PSUB". Here, the sign "+", as attached to the right of mnemonics (Aa, Ac) of each address pointer designates an operation to update the address at a next memory accessing time by incrementing the pointer after a memory access.

There has been described the definition of the instruction for executing the three or four operations in parallel with one instruction code, but single operation instructions may naturally be defined separately. Moreover, the aforementioned parallel execution of the data transfer instruction and the operation instruction requires the three address buses so that it is employed mainly in any of later-described third to sixth embodiments.

Moreover, the control has to be made such that the destinations for storing the results of the operations to be executed simultaneously in parallel may not be overlapped. For example, an error check may be so software-like performed by an assembler that the operation results may not be stored in a common destination. Despite of this error check, the storing destinations may be overlapped. In order to prevent the hardware from being damaged, therefore, a priority encoder may be employed to give one destination a higher priority while ignoring the other.

Here, in this embodiment, each execution unit is given a construction for executing a single-precision data operation. However, each execution unit can naturally execute both the single-precision data operation and a double-precision data operation. In this modification, a double-precision operation/double-precision parallel data operations can be executed in addition to the single-precision data operation/single-precision parallel data operations. The single-precision data operation and the double-precision data operation may be switched in the Modes.

Figure 2:
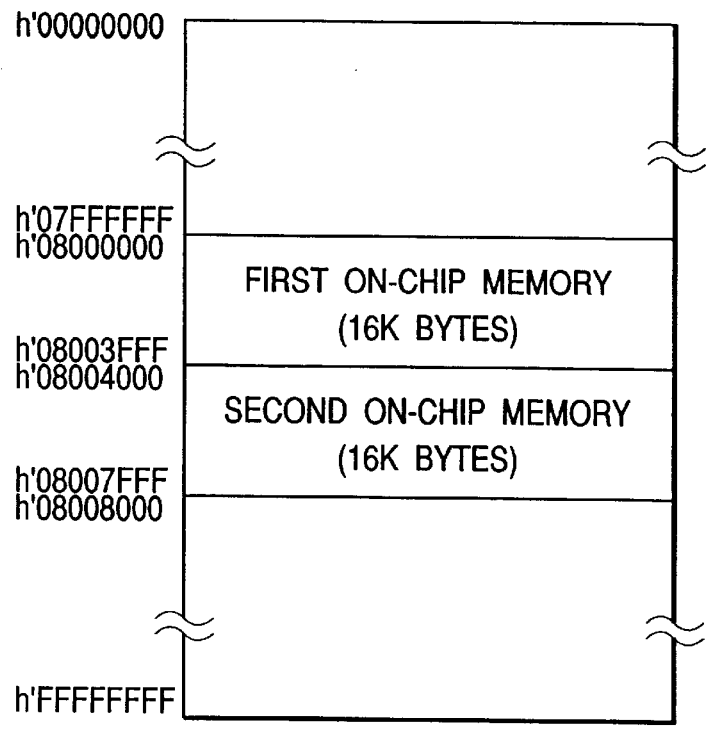
FIG. 2 shows a sample of a mapping over an address space of first and second on-chip memories in Mode 1 and Mode 3.

In a reset initial state, the microprocessor LSI1 is in Mode 1 so that MD[1]=MD[0]=low. The first on-chip memory MEM11, the second on-chip memory MEM12, the address generating unit CADR1, the instruction fetch unit CFCH1, the bus interface unit BIF1 and the mode set circuit MODE1 are controlled to effect in their connections with the first data bus IDB1. FIG. 2 shows a sample of a mapping over the address space of MEM11 and MEM12 in Mode 1. Here, the memory map of FIG. 2 is identical in Mode 3. In FIG. 2, moreover, MEM11 and MEM12 are mapped in the continuous address space, but this continuity is not essential. It is needless to say that MEM11 and MEM12 may be mapped in an intrinsic address space and that the capacity of each memory should not be fixed at 16 Kbytes.

The first data execution unit EX11 is instructed to execute the operations by the control signal which is issued from the central processing unit CPU1, but the second data execution unit EX12 comes into an inactive state independently of the control signal. The central processing unit CPU1 generates a program address in the address generating unit and reads out an instruction from a predetermined memory through IAB and in an instruction code in the instruction fetch unit CFCH1 from IDB1. Here, the memory for reading out the instruction need not always be the on-chip memories MEM11 and MEM12, but the instruction may be read in from an external memory through an external parallel interface unit PIO, for example.

The fetched instruction code is decoded by the instruction decode unit CDEC to generate a set of control signals CNT necessary for the individual modules.

When the decoded instruction is one for reading out the data from the memories, the address generating unit CADR1 generates an address to be accessed to and outputs it to the address bus IAB. When the address thus outputted to IAB is one mapping the on-chip memory MEM11 or MEM12, this MEM11 or MEM12 activates a word line of the corresponding address to read out the necessary data and output them to the data bus IDB1. The data thus outputted to IDB1 are transferred to the destination operand designated by the instruction. When the destination operand thus designated by the instruction is a register in the address generating unit CADR1, for example, the data are fetched from IDB1 in CADR1 and inputted to the predetermined register. When the destination operand is in the first or second data execution unit EX11 or EX12, the operand code is shared between EX11 and EX12. In Mode 1, the second data execution unit EX12 is inactive so that the data on IDB1 are fetched by EX11. When the destination operand designated by the instruction is a register in the mode set circuit MODE1, the data are fetched from IDB1 in MODE1 to update the predetermined register. When the bit holding the state of MD[1] and MD[0] changes at this time, the mode is switched to that corresponding to a predetermined state. When the address outputted to IAB is in the field of the external memory, the address on IAB is outputted from the parallel interface unit PIO to the outside so that the data read out from the external memory are outputted to IDB1 through PIO, the data bus PDB for peripheral apparatus and the bus interface unit BIF1 and are transferred to the destination operand designated by the instruction.

When the decoded instruction is one for writing the data in the memories, the address generating unit CADR1 generates an address to be accessed to and outputs it to the address bus IAB. When the address thus outputted to IAB is one mapping the on-chip memory MEM11 or MEM12, this MEM11 or MEM12 activates a word line of the corresponding address. When the source operand thus designated by the instruction is a register in the address generating unit CADR1, on the other hand, the data are outputted from CADR1 to IDB1 and inputted to the MEM12 so that they are written at a predetermined address. When the source operand is in the first or second data execution unit EX11 or EX12, the operand code is shared between EX11 and EX12. In Mode 1, the second data execution unit EX12 is inactive so that the data in EX11 are outputted to IDB1. When the source operand designated by the instruction is a register in the mode set circuit MODE1, the data are outputted from MODE1 to IDB1. When the address outputted to IAB is in the field of the external memory, the address on IAB is outputted from the parallel interface unit PIO to the outside. Simultaneously with this, the data outputted from the source operand to the IDB1 are written in the external memory through the bus interface unit BIF1 and the data buses PDB and PIO for the peripheral apparatus.

In mode 1, the data transfer between the individual modules other than the memories is likewise executed by using IDB1. In this Mode, the second data execution unit EX12 is inactive so that the first data execution unit EX11 is automatically accessed to, when the source or destination operand designates the registers or the like in the data execution unit.

Figure 3:
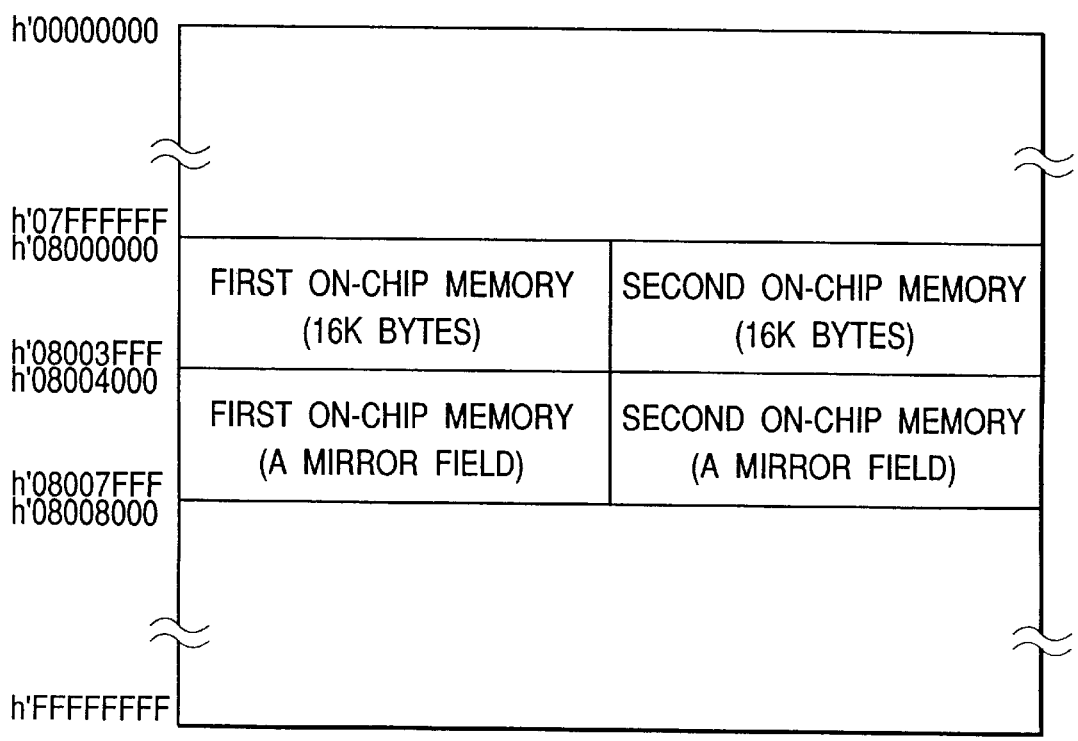
FIG. 3 shows a sample of a mapping over an address space of the first and second on-chip memories in Mode 2 and for data transfer operations between an on-chip memory and a data execution unit.
Figure 4:
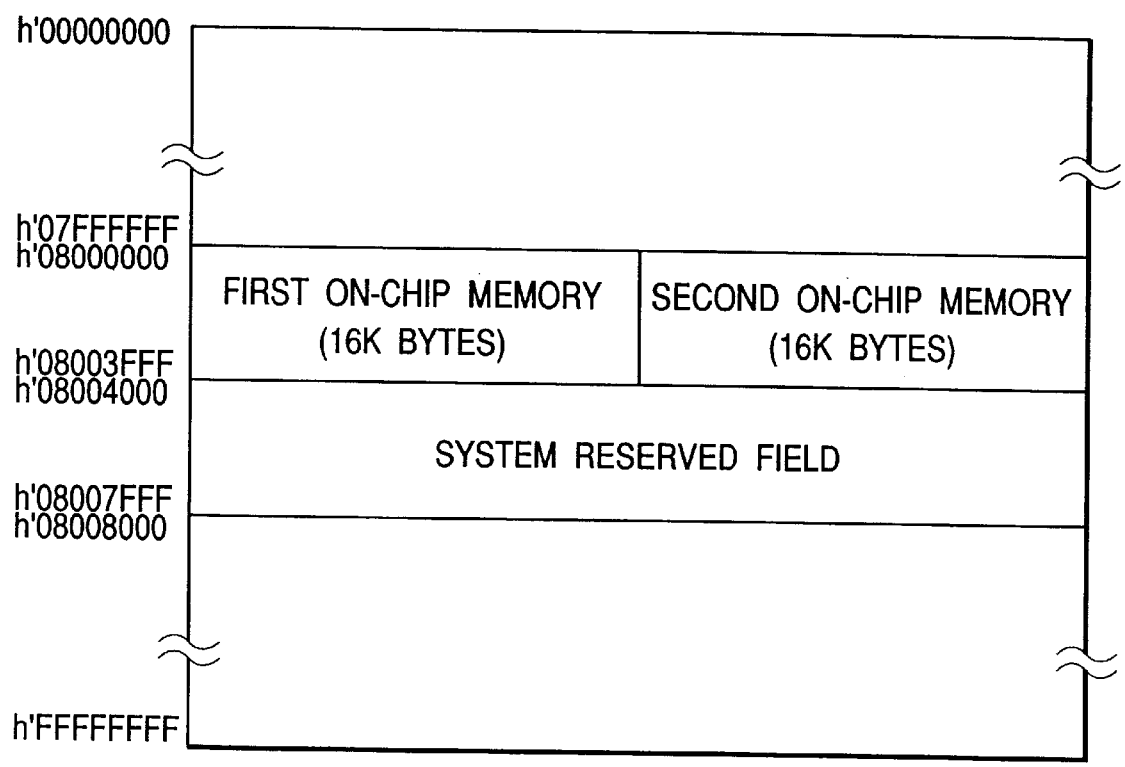
FIG. 4 shows another sample of a mapping over an address space of the first and second on-chip memories in Mode 2 and for data transfer operations between the on-chip memory and the data execution unit.

When the microprocessor LSI1 is in the state of Mode 2, MD[1]=low and MD[0]=high. The first on-chip memory MEM11, the address generating unit CADR1, the instruction fetch unit CFCH1, the bus interface BIF1 and the mode set circuit MODE1 are controlled to have effective connections with the first data bus IDB1. The second on-chip memory MEM12 selects which of the first data bus IDB1 and the second data bus IDB2 is to be connected therewith, in accordance with the content of the control received. When this received control is the data transfer operation between the data execution units EX11 and EX12, the second on-chip memory MEM12 is connected with the second data bus IDB2. In other cases, the connection is made with IDB1. FIG. 3 shows a sample of a mapping over the address space of MEM11 and MEM12 at a time of Mode 2 and when the received control is the data transfer operation with the data execution unit EX11 or EX12. Here, the case other than that of the time of Mode 2 and when the received control is the data transfer operation with the data execution unit EX11 or EX12 is identical to that of FIG. 2. In FIG. 3, moreover, there are two double mapping spaces of MEM11 and MEM12. However, it is needless to say that the mapping may be only at one portion, as shown in FIG. 4.

The first data execution unit EX11 and the second data execution unit EX12 are not distinguished on the instruction code so that they execute the same instruction of the common control signal which is issued from the central processing unit CPU1. In the case of the instruction fetch, as at the time of Mode 1, the central processing unit CPU1 generates the program address in the address generating unit, reads out the instruction from the predetermined memory through IAB and reads the instruction code in the instruction fetch unit CFCH1 from IDB1. Here, even when the memory from which the instruction is to be read out is the on-chip memory, the memory map to be applied is that of FIG. 2 when in the instruction fetch operation, so that the instruction code is correctly read out from the designated address. In the case of the second on-chip memory MEM12, the read instruction code IDB1 is selected and outputted. The fetched instruction code is decoded by the instruction decode unit CDEC to generate the control signal set CNT necessary for the individual modules.

The operations are identical to those of Mode 1 when the decoded instruction is other than the data transfer operations between the on-chip memories and the data execution units.

The following operations are executed when the decoded instruction is other than the data transfer operations between the on-chip memories and the data execution units.

At the time of the instruction to read out the data from the memories, the address generating unit CADR1 generates an address to be accessed to and outputs it to the address bus IAB. The address outputted to IAB activates the word lines at the addresses corresponding to both MEM11 and MEM12 to read out the necessary data so that the data read out from the MEM11 are outputted to the data bus IDB1 whereas the data read out from the MEM12 are outputted to the data bus IDB2. The data outputted to IDB1 are transferred to the destination operand in the first data execution unit EX11 designated by the instruction. Simultaneously with this, the data outputted to IDB2 are transferred to the destination operand in the second data execution unit EX12 designated by the same instruction. At the time of the instruction to write the data in the memories, the address generating unit CADR1 generates an address to be accessed to, and outputs it to address bus IAB. The address outputted to IAB activates simultaneously the word lines of the addresses corresponding to both MEM11 and MEM12. On the other hand, the data of the source operand in the first data execution unit EX11 designated by the instruction are outputted to IDB1. Simultaneously with this, the data of the source operand in the second data execution unit EX12 designated by the instruction are outputted to IDB2. Since EX11 and EX12 are not distinguished on the instruction code, as described hereinbefore, both the operations can be simultaneously executed in Mode 2 with the same instruction code even in response to the data transfer instruction. In the case of the data execution instruction where the resources are closed in the data execution units, it is apparent that a plurality of identical operations can be simultaneously executed with a single instruction code.

In Mode 2, the data transfer between the individual modules other than the memories can be executed between the modules excepting the second data execution unit and is executed by using the first data bus IDB1. In Mode 2, the modules other than the second data execution unit EX12 are connected with the first data bus IDB1, and the operands in the first and second data execution units EX11 and EX12 cannot be distinguished with the instruction code. In this Mode, therefore, the data transfer between the modules with the operands in the second data execution unit EX12 is not supported. The access to the operands in the second data execution unit EX12 is executed, if necessary, by making a switching to Mode 3.

In this embodiment, it is not anticipated to support similar functions in Mode 2, too, in the field of the external memory. In order to execute the two operations simultaneously, double input/output terminals for the outside are required, and this is impractical from the restriction on the pin number of the package. When the data transfer operations are controlled to be executed orderly one by one, on the other hand, this control can eliminate the restriction on the pin number but cannot match the intrinsic object to improve the performance by executing the two operations simultaneously in parallel. However, this failure does not imply that the invention cannot apply this function by the external memories but clarifies that the function realized by the on-chip memories can be likewise constructed, if necessary, by the bus interface unit BIF1, the data bus PDB for the peripheral apparatus, the parallel interface PIO and the external memories. Therefore, this function will not be described herein as another embodiment.

When the microprocessor LSI1 is in the state of Mode 3, MD[1]=high, and MD[0]=low. The first on-chip memory MEM11, the second on-chip memory MEM12, the address generating unit CADR1, the instruction fetch unit CFCH1, the bus interface BIF1 and the mode set circuit MODE1 are controlled to have effective connections with the second data bus IDB2. At the time of Mode 3, a sample of the mapping over the address space of MEM11 and MEM12 is identical to that at the time of Mode 1, as shown in FIG. 2.

The second data execution unit EX12 executes the operations in response to the instruction of the control signal which is issued from the central processing unit CPU1, but the first data execution unit EX11 comes into an inactive state independently of the control signal. The central processing unit CPU1 generates a program address in the address generating unit, reads out the instruction from a predetermined memory through IAB and reads the instruction code in the instruction fetch unit CFCH1 from IDB2. Here, the memory for reading out the instruction need not always be the on-chip memories MEM11 and MEM12, but the instruction may be read in from an external memory through an external parallel interface unit PIO, for example. The fetched instruction code is decoded by the instruction decode unit CDEC to generate a set of control signals CNT necessary for the individual modules. What is different from Mode 1 is the actions in which the instruction code is read in from the second data bus IDB2.

When the decoded instruction is one for reading out the data from the memories, the address generating unit CADR1 generates an address to be accessed to and outputs it to the address bus IAB. When the address thus outputted to IAB is one mapping the on-chip memory MEM11 or MEM12, this MEM11 or MEM12 activates a word line of the corresponding address to read out the necessary data and output them to the second data bus IDB2. The data thus outputted to IDB2 are transferred to the destination operand designated by the instruction. When the destination operand thus designated by the instruction is a register in the address generating unit CADR1, for example, the data are fetched from IDB2 in CADR1 and inputted to the predetermined register. When the destination operand is in the first or second data execution unit EX11 or EX12, the operand code is shared between EX11 and EX12. In Mode 3, the first data execution unit EX11 is inactive so that the data on IDB2 are fetched by EX12. When the destination operand designated by the instruction is a register in the mode set circuit MODE1, the data are fetched from IDB2 in MODE1 to update the predetermined register. When the bit holding the state of MD[1] and MD[0] changes at this time, the mode is switched to that corresponding to a predetermined state. When the address outputted to IAB is in the field of the external memory, the address on IAB is outputted from the parallel interface unit PIO to the outside so that the data read out from the external memory are outputted to IDB2 through PIO, the data bus PDB for peripheral apparatus and the bus interface unit BIF1 and are transferred to the destination operand designated by the instruction.

When the decoded instruction is one for writing the data in the memories, the address generating unit CADR1 generates an address to be accessed to and outputs it to the address bus IAB. When the address thus outputted to IAB is one mapping the on-chip memory MEM11 or MEM12, this MEM11 or MEM12 activates a word line of the corresponding address. When the source operand thus designated by the instruction is a register in the address generating unit CADR1, on the other hand, the data are outputted from CADR1 to IDB2 and inputted to the MEM12 so that they are written at a predetermined address. When the source operand is in the first or second data execution unit EX11 or EX12, the operand code is shared between EX11 and EX12. In Mode 3, the first data execution unit EX11 is inactive so that the data in EX12 are outputted to IDB2. When the source operand designated by the instruction is a register in the mode set circuit MODE1, the data are outputted from MODE1 to IDB2. When the address outputted to IAB is in the field of the external memory, the address on IAB is outputted from the parallel interface unit PIO to the outside. Simultaneously with this, the data outputted from the source operand to the IDB2 are written in the external memory through the bus interface unit BIF1 and the data buses PDB and PIO for the peripheral apparatus.

In mode 3, the data transfer between the individual modules other than the memories is likewise executed by using IDB2. In this Mode, the first data execution unit EX11 is inactive so that the second data execution unit EX12 is automatically accessed to, when the source or destination operand designates the registers or the like in the data execution unit.

[Construction and Operations of Mode Set Circuit MODE1]

Figure 5:
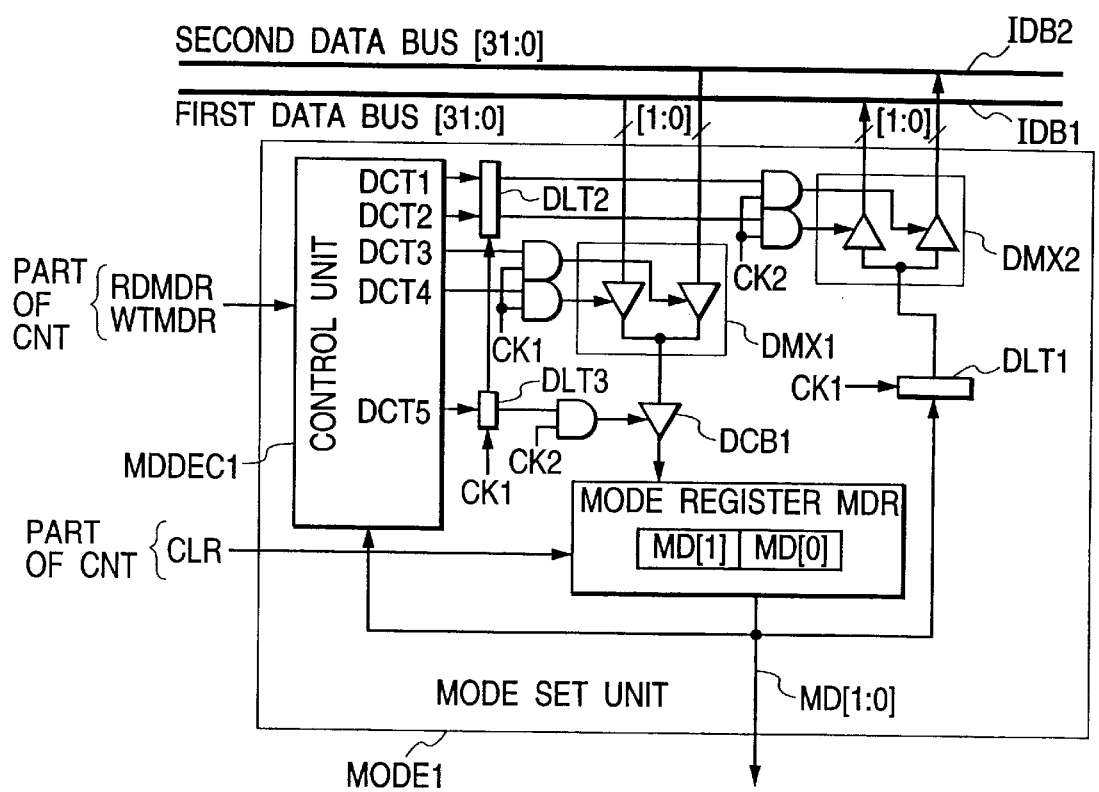
FIG. 5 shows a sample of a more specific construction of a mode set circuit (MODE1)

A sample of a more specific construction of the mode set circuit MODE1. In FIG. 5: letters MDR designates a mode register constructing bits for holding an MD[1:0] signal indicating a mode state; letters MDDEC1 a control unit for generating control signals DCT1 to DCT5 in the mode set circuit; letters DCT1 to DCT5 the control signals to be outputted from the control unit MDDEC1; letters DMX1 a selector for selecting and fetching the data on the first data bus IDB1 or the second data bus IDB2; letters DCB1 a clock gate for inputting the data selected by the selector DMX1 to a mode register MDR; letters DLT1 a delay latch unit for delaying the output signal MD[1:0] of the mode register MDR by a half period; letters DMX2 a selector for outputting the output of DLT1 to the first data bus IDB1 or the second data bus IDB2; ; DLT2 a delay latch unit for delaying the control signals DCT1 and DCT2 by a half period; letters DLT3 a delay latch unit for delaying the control signal DCT5 by a half period; letters RDMDR a control signal for outputting the output signal MD[1:0] of the mode register MDR to the first data bus IDB1 or the second data bus IDB2; letters WTMDR a control signal for inputting the data on the first data bus IDB1 or the second data bus IDB2 to the mode register MDR; and letters CLR a clear signal for initializing the mode register MDR. Here, the letters RDMDR and WTMDR designate the control signals which are included in the control signal set outputted by the central processing unit CPU1.

Here will be described in detail the operations of the mode set circuit MODE1.

Figures 6, 7:
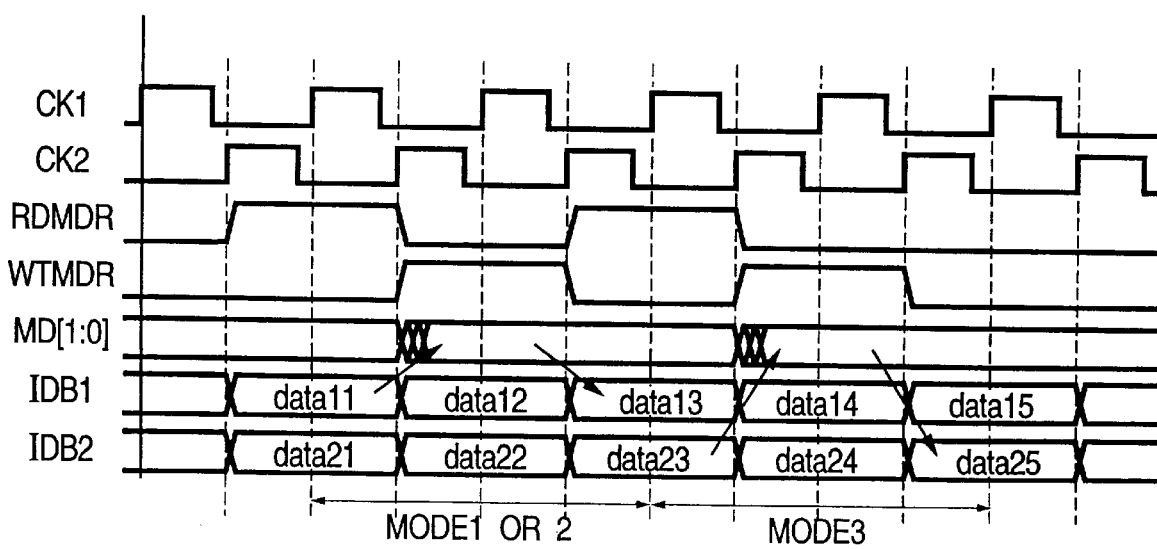
FIG. 6 shows a truth table of a control unit (MDDEC1) in the mode set circuit.
FIG. 7 shows a timing chart of a mode register (MDR) in a mode set circuit.

FIG. 6 shows a truth table tabulating the functions of the control unit MDDEC1, and FIG. 7 shows a timing chart of the mode register at a time of write/read operations. In response to the control signals RDMDR and WTMDR issued by the central processing unit CPU1, the mode set circuit MODE1 rewrites the content of the mode register MDR to change the state of Mode. When the CLR signal is enabled by a reset or the like for the initialization, the mode register MDR indicates the state of Mode 1 corresponding to any of NOs. 1 to 3 of FIG. 6. When the instruction to rewrite the mode register MDR is decoded, the central processing unit CPU1 sets the WTMDR signal to "1". As a result, DCT4 and DCT5 take the value "1" to input the data, as transferred from the first data bus IDB1, to MDR through DMX1 and DCB1. When the instruction to read out the content of the mode register MDR, the central processing unit CPU1 sets the RDMDR signal to "1". As a result, DCT2 takes the value "1" so that the content of the MDR register is outputted to the first data bus IDB1 through DCT1 and DMX2. Here, for the input/output of the data, the less significant bits of the data bus, i.e., the 0 bit and the 1 bit are employed in FIG. 5. It is, however, quite natural that the invention should not be limited to those bit positions.

As defined at Nos. 1 to 3 and Nos. 4 to 6 in FIG. 6, the operations are similar to those of Mode 1 even if the state is changed to Mode 2 by the preceding writing operation in MDR. At the time of the state of Mode 3, as defined at Nos. 7 to 9 in FIG. 6, the second data bus IDB2 is employed for the input/output of the data in place of the first data bus IDB1, and the succeeding operations are identical. Thus, it is possible to realize a mechanism in which the input/output data bus can be automatically interchanged in the mode exhibited by the mode register owned by the mode set circuit MODE1 itself.

This embodiment has been made such that the mode set circuit is exemplified by the independent module. It is, however, apparent that the mode set circuit may be constructed as one register in the central processing unit CPU1, for example, and the mode set circuit should not be limited to the manner how to divide the hardware module. Moreover, the mode register MDR is also exemplified by a register dedicated for holding the state of the mode signal MD[1:0]. It is, however, needless to say that the mode register MDR could be constructed as the bits of a part of another control register. It is further apparent that the mode register MDR could be mapped as a memory mapped register.

The control signals RDMDR and WTMDR to be issued by the central processing unit CPU1 may be generated as the decoded result of the fetched instruction but may be generated by another method. When a specific interrupt demand occurs in response to the interrupt request signal IREQ to be outputted from the internal control unit IRQ, for example, there may be provided a function to switch the mode automatically. In the control by the instruction, moreover, the content of the mode register MDR may be rewritten by the transfer of the data or directly changed in response to a mode set instruction. Thus, there are so many specific means for switching the mode. However, the invention should not be limited to such predetermined specific switching methods. It is, however, apparent that the invention may be provided with the function to set and hold the mode and means for changing the function.

As also apparent, the instruction fetch unit CFCH1 or the address generating unit CADR1 in the central processing unit CPU1 can be automatically controlled from either the first data bus IDB1 or the second data bus IDB2 by a construction method similar to that of the mode set circuit MDDEC1. In the fetch operation, a fetch is an operation to write in the fetch register, and a fetch control signal may be used in place of the control signal RDMDR. The fetch unit need not be provided with the read function.

Here, the address generating unit is usually realized by using a general purpose register and an arithmetic logic unit. The switching control method of the data bus in the data transfer between the register in the address generating unit and the data bus is similar to the mode set circuit MDDEC, and the remaining intrinsic operations of the address generating unit are not different from the ordinary ones so that their detailed description will be omitted.

[Construction of On-Chip Memory]

Figure 8:
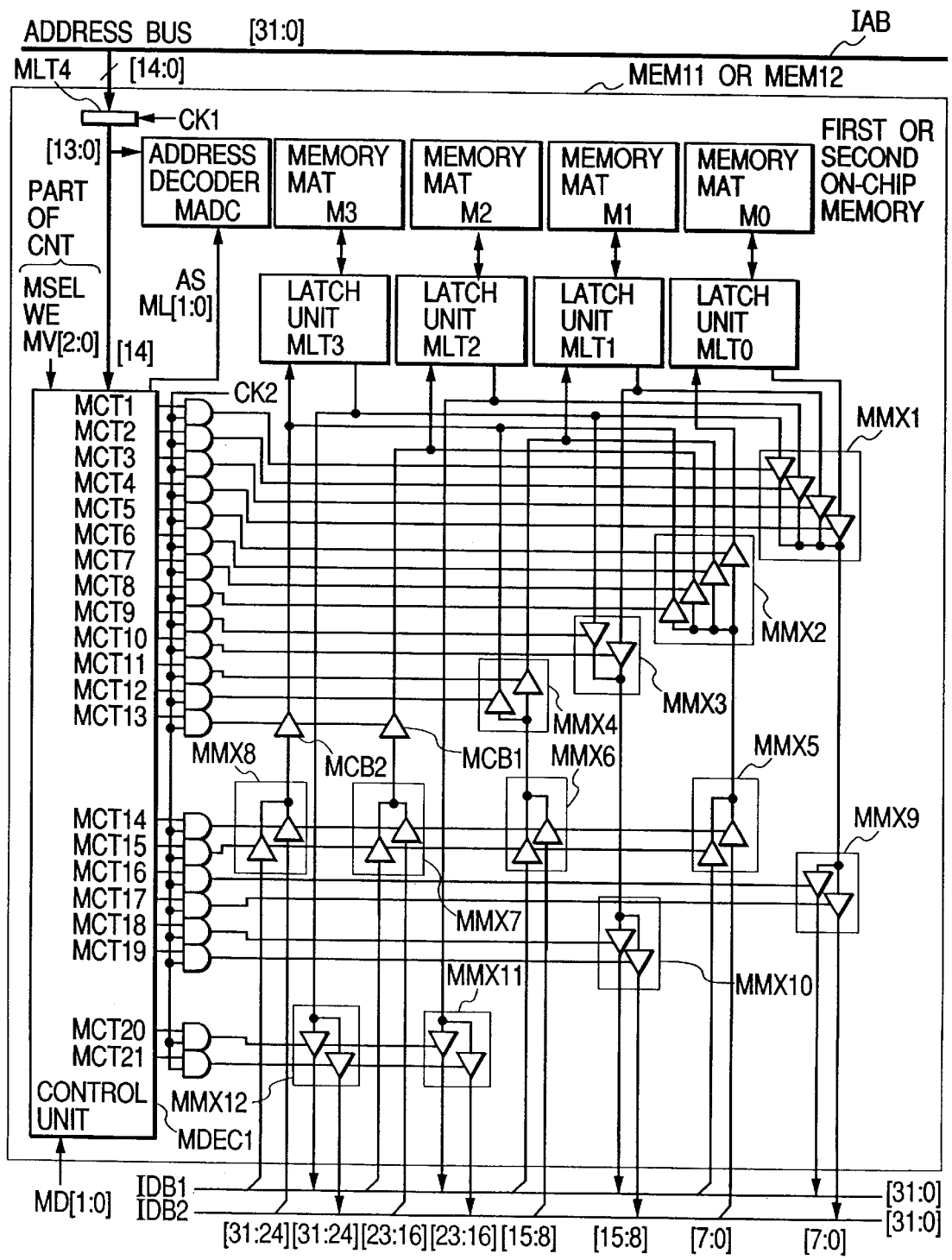
FIG. 8 shows a sample of a more specific construction of the first and second on-chip memories (MEM11 and MEM12)

A sample of a more specific construction of the first or second on-chip memory MEM11 or MEM12 is shown in FIG. 8. In FIG. 8: letters MADC designates an address decoder; letters M0, M1, M2 and M3 memory mats for storing data at the unit of 1 byte, respectively; letters MLT0, MLT1, MLT2 and MLT3 latch units for relaying the inputs/outputs of data at the byte unit, respectively, with the memory mats; letters MLT4 a latch unit for fetching the information of less significant 15 bits of the address bus IAB in the first on-chip memory MEM11; MMX1, MMX3, MMX5, MMX6, MMX7 and MMX8 selectors for selecting and outputting one of plural inputs; letters MMX2, MMX4, MMX9, MMX10, MMX11 and MMX12 selectors for selecting and outputting one of plural outputs; letters MCB1 a clocked gate for fetching the output of MMX7 in the latch unit MLT2; letters MCB2 a clocked gate for fetching the output of MMX8 in the latch unit MLT3; letters MDEC1 a control unit for generating control signals MCT1 to MCT21 in the first on-chip memory MEM11; letters MCT1 to MCT21 control signals to be outputted from the control unit MDEC1; letters MV[2:0] a control code signal of 3 bits for controlling the read/write operations shared among the memories; letters WE a control signal for designating the common writing or reading operation of the memories; letters MSEL a memory access enable signal shared among the on-chip memories; letters AS a signal indicating that the [13:0] in the address information of MLT4 to be inputted to the address decoder MADC is effective when the first on-chip memory is accessed to; and letters ML[1:0] a control signal for designating which memory mat enables its word lines by the address decoder MADC. The remaining signals have already been described to have the identical definitions. Here, MV[2:0], WE and MSEL are the control signals which are contained in the control signal set CNT outputted by the central processing unit CPU1.

The structures of the first and second on-chip memories are identical excepting that the truth tables of the control units are different.

[Operations of On-Chip Memory MEM11]

Here will be described the detailed operations of the first on-chip memory MEM11.

The memories to be described distinguish three types of data lengths in response to an instruction so that a memory having a corresponding function is taken up. The corresponding relations between the addresses and the actual memories are shown in FIG. 9. The memory mats M0, M1, M2 and M3 store data of the unit of 1 byte and correspond to the addresses 4n, 4n+1, 4n+2 and 4n+3 (n: an integer no less than 0). When the data at the byte unit are to be accessed to, the central processing unit CPU1 can designate an arbitrary address. The letters ML[1:0] designates a code for enabling a word line of 1 byte, and the address decoder MADC enables the word line of the memory mat corresponding to the address designated by [13:0] of MLT4. When the data at the word unit are to be accessed to, the central processing unit CPU1 designates the address 4n or 4n+2. The letters ML[1:0] designates a code for enabling the word lines of consecutive 2 bytes, and the address decoder MADC enables the word lines of two memory mats at the address 4n, as designated by [13:0] of MLT4 and the subsequent 4n+1, or 4n+2 and the subsequent 4n+3. When the data at a long word unit are to be accessed to, the central processing unit CPU1 designates the address 4n. The letters ML[1:0] designates a code for enabling the word lines of consecutive 4 bytes, and the address decoder MADC enables the word lines of all the four memory mats at the address 4n, as designated by [13:0] of MLT4 and the subsequent 4n+1, 4n+2 and 4n+3.

The control code signal MV[2:0] is a code signal, as defined in FIG. 10. Here in this embodiment, the code signal supports three kinds of data transfer operations of a byte unit, a word unit and a long word unit in the case of the data transfer operations of the on-chip memories with the exception of the first and second data execution units. In the case of the data transfer operations between the on-chip memories and the first and second data execution units, however, the sample supports two kinds of the data transfer operations of the word unit and the long word unit, but can naturally support three kinds. The MSEL is the memory access enable signal shared among the on-chip memories and is generated to omit the means for decoding the more significant information of the addresses with the individual on-chip memories. The individual on-chip memories can be distinguished therein with the 15th (IAV[14]) of IAB and the information of the mode state signal MD[1:0] because they have a capacity of 16 Kbytes. When MSEL indicates the enable state, the control signal WE designates the read operation or the write operation. The low state implies the read operation whereas the high state implies the write operation. The signal MV[2:0] designates the memory access operations for the instruction fetch operation, the data transfer operations with the exception of the data execution units and the data transfer operations with the data execution units and is defined with different codes according to the bit width of the data to be accessed to. In this embodiment, the microcomputer LSI is assumed to execute the fixed length instruction fetch operation of 32 bits. As shown in FIG. 10, therefore, the instruction fetch operation is defined by one kind of code.

FIG. 11, FIG. 12 and FIG. 13 show truth tables of the definitions of the control unit MDEC1 in Mode 1, Mode 2 and Mode 3, respectively. Here, the truth table is shown in each Mode, but one table is too large to present so that it is divided. However, this truth table is such a logic unit as can be presented in one table by adding MD[1:0] to the input signal, as shown in FIG. 6. Moreover, the truth tables of FIGS. 11, 12 and 13 anticipate the memory map of FIG. 3. In the truth tables of FIGS. 11, 12 and 13, moreover, the unused codes are filled in such rows for simplicity as are expected to have less hardware.

Figure 14:
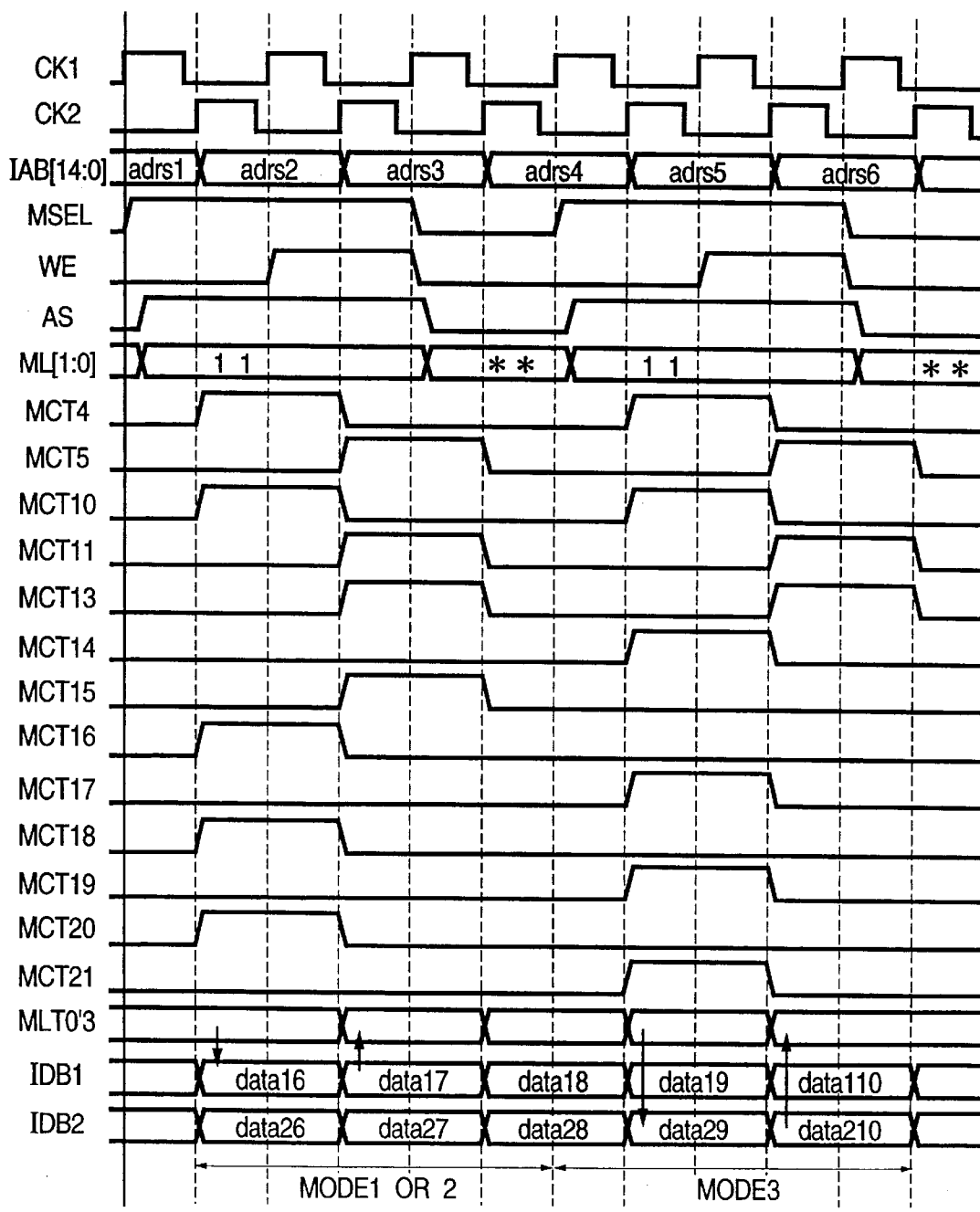
FIG. 14 shows a timing chart of the first on-chip memory.

FIG. 14 shows a timing chart of the first on-chip memory MEM11 exemplifying the read/write operations of the data at the long word unit. The second on-chip memory MEM12 has an identical timing although the data buses to be connected are different for the Modes. In order to time the read and write memory mats, the memory unit is different from the read/write timings in the preceding mode set register. However, the timing itself is determined as the specifications in the microcomputer providing the base. Here will be described the individual operations for the different Modes.

(1) Instruction Fetch Operation in Mode 1

When MSEL indicates the enable state, when the 15th bit (IAB[14]) of IAB is low and when MV[2:0] designates the code indicating the instruction fetch operation, the first on-chip memory MEM11 executes the data read operation of the long word (of 32 bits). Since the instruction fetch operation is a read operation, no control signal WE is required so that it is ignored in FIGS. 11, 12 and 13. It is, however, needless to say that WE=low is allowed to hold compatibility with other operations. At this time, the AS signal comes into the enable state (high), and ML[1:0] indicates the code (11) for enabling the word liens of four consecutive bytes so that the adress decoder MADC reads out the data by enabling the predetermined word lines of all the four memory mats. The data thus read out are latched by the latch units MLT0 to MLT3. The data, as latched by MLT0, pass through the selector MMX1 with MCT4 being enabled and further through the selector MMX9 with MCT16 being enabled so that they are outputted to the least significant byte ([7:0]) of the first data bus IDB1. The data, as latched by MLT1, pass through the selector MMX3 with MCT10 being enabled and further through the selector MMX10 with MCT18 being enabled so that they are outputted to the second byte ([15:8]) from the least significant byte of the first data bus IDB1. The data, as latched by MLT2, pass through the selector MMX11 with MCT20 being enabled so that they are outputted the third byte ([23:16]) from the least significant byte of the first data bus IDB1. The data, as latched by MLT3, pass through the selector MMX12 with MCT20 being enabled so that they are outputted to the most significant byte ([31:24]) of the first data bus IDB1. Here, the detailed control signals and circuit constructions of the latch units MLT0 to MLT3, the address decoder MADC and the memory mats M0 to M3 have no direct relation to the invention, but this memory unit having a variable data length and a memory accessibility is known in the prior art so that its direction will be omitted, as in the following description.

(2) Read operation of Data at Byte Unit in Mode 1

When MSEL exhibits the enable state, when WE=low, when the 15th bit (IAB[14]) of IAB is low and when MV[2:0] designates a code indicating the read operation of data at the byte unit, the first on-chip memory MEM11 executes the read operation of the data at the byte unit. At this time, the As signal comes into the enable state (high), and ML[1:0] indicates the code (01) for enabling the word line of 1 byte, so that the address decoder MADC reads out the data by enabling a predetermined word line of one corresponding memory mat. The data, thus read out, are latched by the latch units MLT0, MLT1, MLT2 or MLT3 connected with the accessed memory mat. When the less significant 2 bits of the address information latched in MLT4 is 00, the data, as read out from the memory mat M0, are latched by MLT0 and pass through the selector MMX1 with MCT4 being enabled and further through the selector MMX9 with MCT16 being enabled, so that they are outputted to the least significant byte ([7:0]) of the first data bus IDB1. When the less significant 2 bits of the address information latched by MLT4 are 01, the data, as read out from the memory mat M1, are latched by MLT1 and pass through the selector MMX1 with MCT3 being enabled and further through the selector MMX9 with MCT16 being enabled, so that they are outputted to the least significant byte ([7:0]) of the first data bus IDB1. When the less significant 2 bits of the address information latched by MLT4 are 10, the data, as read out from the memory mat M2, latched by MLT2 and pass through the selector MMX1 with MCT2 being enabled and further through the selector MMX9 with MCT16 being enabled, so that they are outputted to the least significant byte ([7:0]) of the first data bus IDB1. When the less significant 2 bits of the address information latched by MLT4 are 11, the data, as read out from the memory mat M3, latched by MLT3 and pass through the selector MMX1 with MCT1 being enabled and further through the selector MMX9 with MCT16 being enabled, so that they are outputted to the least significant byte ([7:0]) of the first data bus IDB1. Thus, the byte data of an arbitrary address are outputted to the least significant byte of the first data bus IDB1.

(3) Write Operation of Data at Byte Unit in Mode 1

The data to be written are sent as at the read time from the least significant byte of the first data bus IDB1. When MSEL exhibits the enable state, when WE=high, when the 15th bit (IAB[14]) of IAB is low and when MV[2:0] designates the code indicating the write operation of data at the byte unit, the first on-chip memory MEM11 executes the write operation of the data at the byte unit. At this time, the AS signal comes into the enable state (high), and ML[1:0] indicates the code (01) for enabling the word line of 1 byte, so that the address decoder MADC writes the data in the latch unit by enabling a predetermined word line of one corresponding memory mat. When the lest significant 2 bits of the address information latched by MLT4 is 00, the data, as sent from the least significant byte of the first data bus IDB1, pass through the selector MMX5 with MCT15 being enabled and further through the selector MMX2 with MCT5 being enabled, so that they are inputted to MLT0 and written in the memory mat M0. When the less significant 2 bits of the address information latched by MLT4 is 01, the data, as sent from the least significant byte of the first data bus IDB1, likewise pass through the selector MMX5 with MCT15 being enabled and further through the selector MMX2 with MCT6 being enabled, so that they are inputted to MLT1 and written in the memory mat M1. When the less significant 2 bits of the address information latched by MLT4 is 10, the data, as sent from the least significant byte of the first data bus IDB1, likewise pass through the selector MMX5 with MCT15 being enabled and further through the selector MMX2 with MCT7 being enabled, so that they are inputted to MLT2 and written in the memory mat M2. When the less significant 2 bits of the address information latched by MLT4 is 11, the data, as sent from the least significant byte of the first data bus IDB1, likewise pass through the selector MMX5 with MCT15 being enabled and further through the selector MMX2 with MCT8 being enabled, so that they are inputted to MLT3 and written in the memory mat M3.

(4) Read Operation of Data at Word Unit in Mode 1

When MSEL exhibits the stable state, when WE=low, when the 15th bit (IAB[14]) of IAB is low and when MV[2:0] designates the code indicating the read operation of data at the word unit, the first on-chip memory MEM11 executes the read operation of the data at the word unit. At this time, the AS signal comes into the enable state (high), and ML[1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT4 and MCT10 being enabled and further through the selectors MMX9 and MMX10 with MCT16 and MCT18 being enabled, so that they are outputted to the less significant 2 bytes ([15:0]) of the first data bus IDB1. When the less significant 2 bits of the address information latched by MLT4 are 10, the data, as read out from the memory mats M2 and M3, are latched by MLT2 and MLT3 and pass through the selectors MMX1 and MMX3 with MCT4 and MCT10 being enabled and further through the selectors MMX9 and MMX10 with MCT16 and MCT18 being enabled, so that they are outputted to the less significant 2 bytes ([15:0]) of the first data bus IDB1.

(5) Write Operation of Data at Word Unit in Mode 1

The data to be written are sent as at the read time from the less significant 2 bytes of the first data bus IDB1. When MSEL exhibits the enable state, when WE=high, when the 15th bit (IAB[14]) of IAB is low and when MV[2:0] designates the code indicating the write operation of the data at the word unit, the first on-chip memory MEM11 executes the write operation of the data at the word unit. At this time the AS signal comes into the enable state (high), and ML[1:0] indicates the code (10) for enabling the word lines of 2 bytes, so that the address decoder MADC writes the data in the corresponding latch unit by enabling the predetermined word lines of the corresponding consecutive two memory mats. When the less significant 2 bits of the address information latched in MLT4 are 00, the data, as sent from the less significant 2 bytes of the first data bus IDB1, pass through the selectors MMX5 and MMX6 with MCT15 being enabled and further through the selectors MMX2 and MMX4 with MCT5 and MCT11 being enabled, so that they are inputted to MLT0 and MLT1 and written in the memory mats M0 and M1. When the less significant 2 bits of the address information latched in MLT4 are 10, the data, as sent from the less significant 2 bytes of the first data bus IDB1, pass through the selectors MMX5 and MMX6 with MCT15 being enabled and further through the selectors MMX2 and MMX4 with MCT7 and MCT12 being enabled, so that they are inputted to MLT2 and MLT3 and written in the memory mats M2 and M3.

(6) Read Operation of Data at Long Word Unit in Mode 1

When MSEL exhibits the enable state, when WE=low, when the 15th bit (IAB[14]) of IAB is low and when MV[2:0] designates the code indicating the read operation of data at the long word unit, the first on-chip memory MEM11 executes the read operation of the data at the long word unit. At this time, the AS signal comes into the enable state (high), and the ML[1:0] indicates the code (11) for enabling the word lines of 4 bytes, so that the address decoder MADC reads out the data by enabling the predetermined word lines of all the four corresponding memory mats. The data, as read out from the memory mats M0 to M3, are latched by MLT0 to MLT3 and pass through the selectors MMX1 and MMX3 with MCT4 and MCT10 being enabled and further through the selectors MMX9, MMX10, MMX11 and MMX12 with MCT16, MCT18 and MCT20 being enabled, so that they are outputted to the first data bus IDB1 ([31:0]).

(7) Write Operation of Data at Long Word Unit in Mode 1

The data to be written are sent as at the read time by using all the bits of the first data bus IDB1. When MSEL exhibits the enable state, when WE=high, when the 15th bit (IAB [14]) of IAB is low and when MV[2:0] designates the code indicating the write operation of the data at the long word unit, the first on-chip memory MEM11 executes the write operation of the data at the long word unit. At this time, the AS signal comes into the enable state (high), and ML[1:0] indicates the code for enabling the word lines of 4 bytes, so that the address decoder MADC writes the data in the corresponding latch unit by enabling the predetermined word lines of all the four memory mats. The data, as sent from the first data bus IDB1, pass through the selectors MMX5, MMX6, MMX7 and MMX8 with the MCT15 being enabled and further through MMX2, MMX4, MCB1 and MCB2 with MCT5, MCT11 and MCT13 being enabled, so that they are inputted to MLT0 to MLT3 and written in the memory mats M0 to M3.

(8) Instruction Fetch Operation in Mode 2

This case is identical to the preceding one of (1) Instruction Fetch Operation in Mode 1.

(9) Read Operation of Data at Byte Unit in Mode 2

When MSEL exhibits the enable state, when WE=low and when MV[2:0] designates the code indicating the read operation of data at the byte unit, the second on-chip memory MEM12 executes the read operation of the data at the byte unit. When MV[2:0] designates the code indicating the read operation of the data for the data transfer with the exception of the data execution unit, the read operation is identical to the aforementioned case of (2) Read operation of Data at Byte Unit in Mode 1, if the 15th bit (IAB[14]) of IAB is low. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(10) Write Operation of Data at Byte Unit in Mode 2

In this case, as in the read operation of (9) Read operation of Data at Byte Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(11) Read Operation of Data at Word Unit in Mode 2

When MSEL exhibits the enable state, when WE=low and when MV[2:0] designates the code indicating the read operation of data at the word unit, the first on-chip memory MEM11 executes the read operation of the data at the word unit. When MV[2:0] designates the code indicating the read operation of the data for the data transfer with the exception of the data execution unit, the read operation is identical to the aforementioned case of (4) Read operation of Data at Word Unit in Mode 1, if the 15th bit (IAB[14]) of IAB is low. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(12) Write Operation of Data at Word Unit in Mode 2

In this case, as in the read operation of (11) Read operation of Data at Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(13) Read Operation of Data at Long Word Unit in Mode 2

When MSEL exhibits the enable state, when WE=low and when MV[2:0] designates the code indicating the read operation of data at the long word unit, the first on-chip memory MEM11 executes the read operation of the data at the long word unit. When MV[2:0] designates the code indicating the read operation of the data for the data transfer with the exception of the data execution unit, the read operation is identical to the aforementioned case of (6) Read operation of Data at Long Word Unit in Mode 1, if the 15th bit (IAB[14]) of IAB is low. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(14) Write Operation of Data at Long Word Unit in Mode 2

In this case, as in the read operation of (13) Read operation of Data at Long Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(15) Instruction Fetch Operation in Mode 3

When MSEL indicates the enable state, when the 15th bit (IAB[14]) of IAB is low and when MV[2:0] designates the code indicating the instruction fetch operation, the first on-chip memory MEM11 executes the data read operation of the long word (of 32 bits). At this time, the AS signal comes into the enable state (high), and ML[1:0] indicates the code (11) for enabling the word liens of four consecutive bytes so that the adress decoder MADC reads out the data by enabling the predetermined word lines of all the four memory mats. The data thus read out are latched by the latch units MLT0 to MLT3. The data, as latched by MLT0, pass through the selector MMX1 with MCT4 being enabled and further through the selector MMX9 with MCT17 being enabled so that they are outputted to the least significant byte ([7:0]) of the second data bus IDB2. The data, as latched by MLT1, pass through the selector MMX3 with MCT10 being enabled and further through the selector MMX10 with MCT19 being enabled so that they are outputted to the second byte ([15:8]) from the least significant byte of the second data bus IDB2. The data, as latched by MLT2, pass through the selector MMX11 with MCT21 being enabled so that they are outputted the third byte ([23:16]) from the least significant byte of the second data bus IDB2. The data, as latched by MLT3, pass through the selector MMX12 with MCT21 being enabled so that they are outputted to the most significant byte ([31:24]) of the second data bus IDB2.

(16) Read Operation of Data at Byte Unit in Mode 3

When MSEL exhibits the enable state, when WE=low, when the 15th bit (IAB[14]) of IAB is low and when MV[2:0] designates a code indicating the read operation of data at the byte unit, the first on-chip memory MEM11 executes the read operation of the data at the byte unit. At this time, the AS signal comes into the enable state (high), and ML[1:0] indicates the code (01) for enabling the word line of 1 byte, so that the address decoder MADC reads out the data by enabling a predetermined word line of one corresponding memory mat. The data, thus read out, are latched by the latch units MLT0, MLT1, MLT2 or MLT3 connected with the accessed memory mat. When the less significant 2 bits of the address information latched in MLT4 is 00, the data, as read out from the memory mat M0, are latched by MLT0 and pass through the selector MMX1 with MCT4 being enabled and further through the selector MMX9 with MCT17 being enabled, so that they are outputted to the least significant byte ([7:0]) of the second data bus IDB2. When the less significant 2 bits of the address information latched by MLT4 are 01, the data, as read out from the memory mat M1, are latched by MLT1 and pass through the selector MMX1 with MCT3 being enabled and further through the selector MMX9 with MCT17 being enabled, so that they are outputted to the least significant byte ([7:0]) of the second data bus IDB2. When the less significant 2 bits of the address information latched by MLT4 are 10, the data, as read out from the memory mat M2, latched by MLT2 and pass through the selector MMX1 with MCT2 being enabled and further through the selector MMX9 with MCT17 being enabled, so that they are outputted to the least significant byte ([7:0]) of the second data bus IDB2. When the less significant 2 bits of the address information latched by MLT4 are 11, the data, as read out from the memory mat M3, latched by MLT3 and pass through the selector MMX1 with MCT1 being enabled and further through the selector MMX9 with MCT17 being enabled, so that they are outputted to the least significant byte ([7:0]) of the second data bus IDB2. Thus, the byte data of an arbitrary address are outputted to the least significant byte of the second data bus IDB2.

(17) Write Operation of Data at Byte Unit in Mode 3

The data to be written are sent as at the read time from the least significant byte of the second data bus IDB2. When MSEL exhibits the enable state, when WE=high, when the 15th bit (IAB[14]) of IAB is low and when MV[2:0] designates the code indicating the write operation of data at the byte unit, the first on-chip memory MEM11 executes the write operation of the data at the byte unit. At this time, the AS signal comes into the enable state (high), and ML[1:0] indicates the code (01) for enabling the word line of 1 byte, so that the address decoder MADC writes the data in the latch unit by enabling a predetermined word line of one corresponding memory mat. When the less significant 2 bits of the address information latched by MLT4 is 00, the data, as sent from the least significant byte of the second data bus IDB2, pass through the selector MMX5 with MCT14 being enabled and further through the selector MMX2 with MCT5 being enabled, so that they are inputted to MLT0 and written in the memory mat M0. When the less significant 2 bits of the address information latched by MLT4 is 01, the data, as sent from the least significant byte of the second data bus IDB2, likewise pass through the selector MMX5 with MCT14 being enabled and further through the selector MMX2 with MCT6 being enabled, so that they are inputted to MLT1 and written in the memory mat M1. When the less significant 2 bits of the address information latched by MLT4 is 10, the data, as sent from the least significant byte of the second data bus IDB2, likewise pass through the selector MMX5 with MCT14 being enabled and further through the selector MMX2 with MCT7 being enabled, so that they are inputted to MLT2 and written in the memory mat M2. When the less significant 2 bits of the address information latched by MLT4 is 11, the data, as sent from the least significant byte of the second data bus IDB2, likewise pass through the selector MMX5 with MCT14 being enabled and further through the selector MMX2 with MCT8 being enabled, so that they are inputted to MLT3 and written in the memory mat M3.

(18) Read Operation of Data at Word Unit in Mode 3

When MSEL exhibits the stable state, when WE=low, when the 15th bit (IAB[14]) of IAB is low and when MV[2:0] designates the code indicating the read operation of data at the word unit, the first on-chip memory MEM11 executes the read operation of the data at the word unit. At this time, the AS signal comes into the enable state (high), and ML[1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT4 and MCT10 being enabled and further through the selectors MMX9 and MMX10 with MCT17 and MCT18 being enabled, so that they are outputted to the less significant 2 bytes ([15:0]) of the second data bus IDB2. When the less significant 2 bits of the address information latched by MLT4 are 10, the data, as read out from the memory mats M2 and M3, are latched by MLT2 and MLT3 and pass through the selectors MMX1 and MMX3 with MCT4 and MCT10 being enabled and further through the selectors MMX9 and MMX10 with MCT17 and MCT19 being enabled, so that they are outputted to the less significant 2 bytes ([15:0]) of the second data bus IDB2.

(19) Write Operation of Data at Word Unit in Mode 3

The data to be written are sent as at the read time from the less significant 2 bytes of the second data bus IDB2. When MSEL exhibits the enable state, when WE=high, when the 15th bit (IAB[14]) of IAB is low and when MV[2:0] designates the code indicating the write operation of the data at the word unit, the first on-chip memory MEM11 executes the write operation of the data at the word unit. At this time the AS signal comes into the enable state (high), and ML[1:0]) indicates the code (10) for enabling the word lines of 2 bytes, so that the address decoder MADC writes the data in the corresponding latch unit by enabling the predetermined word lines of the corresponding consecutive two memory mats. When the least significant 2 bits of the address information latched in MLT4 are 00, the data, as sent from the less significant 2 bytes of the second data bus IDB2, pass through the selectors MMX5 and MMX6 with MCT14 being enabled and further through the selectors MMX2 and MMX4 with MCT5 and MCT11 being enabled, so that they are inputted to MLT0 and MLT1 and written in the memory mats M0 and M1. When the less significant 2 bits of the address information latched in MLT4 are 10, the data, as sent from the less significant 2 bytes of the second data bus IDB2, pass through the selectors MMX5 and MMX6 with MCT14 being enabled and further through the selectors MMX2 and MMX4 with MCT7 and MCT12 being enabled, so that they are inputted to MLT2 and MLT3 and written in the memory mats M2 and M3.

(20) Read Operation of Data at Long Word Unit in Mode 3

When MSEL exhibits the enable state, when WE=low, when the 15th bit (IAB[14]) of IAB is low and when MV[2:0] designates the code indicating the read operation of data at the long word unit, the first on-chip memory MEM11 executes the read operation of the data at the long word unit. At this time, the AS signal comes into the enable state (high), and the ML[1:0] indicates the code (11) for enabling the word lines of 4 bytes, so that the address decoder MADC reads out the data by enabling the predetermined word lines of all the four corresponding memory mats. The data, as read out from the memory mats M0 to M3, are latched by MLT0 to MLT3 and pass through the selectors MMX1 and MMX3 with MCT4 and MCT10 being enabled and further through the selectors MMX9, MMX10, MMX11 and MMX12 with MCT17, MCT19 and MCT21 being enabled, so that they are outputted to the second data bus IDB2 ([31:0]).

(21) Write Operation of Data at Long Word Unit in Mode 3

The data to be written are sent as at the read time by using all the bits of the second data bus IDB2. When MSEL exhibits the enable state, when WE=high, when the 15th bit (IAB[14]) of IAB is low and when MV[2:0] designates the code indicating the write operation of the data at the long word unit, the first on-chip memory MEM11 executes the write operation of the data at the long word unit. At this time, the AS signal comes into the enable state (high), and ML[1:0] indicates the code for enabling the word lines of 4 bytes, so that the address decoder MADC writes the data in the corresponding latch unit by enabling the predetermined word lines of all the four memory mats. The data, as sent from the second data bus IDB2, pass through the selectors MMX5, MMX6, MMX7 and MMX8 with the MCT14 being enabled and further through MMX2, MMX4, MCB1 and MCB2 with MCT5, MCT11 and MCT13 being enabled, so that they are inputted to MLT0 to MLT3 and written in the memory mats M0 to M3.

[Operations of On-Chip Memory MEM12]

The detailed operations of the second on-chip memory MEM12 will be described in the following.

This second on-chip memory MEM12 is a memory like MEM11 having a function to correspond three types of data lengths separately in response to an instruction. The corresponding relations the addresses and the actual memories in the second on-chip memory MEM12 are shown in FIG. 15. FIG. 16, FIG. 17 and FIG. 18 show truth tables of the control unit MDEC1 in the second on-chip memory MEM12 in Mode 1, Mode 2 and Mode 3, respectively. Here, the truth tables of FIGS. 16, 17 and 18 anticipate the memory mat of FIG. 3. Here will be described the individual operations separately in different Modes.

(1) Instruction Fetch Operation in Mode 1

When MSEL exhibits the enable state, when the 15th bit (IAB[14]) of IAB is high and when MV[2:0] designates the code indicating the instruction fetch operation, the second on-chip memory MEM12 executes the read operation of the data of a long word (of 32 bits). The subsequent operations are identical to those of the first on-chip memory MEM11.

(2) Read Operation of Data at Byte Unit in Mode 1

When MSEL exhibits the enable state, when WE=low, when the 15th bit (IAB[14]) of IAB is high and when MV[2:0] designates the code indicating the read operation of data at the byte unit, the second on-chip memory MEM12 executes the read operation the data at the byte unit. The subsequent operations are identical to those of the first on-chip memory MEM11.

(3) Write Operation of Data at Byte Unit in Mode 1

The data to be written are sent as at the read time from the least significant byte of the first data bus IDB1. When MSEL exhibits the enable state, when WE=high, when the 15th bit (IAB[14]) of IAB is high and when MV[2:0] designates the code indicating the write operation of data at the byte unit, the second on-chip memory MEM12 executes the write operation the data at the byte unit. The subsequent operations are identical to those of the first on-chip memory MEM11.

(4) Read Operation of Data at Word Unit in Mode 1

When MSEL exhibits the enable state, when WE=low, when the 15th bit (IAB[14]) of IAB is high and when MV[2:0] designates the code indicating the read operation of data at the word unit, the second on-chip memory MEM12 executes the read operation the data at the word unit. The subsequent operations are identical to those of the first on-chip memory MEM11.

(5) Write Operation of Data at Word Unit in Mode 1

The data to be written are sent as at the read time from two less significant bytes of the first data bus IDB1. When MSEL exhibits the enable state, when WE=high, when the 15th bit (IAB[14]) of IAB is high and when MV[2:0] designates the code indicating the write operation of data at the word unit, the second on-chip memory MEM12 executes the write operation the data at the word unit. The subsequent operations are identical to those of the first on-chip memory MEM11.

(6) Read Operation of Data at Long Word Unit in Mode 1

When MSEL exhibits the enable state, when WE=low, when the 15th bit (IAB[14]) of IAB is high and when MV[2:0] designates the code indicating the read operation of data at the long word unit, the second on-chip memory MEM12 executes the read operation the data at the long word unit. The subsequent operations are identical to those of the first on-chip memory MEM11.

(7) Write Operation of Data at Long Word Unit in Mode 1

The data to be written are sent as at the read time by using all bits of the first data bus IDB1. When MSEL exhibits the enable state, when WE=high, when the 15th bit (IAB[14]) of IAB is high and when MV[2:0] designates the code indicating the write operation of data at the long word unit, the second on-chip memory MEM12 executes the write operation the data at the long word unit. The subsequent operations are identical to those of the first on-chip memory MEM11.

(8) Instruction Fetch Operation in Mode 2

In this case, the operation is identical to that of (1) Instruction Fetch Operation in Mode 1

(9) Read Operation of Data at Byte Unit in Mode 2

When MSEL exhibits the enable state, when WE=low and when MV[2:0] designates the code indicating the read operation of data at the byte unit, the second on-chip memory MEM12 executes the read operation of the data at the byte unit. When MV[2:0] designates the code indicating the read operation of the data for the data transfer with the exception of the data execution unit, the read operation is identical to the aforementioned case of (2) Read operation of Data at Byte Unit in Mode 1, if the 15th bit (IAB[14]) of IAB is high. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. Moreover, the data are outputted to the second data bus IDB2. The detailed control and operation are identical to those of (16) Read Operation of Data at Byte Unit in Mode 3, as will be described.

(10) Write Operation of Data at Byte Unit in Mode 2

In this case, as in the read operation of (9) Read operation of Data at Byte Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory MEM11. Moreover, the data are inputted from the second data bus IDB2. The detailed control and operation are identical to those of (17) Write Operation of Data at Byte Unit in Mode 3, as will be described.

(11) Read Operation of Data at Word Unit in Mode 2

When MSEL exhibits the enable state, when WE=low and when MV[2:0] designates the code indicating the read operation of data at the word unit, the second on-chip memory MEM12 executes the read operation of the data at the word unit. When MV[2:0] designates the code indicating the read operation of the data for the data transfer with the exception of the data execution unit, the read operation is identical to the aforementioned case of (4) Read operation of Data at Word Unit in Mode 1, if the 15th bit (IAB[14]) of IAB is high. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. Moreover, the data are outputted to the second data bus IDB2. The detailed control and operation are identical to those of (18) Read Operation of Data at Word Unit in Mode 3, as will be described.

(12) Write Operation of Data at Word unit in Mode 2

In this case, as in the read operation of (11) Read operation of Data at Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory MEM11. Moreover, the data are inputted from the second data bus IDB2. The detailed control and operation are identical to those of (19) Write Operation of Data at Word Unit in Mode 3, as will be described.

(13) Read Operation of Data at Long Word Unit in Mode 2

When MSEL exhibits the enable state, when WE=low and when MV[2:0] designates the code indicating the read operation of data at the long word unit, the second on-chip memory MEM12 executes the read operation of the data at the word unit. When MV[2:0] designates the code indicating the read operation of the data for the data transfer with the exception of the data execution unit, the read operation is identical to the aforementioned case of (6) Read operation of Data at Long Word Unit in Mode 1, if the 15th bit (IAB[14]) of IAB is high. When MV[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the first on-chip memory MEM11. Moreover, the data are outputted to the second data bus IDB2. The detailed control and operation are identical to those of (20) Read Operation of Data at Long Word Unit in Mode 3, as will be described.

(14) Write Operation of Data at Long Word Unit in Mode 2

In this case, as in the read operation of (13) Read operation of Data at Long Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory MEM11. Moreover, the data are inputted from the second data bus IDB2. The detailed control and operation are identical to those of (21) Write Operation of Data at Long Word Unit in Mode 3, as will be described.

(15) Instruction Fetch Operation in Mode 3

When MSEL indicates the enable state, when the 15th bit (IAB[14]) of IAB is high and when MV[2:0] designates the code indicating the instruction fetch operation, the first on-chip memory MEM11 executes the data read operation of the long word (of 32 bits). The subsequent operations are identical to those of the first on-chip memory MEM1.

(16) Read Operation of Data at Byte Unit in Mode 3

When MSEL exhibits the enable state, when WE=low, when the 15th bit (IAB[14]) of IAB is high and when MV[2:0] designates a code indicating the read operation of data at the byte unit, the second on-chip memory MEM12 executes the read operation of the data at the byte unit. The subsequent operations are identical to those of the first on-chip memory MEM11.

(17) Write Operation of Data at Byte Unit in Mode 3

The data to be written are sent as at the read time from the least significant byte of the second data bus IDB2. When MSEL exhibits the enable state, when WE=high, when the 15th bit (IAB[14]) of IAB is high and when MV[2:0] designates the code indicating the write operation of data at the byte unit, the second on-chip memory MEM12 executes the write operation of the data at the byte unit. The subsequent operations are identical to those of the first on-chip memory MEM11.

(18) Read Operation of Data at Word Unit in Mode 3

When MSEL exhibits the stable state, when WE=low, when the 15th bit (IAB[14]) of IAB is high and when MV[2:0] designates the code indicating the read operation of data at the word unit, the second on-chip memory MEM12 executes the read operation of the data at the word unit. The subsequent operations are identical to those of the first on-chip memory MEM11.

(19) Write Operation of Data at Word Unit in Mode 3

The data to be written are sent as at the read time from the less significant 2 bytes of the second data bus IDB2. When MSEL exhibits the enable state, when WE=high, when the 15th bit (IAB[14]) of IAB is high and when MV[2:0] designates the code indicating the write operation of the data at the word unit, the second on-chip memory MEM12 executes the write operation of the data at the word unit. The subsequent operations are identical to those of the first on-chip memory MEM1.

(20) Read Operation of Data at Long Word Unit in Mode 3

When MSEL exhibits the enable state, when WE=low, when the 15th bit (IAB[14]) of IAB is high and when MV[2:0] designates the code indicating the read operation of data at the long word unit, the second on-chip memory MEM12 executes the read operation of the data at the long word unit. The subsequent operations are identical to those of the first on-chip memory MEM1.

(21) Write Operation of Data at Long Word Unit in Mode 3

The data to be written are sent as at the read time by using all the bits of the second data bus IDB2. When MSEL exhibits the enable state, when WE=high, when the 15th bit (IAB[14]) of IAB is high and when MV[2:0] designates the code indicating the write operation of the data at the long word unit, the second on-chip memory MEM12 executes the write operation of the data at the long word unit. The subsequent operations are identical to those of the first on-chip memory MEM11.

[Construction of Data Execution Unit EX11]

Figure 19:
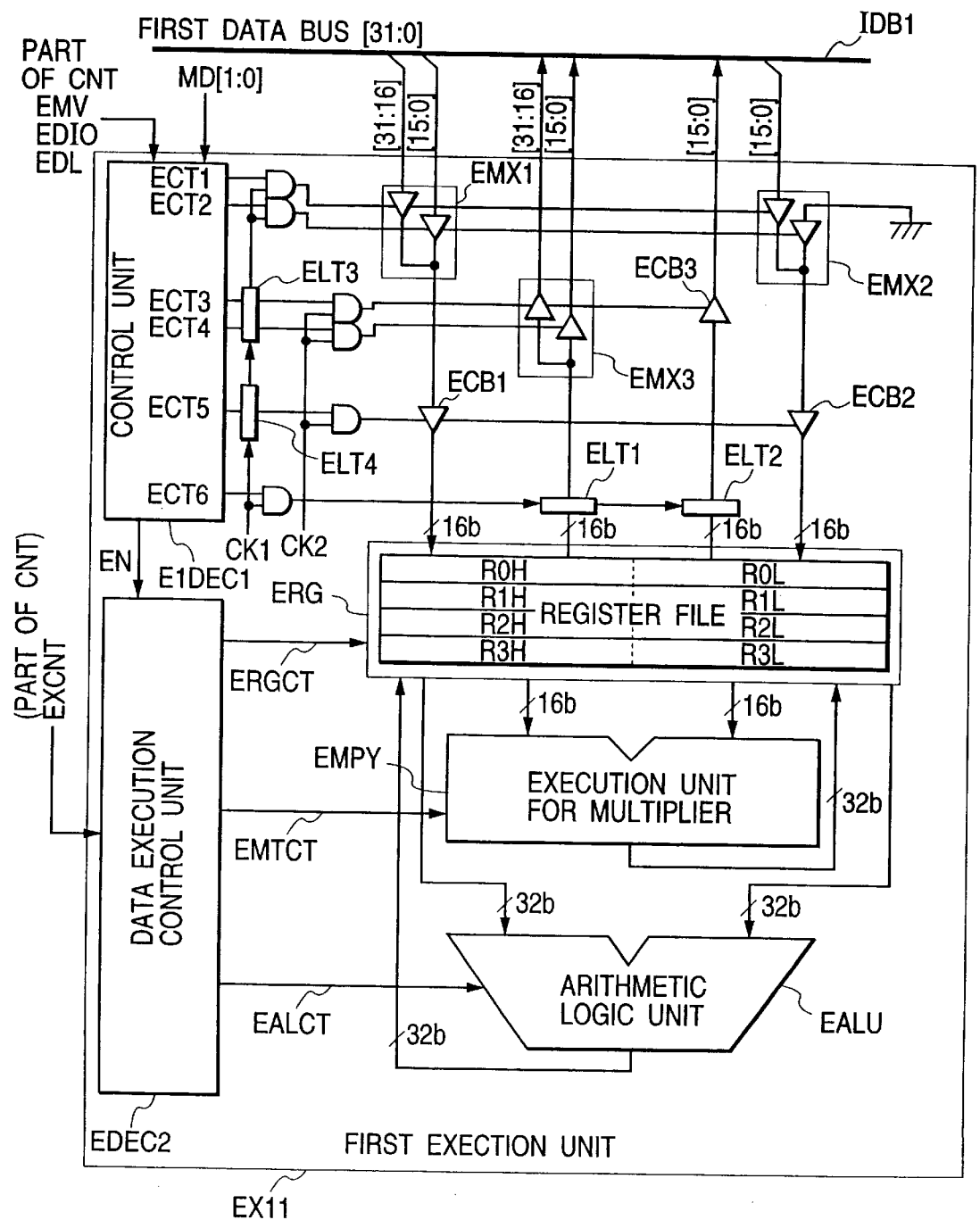
FIG. 19 shows a sample of a more specific construction of a first data execution unit (EX11)

A sample of a more specific construction of the first data execution unit EX11 is shown in FIG. 19. In FIG. 19: letters ERG designates a register file in the first data execution unit EX11; letters EMPY an execution unit for multiplier; letters EALU an arithmetic logic unit; letters E1DEC1 a control unit for generating data transfer control signals ECT1 to ECT6 in the first data execution unit EX11; letters EDEC2 a control unit for generating a set of data execution control signals ERGCT, EMTCT and EALCT in the first data execution unit EX11; letters ECT1 to ECT6 the control signals to be outputted from the control unit E1DEC1; letters EMX1 a selector for selecting and fetching a more significant word (of 16 bits) or a less significant word of the first data bus IDB1; letters EMX2 a selector for selecting and fetching the less significant words (of 16 bits) or all zero data of the first data bus IDB1; letters ECB1 a clocked gate for inputting the data, as selected by the selector EMX1, to the file of a more significant word resistor (R0 to 3H); letters ECB2 a clocked gate for inputting the data, as selected by the selector EMX2, to the file of a less significant word resistor (R0 to 3L); letters ELT1 a latch unit for latching the output signals of the more significant word registers (R0 to 3H), as selected by the register file ERG, at the timing of one end CK1 so that they may be outputted to the first data bus; letters ELT2 a latch unit for latching the output signals of the less significant word registers (R0 to 3L), as selected by the register file ERG, at the timing of one end CK1 so that they may be outputted to the first data bus; letters EMX3 a selector for outputting the output of ELT1 to the more significant word or the less significant word of the first data bus IDB1; letters ECB3 a clocked gate for outputting the output of ELT2 to the less significant words of the first data bus IDB1; letters ELT3 a delay latch unit for delaying the control signals ECT3 and ECT4 by a half period; letters ELT4 a delay latch unit for delaying the control signal ECT5 by a half period; letters EMV a control signal for instructing both the data execution units EX11 and EX12 the data transfer operation; letters EDIO a control signal for designating both the data execution units EX11 and EX12 the transfer direction at the time of the data transfer operation; letters EDL a control signal for designating both the data execution units EX11 and EX12 the data bit length at the time of the data transfer operation; and letters EXCNT a set of control signals for instructing both the data execution units EX11 and EX12 the operations. Here, the signals EMV, EDIO, EDL and EXCNT are contained in the set control signals which are outputted by the central processing unit CPU1. The set control signals ERGCT for the data execution are composed of a plurality of kinds of signals including: the signals for selecting a specific register such as R0H or R1L in the register file ERG and for feeding the held data to the execution unit for the multiplier; the signals for selecting a specific register such as R1H or RQL in the register file ERG and for feeding the held data to the arithmetic logic unit EALU; and the control signals for storing the executed result coming from the execution unit for the multiplier EMPY or the arithmetic logic unit EALU in the selected register such as R2H or R2L. The set control signals EMTCT for the data transfer for the data transfer are composed of a plurality of kinds of signals including: the signals for designating whether or not the input data to be fed to the execution unit for the multiplier EMPY are signed; and the signals for determining whether or not the executed result of the execution unit for the multiplier EMPY is to be shifted. The set control signals EALCT for the data transfer are composed of a plurality of kinds of signals such as signals for selecting the arithmetic executions such as AND, OR, Exclusive OR in the arithmetic logic unit EALU.

[Construction of Data Execution Unit EX12]

Figure 20:
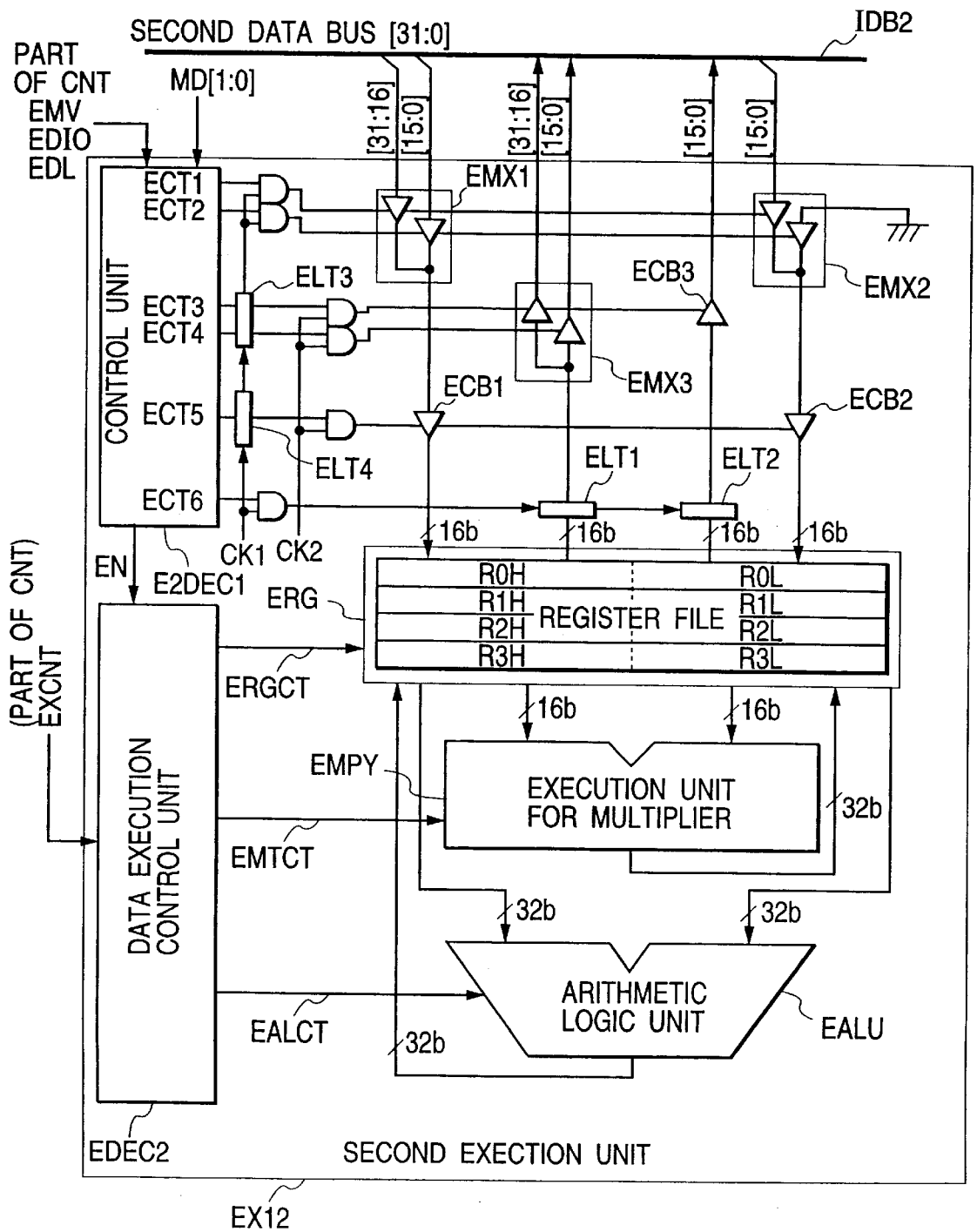
FIG. 20 shows a sample of a more specific construction of a second data execution unit (EX12)

A sample of a more specific construction of the second data execution unit EX12 is shown in FIG. 20. The first and second data execution units EX11 and EX12 are identical in structures excepting the truth tables defining the functions the data buses and the control units E1DEC1 and E2DEC1 to be connected, and their reference numerals and their descriptions are omitted.

[Operations of Data Execution Unit EX11]

Here will be described the detailed operations of the first data execution unit EX11.

Figure 22A:
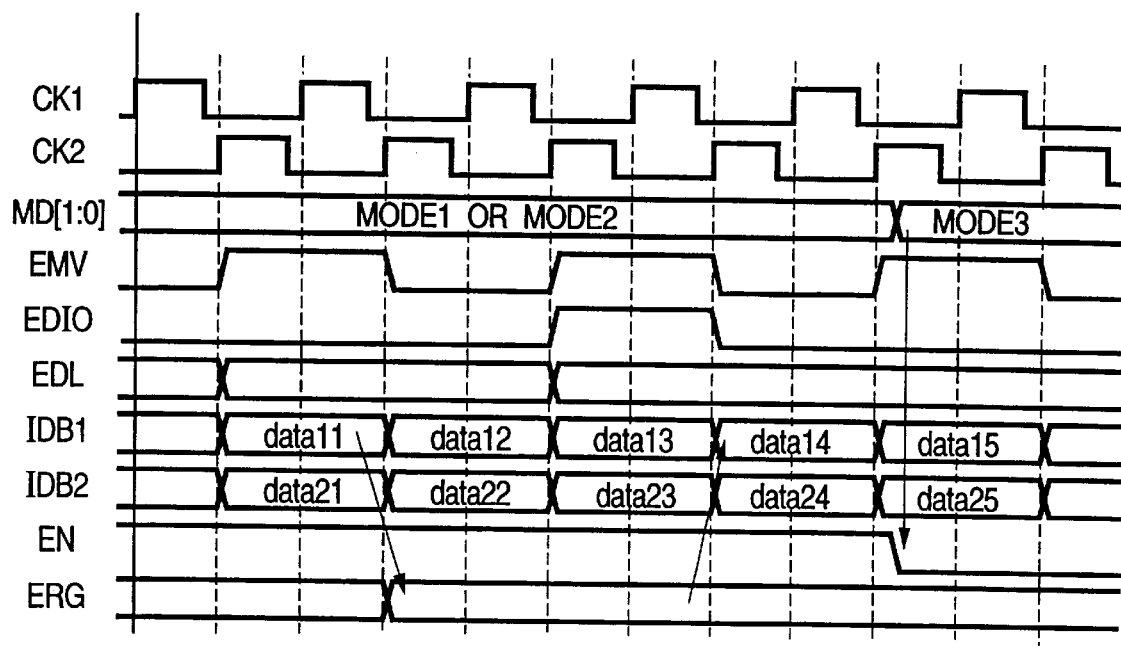
FIG. 22a shows a timing chart of the first data execution unit.

FIG. 21a shows a truth table enumerating the functions of the control unit E1DEC1, and FIG. 22a is a timing chart of the register file in the first data execution unit EX11 at the time of the write/read operations. The data execution unit of this embodiment takes an execution unit capable of executing the digital signal processing efficiently. The register file ERG is constructed of a plurality of registers having a length of 32 bits. Each register is constructed of more significant words having a length of 16 bits and less significant words having a length of 16 bits. For example, the register R0 is composed of a more significant word R0H and a less significant word R0L. As the execution unit, there are mounted the ordinary arithmetic logic unit EALU and the execution unit for the multiplier EMPY, which are so controlled by the set control signals EXCNT that they can be arithmetically executed in parallel. The arithmetic logic unit EALU executes the operations of the same 32 bits as the bit length of the register. On the other hand, the execution unit for the multiplier receives the data of 16 bits as its source data to output the result of 32 bits.

Here will be briefly described the operations of the multiplier EMPY with reference to FIG. 19.

In order that the data execution control unit EDEC2 may come into the state capable of generating the set control signals for the data execution ERGCT, EMTCT and EALCT, it receives an operation enable signal EN from the control unit E1DEC1.

The data execution control unit EDEC2 having received the execution enable signal EN selects a specific register in the register file ERG of the set control signals ERGCT for the data execution. In the case of this embodiment, one input of the multiplier EMPY has a bit length of 16 bits so that the register of 16 bits is selected as a multiplier R0H and a multiplicand R3H. To ERG, there is fed the signal for feeding the data, as held in the selected register of 16 bits, to the multiplier EMPY. The EDEC2 feeds the multiplier EMPY of the set control signals EMTCT for the data execution with the signal designating whether or not the fed input data are signed or the signal for determining whether the execution result of the multiplier EMPY is to be shifted, thereby to cause the multiplier EMPY to execute operation designated by EMTCT. Next, the result of the execution is designated to the specific register in the register file ERG. In the case of this embodiment, the output of the multiplier EMPY has a bit length of 32 bits so that one register such as R2H or R2L is selected. The control signal for writing the result of the execution in the designated register is fed from the data execution control unit EDEC2 to the register file ERG. In response to the control signal, the result of the execution in the multiplier EMPY is written in the specific register in the register file ERG.

Here will be briefly described the operations of the arithmetic logic unit EALU.

In order that the data execution control unit EDEC2 may come into the state capable of generating the set control signals for the data execution ERGCT, EMTCT and EALCT, it receives an operation enable signal EN from the control unit E1DEC1. This point is identical to that of the aforementioned operation of the multiplier.

The data execution control unit EDEC2 having received the execution enable signal EN selects a specific register in the register file ERG of the set control signals ERGCT for the data execution. In the case of this embodiment, one input of the arithmetic LOGIC unit EALU has a bit length of 32 bits so that one register such as R0h and R0L, and R1H and R1L is selected. To ERG, there is fed the signal for feeding the data, as held in the selected register, to the arithmetic LOGIC unit EALU. The EDEC2 feeds the arithmetic LOGIC unit EALU of the set control signals EALCT for the data execution with the signal for selecting the arithmetic logic operations such as ADD, AND, OR or Exclusive OR, thereby to cause the arithmetic logic unit EALU to execute operation designated by EALCT. Next, the result of the execution is designated to the specific register in the register file ERG. In the case of this embodiment, the output of the arithmetic LOGIC unit EALU has a bit length of 32 bits so that one register of 32 bits is designated. The control signal for writing the result of the execution in the designated register is fed from the data execution control unit EDEC2 to the register file ERG. In response to the control signal, the result of the execution in the arithmetic LOGIC unit EALU is written in the specific register in the register file ERG.

By combining the operation in the multiplier and the operation in the arithmetic logic unit, moreover, it is possible to realize the multiply and accumulation operation to be executed in a filtering operation. After the operation in the multiplier, more specifically, the result of the operation is employed as one input of the arithmetic logic unit EALU for the arithmetic logic operation. When the multiply and accumulation operation is to be executed, there may be executed in parallel the pipe-line operation, i.e., the operation in the multiplier and the operation to execute the operation result of one cycle before in the multiplier as one input of the arithmetic logic unit. The description of the operation of the multiplier EMPY and the description of the operation of the arithmetic logic unit EALU thus far made are similar in another embodiment. It is needless to say that the multiply and accumulation operation to be executed in the filtering operation can also be realized in another embodiment by combining the operation in the multiplier and the operation in the arithmetic logic unit.

Here, in the description of another embodiment, as including that of this embodiment, the "inactive state" of an execution unit implies the state in which no data transfer is between the data execution unit and the data bus. When data to be fed to a second execution unit are in the first data bus, for example, the data are broken if the data from the first execution unit are transferred to the first data bus. Therefore, the data execution unit in the "inactive state" is required at least not to transfer the data to the data bus. Specifically, the control unit E1DEC1 having received the set control signals of the data execution unit is active, but the output of the data from the register file ERG to the data bus is interrupted by fixing the signals to be outputted from the control unit E1DEC1, in the low state, i.e., in the disable state thereby to disconnect the clocked gate ECB3 and the selector EMX3 controlling the data output to the data bus. In this embodiment, the clocked gate ECB3 and the selector EMX3 are disconnected by taking a timing with a clock CK1 or CK2 on the basis of the signal ECT3 and ECT4. By fixing the clock signals CK1 and CK2 to the ECB3 and EMX3 in the low state, i.e., in the disable state, however, the clocked gates ECB1 to ECB3 and EMX3 can also be disconnected to interrupt the output of the data from the register file ERG to the data bus.

In order to effect no data transfer between the data execution unit and the data bus, the input to the register file ERG can naturally be interrupted. In order to disconnect the selectors EMX1 and EMX2 and the clocked gates ECB1 and ECB2, therefore, the signals ECT1, ECT2 and ECT5 may be fixed in the disable state. Alternatively, moreover, the input from the data bus can naturally be interrupted by fixing the clock signals CK1 and CK2 in the disable state. Thus, it is possible to prevent the data in the register file ERG from being broken.

In order to prevent any useless power consumption while the data transfer between the register file ERG and the data bus is interrupted, as described above, the operations may be interrupted by inputting the operation enable signal EN from the control unit E1DEC1 to the data execution control unit EDEC2 to invite no transition of the state of the multiplier EMPY and the arithmetic logic unit EALU.

These execution units and registers handle at least the data of fixed point type. The detailed description of the method for handling the integer data and the fixed point data is omitted because so many samples are already in the prior art. However, here will be described a difference at the time of the data transfer which has a deep relation to the practice of the invention.

For the integer data, the operations are identical to those which are executed by the CPU of the microcomputer of the prior art. When the word data having a length of 16 bits are to be transferred, more specifically, what is to be transferred is the less significant 16 bits of the register. Since the decimal point is located in the case of the fixed point data between a bit 31 and a bit 30, on the other hand, the less significant side is so far lighter than the more significant side as to fall within an error range as the case may be. When data having a smaller width than the bit length of the register are to be transferred, therefore, the more significant data are to be transferred. In this embodiment, too, the more significant register is to be subjected to the transfer in the case of the data transfer of a word length (of 16 bits).

(1) Operations in Mode 1 and Mode 2

When the central processing unit CPU1 issues the control signal for instructing the data inputting operation at the word unit, EMV is enabled (high), EDIO=low and EDL=low, so that the first data execution unit EX11 executes the operation to fetch the word data at the less significant 16 bits of the first data bus IDB1. When the control signal ECT2 is enabled, the word data at the less significant 16 bits of the first data bus IDB1 pass through the selector EMX1 and further through the clocked gate ECB1 with ECT5 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU1 issues the control signal for instructing the data inputting operation at the word unit, EMV is enabled (high), EDIO=high and EDL=low, so that the first data execution unit EX11 executes the operation to output the word data to the less significant 16 bits of the first data bus IDB1. When the control signal ECT6 is enabled, the data to be outputted pass from the more significant words of the source register in the register file ERG through the latch unit ELT1 and further through the selector EMX3 with the ECT4 being enabled, and are outputted to the less significant 16 bits of the first data bus IDB1. Here, no output is made to the more significant 16 bits of the first data bus IDB1, but it is needless to say that the practice of the invention is not obstructed even with a function to expand the most significant bit of the output data while considering that the transfer destination is the register of 32 bits.

When the central processing unit CPU1 issues the control signal for instructing the data inputting operation at the long word unit, EMV is enabled (high), EDIO=low and EDL= high, so that the first data execution unit EX11 executes the operation to fetch the long word data of the first data bus IDB1. When the control signal ECT2 is enabled, the word data at the more significant 16 bits of the first data bus IDB1 pass through the selector EMX1 and further through the clocked gate ECB1 with ECT5 being enabled, and are fetched by the register file ERG so that they are inputted to the more significant words of the designated destination register. Simultaneously with this, the word data at the less significant 16 bits of the first data bus IDB1 are inputted from the selector EMX2 and are fetched through the clocked gate ECB2 by the register file ERG so that they are inputted to the less significant words of the designated destination register.

When the central processing unit CPU1 issues the control signal for instructing the data inputting operation at the long word unit, EMV is enabled (high), EDIO=high and EDL= high, so that the first data execution unit EX11 executes the operation to output the long word data to the first data bus IDB1. When the control signal ECT3 is enabled, the data to be outputted pass from the more significant words of the source register in the register file ERG through the latch unit ELT1 and further through the selector EMX3 with the ECT4 being enabled, and are outputted to the more significant 16 bits of the first data bus IDB1. Simultaneously with this, the data to be outputted pass from the less significant words of the source register in the register file ERG through the latch unit ELT2 and further through the clocked gate ECB3 and are outputted to the less significant 16 bits of the first data bus IDB1.

(2) Operations in Mode 3

When the mode state signal MD[1:0] indicates Mode 3, the control unit E1DEC1 disables the operation enable signal EN. From now on, the first data execution unit EX11 will not execute the operation but hold the disable state till the Mode is changed, no matter what operation is instructed by the central processing unit CPU1. In this mode, the control issued by the central processing unit CPU1 is effective in the second data execution unit EX12.

[Operations of Data Execution Unit EX12]

Here will be described the detailed operations of the second data execution unit EX12.

FIG. 21b shows a truth table enumerating the functions of the control unit E2DEC1. The timing is identical to that of the first data execution unit EX11.

(1) Operations in Mode 1

When the mode state signal MD[1:0] indicates Mode 1, the control unit E2DEC1 disables the operation enable signal EN. From now on, the second data execution unit EX12 will not execute the operation but hold the disable state till the Mode is changed, no matter what operation is instructed by the central processing unit CPU1. In this mode, the control issued by the central processing unit CPU1 is effective in the first data execution unit EX11.

(2) Operations in Mode 2 and Mode 3

When the central processing unit CPU1 issues the control signal for instructing the data inputting operation at the word unit, EMV is enabled (high), EDIO=low and EDL=low, so that the second data execution unit EX12 executes the operation to fetch the word data at the less significant 16 bits of the second data bus IDB2. When the control signal ECT2 is enabled, the word data at the less significant 16 bits of the second data bus IDB2 pass through the selector EMX1 and further through the clocked gate ECB1 with ECT5 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU1 issues the control signal for instructing the data inputting operation at the word unit, EMV is enabled (high), EDIO=high and EDL=low, so that the second data execution unit EX12 executes the operation to output the word data to the less significant 16 bits of the second data bus IDB2. When the control signal ECT6 is enabled, the data to be outputted pass from the more significant words of the source register in the register file ERG through the latch unit ELT1 and further through the selector EMX3 with the ECT4 being enabled, and are outputted to the less significant 16 bits of the second data bus IDB2. Here, no output is made to the more significant 16 bits of the second data bus IDB2, but it is needless to say that the practice of the invention is not obstructed even with a function to expand the most significant bit of the output data while considering that the transfer destination is the register of 32 bits.

When the central processing unit CPU1 issues the control signal for instructing the data inputting operation at the long word unit, EMV is enabled (high), EDIO=low and EDL=high, so that the second data execution unit EX12 executes the operation to fetch the long word data of the second data bus IDB2. When the control signal ECT2 is enabled, the word data at the more significant 16 bits of the second data bus IDB2 pass through the selector EMX1 and further through the clocked gate ECB1 with ECT5 being enabled, and are fetched by the register file ERG so that they are inputted to the more significant words of the designated destination register. Simultaneously with this, the word data at the less significant 16 bits of the second data bus IDB2 are inputted from the selector EMX2 and are fetched through the clocked gate ECB2 by the register file ERG so that they are inputted to the less significant words of the designated destination register.

When the central processing unit CPU1 issues the control signal for instructing the data inputting operation at the long word unit, EMV is enabled (high), EDIO=high and EDL=high, so that the second data execution unit EX12 executes the operation to output the long word data to the second data bus IDB2. When the control signal ECT3 is enabled, the data to be outputted pass from the more significant words of the source register in the register file ERG through the latch unit ELT1 and further through the selector EMX3 with the ECT6 being enabled, and are outputted to the more significant 16 bits of the second data bus IDB2. Simultaneously with this, the data to be outputted pass from the less significant words of the source register in the register file ERG through the latch unit ELT2 and further through the clocked gate ECB3 and are outputted to the less significant 16 bits of the second data bus IDB2.

In this embodiment thus far described, by applying the invention, the source data necessary for the operations can be supplied without delay to sufficiently exhibit the effect of a high performance by the two parallel execution function in response to the single instruction without being obstructed by the data transfer. Moreover, no problem arises in the consistency with the ordinary single operation.

For the first and second data execution units EX11 and EX12 in the foregoing embodiment, the truth tables of the control units E1DEC1 and E2DEC1 are slightly different. By devising the mode display definitions in the mode set circuit MODE1, however, the truth tables can be made identical. If the following definitions are made, for example:

Mode 1: MD[1:0]=01;
Mode 2: MD[1:0]=11; and
Mode 3: MD[1:0]=10, then the control unit E1DEC1 of the first data execution unit EX11 can be controlled in the mode for MD[0], and the control unit E2DEC1 of the second data execution unit EX12 can be likewise controlled in the mode for MD[1]. Only the names of the input signals are different, but the internal logic structures are identical. Similar effects could be achieved even if the mode signals are decoded without any change in the definitions to the signals for enabling the individual data execution units, and other various methods could be conceived, although omitted.

<Embodiment 2>

Figure 23:
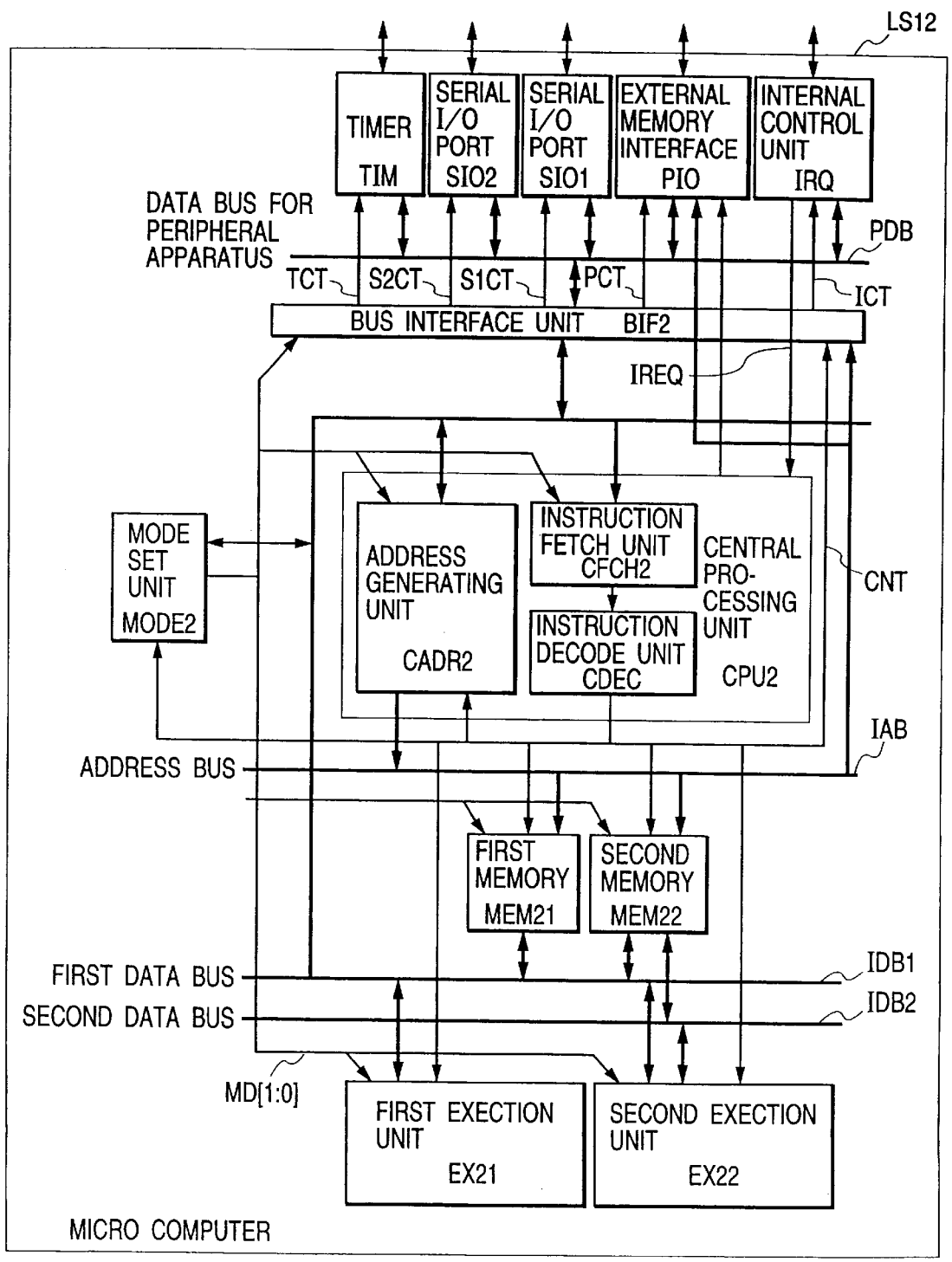
FIG. 23 shows a second embodiment of the one-chip microcomputer according to the invention.

FIG. 23 shows a second embodiment of a one-chip microcomputer according to the invention. In FIG. 23: letters LSI2 designates a microcomputer according to the invention; letters CPU2 a central processing unit including a circuit for fetching and decoding an instruction to generate a desired control signal; letters CFCH2 an instruction fetch unit included in CPU2; letters CDEC an instruction decode unit included in CPU2; letters MODE2 a mode set circuit for setting the microcomputer LSI2 to a mode, designated by the control signals, to hold the state; letters CADR2 an address generating unit included in CPU2 for generating the designated address; letters MEM21 a first on-chip memory packaged over the chip; letters MEM22 a second on-chip memory packaged over the chip; letters EX21 a first data execution unit for executing the data operations; letters EX22 a second data execution unit for executing the data operations; letters IDB1 a first data bus connected with MEM 21, MEM22, EX21, MODE2 and a bus interface unit BIF2 and used for the data transfer; letters IDB2 a second data bus connected with MEM22, EX21, EX22, MODE2 and the bus interface unit BIF2 and used for the data transfer; and letters BIF2 a bus interface unit for the data transfer between the bus IDB1 and a data bus PDB, as connected with peripheral modules, and for generating a data transfer control signal to the peripheral modules. The remaining reference letters are identical to those of the first embodiment of FIG. 1.

In this embodiment, the instruction fetch unit CFCH2, the mode set circuit MODE2, the address generating unit CADR2, the first on-chip memory MEM21 are connected with the first data bus IDB1 but not with the second data bus IDB2. In place, the second data execution unit EX22 is connected with both IDB1 and IDB2.

Here will be described the operations of FIG. 23 in the difference modes.

The first data execution unit EX11 and the second data execution unit EX12 are functionally equivalent as in FIG. 1 excepting the parts connected with the data bus, and their execution functions and the registers in their modules are distinguished not on the instruction code but by the modes. The mode set circuit MODE2 sets one of the following three modes and holds the state as in Mode 1. Here, the modes may be Mode 1 and Mode 2, as in the foregoing first embodiment.

Mode 1: Can execute a single operation by the first data execution unit. A reset initial value.

Mode 2: Can execute two parallel operations by the first and second data execution unit.

Mode 3: Can execute a single operation by the second data execution unit. A sample of the format of the instruction, as included in the instruction set of the microcomputer, and the instruction code will not be described because they are similar to those of the first embodiment described with reference to FIG. 56. In this embodiment, moreover, the individual execution units are constructed for the single-precision data operation but may be constructed to execute both the single- and double-precision data operations as in the first embodiment.

[Operations in Different Modes]

The operations in Mode 1 and Mode 2 will not be described because they are identical to those of the embodiment of FIG. 1.

When the microprocessor LSI2 is in the state of Mode 3, MD[1]=high, and MD[0]=low. In this embodiment unlike the embodiment of FIG. 1, the connection states in Mode 3 are similar to those of Mode 1 excepting the second data execution unit EX22. Therefore, the operations of the module other than the second data execution unit EX22 are identical to those at the time of Mode 1.

In Mode 3, the second data execution unit EX22 is also connected with IDB1. When the decoded instruction is one for reading out the data from the memory and when the destination operand designated by the instruction is in the first or second data execution unit EX21 or EX22, the operand codes are shared between EX21 and EX22. In Mode 3, however, the first data execution unit EX21 is inactive so that the data on IDB1 are fetched by EX12. When the decoded instruction is one for writing the data in the memory and when the destination operand designated by the instruction is in the first or second data execution unit EX21 or EX22, the operand codes are shared between EX21 and EX22. In Mode 3, however, the first data execution unit EX21 is inactive so that the data in EX22 are outputted to IDB1. In Mode 3, the data transfer between the individual modules other than the memories is executed by using IDB1 as in Mode 1.

[Construction of Mode Set Circuit MODE2]

Figures 24, 25:
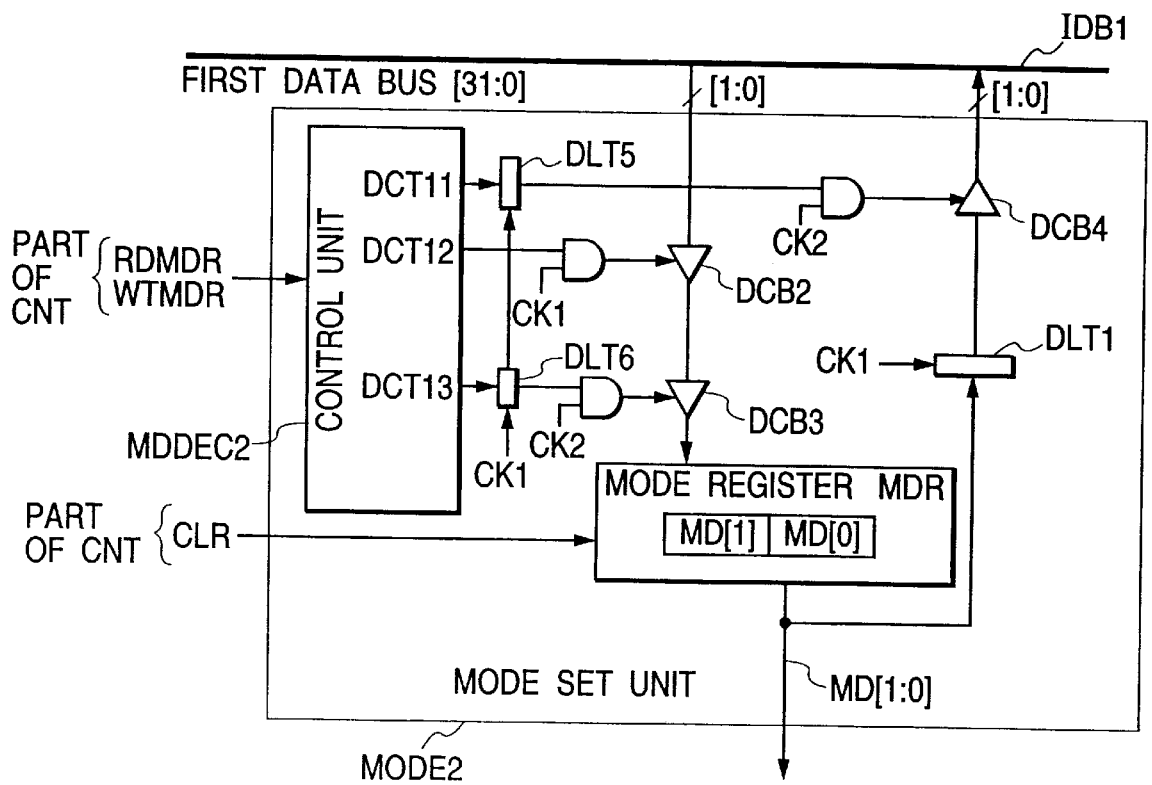
FIG. 24 shows a sample of a more specific construction of a mode set circuit (MODE2)
FIG. 25 shows a truth table of a control unit (MDDEC2) in the mode set circuit.

A sample of a more specific construction of the mode set circuit MODE2 is shown in FIG. 24. In FIG. 24: letters MDDEC2 a control unit for generating control signals DCT11 to DCT13 in the mode set circuit; letters DCT11 to DCT13 the control signals to be outputted from the control unit MDDEC2; letters DCB2 a clocked gate for fetching the data from the first data bus IDB1; letters DCB3 a clocked gate for inputting the data, as fetched by the clocked gate DCB2, to the mode register MDR; letters DCB4 a clocked gate for outputting the output of DLT1 to the first data bus IDB1; letters DLT5 a delay latch unit for delaying the control signal DCT11 by a half period; and letters DLT6 a delay latch unit for delaying the control signal DCT13 by a half period. The remaining letters designate the same ones as those of FIG. 6.

FIG. 25 shows a truth table enumerating the functions of the control unit MDDEC2. As defined in FIG. 25, this embodiment is identical to the first embodiment excepting that the mode set circuit MODE2 can be connected with the first data bus IDB1 so that the operations in Mode 3 are similar to those of Modes 1 and 2.

It is apparent that even the instruction fetch unit CFCH2 and the address generating unit CADR2 in the central processing unit CPU2 can input/output the data to and from the first data bus IDB1 by the construction and method similar to those of the mode set circuit MODE2.

[Construction and Operations of On-chip Memory MEM21]

Figure 26:
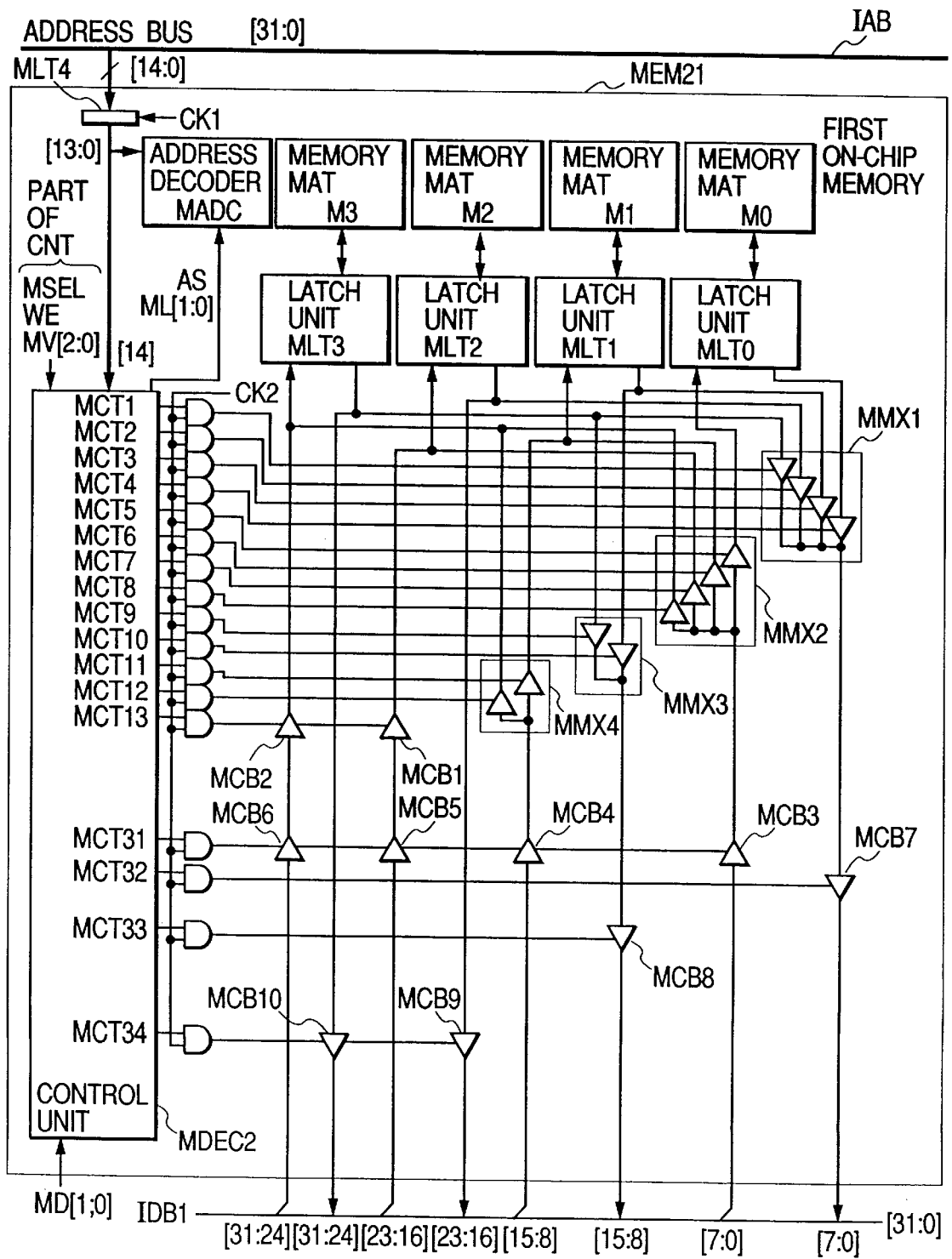
FIG. 26 shows a sample of a more specific construction of a first on-chip memory (MEM21)

A sample of a more specific construction of the first on-chip memory MEM21 is shown in FIG. 26. In FIG. 26: letters MCB3, MCB4, MCB5 and MCB6 designate clocked gates for fetching the data at the byte units individually from the first data bus IDB1; letters MCB7, MCB8 and MCB9 clocked gates for outputting the data at the byte unit individually to the first data bus IDB1; letters MDEC2 a control unit for generating the control signals MCT1 to MCT13 and MCT31 to MCT34 in the first on-chip memory MEM21; and the letters MCT1 to MCT13 and MCT31 to MCT34 the control signals to be outputted from the control unit MDDEC2. The remaining letters are identical to those of FIG. 8. Moreover, the control signals MCT1 to MCT13 are also identical to those of FIG. 8.

Here will be described the detailed operations of the first on-chip memory MEM21.

FIG. 26 also takes up like FIG. 8 the memories having functions to discriminate and correspond to three types of data lengths in response to the instruction. Therefore, the corresponding relations between the addresses and the actual memories and the code definitions of the control code signal MV[2:0] are similar to those of FIGS. 9 and 10, and the operations around the memory mat are also identical to those of FIG. 8 so that their description will be omitted here.

Figure 29:
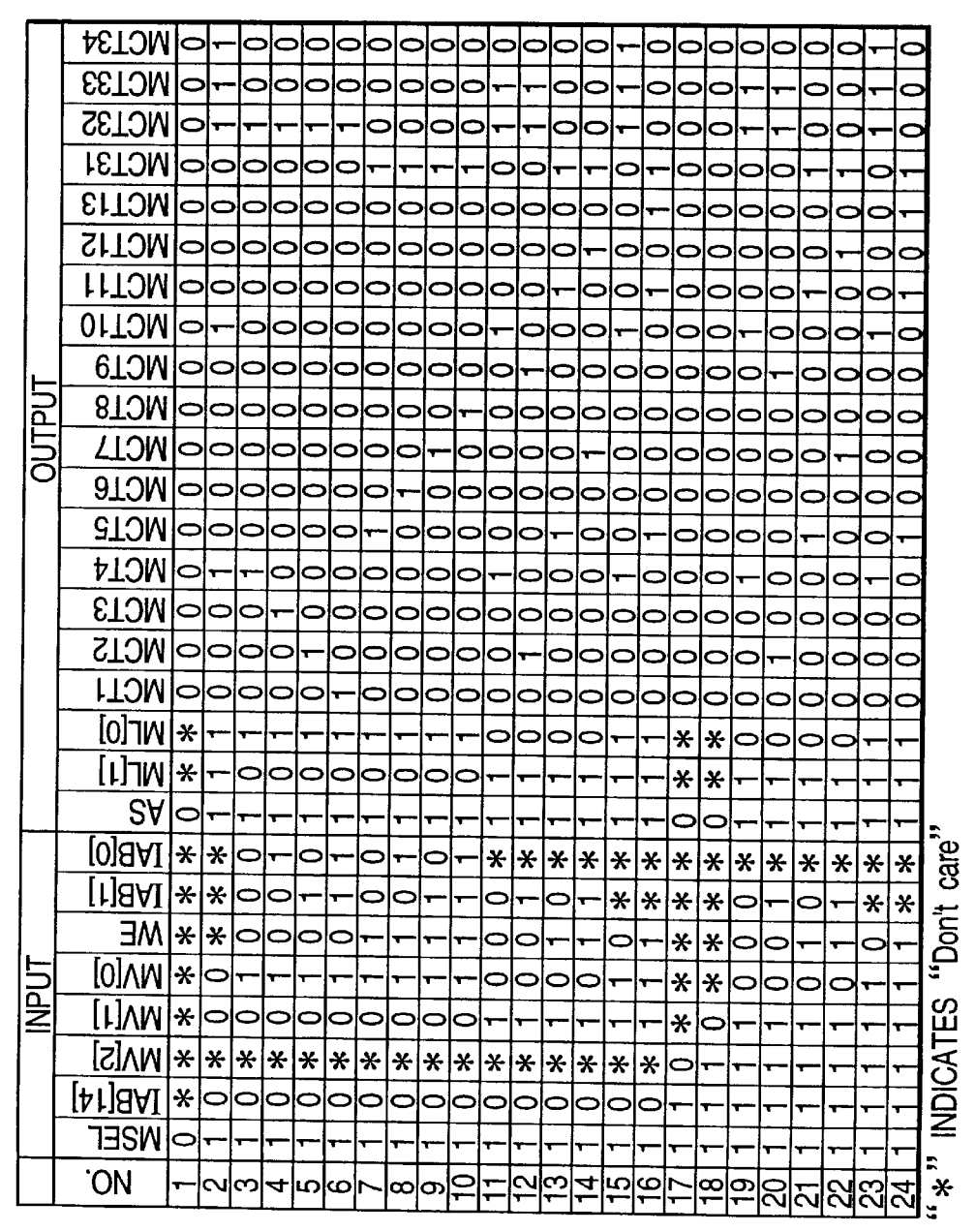

FIG. 28 shows the truth table of the definitions of the control unit MDEC2 in Mode 1 or Mode 3, and FIG. 29 shows the truth table of the same in Mode 2. The timing is similar to that of FIG. 14. Here will be described the operations separately in different Modes.

(1) Operations in Mode 1

In this embodiment, the bus to input/output the data is the first data bus IDB1. Therefore, the portion corresponding to the selector in FIG. 8 is only the clocked gate so that the operations are not basically different from those of FIG. 8.

Hence the operations of the first on-chip memory MEM21 in Mode 1 are identical to those of Embodiment 1 of FIG. 8 so that the detailed descriptions of the individual operations will be omitted.

(2) Operations in Mode 2

In this case, too, the operations are identical to (1) Operations in Mode 1.

(3) Operations in Mode 3

In mode 3, unlike the foregoing first embodiment, the data are inputted/outputted to and from not the second data bus IDB2 but the first data bus IDB1 as in Mode 1. Therefore, the detail of the operations is identical to the case of Mode 1.

[Construction and Operations of On-Chip Memory MEM22]

Figure 27:
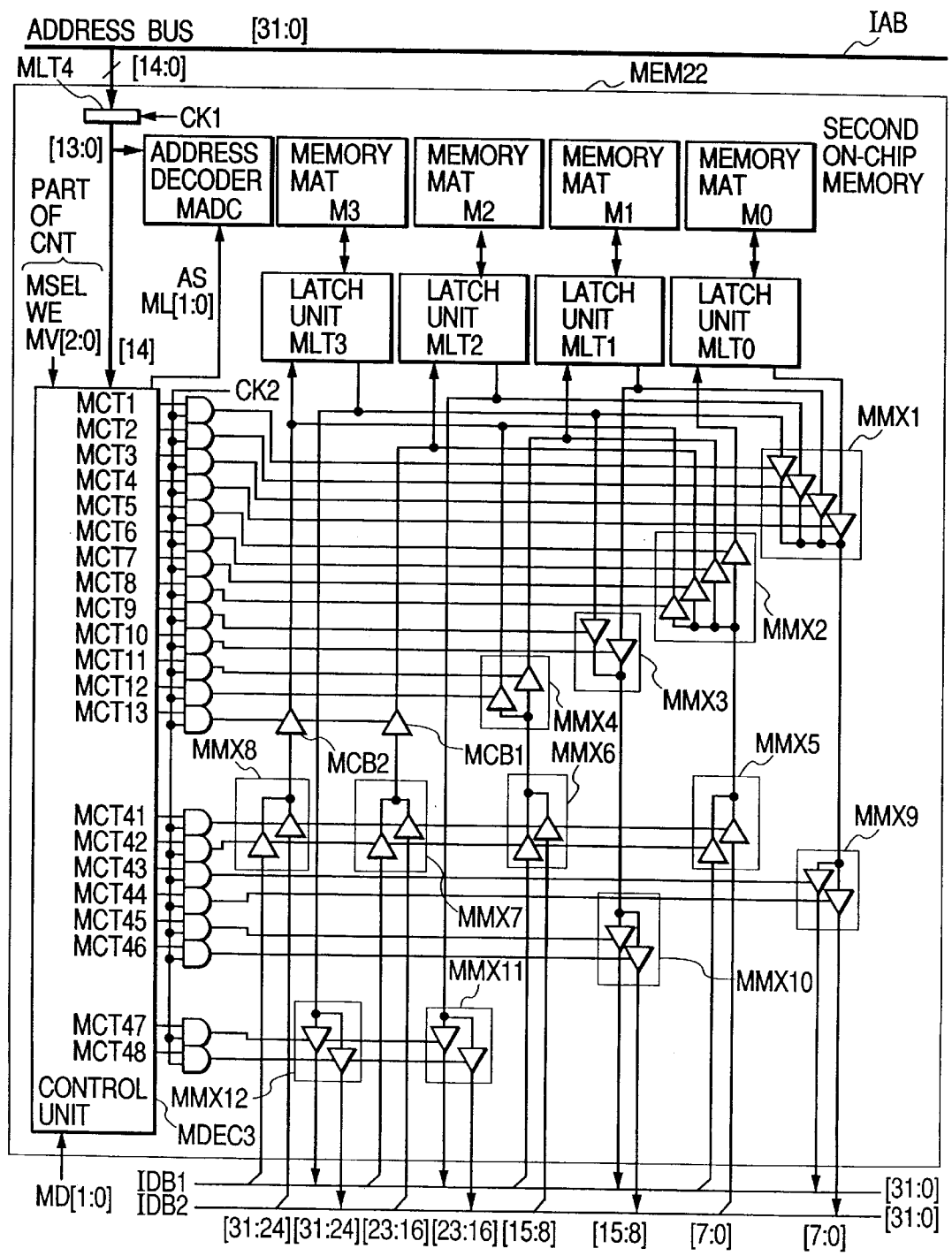
FIG. 27 shows a sample of a more specific construction of a first on-chip memory (MEM22)

A sample of a more specific construction of the second on-chip memory MEM22 is shown in FIG. 27. The circuit construction of FIG. 27 is unchanged by the different definitions of the truth values excepting that the control signals MCT14 to MCT21 of FIG. 8 are replaced by MCT41 to MCT48. The definitions of the truth values of the control unit MDEC3 in FIG. 27 are shown in FIGS. 30 and 31.

FIG. 30 is a truth table of the cases in Mode 1 and Mode 3. In this embodiment, the operations of the on-chip memory MEM22 in Mode 1 and Mode 3 are identical, and the content of the truth values is identical to that of the first embodiment of FIG. 16 excepting that the MCT14 to MCT21 are replaced by MCT41 to MCT48. FIG. 31 shows the truth table of the case of Mode 2, and the content of the truth values is also identical to that of the first embodiment of FIG. 17.

[Construction and Operations of Data Execution Unit]

The first data execution unit EX21 has the same structure as that of the first data execution unit EX11 of the first embodiment so that its description will be omitted.

Figure 32:
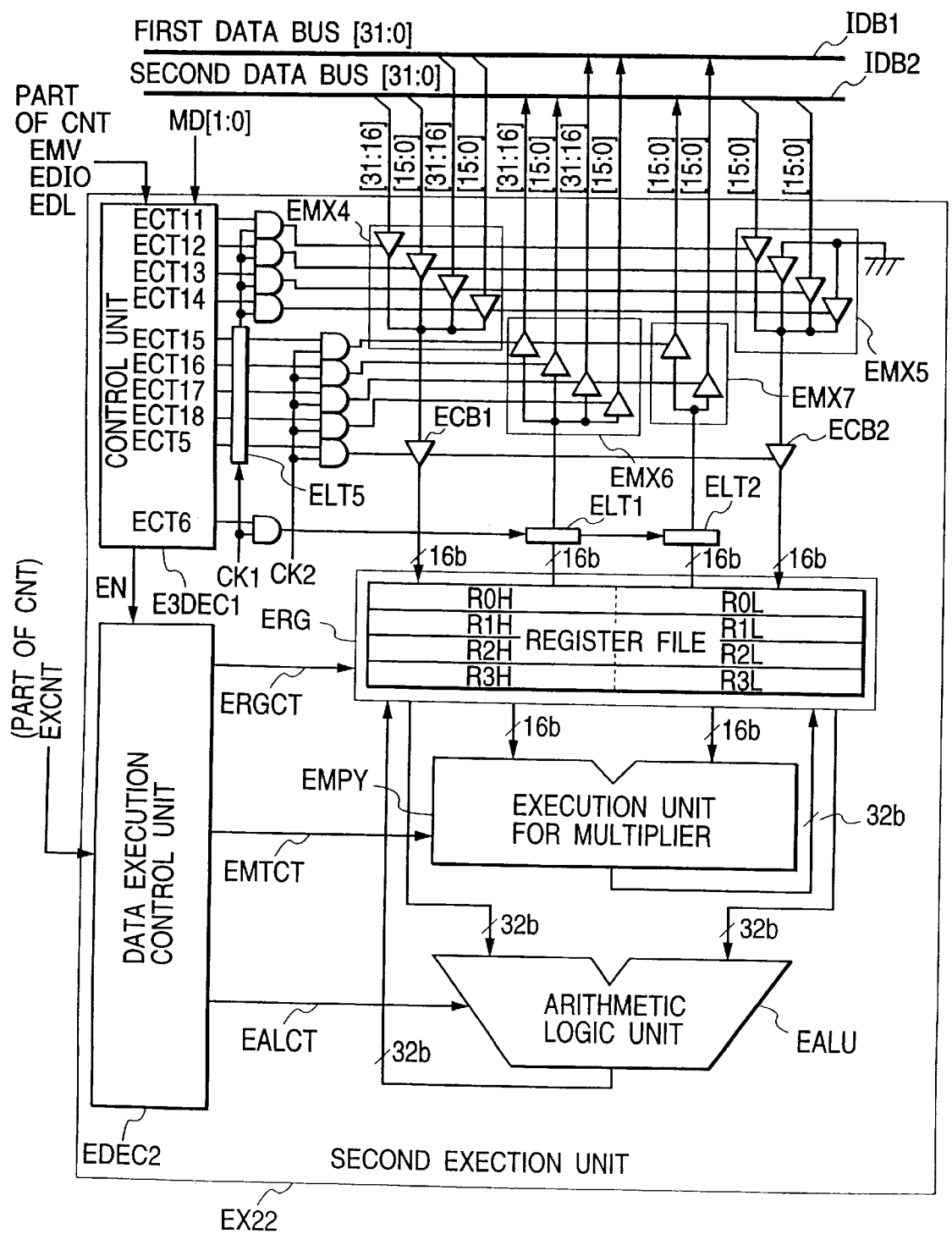
FIG. 32 shows a sample of a more specific construction of a second data execution unit (EX22)

A sample of a more specific construction of the second data execution unit EX22 is shown in FIG. 32. In FIG. 32: letters E3DEC1 a control unit for generating data transfer control signals ECT5 and ECT6, and ECT11 to ECT18 in the first data execution unit EX21; letters ECT5 and ECT6, and ECT11 to ECT18 the control signals to be outputted from the control unit MDDEC E3DEC1; letters EMX4 a selector for selecting and fetching a more significant word (of 16 bits) or a less significant word of the first data bus IDB1 or the second data bus IDB2; letters EMX5 a selector for selecting and fetching the less significant words (of 16 bits) or all zero data of the first data bus IDB1 or the second data bus IDB2; letters ECB1 a clocked gate for inputting the data, as selected by the selector EMX4, to the register file ERG; letters ECB2 a clocked gate for inputting the data, as selected by the selector EMX5, to the register file ERG; letters ELT1 a latch unit for latching the output signals of the more significant word registers (R0 to 3H), as selected by the register file ERG, at the timing of one end CK1 so that they may be outputted to the first data bus or the second data bus; letters ELT2 a latch unit for latching the output signals of the less significant word registers (R0 to 3L), as selected by the register file ERG, at the timing of one end CK1 so that they may be outputted to the first data bus or the second data bus; letters EMX6 a selector for outputting the output of ELT1 to the more significant word or the less significant word of the first data bus IDB1 or the second data bus IDB2; letters EMX7 a selector for outputting the output of ELT2 to the less significant words of the first data bus IDB1 or the second data bus IDB2; and letters FLT5 a delay latch unit for delaying the control signals ECT5 and ECT15 to ECT18 by a half delay. The remaining letters are identical to those of FIG. 19.

Here will be described detailed operations of the second data execution unit EX22.

Figure 22B:
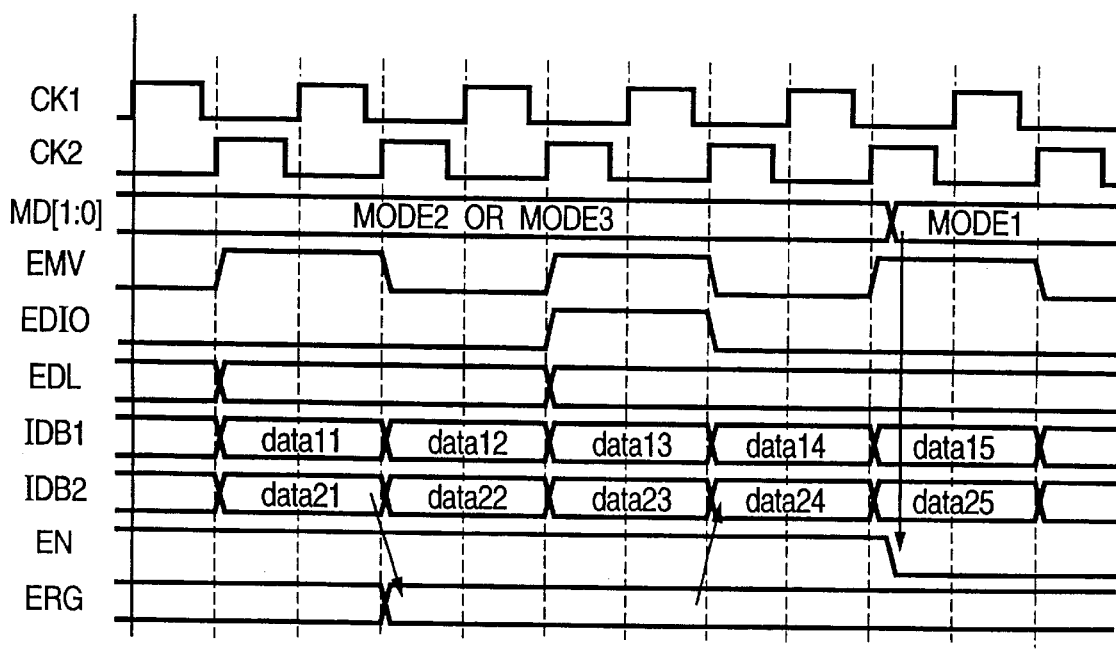
FIG. 22b shows a timing chart of the second data execution unit.

FIG. 33 is a truth table enumerating the functions of the control unit M3DEC1. Here, the timing of the write/read operations of the register file in the data execution unit is identical to that of FIG. 22b excepting that the second data bus IDB2 is employed in Mode 2 whereas the first data bus IDB1 is employed in Mode 1 and Mode 3. The data execution unit of this embodiment also takes up the execution unit which can efficiently execute the digital signal processing handling the data of the fixed point type, and has the same operation functions as those of FIG. 20. Hence, the data transfer operations relating to the invention will be exclusively described while omitting the detailed description.

(1) Operations in Mode 1

When the mode state signal MD[1:0] exhibits Mode 1, the control unit E3DEC1 disables the operation enable signal EN. From now on, the second data execution unit EX22 will not execute the operation but hold the disable state till the Mode is changed, no matter what operation is instructed by the central processing unit CPU2. In this mode, the control issued by the central processing unit CPU2 is effective in the first data execution unit EX21.

(2) Operations in Mode 2

When the central processing unit CPU2 issues the control signal for instructing the data inputting operation at the word unit, EMV is enabled (high), EDIO=low and EDL=low, so that the second data execution unit EX22 executes the operation to fetch the word data at the less significant 16 bits of the second data bus IDB2. When the control signal ECT12 is enabled, the word data at the less significant 16 bits of the second data bus IDB2 pass through the selector EMX4 and further through the clocked gate ECB1 with ECT5 being enabled, and are fetched by the register file ERG so that they are inputted to the more significant words of the designated destination register. Simultaneously with this, all zero data are outputted from the selector EMX5 and are fetched through the clocked gate ECB2 by the register file ERG so that they are inputted to the less significant words of the designated destination register.

When the central processing unit CPU2 issues the control signal for instructing the data inputting operation at the word unit, EMV is enabled (high), EDIO=high and EDL=low, so that the second data execution unit EX22 executes the operation to output the word data to the less significant 16 bits of the second data bus IDB2. When the control signal ECT6 is enabled, the data to be outputted pass from the more significant words of the source register in the register file ERG through the latch unit ELT1 and further through the selector EMX6 with the ECT16 being enabled, and are outputted to the less significant 16 bits of the second data bus IDB2. Here, no output is made to the more significant 16 bits of the second data bus IDB2, but it is needless to say that the practice of the invention is not obstructed even with a function to expand the most significant bit of the output data while considering that the transfer destination is the register of 32 bits.

When the central processing unit CPU2 issues the control signal for instructing the data inputting operation at the long word unit, EMV is enabled (high), EDIO=low and EDL=high, so that the second data execution unit EX22 executes the operation to fetch the long word data of the second data bus IDB2. When the control signal ECT11 is enabled, the word data at the more significant 16 bits of the second data bus IDB2 pass through the selector EMX4 and further through the clocked gate ECB1 with ECT5 being enabled, and are fetched by the register file ERG so that they are inputted to the more significant words of the designated destination register. Simultaneously with this, the word data at the less significant 16 bits of the second data bus IDB2 are inputted from the selector EMX5 and are fetched through the clocked gate ECB2 by the register file ERG so that they are inputted to the less significant words of the designated destination register.

When the central processing unit CPU2 issues the control signal for instructing the data inputting operation at the long word unit, EMV is enabled (high), EDIO=high and EDL=high, so that the second data execution unit EX22 executes the operation to output the long word data to the second data bus IDB2. When the control signal ECT6 is enabled, the data to be outputted pass from the more significant words of the source register in the register file ERG through the latch unit ELT1 and further through the selector EMX6 with the ECT15 being enabled, and are outputted to the more significant 16 bits of the second data bus IDB2. Simultaneously with this, the data to be outputted pass from the less significant words of the source register in the register file ERG through the latch unit ELT2 and further through the clocked gate ECB3 and are outputted to the less significant 16 bits of the second data bus IDB2.

(3) Operations in Mode 3

When the central processing unit CPU2 issues the control signal for instructing the data inputting operation at the word unit, EMV is enabled (high), EDIO=low and EDL=low, so that the second data execution unit EX22 executes the operation to fetch the word data at the less significant 16 bits of the first data bus IDB1. When the control signal ECT14 is enabled, the word data at the less significant 16 bits of the first data bus IDB1 pass through the selector EMX4 and further through the clocked gate ECB1 with ECT5 being enabled, and are fetched by the register file ERG so that they are inputted to the more significant words of the designated destination register. Simultaneously with this, all zero data are outputted from the selector EMX5 and are fetched through the clocked gate ECB2 by the register file ERG so that they are inputted to the less significant words of the designated destination register.

When the central processing unit CPU2 issues the control signal for instructing the data inputting operation at the word unit, EMV is enabled (high), EDIO=high and EDL=low, so that the second data execution unit EX22 executes the operation to output the word data to the less significant 16 bits of the first data bus IDB1. When the control signal ECT6 is enabled, the data to be outputted pass from the more significant words of the source register in the register file ERG through the latch unit ELT1 and further through the selector EMX6 with the ECT18 being enabled, and are outputted to the less significant 16 bits of the first data bus IDB1. Here, no output is made to the more significant 16 bits of the first data bus IDB1, but it is needless to say that the practice of the invention is not obstructed even with a function to expand the most significant bit of the output data while considering that the transfer destination is the register of 32 bits.

When the central processing unit CPU2 issues the control signal for instructing the data inputting operation at the long word unit, EMV is enabled (high), EDIO=low and EDL=high, so that the first data execution unit EX22 executes the operation to fetch the long word data of the first data bus IDB1. When the control signal ECT13 is enabled, the word data at the more significant 16 bits of the first data bus IDB1 pass through the selector EMX4 and further through the clocked gate ECB1 with ECT5 being enabled, and are fetched by the register file ERG so that they are inputted to the more significant words of the designated destination register. Simultaneously with this, the word data at the less significant 16 bits of the first data bus IDB1 are inputted from the selector EMX5 and are fetched through the clocked gate ECB2 by the register file ERG so that they are inputted to the less significant words of the designated destination register.

When the central processing unit CPU2 issues the control signal for instructing the data inputting operation at the long word unit, EMV is enabled (high), EDIO=high and EDL=high, so that the second data execution unit EX22 executes the operation to output the long word data to the first data bus IDB1. When the control signal ECT6 is enabled, the data to be outputted pass from the more significant words of the source register in the register file ERG through the latch unit ELT1 and further through the selector EMX6 with the ECT17 being enabled, and are outputted to the more significant 16 bits of the first data bus IDB1. Simultaneously with this, the data to be outputted pass from the less significant words of the source register in the register file ERG through the latch unit ELT2 and further through the clocked gate ECB3 and are outputted to the less significant 16 bits of the first data bus IDB1 through EMX7.

In this embodiment thus far described, too, by applying the invention, the source data necessary for the operations can be supplied as in the first embodiment without delay to sufficiently exhibit the effect of a high performance by the two parallel execution function in response to the single instruction without being obstructed by the data transfer. By expanding the input/output functions of the second data execution unit EX22, moreover, this embodiment is featured by having no input/output circuit function of the modules of the instruction fetch unit CFCH2, the address generating unit CADR2, the mode set circuit MODE2 and the bus interface unit in the central processing unit CPU2 with the second data bus IDB2. Here in this embodiment, the on-chip memory and the data execution unit are exemplified by different circuit constructions between the first and second. When the circuit scale raises no serious problem, the first on-chip memory and data execution unit may be given the same construction as the second on-chip memory and data execution unit to exclude the trouble of construction another circuits and to make a control without using any unnecessary functional portion.

In the second embodiment, moreover, by devising the mode display definition in the mode set circuit MODE1 as in the first embodiment, the control circuits for the first and second data execution units EX21 and EX22 can naturally be given the definition of the same truth table.

<Embodiment 3>

Figure 34:
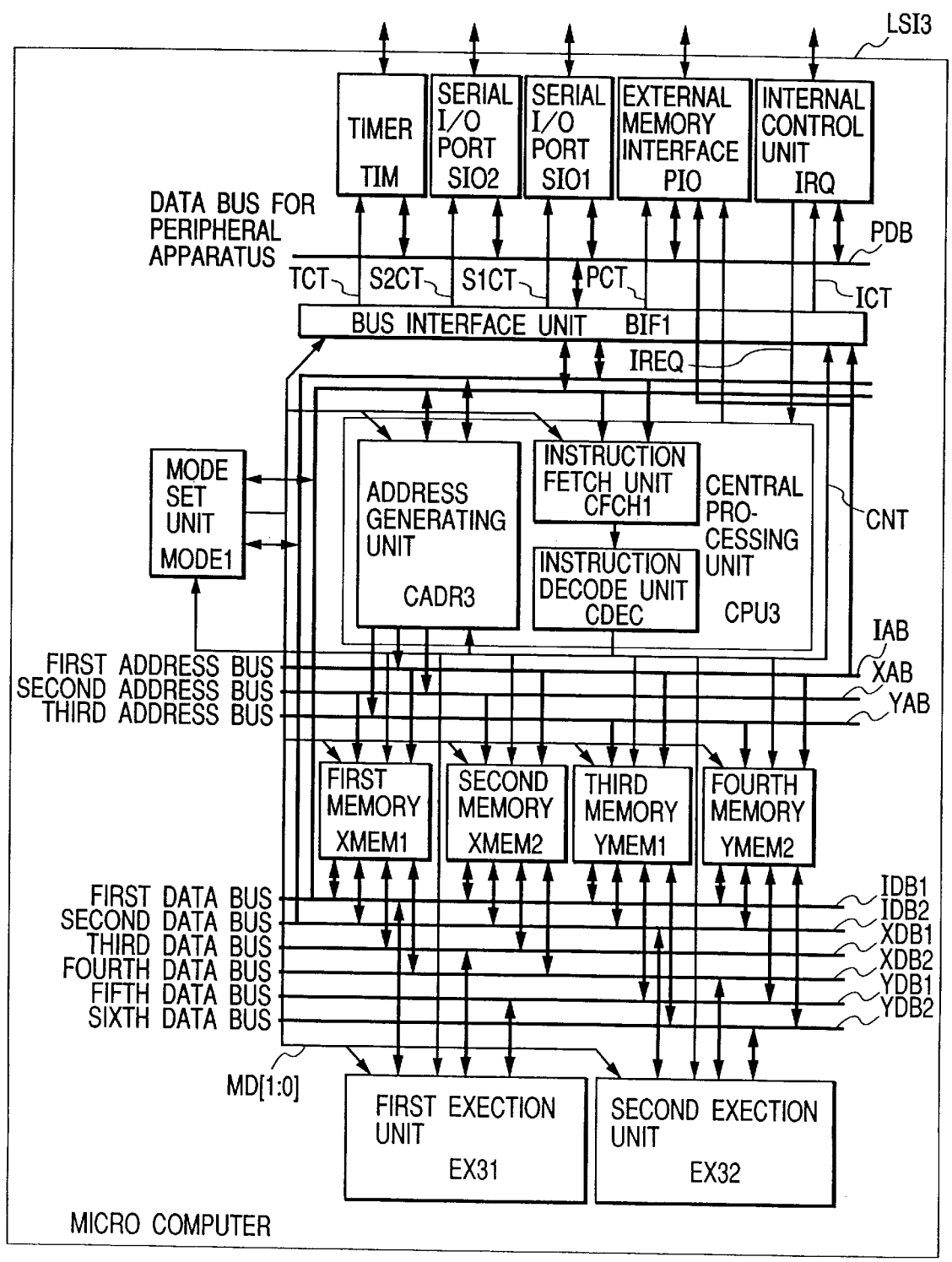
FIG. 34 shows a third embodiment of the one-chip microcomputer according to the invention.

FIG. 34 shows a third example of a one-chip microcomputer according to the invention. In this embodiment, the invention is applied to the one-chip microcomputer system which is constructed to include four on-chip memories and six data buses so as to execute the digital signal processing more efficiently than the first embodiment of FIG. 1. In FIG. 34: letters LSI3 designates a microcomputer according to the invention; letters CPU3 a central processing unit including a circuit for fetching and decoding an instruction to generate a desired control signal; letters CADR3 a first address generating unit included in CPU3 and having a function to generate the two designated addresses at the maximum simultaneously; letters IAB a first address bus for outputting an address generated in CADR3; letters XAB a second address bus for outputting an address generated in CADR3; letters YAB a third address bus for generating an address generated in CADR3; letters XMEM1 a first on-chip memory packaged over the chip; letters XMEM2 a second on-chip memory packaged over the chip; YMEM1 a third on-chip memory packaged over the chip; letters YMEM2 a fourth on-chip memory packaged over the chip; letters EX31 a first data execution unit for executing the data operations; letters EX32 a second data execution unit for executing the data operations; letters IDB1 a first data bus connected with XMEM1, XMEM2, YMEM1, YMEM2, EX31, MODE1 and a bus interface unit BIF1 and used for the data transfer; letters IDB2 a second data bus connected with XMEM1, XMEM2, YMEM1, YMEM2, EX32, MODE1 the bus interface unit BIF1 and used for the data transfer; letters XDB1 a third data bus connected with XMEM1, XMEM2 and EX31 and used for the data transfer; letters XDB2 a fourth data bus connected with XMEM1, XMEM2 and EX32 and used for the data transfer; letters XDB1 a fifth data bus connected with YMEM1, YMEM2 and EX31 and used for the data transfer; and letters YDB2 a sixth data bus connected with YMEM1, YMEM2 and EX32 and used for the data transfer. The remaining reference letters are identical to those of FIG. 1.

This embodiment is classified into three data transfer operations according to the buses to be used.

(1) The data transfer operations using the first address bus IAB1, the first data bus IDB1 and the second data bus IDB2 are identical to those of the preceding first embodiment.
(2) The second address bus XAB, the third data bus XDB1 and the fourth data bus XDB2 are used for the data transfers between the first on-chip memory XMEM1 and the second on-chip memory XMEM2 and between the data execution unit EX31 and the data execution unit EX32, and the operations handle the data at the word unit.
(3) The third address bus YAB, the fifth data bus YDB1 and the sixth data bus YDB2 are used for the data transfers between the third on-chip memory YMEM1 and the fourth on-chip memory YMEM2 and between the first data execution unit EX31 and the second data execution unit EX32, and the operations handle the data at the word unit.

The aforementioned data transfer operations (2) and (3) can be solely executed but could be simultaneously executed in parallel because the hardware resources to be used are completely divided. These operations are distinguished by the instructions.

The address generating unit CADR3 has a function to generate the program address and the two data accessing addresses simultaneously. This simultaneous address generating function may be made by providing a plurality of execution units and fields capable of designating the two data transfer instructions in parallel on the instruction codes.

In this embodiment, the first data execution unit EX31 is given a function to read out two data in parallel from the first on-chip memory XMEM1 and the third on-chip memory YMEM1 by using the third and fifth data buses XDB1 and YDB1, and the second data execution unit EX32 is given a function to read out two data in parallel from the second on-chip memory XMEM2 and the fourth on-chip memory YMEM2 by using the fourth and sixth data buses XDB2 and YDB2. Thanks to these functions, the digital signal processing such as the multiply and accumulation operations can be executed at the rate of one tap per one step. When the invention is applied to this, the two filtering operations can be simultaneously executed in Mode 2 at a twice efficiency at one step.

[Operations and Instructions in Different Modes]

Here will be described the operations of FIG. 34 in the difference modes.

The first data execution unit EX31 and the second data execution unit EX32 are functionally equivalent as in the first Embodiment, and their execution functions and the registers in their modules are distinguished not on the instruction code but by the modes. The mode set circuit MODE1 and the mode definitions are identical to those of the first embodiment.

Samples of the format and code of the instructions, as included in the instruction set of the microcomputer, are similar to those, as described in the first embodiment with reference to FIG. 56, and their description will be omitted. In this embodiment, moreover, each execution unit is given a construction for executing a single-precision data operation. However, each execution unit may execute, as in the first embodiment, both the single-precision data operation and a double-precision data operation.

In a reset initial state, the microprocessor LSI3 is in Mode 1 so that MD[1]=MD[0]=low. The address generating unit CADR3, the instruction fetch unit CFCH1, the bus interface unit BIF1 and the mode set circuit MODE1 are controlled as in the first embodiment to effect in their connections with the first data bus IDB1. The first on-chip memory XMEM1 and the second on-chip memory XMEM2 are effectively connected with not only the first data bus IDB1 but also the third data bus XDB1. The third on-chip memory YMEM and the fourth on-chip memory YMEM are effectively connected with not only the first data bus XDB1 but also the fifth data bus YDB1.

Figure 35:
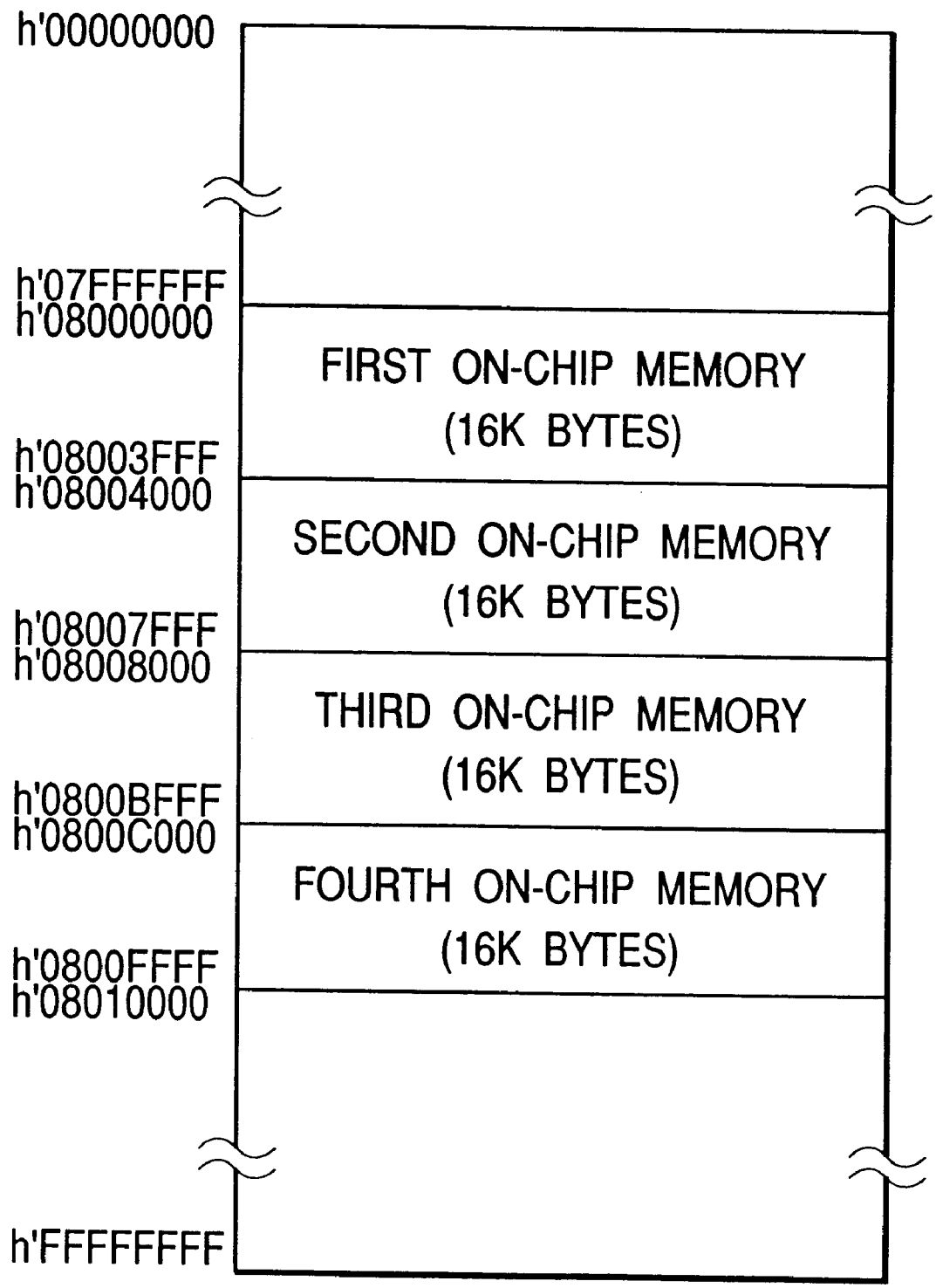
FIG. 35 shows a sample of a mapping over an address space of first to fourth on-chip memories in Mode 1 and Mode 3.

When the connection with the first data bus IDB1 is effective, the address is fed from the first address bus IAB1. When the connection with the third data bus XDB1 is effective, the address is fed from the second address bus XAB. When the connection with the fifth data bus YDB1 is effective, the address is fed from the third address bus YAB. FIG. 35 shows a sample of a mapping over the address space of XMEM1, XMEM2, YMEM1 and YMEM2 at the time of Mode 1. Here, the memory map of FIG. 35 is identical to that at the time of Mode 3. In FIG. 35, moreover, XMEM1, XMEM2, YMEMI and YMEM2 are mapped in the continuous address space. As in the first embodiment, however, XMEM1, XMEM2, YMEM1 and YMEM2 need not be especially continuous but may be mapped in an intrinsic address space. It is needless to say that the memory capacity is not fixed at 16 Kbytes.

The first data execution unit EX31 is instructed to execute the operations by the control signal which is issued from the central processing unit CPU3, but the second data execution unit EX32 comes into an inactive state independently of the control signal. The central processing unit CPU3 generates a program address in the address generating unit and reads out an instruction from a predetermined memory through IAB and in an instruction code in the instruction fetch unit CFCH3 from IDB1. Here, the memory for reading out the instruction need not always be the on-chip memories, but the instruction may be read in from an external memory through an external parallel interface unit PIO, for example. The fetched instruction code is decoded by the instruction decode unit CDEC to generate a set of control signals CNT necessary for the individual modules.

When the decoded instruction is one for reading out the data from the memories using the first address bus IAB and the first data bus IDB1, the address generating unit CADR3 generates an address to be accessed to and outputs it to the first address bus IAB. When the address thus outputted to IAB is one mapping the on-chip memory XMEM1, XMEM2, YMEM1 or YMEM2, this XMEM1, XMEM2, YMEM1 or YMEM2 activates a word line of the corresponding address to read out the necessary data and output them to the first data bus IDB1. The data thus outputted to IDB1 are transferred to the destination operand designated by the instruction. When the destination operand thus designated by the instruction is a register in the address generating unit CADR3, for example, the data are fetched from IDB1 in CADR3 and inputted to the predetermined register. When the destination operand is in the first or second data execution unit EX31 or EX32, the operand code is shared between EX31 and EX32. In Mode 1, the second data execution unit EX32 is inactive so that the data on IDB1 are fetched by EX31. When the destination operand designated by the instruction is a register in the mode set circuit MODE1, the operations are identical to those of the first embodiment.

When the decoded instruction is one for reading out the data from the memories using the second address bus XAB and the third data bus XDB1, the address generating unit CADR3 generates an address to be accessed to and outputs it to the second address bus XAB. The address thus outputted to XAB is one mapping the on-chip memory XMEM1 or XMEM2 in this embodiment. The accessed memory XMEM1, XMEM2 activates a word line of the corresponding address to read out the necessary data and output them to the third data bus XDB1. The data thus outputted to XDB1 are transferred to the destination operand designated by the instruction. The destination operand is the first or second data execution unit EX31 or EX32 in this embodiment. In Mode 1, however, the second data execution unit EX32 is inactive so that the data on XDB1 are fetched by EX31.

When the decoded instruction is one for reading out the data from the memories using the third address bus YAB and the fifth data bus YDB1, the address generating unit CADR3 generates an address to be accessed to and outputs it to the third address bus YAB. The address thus outputted to YAB is one mapping the on-chip memory YMEM1 or YMEM2 in this embodiment. The accessed memory YMEM1, YMEM2 activates a word line of the corresponding address to read out the necessary data and output them to the fifth data bus YDB1. The data thus outputted to YDB1 are transferred to the destination operand designated by the instruction. The destination operand is the first or second data execution unit EX31 or EX32 in this embodiment. In Mode 1, however, the second data execution unit EX32 is inactive so that the data on YDB1 are fetched by EX31.

When the decoded instruction is one for writing the data in the memories using the first address bus IAB and the first data bus IDB1, the address generating unit CADR3 generates an address to be accessed to and outputs it to the address bus IAB. When the address thus outputted to IAB is one mapping the on-chip memory XMEM1, XMEM2, YMEM1 or YMEM2, this memory XMEM1, XMEM2, YMEM1 or YMEM2 activates a word line of the corresponding address. When the source operand thus designated by the instruction is a register in the address generating unit CADR3, on the other hand, the data are outputted from CADR1 to IDB1 and inputted to the XMEM1, XMEM2, YMEM1 or YMEM2 so that they are written at a predetermined address. When the source operand is in the first or second data execution unit EX31 or EX32, the operand code is shared between EX31 and EX32. In Mode 1, the second data execution unit EX32 is inactive so that the data in EX31 are outputted to IDB1 and inputted to XMEM1, XMEM2, YMEM1 or YMEM2 so that they are written at a predetermined address. When the source operand designated by the instruction is a register in the mode set circuit MODE1, the operations are identical to those of the first embodiment.

When the decoded instruction is one for writing the data in the memories using the second address bus XAB and the third data bus XDB1, the address generating unit CADR3 generates an address to be accessed to and outputs it to the second address bus XAB. The address thus outputted to XAB is one mapping the on-chip memory XMEM1 or XMEM2 in this embodiment. The accessed memory XMEM1 XMEM2 activates a word line of the corresponding address. On the other hand, the source operand thus designated by the instruction is the first or second data execution unit EX31 or EX32. In Mode 1, the second data execution unit EX32 is inactive so that the data in EX31 are outputted to XDB1 and inputted to XMEM1 or XMEM2 so that they are written at a predetermined address.

When the decoded instruction is one for writing the data in the memories using the third address bus YAB and the fifth data bus YDB1, the address generating unit CADR3 generates an address to be accessed to and outputs it to the third address bus YAB. The address thus outputted to YAB is one mapping the on-chip memory YMEM1 or YMEM2 in this embodiment. The accessed memory YMEM1 YMEM2 activates a word line of the corresponding address. On the other hand, the source operand thus designated by the instruction is the first or second data execution unit EX31 or EX32. In Mode 1, the second data execution unit EX32 is inactive so that the data in EX31 are outputted to YDB1 and inputted to YMEM1 or YMEM2 so that they are written at a predetermined address.

Of the operations, the data transfer using the second address bus XAB and the third data bus XDB1 and the data transfer using the third address bus YAB and the fifth data bus YDB1 can be executed in parallel no matter whether the operations might be to read/write, but the operation content is identical to that of the single operation. Moreover, the data transfer between the operands other than the memories using the first address bus IAB and the first data bus IDB1 is identical to that of the first embodiment.

When the microprocessor LSI3 is in the state of Mode 2, MD[1]=low and MD[0]=high. The address generating unit CADR3, the instruction fetch unit CFCH1, the bus interface BIF1 and the mode set circuit MODE1 are controlled to have effective connections with the first data bus IDB1.

The first on-chip memory XMEM1 is effectively connected with not only the first data bus IDB1 but also the third data bus XDB1. The second on-chip memory XMEM2 is effectively connected with not only the first data bus IDB1 but also the second data bus IDB2 and the fourth data bus XDB2. The third on-chip memory YMEM1 is effectively connected with not only the first data bus IDB1 but also the fifth data bus YDB1. The fourth on-chip memory YMEM2 is effectively connected with not only the first data bus IDB1 but also the second data bus IDB2 and the sixth data bus YDB2. When the connection with the first data bus IDB1 or the second data bus IDB2 is effective, the address is fed from the first address bus IAB. When the connection with the third data bus XDB1 or the fourth data bus XDB2 is effective, the address is fed from the second address bus XAB. When the connection with the fifth data bus YDB1 or the sixth data bus YDB2 is effective, the address is fed from the third address bus YAB.

Figure 36:
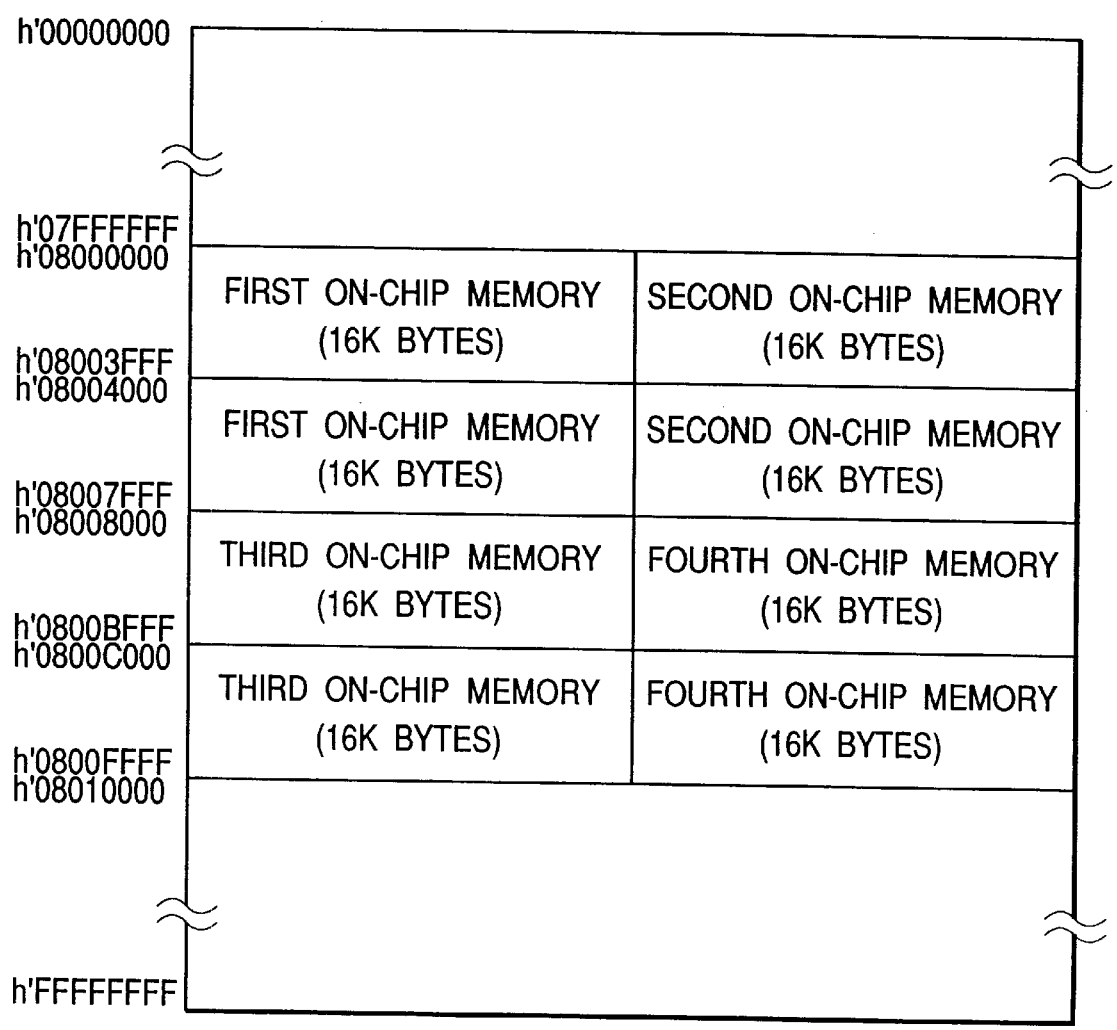
FIG. 36 shows a sample of a mapping over an address space of the first to fourth on-chip memories in Mode 2 and for data transfer operations between an on-chip memory and a data execution unit.
Figure 37:
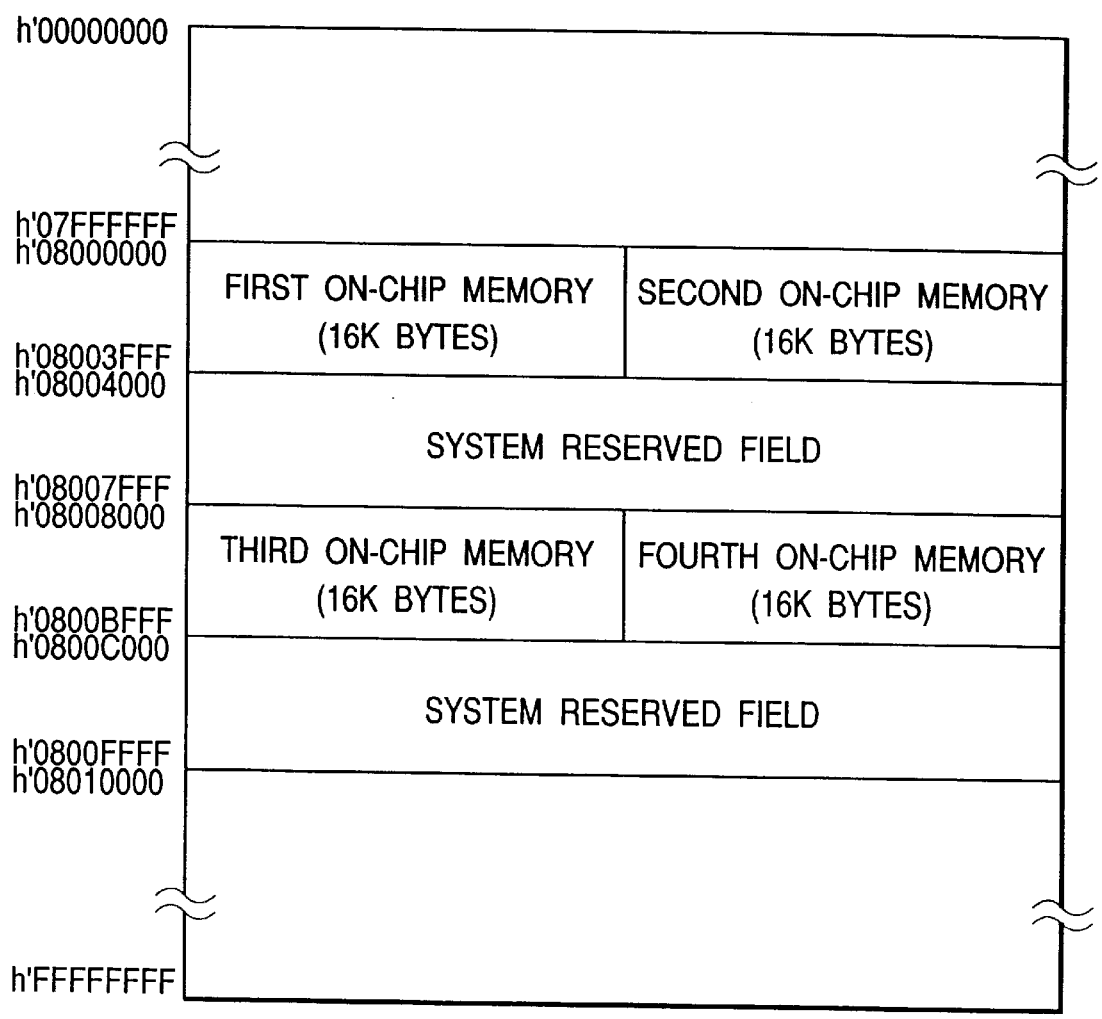
FIG. 37 shows another sample of the mapping over the address space of the first to fourth on-chip memories in Mode 2 and for the data transfer operations between the on-chip memory and the data execution unit.

FIG. 36 shows a sample of a mapping over the address space of the on-chip memories XMEM1, XMEM2, YMEM1 and YMEM2 at a time of Mode 2 and when the received control is the data transfer operation with the data execution unit EX31 or EX32. Here, the case other than that of the time of Mode 2 and when the received control is the data transfer operation with the data execution unit EX31 or EX32 is identical to that of FIG. 35. In FIG. 36, moreover, there are two double mapping spaces of each of XMEM1, XMEM2, YMEM1 and YMEM2. However, it is needless to say that the mapping may be only at one portion, as shown in FIG. 37. When the address space of the on-chip memory is to be accessed to, as shown in FIG. 36 or 37, the corresponding addresses of XMEM1 and XMEM2, or YMEM1 and YMEM2 are simultaneously accessed to. No simultaneous access is made in the combination of XMEMm (m=1 or 2) and YMEMn (N=1 or 2).

The first data execution unit EX31 and the second data execution unit EX32 are not distinguished on the instruction code so that they execute the same instruction of the common control signal which is issued from the central processing unit CPU3. In the case of the instruction fetch, as at the time of Mode 1, the central processing unit CPU3 generates the program address in the address generating unit, reads out the instruction from the predetermined memory through IAB and reads the instruction code in the instruction fetch unit CFCH3 from IDB1. Here, even when the memory from which the instruction is to be read out is the on-chip memory, the memory map to be applied is that of FIG. 35 when in the instruction fetch operation, so that the instruction code is correctly read out from the designated address. When the memory XMEM1, XMEM2, YMEM1 or YMEM2 is accessed to for fetching the instruction, the read instruction code IDB1 is selected and outputted for any memory. The fetched instruction code is decoded by the instruction decode unit CDEC to generate the control signal set CNT necessary for the individual modules.

The operations are identical to those of Mode 1 when the decoded instruction is other than the data transfer operations between the on-chip memories and the data execution units.

The following operations are executed when the decoded instruction is other than the data transfer operations between the on-chip memories and the data execution units.

When the decoded instruction is one to read out the data from the memories using the first address bus IAB, the first data bus IDB1 and the second data bus IDB2, the address generating unit CADR3 generates an address to be accessed to and outputs it to the address bus IAB. The address outputted to IAB activates the word lines at the addresses in the combination of XMEM1 and XMEM2 or the combination of YMEM2 and YMEM2 to read out the necessary data so that the data read out from the XMEM1 are outputted to the first data bus IDB1 whereas the data read out from the XMEM2 are outputted to the second data bus IDB2. The data outputted to IDB1 are transferred to the destination operand in the first data execution unit EX31 designated by the instruction. Simultaneously with this, the data outputted to IDB2 are transferred to the destination operand in the second data execution unit EX32 designated by the same instruction.

When the decoded instruction is one to read out the data from the memories using the second address bus XAB, the third data bus XDB1 and the fourth data bus XDB2, the address generating unit CADR3 generates an address to be accessed to and outputs it to the second address bus XAB. The address outputted to XAB simultaneously activates the word lines at the addresses of both XMEM1 and XMEM2 to read out the necessary data, so that the data read out from the XMEM1 are outputted to the third data bus XDB1 whereas the data read out from the XMEM2 are outputted to the fourth data bus XDB2. The data outputted to XDB1 are transferred to the destination operand in the first data execution unit EX31 designated by the instruction. Simultaneously with this, the data outputted to XDB2 are transferred to the destination operand in the second data execution unit EX32 designated by the same instruction.

When the decoded instruction is one to read out the data from the memories using the third address bus YAB, the fifth data bus YDB1 and the sixth data bus YDB2, the address generating unit CADR3 generates an address to be accessed to and outputs it to the third address bus YAB. The address outputted to YAB simultaneously activates the word lines at the addresses of both YMEM1 and YMEM2 to read out the necessary data, so that the data read out from the YMEM1 are outputted to the fifth data bus YDB1 whereas the data read out from the YMEM2 are outputted to the sixth data bus YDB2. The data outputted to YDB1 are transferred to the destination operand in the first data execution unit EX31 designated by the instruction. Simultaneously with this, the data outputted to YDB2 are transferred to the destination operand in the second data execution unit EX32 designated by the same instruction.

When the decoded instruction is one for writing the data in the memories using the first address bus IAB, the first data bus IDB1 and the second data bus IDB2, the address generating unit CADR3 generates an address to be accessed to and outputs it to the address bus IAB. The address thus outputted to IAB simultaneously activates the word lines of the corresponding addresses in combination of XMEM1 and XMEM2, or YMEM1 and YMEM2. On the other hand, the data of the source operand in the first data execution unit EX31, as designated by the instruction, are outputted to the first data bus IDB1. Simultaneously with this, the data of the source operand in the second data execution unit EX32, as designated by the instruction, are outputted to the second data bus IDB2. The data, as outputted to IDB1 and IDB2, are inputted to XMEM1 and XMEM2, or YMEM1 and YMEM2 so that they are written at a predetermined address.

When the decoded instruction is one for writing the data in the memories using the second address bus XAB, the third data bus XDB1 and the fourth data bus XDB2, the address generating unit CADR3 generates an address to be accessed to and outputs it to the second address bus XAB. The address thus outputted to XAB simultaneously activates the word lines of the corresponding addresses of both XMEM1 and XMEM2. On the other hand, the data of the source operand in the first data execution unit EX31, as designated by the instruction, are outputted to the third data bus XDB1. Simultaneously with this, the data of the source operand in the second data execution unit EX32, as designated by the instruction, are outputted to the fourth data bus XDB2. The data, as outputted to XDB1 and XDB2, are inputted to XMEM1 and XMEM2 so that they are written at a predetermined address.

When the decoded instruction is one for writing the data in the memories using the third address bus YAB, the fifth data bus YDB1 and the sixth data bus YDB2, the address generating unit CADR3 generates an address to be accessed to and outputs it to the third address bus YAB. The address thus outputted to YAB simultaneously activates the word lines of the corresponding addresses of both YMEM1 and YMEM2. On the other hand, the data of the source operand in the first data execution unit EX31, as designated by the instruction, are outputted to the fifth data bus YDB1. Simultaneously with this, the data of the source operand in the second data execution unit EX32, as designated by the instruction, are outputted to the sixth data bus YDB2. The data, as outputted to YDB1 and YDB2, are inputted to YMEM1 and YMEM2 so that they are written at a predetermined address.

Of the operations, the data transfer using the second address bus XAB, the third data bus XDB1 and the fourth data bus XDB2 and the data transfer using the third address bus YAB, the fifth data bus YDB1 and the sixth data bus YDB2 can be executed in parallel no matter whether the operations might be to read/write, but the operation content is identical to that of the single operation. Moreover, the data transfer between the operands other than the memories using the first address bus IAB, the first data bus IDB1 and the second data bus IDB2 is identical to that of the first embodiment.

When the microprocessor LSI3 is in the state of Mode 3, MD[1]=low and MD[0]=low. The address generating unit CADR3, the instruction fetch unit CFCH1, the bus interface BIF1 and the mode set circuit MODE1 are controlled as in the first embodiment to have effective connections with the second data bus IDB2. The first on-chip memory XMEM1 and the second on-chip memory XMEM2 are effectively connected with not only the second data bus IDB2 but also the fourth data bus XDB2. The third on-chip memory YMEM1 and the fourth on-chip memory XMEM2 are effectively connected with not only the second data bus IDB2 but also the sixth data bus YDB2.

When the connection with the second data bus IDB2 is effective, the address is fed from the first address bus IAB. When the connection with the fourth data bus XDB2 is effective, the address is fed from the second address bus XAB. When the connection with the sixth data bus YDB2 is effective, the address is fed from the third address bus YAB. A sample of the mapping over the address spaces of the XMEM1, XMEM2, YMEM1 and YMEM2 at the time of Mode 3 is identical to that at the time of Mode 1, as shown in FIG. 35.

The second data execution unit EX32 is instructed to execute the operations by the control signal which is issued from the central processing unit CPU3, but the first data execution unit EX31 comes into an inactive state independently of the control signal. The central processing unit CPU3 generates a program address in the address generating unit and reads out an instruction from a predetermined memory through IAB and in an instruction code in the instruction fetch unit CFCH3 from IDB2. Here, the memory for reading out the instruction need not always be the on-chip memories, but the instruction may be read in from an external memory through an external parallel interface unit PIO, for example. The fetched instruction code is decoded by the instruction decode unit CDEC to generate a set of control signals CNT necessary for the individual modules. Here, what is different in the operations from Mode 1 is that the instruction codes are read from the second data bus IDB2.

When the decoded instruction is one for reading out the data from the memories using the first address bus IAB and the second data bus IDB2, the address generating unit CADR3 generates an address to be accessed to and outputs it to the first address bus IAB. When the address thus outputted to IAB is one mapping the on-chip memory XMEM1, XMEM2, YMEM1 or YMEM2, this XMEM1, XMEM2, YMEM1 or YMEM2 activates a word line of the corresponding address to read out the necessary data and output them to the second data bus IDB2. The data thus outputted to IDB2 are transferred to the destination operand designated by the instruction. When the destination operand thus designated by the instruction is a register in the address generating unit CADR3, for example, the data are fetched from IDB2 in CADR3 and inputted to the predetermined register. When the destination operand is in the first or second data execution unit EX31 or EX32, the operand code is shared between EX31 and EX32. In Mode 3, the first data execution unit EX31 is inactive so that the data on IDB2 are fetched by EX32. When the destination operand designated by the instruction is a register in the mode set circuit MODE1, the operations are identical to those of the first embodiment.

When the decoded instruction is one for reading out the data from the memories using the second address bus XAB and the fourth data bus XDB2, the address generating unit CADR3 generates an address to be accessed to and outputs it to the second address bus XAB. The address thus outputted to XAB is one mapping the on-chip memory XMEM1 or XMEM2 in this embodiment. The accessed memory XMEM1, XMEM2 activates a word line of the corresponding address to read out the necessary data and output them to the fourth data bus XDB2. The data thus outputted to XDB2 are transferred to the destination operand designated by the instruction. The destination operand is the first or second data execution unit EX31 or EX32 in this embodiment. In Mode 3, however, the first data execution unit EX31 is inactive so that the data on XDB2 are fetched by EX32.

When the decoded instruction is one for reading out the data from the memories using the third address bus YAB and the sixth data bus YDB2, the address generating unit CADR3 generates an address to be accessed to and outputs it to the third address bus YAB. The address thus outputted to YAB is one mapping the on-chip memory YMEM1 or YMEM2 in this embodiment. The accessed memory YMEM1, YMEM2 activates a word line of the corresponding address to read out the necessary data and output them to the sixth data bus YDB2. The data thus outputted to YDB2 are transferred to the destination operand designated by the instruction. The destination operand is the first or second data execution unit EX31 or EX32 in this embodiment. In Mode 3, however, the first data execution unit EX31 is inactive so that the data on YDB2 are fetched by EX32.

When the decoded instruction is one for writing the data in the memories using the first address bus IAB and the second data bus IDB2, the address generating unit CADR3 generates an address to be accessed to and outputs it to the address bus IAB. When the address thus outputted to IAB is one mapping the on-chip memory XMEM1, XMEM2, YMEM1 or YMEM2, this memory XMEM1, XMEM2, YMEM1 or YMEM2 activates a word line of the corresponding address. When the source operand thus designated by the instruction is a register in the address generating unit CADR3, on the other hand, the data are outputted from CADR3 to IDB2 and inputted to the XMEM1, XMEM2, YMEM1 or YMEM2 so that they are written at a predetermined address. When the source operand is in the first or second data execution unit EX31 or EX32, the operand code is shared between EX31 and EX32. In Mode 3, the first data execution unit EX31 is inactive so that the data in EX32 are outputted to IDB2 and inputted to XMEM1, XMEM2, YMEM1 or YMEM2 so that they are written at a predetermined address. When the source operand designated by the instruction is a register in the mode set circuit MODE1, the operations are identical to those of the first embodiment.

When the decoded instruction is one for writing the data in the memories using the second address bus XAB and the fourth data bus XDB2, the address generating unit CADR3 generates an address to be accessed to and outputs it to the second address bus XAB. The address thus outputted to XAB is one mapping the on-chip memory XMEM1 or XMEM2 in this embodiment. The accessed memory XMEM1 XMEM2 activates a word line of the corresponding address. On the other hand, the source operand thus designated by the instruction is the first or second data execution unit EX31 or EX32. In Mode 3, the first data execution unit EX31 is inactive so that the data in EX32 are outputted to XDB2 and inputted to XMEM1 or XMEM2 so that they are written at a predetermined address.

When the decoded instruction is one for writing the data in the memories using the third address bus YAB and the sixth data bus YDB2, the address generating unit CADR3 generates an address to be accessed to and outputs it to the third address bus YAB. The address thus outputted to YAB is one mapping the on-chip memory YMEM1 or YMEM2 in this embodiment. The accessed memory YMEM1 YMEM2 activates a word line of the corresponding address. On the other hand, the source operand thus designated by the instruction is the first or second data execution unit EX31 or EX32. In Mode 3, the first data execution unit EX31 is inactive so that the data in EX32 are outputted to YDB2 and inputted to YMEM1 or YMEM2 so that they are written at a predetermined address.

Of the operations, the data transfer using the second address bus XAB and the fourth data bus XDB2 and the data transfer using the third address bus YAB and the sixth data bus YDB2 can be executed in parallel no matter whether the operations might be to read/write, but the operation content is identical to that of the single operation. Moreover, the data transfer between the operands other than the memories using the first address bus IAB and the second data bus IDB2 is identical to that of the first embodiment.

In this embodiment, the mode set circuit MODE1 is identical to that of Embodiment 1, and its description will be omitted.

[Construction of On-Chip Memory]

Figure 38:
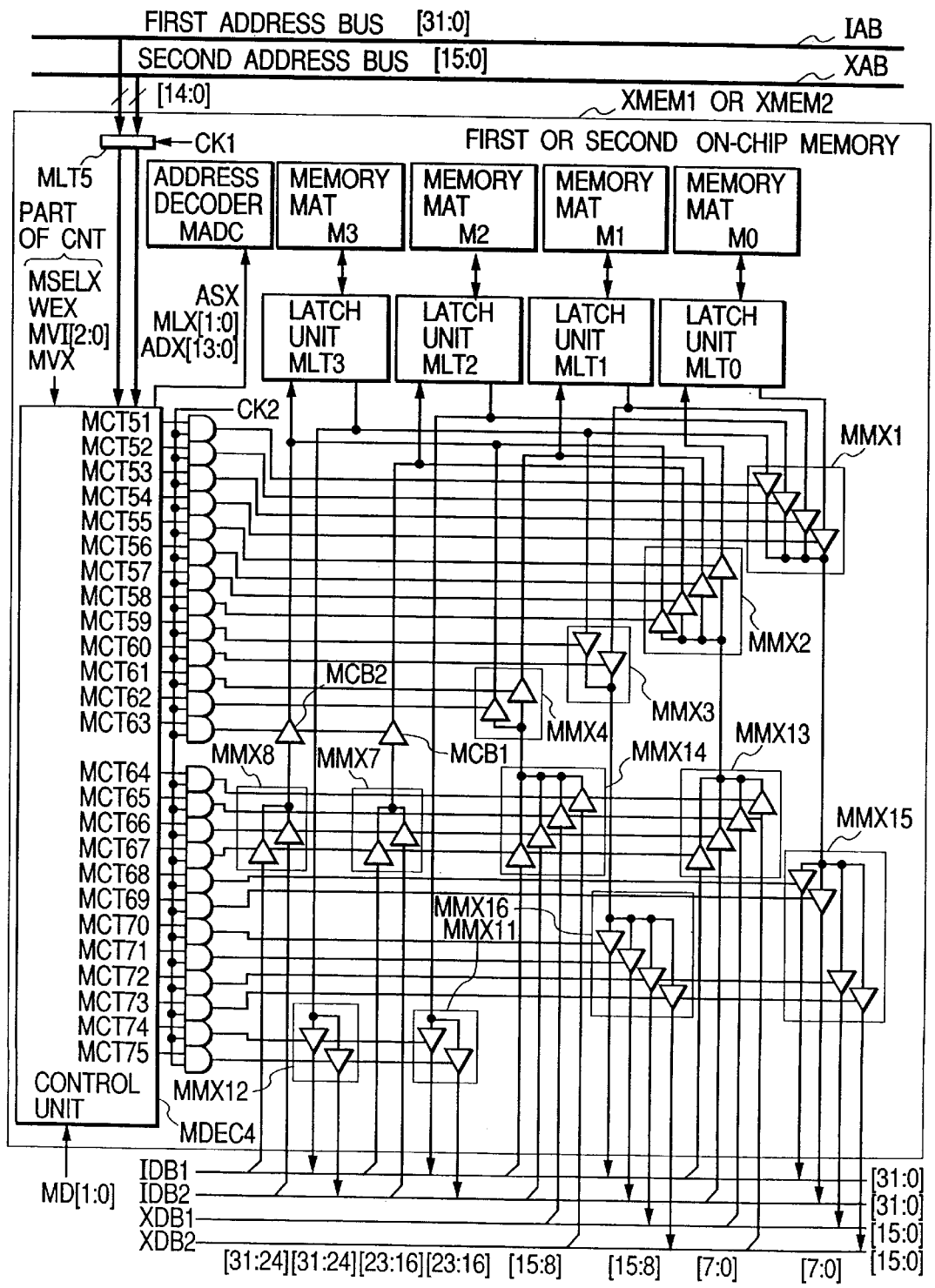
FIG. 38 shows a sample of a more specific construction of the first and second on-chip memories (XMEM1 and XMEM2)
Figure 39:
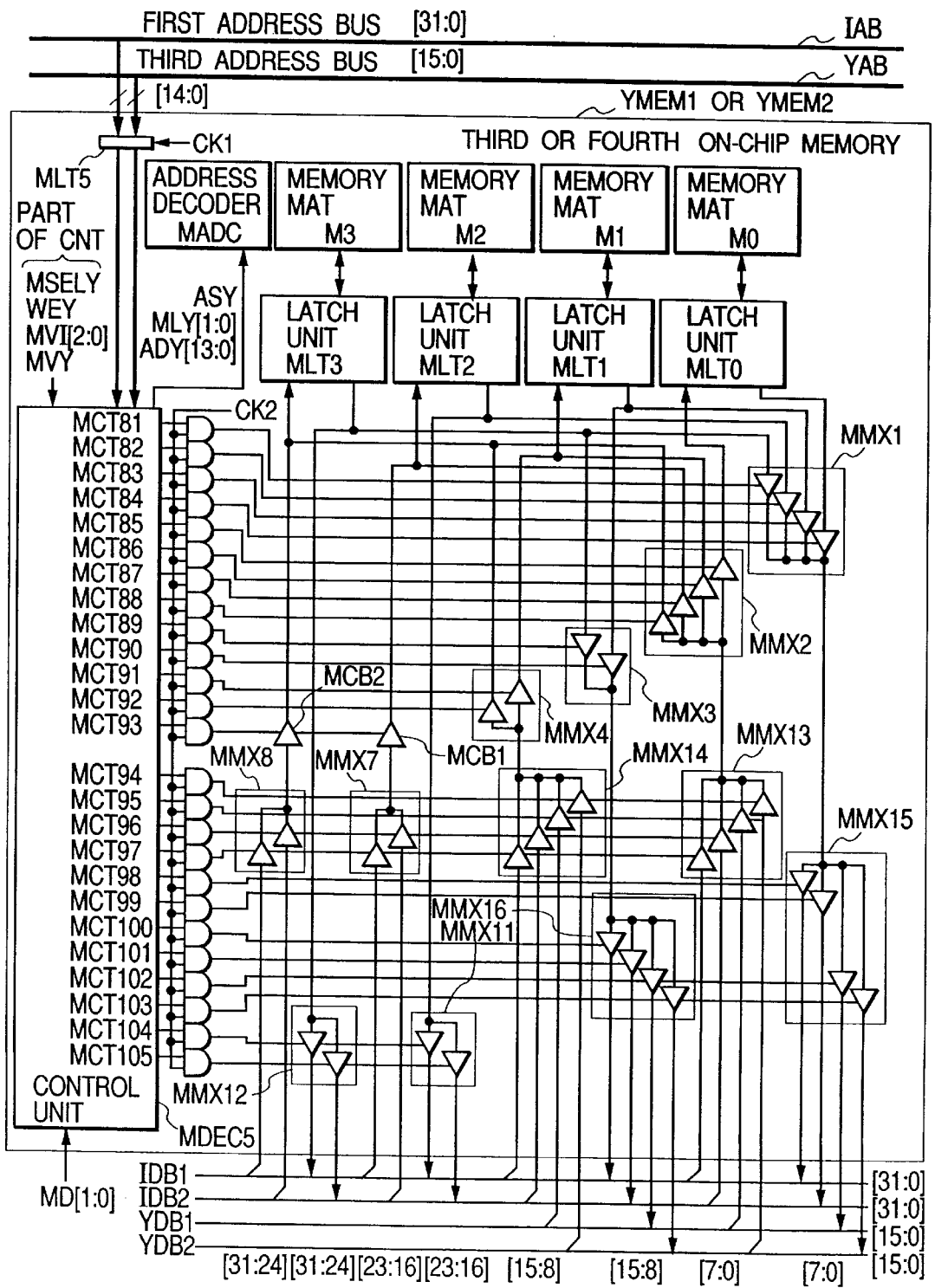
FIG. 39 shows a sample of a more specific construction of the third and fourth on-chip memories (YMEM1 and YMEM2)

A sample of a more specific construction of the first or second on-chip memory XMEM1 or XMEM2 is shown in FIG. 38. In FIG. 38: letters MADC designates an address decoder; letters MLT5 a latch unit for fetching the information of less significant 15 bits of each of the first address bus IAB and the second address bus XAB in the first or second on-chip memory XMEM1 or XMEM2; MMX1, MMX3, MMX13, MMX14, MMX7 and MMX8 selectors for selecting and outputting one of plural inputs; letters MMX2, MMX4, MMX15, MMX16, MMX11 and MMX12 selectors for selecting and outputting one of plural outputs; letters MDEC4 a control unit for generating control signals MCT51 to MCT75 in the first or second on-chip memory XMEM1 or XMEM2; letters MCT51 to MCT75 control signals to be outputted from the control unit MDEC4; letters MVI[2:0] a control code signal of 3 bits for controlling the read/write operations shared among the memories using the fist address bus IAB, the first data bus IDB1 and the second data bus IDB2; letters MVX a control signal of 1 bit for controlling the read/write operations shared between the first and second on-chip memories using the second address bus XAB, the third data bus XDB1 and the fourth data bus XDB2; letters WEX a control signal for designating the common writing or reading operation of the first and second on-chip memories; letters MSELX a memory access enable signal shared between the first and second on-chip memories; letters ASX a signal indicating that the address information ADX [13:0] to be inputted to the address decoder MADC is effective when the first or second on-chip memory XMEM1 or XMEM2 is accessed to; and letters MLX[1:0] a control signal for designating which memory mat enables its word lines by the address decoder MADC. The remaining signals are identical to those of FIG. 8.

The structures of the first and second on-chip memories are identical excepting that the truth tables of the control units are different.

[Operations of On-Chip Memory XMEM1]

Here will be described the detailed operations of the first on-chip memory XMEM1.

The memories to be described are those having functions similar to those of FIG. 8, and the description of the common parts will be omitted. The corresponding relations between the addresses and the actual memories are shown in FIG. 9 as in the first embodiment. What is different from the on-chip memory of FIG. 8 is that it is necessary to select which address information is to be selected because the information on the two address buses is fetched from the outside. By inputting the two address informations at one end are inputted to the control unit MDEC4 and by deciding which information is to be used, therefore, the decided information is fed as the ADX[13:0] signal to the address decoder MADC. The decision on which address information is to be employed can be realized by checking which of the first address bus IAB, the first data bus IDB1 and the second data bus IDB2, or the second address bus XAB, the third data bus XDB1 and the fourth data bus XDB2 the data transfer employs, that is, by means of the MVI[2:0] and MVX signals. FIG. 40 shows a sample of the truth table of the control signals and the address information signals which are generated in the control unit MDEC4 and which are fed to the address decoder MADC. Here, the signal ASX is functionally identical to the signal AS, and the signal MLX[1:0] is functionally identical to the signal ML[1:0].

The data transfer operations using the first address bus IAB, the first data bus IDB1 and the second data bus IDB2 are identical to those of the first embodiment, and the code definition of MVI[2:0] is identical to that of MV[2:0] shown in FIG. 10. The data transfer operations using the second address bus XAB, the third data bus XDB1 and the fourth data bus XDB2 support the data transfer at the word unit (of 16 bits). MVX=high indicates that the central processing unit CPU3 has issued the instruction to access the data at the word unit (of 16 bits) using the third data bus XDB1 and the fourth data bus XDB2.

Since each on-chip memory has a capacity of 16 Kbytes, it can be discriminated therein with the informations of the 15th bit (IAB[14]) of IAB and the mode state signal MD[1:0]. When MSELX indicates the enable state, the control signal WEX designates whether the operation is to read or write. The low state implies the read operation whereas the high state implies the write operation.

Here in this embodiment, the data transfer operations using the third data bus XDB1 and the fourth data bus XDB2 anticipates the support of the data transfer at the word unit (of 16 bits), but can naturally support the data transfer function of another length. It is apparent that the method for realizing this can be easily realized by combining the contents thus far described.

This embodiment anticipates that the memory access operation using MVI[2:0] and MVX or MVY, as will be described, will not simultaneously occur in the same memory. Unlike the first embodiment, therefore, the first and second on-chip memories and the third and fourth on-chip memories are independently fed with the control signal (i.e., WEX in the first and second on-chip memories) for designating the write/read operations and the memory access enable signal (i.e., MSELX in the first and second on-chip memories). As a result, two data transfer operations can be simultaneously executed in the same cycle.

Figure 42:
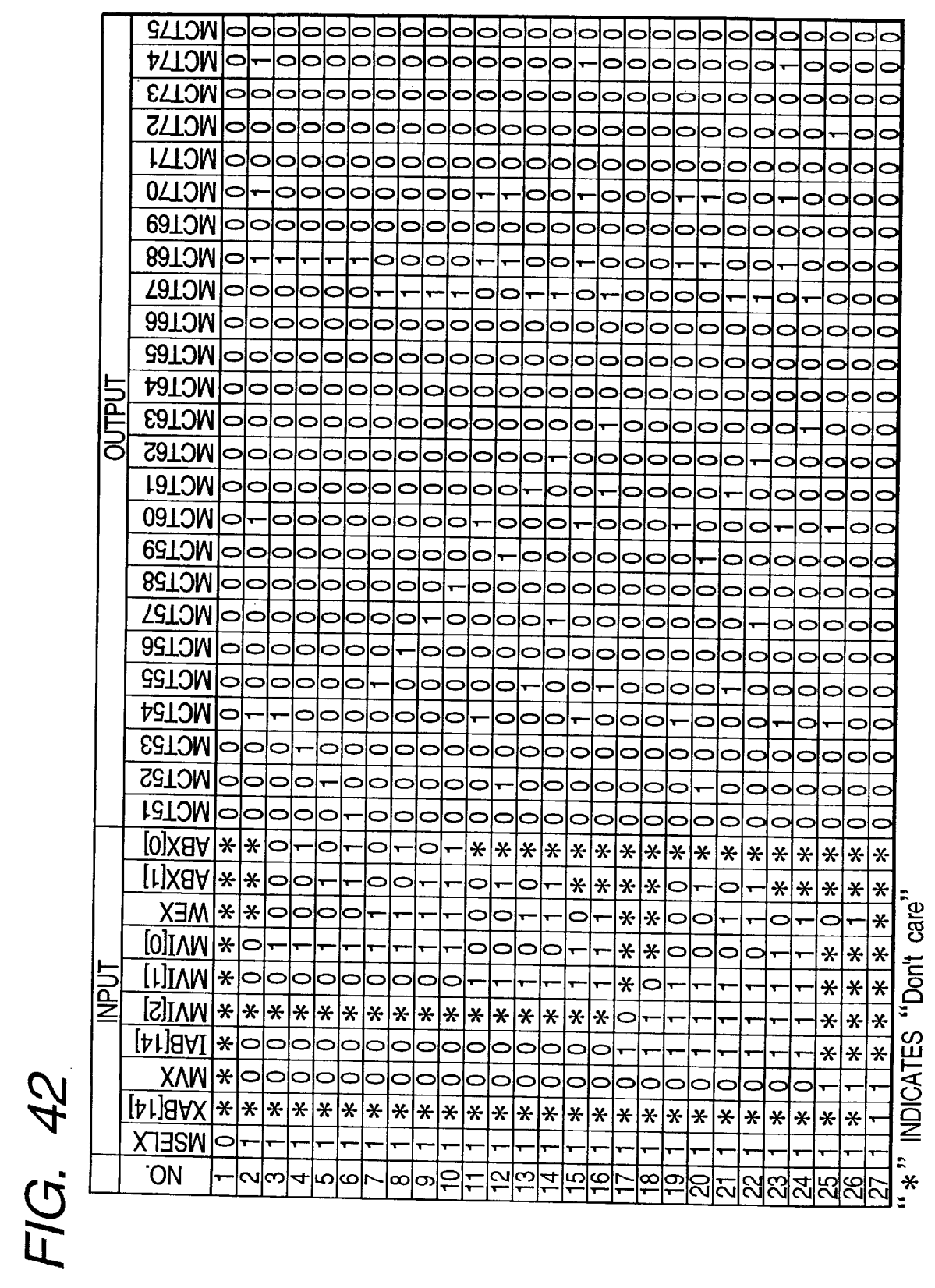

FIG. 41, FIG. 42 and FIG. 43 show truth tables of the definitions of the control unit MDEC4 in Mode 1, Mode 2 and Mode 3, respectively. Here, the truth table is shown in each Mode as in the first embodiment, but one table is too large to present so that it is divided. Moreover, the truth tables of FIGS. 41, 42 and 43 anticipate the memory map of FIG. 36. In these truth tables, moreover, the unused codes are filled in such rows for simplicity as are expected to have less hardware.

The timing is also basically identical to that of the first embodiment, and its description will be omitted. The second on-chip memory XMEM2 has an identical timing although which of the data buses to be connected is different for the Modes. Here will be described the individual operations for the different modes.

(1) Instruction Fetch Operation in Mode 1

When MSELX indicates the enable state, when the 15th bit (IAB[14]) of IAB is low and when MVI[2:0] designates the code indicating the instruction fetch operation, the first on-chip memory XMEM1 executes the data read operation of the long word (of 32 bits). The MVX signal is in the disable state. Here, the instruction fetch operation uses IAB, IDB1 and IDB2 but is not executed with XAB, XDB1 and XDB. Since the instruction fetch operation is a read operation, no control signal WEX is required so that it is ignored in FIGS. 41, 42 and 43. It is, however, needless to say that WEX=low is allowed to hold compatibility with other operations. At this time, as shown in FIG. 40, the ASX signal comes into the enable state (high), and MLX[1:0] indicates the code (11) for enabling the word liens of four consecutive bytes so that the address decoder MADC reads out the data by enabling the predetermined word lines of all the four memory mats. The data thus read out are latched by the latch units MLT0 to MLT3. The data, as latched by MLT0, pass through the selector MMX1 with MCT54 being enabled and further through the selector MMX15 with MCT68 being enabled so that they are outputted to the least significant byte ([7:0]) of the first data bus IDB1. The data, as latched by MLT1, pass through the selector MMX3 with MCT60 being enabled and further through the selector MMX16 with MCT70 being enabled so that they are outputted to the second byte ([15:8]) from the least significant byte of the first data bus IDB1. The data, as latched by MLT2, pass through the selector MMX11 with MCT74 being enabled so that they are outputted the third byte ([23:16]) from the least significant byte of the first data bus IDB1. The data, as latched by MLT3, pass through the selector MMX12 with MCT74 being enabled so that they are outputted to the most significant byte ([31:24]) of the first data bus IDB1.

(2) Read Operation of Data Using IAB and IDB1 at Byte unit in Mode 1

When MSEL exhibits the enable state, when WEX=low, when the 15th bit (IAB[14]) of IAB is low and when MVI[2:0] designates a code indicating the read operation of data at the byte unit, the first on-chip memory XMEM1 executes the read operation of the data at the byte unit. The MVX signal is in the disable state. At this time, the ASX signal comes into the enable state (high), and ML[1:0] indicates the code (01) for enabling the word line of 1 byte, so that the address decoder MADC reads out the data by enabling a predetermined word line of one corresponding memory mat. The data, thus read out, are latched by the latch units MLT0, MLT1, MLT2 or MLT3 connected with the accessed memory mat. When the less significant 2 bits of the address information latched in MLT4 is 00, the data, as read out from the memory mat M0, are latched by MLT0 and pass through the selector MMX1 with MCT54 being enabled and further through the selector MMX15 with MCT68 being enabled, so that they are outputted to the least significant byte ([7:0]) of the first data bus IDB1. When the less significant 2 bits of the address information latched by MLT4 are 01, the data, as read out from the memory mat M1, are latched by MLT1 and pass through the selector MMX1 with MCT53 being enabled and further through the selector MMX15 with MCT68 being enabled, so that they are outputted to the least significant byte ([7:0]) of the first data bus IDB1. When the less significant 2 bits of the address information latched by MLT4 are 10, the data, as read out from the memory mat M2, latched by MLT2 and pass through the selector MMX1 with MCT52 being enabled and further through the selector MMX15 with MCT68 being enabled, so that they are outputted to the least significant byte ([7:0]) of the first data bus IDB1. When the less significant 2 bits of the address information latched by MLT4 are 11, the data, as read out from the memory mat M3, latched by MLT3 and pass through the selector MMXL with MCT51 being enabled and further through the selector MMX15 with MCT68 being enabled, so that they are outputted to the least significant byte ([7:0]) of the first data bus IDB1. Thus, the byte data of an arbitrary address are outputted to the least significant byte of the first data bus IDB1.

(3) Write Operation of Data Using IAB and IDB1 at Byte Unit in Mode 1

The data to be written are sent as at the read time from the least significant byte of the first data bus IDB1. When MSELX exhibits the enable state, when WEX=high, when the 15th bit (IAB[14]) of IAB is low and when MVI[2:0] designates the code indicating the write operation of data at the byte unit, the first on-chip memory XMEM1 executes the write operation of the data at the byte unit. The MVX signal is in the disable state. At this time, the ASX signal comes into the enable state (high), and MLX[1:0] indicates the code (01) for enabling the word line of 1 byte, so that the address decoder MADC writes the data in the latch unit by enabling a predetermined word line of one corresponding memory mat. When the lest significant 2 bits of the address information latched by MLT4 is 00, the data, as sent from the least significant byte of the first data bus IDB1, pass through the selector MMX13 with MCT67 being enabled and further through the selector MMX2 with MCT55 being enabled, so that they are inputted to MLT0 and written in the memory mat M0. When the less significant 2 bits of the address information latched by MLT4 is 01, the data, as sent from the least significant byte of the first data bus IDB1, likewise pass through the selector MMX13 with MCT67 being enabled and further through the selector MMX2 with MCT56 being enabled, so that they are inputted to MLT1 and written in the memory mat M1. When the less significant 2 bits of the address information latched by MLT4 is 10, the data, as sent from the least significant byte of the first data bus IDB1, likewise pass through the selector MMX13 with MCT67 being enabled and further through the selector MMX2 with MCT57 being enabled, so that they are inputted to MLT2 and written in the memory mat M2. When the less significant 2 bits of the address information latched by MLT4 is 11, the data, as sent from the least significant byte of the first data bus IDB1, likewise pass through the selector MMX13 with MCT67 being enabled and further through the selector MMX2 with MCT58 being enabled, so that they are inputted to MLT3 and written in the memory mat M3.

(4) Read Operation of Data Using IAB and IDB1 at Word Unit in Mode 1

When MSELX exhibits the stable state, when WEX=low, when the 15th bit (IAB[14]) of IAB is low and when MVI[2:0] designates the code indicating the read operation of data at the word unit, the first on-chip memory XMEM1 executes the read operation of the data at the word unit. The MVX signal is in the disable state. At this time, the ASX signal comes into the enable state (high), and MLX[1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT54 and MCT60 being enabled and further through the selectors MMX15 and MMX16 with MCT68 and MCT70 being enabled, so that they are outputted to the less significant 2 bytes ([15:0]) of the first data bus IDB1. When the less significant 2 bits of the address information latched by MLT4 are 10, the data, as read out from the memory mats M2 and M3, are latched by MLT2 and MLT3 and pass through the selectors MMX1 and MMX3 with MCT52 and MCT59 being enabled and further through the selectors MMX15 and MMX16 with MCT68 and MCT70 being enabled, so that they are outputted to the less significant 2 bytes ([15:0]) of the first data bus IDB1.

(5) Write Operation of Data Using IAB and IDB1 at Word Unit in Mode 1

The data to be written are sent as at the read time from the less significant 2 bytes of the first data bus IDB1. When MSELX exhibits the enable state, when WEX=high, when the 15th bit (IAB [14]) of IAB is low and when MVI[2:0] designates the code indicating the write operation of the data at the word unit, the first on-chip memory XMEM1 executes the write operation of the data at the word unit. The MVX signal in the disable signal. At this time the ASX signal comes into the enable state (high), and ML[1:0] indicates the code (10) for enabling the word lines of 2 bytes, so that the address decoder MADC writes the data in the corresponding latch unit by enabling the predetermined word lines of the corresponding consecutive two memory mats. When the less significant 2 bits of the address information latched in MLT4 are 00, the data, as sent from the less significant 2 bytes of the first data bus IDB1, pass through the selectors MMX13 and MMX14 with MCT67 being enabled and further through the selectors MMX2 and MMX4 with MCT57 and MCT62 being enabled, so that they are inputted to MLT0 and MLT1 and written in the memory mats M0 and M1. When the less significant 2 bits of the address information latched in MLT4 are 10, the data, as sent from the less significant 2 bytes of the first data bus IDB1, pass through the selectors MMX13 and MMX14 with MCT67 being enabled and further through the selectors MMX2 and MMX4 with MCT57 and MCT62 being enabled, so that they are inputted to MLT2 and MLT3 and written in the memory mats M2 and M3.

(6) Read Operation of Data Using IAB and IDB1 at Long Word Unit in Mode 1

When MSELX exhibits the enable state, when WEX=low, when the 15th bit (IAB[14]) of IAB is low and when MVI[2:0] designates the code indicating the read operation of data at the long word unit, the first on-chip memory XMEM1 executes the read operation of the data at the long word unit. The MVX signal is in the disable state. At this time, the ASX signal comes into the enable state (high), and the MLX[1:0] indicates the code (11) for enabling the word lines of 4 bytes, so that the address decoder MADC reads out the data by enabling the predetermined word lines of all the four corresponding memory mats. The data, as read out from the memory mats M0 to M3, are latched by MLT0 to MLT3 and pass through the selectors MMX1 and MMX3 with MCT54 and MCT60 being enabled and further through the selectors MMX15, MMX16, MMX11 and MMX12 with MCT68, MCT70 and MCT74 being enabled, so that they are outputted to the first data bus IDB1 ([31:0]).

(7) Write Operation of Data Using IAB and IDB1 at Long Word Unit in Mode 1

The data to be written are sent as at the read time by using all the bits of the first data bus IDB1. When MSELX exhibits the enable state, when WEX=high, when the 15th bit (IAB [14]) of IAB is low and when MVI[2:0] designates the code indicating the write operation of the data at the long word unit, the first on-chip memory XMEM1 executes the write operation of the data at the long word unit. The MVX signal is in the disable state. At this time, the ASX signal comes into the enable state (high), and MLX[1:0] indicates the code for enabling the word lines of 4 bytes, so that the address decoder MADC writes the data in the corresponding latch unit by enabling the predetermined word lines of all the four memory mats. The data, as sent from the first data bus IDB1, pass through the selectors MMX13, MMX14, MMX7 and MMX8 with the MCT67 being enabled and further through MMX2, MMX4, MCB1 and MCB2 with MCT55, MCT61 and MCT63 being enabled, so that they are inputted to MLT0 to MLT3 and written in the memory mats M0 to M3.

(8) Read Operation of Data Using XAB and XDB1 at Word Unit in Mode 1

When MSELX exhibits the stable state, when WEX=low, when the 15th bit (IAB[14]) of XAB is low and when MVX is in the enable state, the first on-chip memory XMEM1 executes the read operation of the data at the word unit using XDB1. The MVI[2:0] signal is ignored. At this time, the ASX signal comes into the enable state (high), and MLX [1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT54 and MCT60 being enabled and further through the selectors MMX15 and MMX16 with MCT72 being enabled, so that they are outputted to the third data bus XDB1. When the less significant 2 bits of the address information latched by MLT4 are 10, the data, as read out from the memory mats M2 and M3, are latched by MLT2 and MLT3 and pass through the selectors MMX1 and MMX3 with MCT52 and MCT59 being enabled and further through the selectors MMX15 and MMX16 with MCT72 being enabled, so that they are outputted to the third data bus XDB1.

(9) Write Operation of Data Using XAB and XDB1 at Word Unit in Mode 1

The data to be written are sent as at the read time from the less significant 2 bytes of the first data bus IDB1. When MSELX exhibits the enable state, when WEX=high, when the 15th bit (IAB[14]) of IAB is low and when when MVX is in the enable state, the first on-chip memory XMEM1 executes the write operation of the data at the word unit. The MVI[2:0] is ignored. At this time the ASX signal comes into the enable state (high), and ML[1:0] indicates the code (10) for enabling the word lines of 2 bytes, so that the address decoder MADC writes the data in the corresponding latch unit by enabling the predetermined word lines of the corresponding consecutive two memory mats. When the less significant 2 bits of the address information latched in MLT4 are 00, the data, as sent from the third data bus XDB1, pass through the selectors MMX13 and MMX14 with MCT65 being enabled and further through the selectors MMX2 and MMX4 with MCT55 and MCT61 being enabled, so that they are inputted to MLT0 and MLT1 and written in the memory mats M0 and M1. When the less significant 2 bits of the address information latched in MLT4 are 10, the data, as sent from the third data bus XDB1, pass through the selectors MMX13 and MMX14 with MCT65 being enabled and further through the selectors MMX2 and MMX4 with MCT57 and MCT62 being enabled, so that they are inputted to MLT2 and MLT3 and written in the memory mats M2 and M3.

(10) Write Operation of Data at Byte Unit in Mode 2

This case is identical to the preceding operation of (1) Instruction Fetch Operation in Mode 1.

(11) Read Operation of Data Using IAB and IDB1 at Word Unit in Mode 2

When MSELX exhibits the enable state, when WEX=low and when MVI[2:0] designates the code indicating the read operation of data at the word unit, the first on-chip memory XMEM1 executes the read operation of the data at the word unit. The MVX signal is in the disable state. When MVI[2:0] designates the code indicating the read operation of the data for the data transfer with the exception of the data execution unit, the read operation is identical to the aforementioned case of (2) Read operation of Data at Word Unit in Mode 1, if the 15th bit (IAB[14]) of IAB is low. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(12) Write Operation of Data Using IAB and IDB1 at Byte Unit in Mode 2

In this case, as in the read operation of (11) Read operation of Data Using IAB and IDB1 at Byte Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(13) Read Operation of Data Using IAB and IDB1 at Word Unit in Mode 2

When MSELX exhibits the enable state, when WEX=low and when MVI[2:0] designates the code indicating the read operation of data at the word unit, the first on-chip memory XMEM1 executes the read operation of the data at the word unit. The MVX signal is in the disable state. When MVI[2:0] designates the code indicating the read operation of the data for the data transfer with the exception of the data execution unit, the read operation is identical to the aforementioned case of (4) Read operation of Data Using IAB and IDB1 at Word Unit in Mode 1, if the 15th bit (IAB[14]) of IAB is low. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(14) Write Operation of Data Using IAB and IDB1 at Word unit in Mode 2

In this case, as in the read operation of (13) Read operation of Data Using IAB and IDB1 at Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(15) Read Operation of Data Using IAB and IDB1 at Long Word Unit in Mode 2

When MSELX exhibits the enable state, when WEX=low and when MVI[2:0] designates the code indicating the read operation of data at the long word unit, the first on-chip memory XMEM1 executes the read operation of the data at the word unit. The MVX signal is in the disable signal. When MVI[2:0] designates the code indicating the read operation of the data for the data transfer with the exception of the data execution unit, the read operation is identical to the aforementioned case of (6) Read operation of Data at Long Word Unit in Mode 1, if the 15th bit (IAB[14]) of IAB is low. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. In other cases, the operation is identical to that of the case of Mode 1.

(16) Write Operation of Data Using IAB and IDB1 at Long Word Unit in Mode 2

In this case, as in the read operation of (15) Read operation of Data Using IAB and IDB1 at Long Word Unit in Mode 2, when MVI[2:0] designates the code indicating the write operation of the data for the data transfer with the data execution unit, the field corresponding to the remaining information [13:0] is accessed to irrespective of the state of the 15th bit (IAB[14]) of IAB, even at the address of the second on-chip memory. In other cases, the operation is identical to that of the case of Mode 1.

(17) Read Operation of Data Using XAB and XDB1 at Word Unit in Mode 2

When MSELX exhibits the enable state, when WEX=low and when MVX is in the enable state, the first on-chip memory XMEM1 executes the read operation of the data at the word unit using XDB1. The MVI[2:0] signal is ignored. This operation is the read operation of the data for the data transfer with the data execution unit, and the field corresponding to the remaining information [13:0] is accessed to irrespective of the state of the 15th bit (XAB[14]) of XAB, even at the address of the second on-chip memory. In other cases, the operation is identical to that of the case of Mode 1.

(18) Write operation of Data Using XAB and XDB1 at Word Unit in Mode 2

In this case, as in the read operation of (17) Read operation of Data Using XAB and XDB1 at Word Unit in Mode 2, the field corresponding to the remaining information [13:0] is accessed to irrespective of the state of the 15th bit (XAB[14]) of XAB, even at the address of the second on-chip memory. In other cases, the operation is identical to that of the case of Mode 1.

(19) Instruction Fetch Operation in Mode 3

When MSELX indicates the enable state, when the 15th bit (IAB[14]) of IAB is low and when MVI[2:0] designates the code indicating the instruction fetch operation, the first on-chip memory XMEM1 executes the data read operation of the long word (of 32 bits). The MVX signal is in the disable state. At this time, the ASX signal comes into the enable state (high), and MLX[1:0] indicates the code (11) for enabling the word liens of four consecutive bytes so that the adress decoder MADC reads out the data by enabling the predetermined word lines of all the four memory mats. The data thus read out are latched by the latch units MLT0 to MLT3. The data, as latched by MLT0, pass through the selector MMX1 with MCT54 being enabled and further through the selector MMX15 with MCT69 being enabled so that they are outputted to the least significant byte ([7:0]) of the second data bus IDB2. The data, as latched by MLT1, pass through the selector MMX3 with MCT60 being enabled and further through the selector MMX16 with MCT71 being enabled so that they are outputted to the second byte ([15:8]) from the least significant byte of the second data bus IDB2. The data, as latched by MLT2, pass through the selector MMX11 with MCT75 being enabled so that they are outputted the third byte ([23:16]) from the least significant byte of the second data bus IDB2. The data, as latched by MLT3, pass through the selector MMX12 with MCT75 being enabled so that they are outputted to the most significant byte ([31:24]) of the second data bus IDB2.

(20) Read Operation of Data Using IAB and IDB2 at Byte Unit in Mode 3

When MSEX exhibits the enable state, when WEX=low, when the 15th bit (IAB[14]) of IAB is low and when MVI[2:0] designates a code indicating the read operation of data at the byte unit, the first on-chip memory MEM11 executes the read operation of the data at the byte unit. The MVX signal is in the disable state. At this time, the ASX signal comes into the enable state (high), and MLX[1:0] indicates the code (01) for enabling the word line of 1 byte, so that the address decoder MADC reads out the data by enabling a predetermined word line of one corresponding memory mat. The data, thus read out, are latched by the latch units MLT0, MLT1, MLT2 or MLT3 connected with the accessed memory mat. When the less significant 2 bits of the address information latched in MLT4 is 00, the data, as read out from the memory mat M0, are latched by MLT0 and pass through the selector MMX1 with MCT54 being enabled and further through the selector MMX15 with MCT69 being enabled, so that they are outputted to the least significant byte ([7:0]) of the second data bus IDB2. When the less significant 2 bits of the address information latched by MLT4 are 01, the data, as read out from the memory mat M1, are latched by MLT1 and pass through the selector MMX1 with MCT53 being enabled and further through the selector MMX15 with MCT69 being enabled, so that they are outputted to the least significant byte ([7:0]) of the second data bus IDB2. When the less significant 2 bits of the address information latched by MLT4 are 10, the data, as read out from the memory mat M2, latched by MLT2 and pass through the selector MMX1 with MCT52 being enabled and further through the selector MMX15 with MCT69 being enabled, so that they are outputted to the least significant byte ([7:0]) of the second data bus IDB2. When the less significant 2 bits of the address information latched by MLT4 are 11, the data, as read out from the memory mat M3, latched by MLT3 and pass through the selector MMX1 with MCT51 being enabled and further through the selector MMX15 with MCT69 being enabled, so that they are outputted to the least significant byte ([7:0]) of the second data bus IDB2. Thus, the byte data of an arbitrary address are outputted to the least significant byte of the second data bus IDB2.

(21) Write Operation of Data Using IAB and IDB2 at Byte Unit in Mode 3

The data to be written are sent as at the read time from the least significant byte of the second data bus IDB2. When MSELX exhibits the enable state, when WEX=high, when the 15th bit (IAB[14]) of IAB is low and when MVI[2:0] designates the code indicating the write operation of data at the byte unit, the first on-chip memory XMEM1 executes the write operation of the data at the byte unit. The MVX signal is in the disable state. At this time, the ASX signal comes into the enable state (high), and ML[1:0] indicates the code (01) for enabling the word line of 1 byte, so that the address decoder MADC writes the data in the latch unit by enabling a predetermined word line of one corresponding memory mat. When the less significant 2 bits of the address information latched by MLT4 is 00, the data, as sent from the least significant byte of the second data bus IDB2, pass through the selector MMX13 with MCT66 being enabled and further through the selector MMX2 with MCT55 being enabled, so that they are inputted to MLT0 and written in the memory mat M0. When the less significant 2 bits of the address information latched by MLT4 is 01, the data, as sent from the least significant byte of the second data bus IDB2, likewise pass through the selector MMX13 with MCT66 being enabled and further through the selector MMX2 with MCT56 being enabled, so that they are inputted to MLT1 and written in the memory mat M1. When the less significant 2 bits of the address information latched by MLT4 is 10, the data, as sent from the least significant byte of the second data bus IDB2, likewise pass through the selector MMX13 with MCT66 being enabled and further through the selector MMX2 with MCT57 being enabled, so that they are inputted to MLT2 and written in the memory mat M2. When the less significant 2 bits of the address information latched by MLT4 is 11, the data, as sent from the least significant byte of the second data bus IDB2, likewise pass through the selector MMX13 with MCT66 being enabled and further through the selector MMX2 with MCT58 being enabled, so that they are inputted to MLT3 and written in the memory mat M3.

(22) Read Operation of Data Using IAB and IDB2 at Word Unit in Mode 3

When MSELX exhibits the stable state, when WEX=low, when the 15th bit (IAB[14]) of IAB is low and when MVI[2:0] designates the code indicating the read operation of data at the word unit, the first on-chip memory XMEM1 executes the read operation of the data at the word unit. The MVX signal is in the disable state. At this time, the AS signal comes into the enable state (high), and ML[1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT54 and MCT60 being enabled and further through the selectors MMX15 and MMX16 with MCT69 and MCT71 being enabled, so that they are outputted to the less significant 2 bytes ([15:0]) of the second data bus IDB2. When the less significant 2 bits of the address information latched by MLT4 are 10, the data, as read out from the memory mats M2 and M3, are latched by MLT52 and MLT59 and pass through the selectors MMX1 and MMX3 with MCT4 and MCT10 being enabled and further through the selectors MMX15 and MMX16 with MCT69 and MCT71 being enabled, so that they are outputted to the less significant 2 bytes ([15:0]) of the second data bus IDB2.

(23) Write Operation of Data Using IAB and IDB2 at Word Unit in Mode 3

The data to be written are sent as at the read time from the less significant 2 bytes of the second data bus IDB2. When MSELX exhibits the enable state, when WEX=high, when the 15th bit (IAB[14]) of IAB is low and when MVI[2:0] designates the code indicating the write operation of the data at the word unit, the first on-chip memory XMEM1 executes the write operation of the data at the word unit. The MVX signal is in the disable state. At this time the AS signal comes into the enable state (high), and ML[1:0] indicates the code (10) for enabling the word lines of 2 bytes, so that the address decoder MADC writes the data in the corresponding latch unit by enabling the predetermined word lines of the corresponding consecutive two memory mats. When the less significant 2 bits of the address information latched in MLT4 are 00, the data, as sent from the less significant 2 bytes of the second data bus IDB2, pass through the selectors MMX13 and MMX14 with MCT66 being enabled and further through the selectors MMX2 and MMX4 with MCT55 and MCT61 being enabled, so that they are inputted to MLT0 and MLT1 and written in the memory mats M0 and M1. When the less significant 2 bits of the address information latched in MLT4 are 10, the data, as sent from the less significant 2 bytes of the second data bus IDB2, pass through the selectors MMX13 and MMX14 with MCT66 being enabled and further through the selectors MMX2 and MMX4 with MCT57 and MCT62 being enabled, so that they are inputted to MLT2 and MLT3 and written in the memory mats M2 and M3.

(24) Read Operation of Data Using IAB and IDB2 at Long Word Unit in Mode 3

When MSELX exhibits the enable state, when WEX=low, when the 15th bit (IAB[14]) of IAB is low and when MVI[2:0] designates the code indicating the read operation of data at the long word unit, the first on-chip memory XMEM1 executes the read operation of the data at the long word unit. The MVX signal is in the disable state. At this time, the AS signal comes into the enable state (high), and the ML[1:0] indicates the code (11) for enabling the word lines of 4 bytes, so that the address decoder MADC reads out the data by enabling the predetermined word lines of all the four corresponding memory mats. The data, as read out from the memory mats M0 to M3, are latched by MLT0 to MLT3 and pass through the selectors MMX1 and MMX3 with MCT54 and MCT60 being enabled and further through the selectors MMX15, MMX16, MMX11 and MMX12 with MCT69, MCT71 and MCT75 being enabled, so that they are outputted to the second data bus IDB2 ([31:0]).

(25) Write Operation of Data Using IAB and IDB2 at Long Word Unit in Mode 3

The data to be written are sent as at the read time by using all the bits of the second data bus IDB2. When MSEXL exhibits the enable state, when WEX high, when the 15th bit (IAB[14]) of IAB is low and when MVI[2:0] designates the code indicating the write operation of the data at the long word unit, the first on-chip memory XMEM1 executes the write operation of the data at the long word unit. The MVX signal is in the disable state. At this time, the AS signal comes into the enable state (high), and ML[1:0] indicates the code for enabling the word lines of 4 bytes, so that the address decoder MADC writes the data in the corresponding latch unit by enabling the predetermined word lines of all the four memory mats. The data, as sent from the second data bus IDB2, pass through the selectors MMX13, MMX14, MMX7 and MMX8 with the MCT66 being enabled and further through MMX2, MMX4, MCB1 and MCB2 with MCT55, MCT61 and MCT63 being enabled, so that they are inputted to MLT0 to MLT3 and written in the memory mats M0 to M3.

(26) Read Operation of Data Using XAB and XDB2 at Word Unit in Mode 3

When MSELX exhibits the stable state, when WEX=low, when the 15th bit (XAB[14]) of XAB is low and when MVX is in the enable sate, the first on-chip memory XMEM1 executes the read operation of the data using SDB2 at the word unit. The MVI[2:0] signal is ignored. At this time, the AS signal comes into the enable state (high), and ML[1:0] indicates the code (10) for enabling the word lines of two bytes, so that the address decoder MADC read out the data by enabling the predetermined word lines of two corresponding consecutive memory mats. The data, thus read out, are latched by the latch units MLT0 and MLT1 or MLT2 and MLT3, as connected with the accessed memory mats. When the less significant 2 bits of the address information latched by MLT4 are 00, the data, as read out from the memory mats M0 and M1, are latched by MLT0 and MLT1 and pass through the selectors MMX1 and MMX3 with MCT54 and MCT60 being enabled and further through the selectors MMX15 and MMX16 with MCT73 being enabled, so that they are outputted to the fourth data bus XDB2. When the less significant 2 bits of the address information latched by MLT4 are 10, the data, as read out from the memory mats M2 and M3, are latched by MLT52 and MLT59 and pass through the selectors MMX1 and MMX3 with MCT4 and MCT10 being enabled and further through the selectors MMX15 and MMX16 with MCT73 being enabled, so that they are outputted to the fourth data bus XDB2.

(27) Write Operation of Data Using XAB and XDB2 at Word Unit in Mode 3

The data to be written are sent as at the read time from the less significant 2 bytes of the fourth data bus XDB2. When MSELX exhibits the enable state, when WEX=high, when the 15th bit (XAB[14]) of XAB is low and when MVXI is in the enable state, the first on-chip memory XMEM1 executes the write operation of the data using XDB2 at the word unit. The MVX signal is in the disable state. At this time the AS signal comes into the enable state (high), and ML[1:0] indicates the code (10) for enabling the word lines of 2 bytes, so that the address decoder MADC writes the data in the corresponding latch unit by enabling the predetermined word lines of the corresponding consecutive two memory mats. When the less significant 2 bits of the address information latched in MLT4 are 00, the data, as sent from the fourth data bus XDB2, pass through the selectors MMX13 and MMX14 with MCT64 being enabled and further through the selectors MMX2 and MMX4 with MCT55 and MCT61 being enabled, so that they are inputted to MLT0 and MLT1 and written in the memory mats M0 and M1. When the less significant 2 bits of the address information latched in MLT4 are 10, the data, as sent from the fourth data bus XDB2, pass through the selectors MMX13 and MMX14 with MCT64 being enabled and further through the selectors MMX2 and MMX4 with MCT57 and MCT62 being enabled, so that they are inputted to MLT2 and MLT3 and written in the memory mats M2 and M3.

[Operations of On-Chip Memory XMEM2]

The detailed operations of the second on-chip memory XMEM2 will be described in the following.

Figure 46:
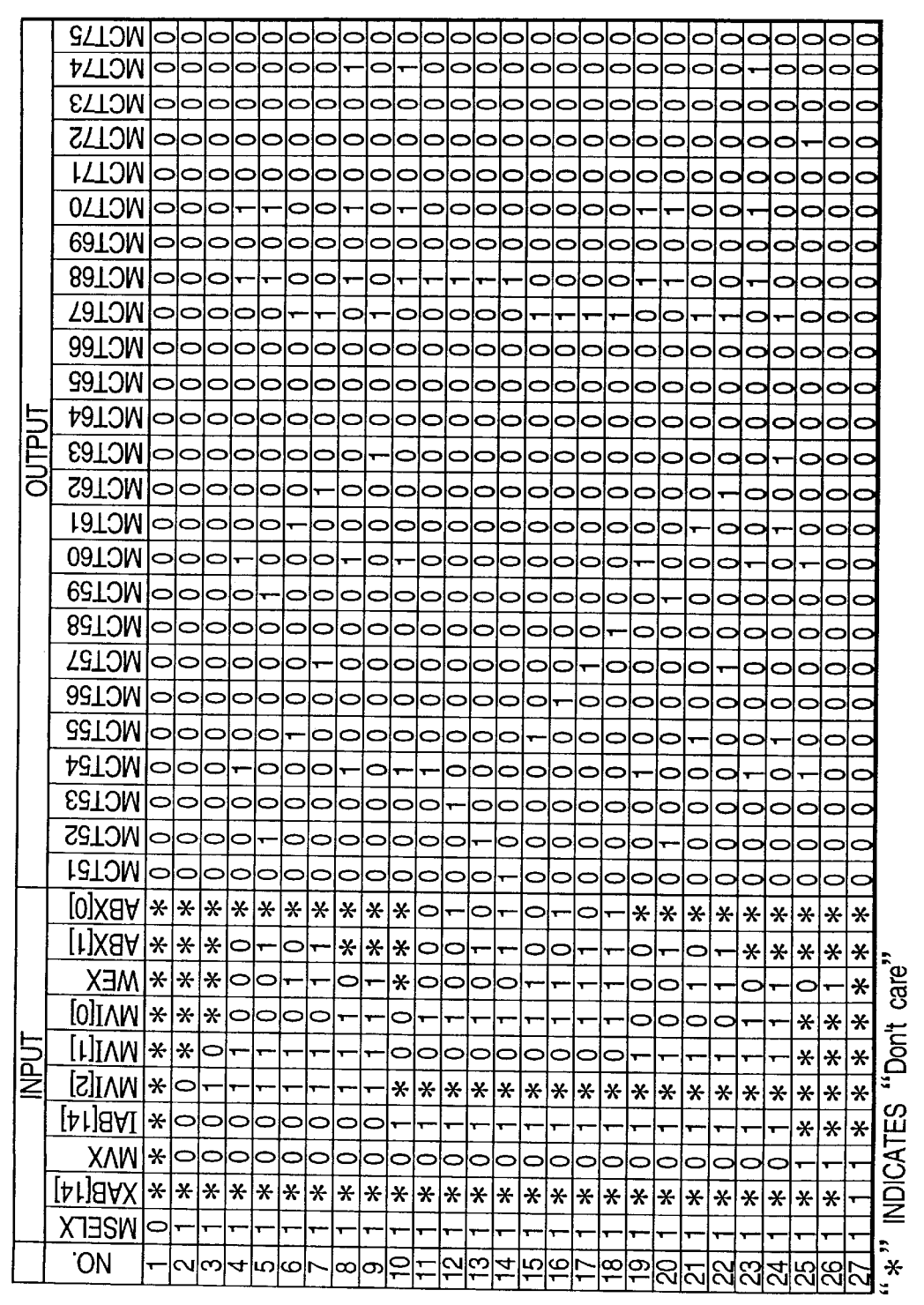
Figure 47:
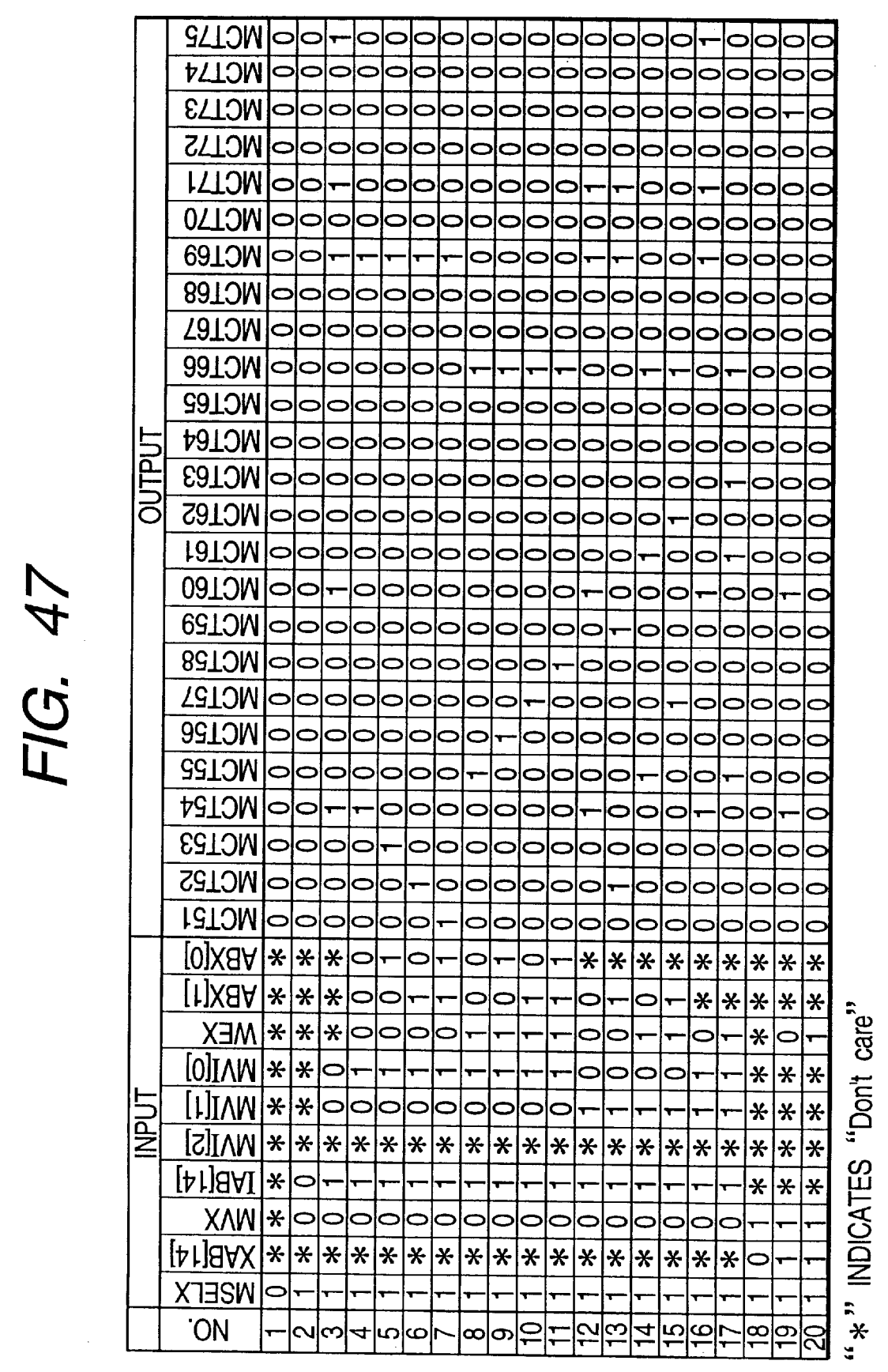

This second on-chip memory XMEM2 is a memory like XMEM1 having a function to correspond three types of data lengths separately in response to an instruction. FIG. 44 is a truth table of the input signals to be fed to the address decoder MADC in the individual modes. FIG. 45, FIG. 46 and FIG. 47 show truth tables of the control unit MDEC4 in the second on-chip memory XMEM2 in Mode 1, Mode 2 and Mode 3, respectively. Here will be described the individual operations separately for the modes.

(1) Instruction Fetch Operation in Mode 1

When MSELX exhibits the enable state, when the 15th bit (IAB[14]) of IAB is high and when MVI[2:0] designates the code indicating the instruction fetch operation, the second on-chip memory XMEM2 executes the read operation of the data of a long word (of 32 bits). The subsequent operations are identical to those of the first on-chip memory XMEM1.

(2) Read Operation of Data Using IAB and IDB1 at Byte Unit in Mode 1

When MSELX exhibits the enable state, when WEX=low, when the 15th bit (IAB[14]) of IAB is high and when MVI[2:0] designates the code indicating the read operation of data at the byte unit, the second on-chip memory XMEM2 executes the read operation the data at the byte unit. The subsequent operations are identical to those of the first on-chip memory XMEM1.

(3) Write Operation of Data Using IAB and IDB1 at Byte unit in Mode 1

The data to be written are sent as at the read time from the least significant byte of the first data bus IDB1. When MSELX exhibits the enable state, when WEX=high, when the 15th bit (IAB[14]) of IAB is high and when MVI[2:0] designates the code indicating the write operation of data at the byte unit, the second on-chip memory XMEM2 executes the write operation the data at the byte unit. The subsequent operations are identical to those of the first on-chip memory XMEM1.

(4) Read Operation of Data Using IAB and IDB1 at Word Unit in Mode 1

When MSELX exhibits the enable state, when WEX=low, when the 15th bit (IAB[14]) of IAB is high and when MVI[2:0] designates the code indicating the read operation of data at the word unit, the second on-chip memory XMEM2 executes the read operation the data at the word unit. The subsequent operations are identical to those of the first on-chip memory xMEM1.

(5) Write Operation of Data Using IAB and IDB1 at Word Unit in Mode 1

The data to be written are sent as at the read time from two less significant bytes of the first data bus IDB1. When MSELX exhibits the enable state, when WEX=high, when the 15th bit (IAB[14]) of IAB is high and when MVI[2:0] designates the code indicating the write operation of data at the word unit, the second on-chip memory XMEM2 executes the write operation the data at the word unit. The subsequent operations are identical to those of the first on-chip memory XMEM1.

(6) Read Operation of Data Using IAB and IDB1 at Long Word Unit in Mode 1

When MSELX exhibits the enable state, when WEX=low, when the 15th bit (IAB[14]) of IAB is high and when MVI[2:0] designates the code indicating the read operation of data at the long word unit, the second on-chip memory XMEM2 executes the read operation the data at the long word unit. The subsequent operations are identical to those of the first on-chip memory XMEM1.

(7) Write Operation of Data Using IAB and IDB1 at Long Word Unit in Mode 1

The data to be written are sent as at the read time by using all bits of the first data bus IDB1. When MSELX exhibits the enable state, when WEX=high, when the 15th bit (IAB[14]) of IAB is high and when MVI[2:0] designates the code indicating the write operation of data at the long word unit, the second on-chip memory XMEM2 executes the write operation the data at the long word unit. The subsequent operations are identical to those of the first on-chip memory XMEM1.

(8) Read Operation of Data Using XAB and XDB1 at Word Unit in Mode 1

When MSELX exhibits the enable state, when WEX=low, when the 15th bit (XAB[14]) of XAB is high and when MVX is in the enable state, the second on-chip memory XMEM2 executes the read operation the data using XDB1 at the word unit. The subsequent operations are identical to those of the first on-chip memory XMEM1.

(9) Write Operation of Data Using XAB and XDB1 at Word Unit in Mode 1

The data to be written are sent as at the read time from the third data bus XDB1. When MSELX exhibits the enable state, when WEX=high, when the 15th bit (XAB[14]) of XAB is high and when MVX is in the enable state, the second on-chip memory XMEM2 executes the write operation of the data using XDB1 at the word unit. The subsequent operations are identical to those of the first on-chip memory XMEM1.

(10) Instruction Fetch Operation in Mode 2

In this case, the operation is identical to that of (1) Instruction Fetch Operation in Mode 1.

(11) Read Operation of Data Using IAB and IDB2 at Byte Unit in Mode 2

When MSELX exhibits the enable state, when WEX=low and when MVI[2:0] designates the code indicating the read operation of data at the byte unit, the second on-chip memory XMEM2 executes the read operation of the data at the byte unit. The MVX signal is in the disable state. When MVI[2:0] designates the code indicating the read operation of the data for the data transfer with the exception of the data execution unit, the read operation is identical to the aforementioned case of (2) Read operation of Data at Byte Unit in Mode 1, if the 15th bit (IAB[14]) of IAB is high. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. Moreover, the data are outputted to the second data bus IDB2. The detailed control and operation are identical to those of (20) Read Operation of Data Using IAB and IDB2 at Byte Unit in Mode 3, as will be described.

(12) Write Operation of Data Using IAB and IDB2 at Byte Unit in Mode 2

In this case, as in the read operation of (11) Read operation of Data Using IAB and IDB2 at Byte Unit in Mode 2, when MVI[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory xMEM1. Moreover, the data are inputted from the second data bus IDB2. The detailed control and operation are identical to those of (21) Write Operation of Data Using IAB and IDB2 at Byte Unit in Mode 3, as will be described.

(13) Read Operation of Data Using LAB and IDB2 at Word Unit in Mode 2

When MSELX exhibits the enable state, when WEX=low and when MVI[2:0] designates the code indicating the read operation of data at the word unit, the second on-chip memory XMEM2 executes the read operation of the data at the word unit. The MVX signal is in the disable state. When MVI[2:0] designates the code indicating the read operation of the data for the data transfer with the exception of the data execution unit, the read operation is identical to the aforementioned case of (4) Read operation of Data at Word Unit in Mode 1, if the 15th bit (IAB[14]) of IAB is high. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the second on-chip memory. Moreover, the data are outputted to the second data bus IDB2. The detailed control and operation are identical to those of (18) Read Operation of Data at Word Unit in Mode 3, as will be described.

(14) Write operation of Data at Word Unit in Mode 2

In this case, as in the read operation of (13) Read operation of Data Using IAB and IDB2 at Word Unit in Mode 2, when MV[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory XMEM1. Moreover, the data are inputted from the second data bus IDB2. The detailed control and operation are identical to those of (23) Write Operation of Data Using IAB and IDB2 at Word Unit in Mode 3, as will be described.

(15) Read Operation of Data Using IAB and IDB2 at Long Word Unit in Mode 2

When MSELX exhibits the enable state, when WEX=low and when MVI[2:0] designates the code indicating the read operation of data at the long word unit, the second on-chip memory XMEM2 executes the read operation of the data at the word unit. The MVX signal is in the disable state. When MVI[2:0] designates the code indicating the read operation of the data for the data transfer with the exception of the data execution unit, the read operation is identical to the aforementioned case of (6) Read operation of Data Using IAB and IDB2 at Long Word Unit in Mode 1, if the 15th bit (IAB[14]) of IAB is high. When MVI[2:0] designates the code indicating the read operation of the data for the data transfer with the data execution unit, however, the field corresponding to the remaining information [13:0] is accessed to irrespective of the state of the 15th bit (IAB[14]) of IAB, even at the address of the first on-chip memory XMEM1. Moreover, the data are outputted to the second data bus IDB2. The detailed control and operation are identical to those of (24) Read Operation of Data Using IAB and IDB2 at Long Word Unit in Mode 3, as will be described.

(16) Write Operation of Data Using IAB and IDB2 at Long Word Unit in Mode 2

In this case, as in the read operation of (15) Read operation of Data Using IAB and IDB2 at Long Word Unit in Mode 2, when MVI[2:0] designates the code indicating the write operation of the data for the data transfer with the data execution unit, the field corresponding to the remaining information [13:0] is accessed to irrespective of the state of the 15th bit (IAB[14]) of IAB, even at the address of the first on-chip memory XMEM1. Moreover, the data are inputted from the second data bus IDB2. The detailed control and operation are identical to those of (25) Write Operation of Data Using IAB and IDB2 at Long Word Unit in Mode 3, as will be described.

(17) Read Operation of Data Using XAB and XDB2 at Word Unit in Mode 2

When MSELX exhibits the enable state, when WEX=low and when MVX is in the enable state, the second on-chip memory XMEM2 executes the read operation of the data using XDB1 at the word unit. The MVI[2:0] is ignored. The field corresponding to the remaining information [13:0] is accessed to irrespective of the state of the 15th bit (XAB [14]) of XAB, even at the address of the second on-chip memory. Moreover, the data are outputted to the fourth data bus XDB2. The detailed control and operation are identical to those of (26) Read Operation of Data Using XAB and XDB2 at Word Unit in Mode 3, as will be described.

(18) Write Operation of Data Using XAB and XDB2 at Word Unit in Mode 2

In this case, as in the read operation of (17) Read operation of Data Using XAB and XDB2 at Word Unit in Mode 2, the field corresponding to the remaining information [13:0] is accessed to irrespective of the state of the 15th bit (IAB[14]) of XAB, even at the address of the first on-chip memory XMEM1. Moreover, the data are inputted from the fourth data bus XDB2. The detailed control and operation are identical to those of (27) Write Operation of Data Using XAB and XDB2 at Word Unit in Mode 3, as will be described.

(19) Instruction Fetch Operation in Mode 3

When MSELX indicates the enable state, when the 15th bit (IAB[14]) of IAB is high and when MVI[2:0] designates the code indicating the instruction fetch operation, the first on-chip memory XMEM1 executes the data read operation of the long word (of 32 bits). The subsequent operations are identical to those of the first on-chip memory MEM11.

(20) Read Operation of Data Using IAB and IDB2 at Byte Unit in Mode 3

When MSELX exhibits the enable state, when WEx=low, when the 15th bit (IAB[14]) of IAB is high and when MVI[2:0] designates a code indicating the read operation of data at the byte unit, the second on-chip memory XMEM2 executes the read operation of the data at the byte unit. The subsequent operations are identical to those of the first on-chip memory XMEM1.

(21) Write operation of Data Using IAB and IDB2 at Byte Unit in Mode 3

The data to be written are sent as at the read time from the least significant byte of the second data bus IDB2. When MSELX exhibits the enable state, when WEX=high, when the 15th bit (IAB[14]) of IAB is high and when MVI[2:0] designates the code indicating the write operation of data at the byte unit, the second on-chip memory XMEM2 executes the write operation of the data at the byte unit. The subsequent operations are identical to those of the first on-chip memory XMEM1.

(22) Read Operation of Data Using IAB and IDB2 at Word Unit in Mode 3

When MSELX exhibits the stable state, when WEX=low, when the 15th bit (IAB[14]) of IAB is high and when MVI[2:0] designates the code indicating the read operation of data at the word unit, the second on-chip memory XMEM2 executes the read operation of the data at the word unit. The subsequent operations are identical to those of the first on-chip memory XMEM1.

(23) Write Operation of Data Using IAB and IDB2 at Word Unit in Mode 3

The data to be written are sent as at the read time from the less significant 2 bytes of the second data bus IDB2. When MSELX exhibits the enable state, when WEX=high, when the 15th bit (IAB[14]) of IAB is high and when MVI[2:0]

designates the code indicating the write operation of the data at the word unit, the second on-chip memory XMEM2 executes the write operation of the data at the word unit. The subsequent operations are identical to those of the first on-chip memory XMEM1.

(24) Read Operation of Data Using IAB and IDB2 at Long Word Unit in Mode 3

When MSELX exhibits the enable state, when WEX=low, when the 15th bit (IAB[14]) of IAB is high and when MVI[2:0] designates the code indicating the read operation of data at the long word unit, the second on-chip memory XMEM2 executes the read operation of the data at the long word unit. The subsequent operations are identical to those of the first on-chip memory XMEM1.

(25) Write Operation of Data Using IAB and IDB2 at Long Word Unit in Mode 3

The data to be written are sent as at the read time by using all the bits of the second data bus IDB2. When MSELX exhibits the enable state, when WEX=high, when the 15th bit (IAB[14]) of IAB is high and when MVI[2:0] designates the code indicating the write operation of the data at the long word unit, the second on-chip memory XMEM2 executes the write operation of the data at the long word unit. The subsequent operations are identical to those of the first on-chip memory XMEM1.

(26) Read Operation of Data Using XAB and XDB2 at Word Unit in Mode 3

When MSELX exhibits the stable state, when WEX=low, when the 15th bit (IAB[14]) of IAB is high and when MVX is in the enable state, the second on-chip memory XMEM2 executes the read operation of the data using XDB2 at the word unit. The subsequent operations are identical to those of the first on-chip memory XMEM1.

(27) Write Operation of Data Using XAB and XDB2 at Word Unit in Mode 3

The data to be written are sent as at the read time from the less significant 2 bytes of the fourth data bus XDB2. When MSELX exhibits the enable state, when WEX=high, when the 15th bit (IAB[14]) of IAB is high and when MVX is in the enable state, the second on-chip memory XMEM2 executes the write operation of the data using XDB at the word unit. The subsequent operations are identical to those of the first on-chip memory XMEM1.

[Construction of Data Execution Unit]

Figure 48:
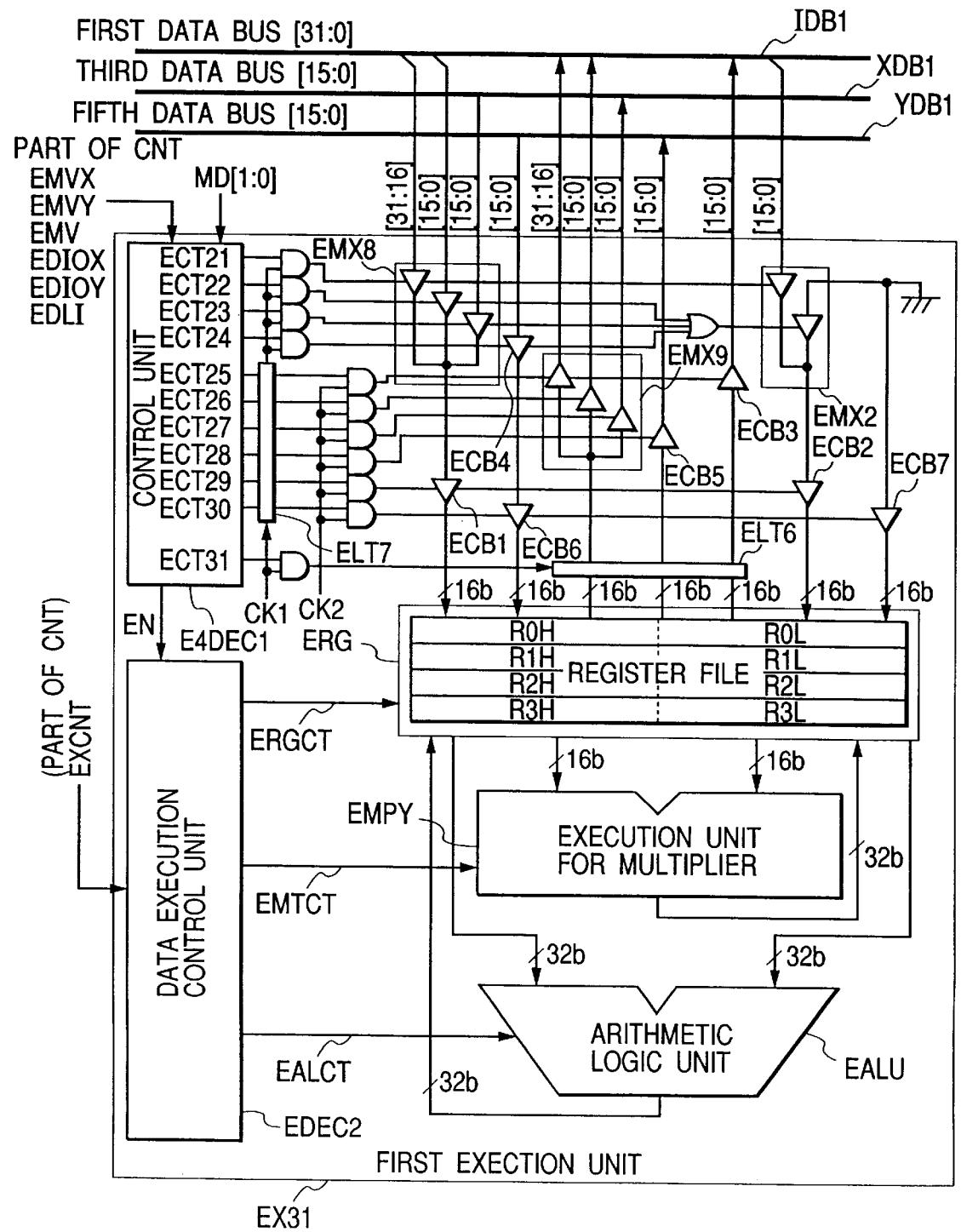
FIG. 48 shows a sample of a more specific construction of a first data execution unit (EX31)

A sample of a more specific construction of the first data execution unit EX31 is shown in FIG. 48. In FIG. 48: letters E4DEC1 designate a control unit for generating data transfer control signals ECT21 to ECT31 in the first data execution unit EX31; letters ECT21 to ECT31 the control signals to be outputted from the control unit E4DEC1; letters EMX8 a selector for selecting and fetching the more significant words (or 16 bits) or less significant words (of 16 bits) of the first data bus IDB1 or the third data bus XDB1; letters ECB1 a clocked gate for inputting the data, as selected by the selector EMX8, to the files of the more significant word registers (R0 to R3H); letters ECB3 a clocked gate for outputting the output of the ELT6 to the less significant words of the first data bus IDB1; letters ECB4 a clocked gate for fetching the data from the fifth data bus YDB1; letters ECB5 a clocked gate for outputting the output of ELT6 to the fifth data bus YDB1; letters ECB6 a clocked gate for inputting the output of the clocked gate ECB4 to the files of the more significant registers (R0 to R3H); letters ECB7 a clocked gate for inputting all zero to the files of the less significant word registers (R0 to R3L); letters ELT6 a latch unit for latching the output signals of the more significant word registers (R0 to R3H) or the less significant word registers (R0 to R3L), as selected from the register file ERG, at the timing of the one terminal CK1 so that they may be outputted to the first data bus, the third data bus or the fifth data bus; letters EMX9 a selector for outputting the output of the ELT6 to the more significant words or less significant words of the first data bus IDB1 or the third data bus XDB1; letters ELT7 a delay latch unit for delaying the control signals ECT25 to ECT30 by a half period; letters EMV the control signal for instructing both the data execution units EX31 and EX32 the data transfer operations using the first or second data bus; letters EMVX a control signal for instructing both the data execution units EX31 and EX32 the data transfer operations using the third or fourth data bus; letters EMVY a control signal for instructing both the data execution units EX31 and EX32 the data transfer operations using the fifth or sixth data bus; letters EDIOX a control signal for instructing both the data execution units EX31 and EX32 the transfer direction at the time of the data transfer operations using the IDB1, IDB2, SDB2 or XDB2; letters EDIOY a control signal for instructing both the data execution units EX31 and EX32 the transfer direction at the time of the data transfer operations using the YDB1 or YDB2; and letters EDLI a control signal for designating the data bit length at the time of the data transfer operations using the IDB1 and IDB2. The remaining reference letters are identical to those of FIG. 19.

Figure 49:
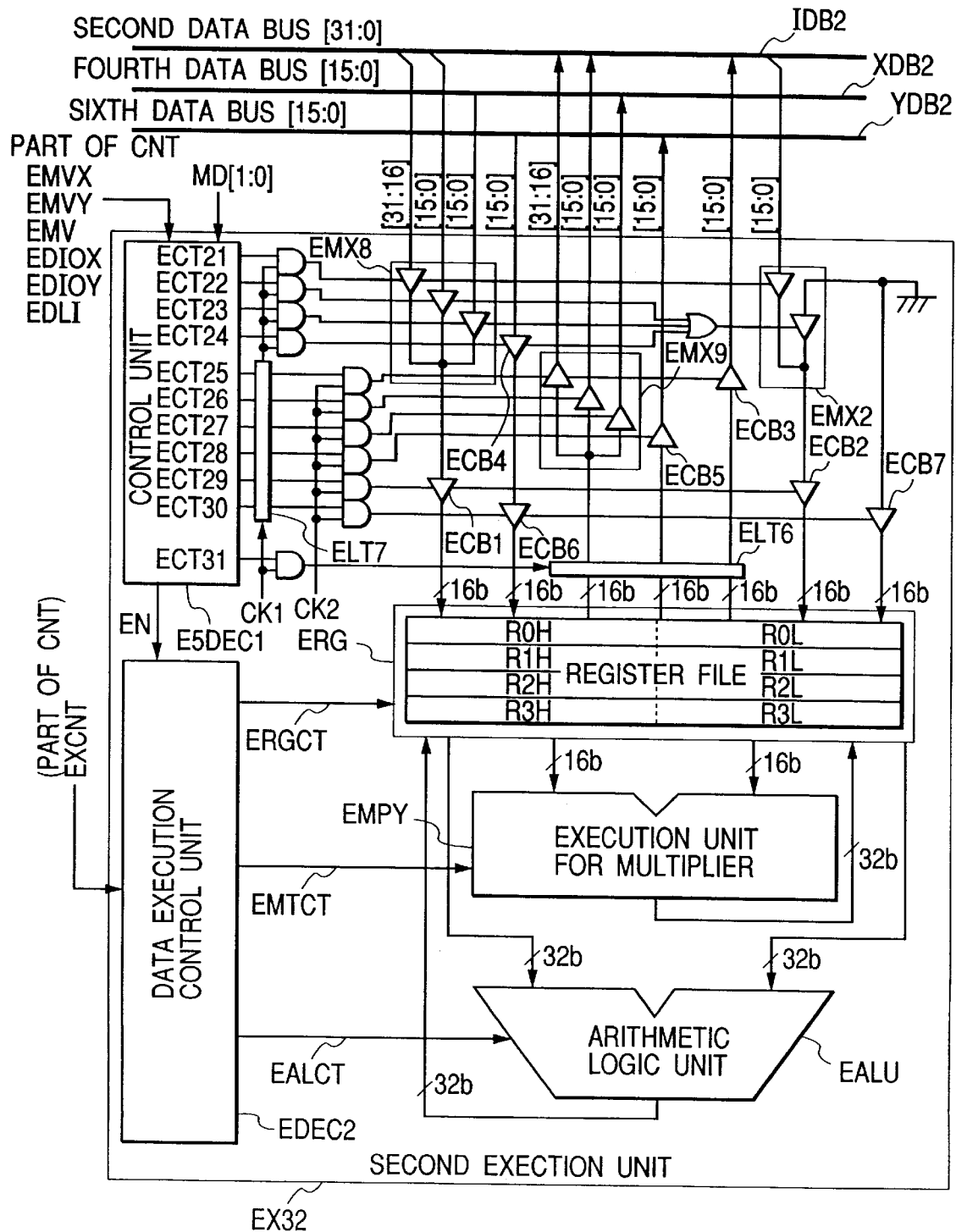
FIG. 49 shows a sample of a more specific construction of a second data execution unit (EX31)

A sample of a more specific construction of the second data execution unit EX12 is shown in FIG. 49. The first and second data execution units EX31 and EX32 are identical in structures excepting the truth tables defining the functions the data buses and the control units E4DEC1 and E5DEC1 to be connected, and their reference numerals and their descriptions are omitted.

[Operations of Data Execution Unit EX31]

Here will be described the detailed operations of the first data execution unit EX31.

FIG. 50 shows a truth table enumerating the functions of the control unit E1DEC1. The timing at the write/read operations of the register files in the first data execution unit EX31 will be omitted because it is identical to that of the first embodiment. The data execution unit to be handled in this embodiment can efficiently execute the digital signal processing handling the fixed point type data, and the operation function is identical to that of FIG. 20. Therefore, the detailed description will be omitted, and the description will be limited to the data transfer operations relating to the invention.

(1) Operations in Mode 1 and Mode 2

When the central processing unit CPU3 issues the control signal for instructing the data inputting operation using the first data bus IDB1 at the word unit, EMV is enabled (high), EDIOX=low and EDLI=low, so that the first data execution unit EX31 executes the operation to fetch the word data at the less significant 16 bits of the first data bus IDB1. When the control signal ECT22 is enabled, the word data at the less significant 16 bits of the first data bus IDB1 pass through the selector EMX8 and further through the clocked gate ECB1 with ECT29 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU3 issues the control signal for instructing the data inputting operation using the first data bus IDB1 at the word unit, EMV is enabled (high), EDIOX=high and EDLI=low, so that the first data execution unit EX31 executes the operation to output the word data to the less significant 16 bits of the first data bus IDB1. When the control signal ECT31 is enabled, the data to be outputted pass from the more significant words of the source register in the register file ERG through the latch unit ELT6 and further through the selector EMX9 with the ECT26 being enabled, and are outputted to the less significant 16 bits of the first data bus IDB1. Here, no output is made to the more significant 16 bits of the first data bus IDB1, but it is needless to say that the practice of the invention is not obstructed even with a function to expand the most significant bit of the output data while considering that the transfer destination is the register of 32 bits.

When the central processing unit CPU3 issues the control signal for instructing the data inputting operation using the first data bus IDB1 at the long word unit, EMV is enabled (high), EDIOX=low and EDLI=high, so that the first data execution unit EX31 executes the operation to fetch the long word data of the first data bus IDB1. When the control signal ECT21 is enabled, the word data at the more significant 16 bits of the first data bus IDB1 pass through the selector EMX8 and further through the clocked gate ECB1 with ECT29 being enabled, and are fetched by the register file ERG so that they are inputted to the more significant words of the designated destination register. Simultaneously with this, the word data at the less significant 16 bits of the first data bus IDB1 are inputted from the selector EMX2 and are fetched through the clocked gate ECB2 by the register file ERG so that they are inputted to the less significant words of the designated destination register.

When the central processing unit CPU3 issues the control signal for instructing the data inputting operation using the first data bus IDB1 at the long word unit, EMV is enabled (high), EDIOX=high and EDLI=high, so that the first data execution unit EX31 executes the operation to output the long word data to the first data bus IDB1. When the control signal ECT31 is enabled, the data to be outputted pass from the more significant words of the source register in the register file ERG through the latch unit ELT6 and further through the selector EMX9 with the ECT25 being enabled, and are outputted to the more significant 16 bits of the first data bus IDB1. Simultaneously with this, the data to be outputted pass from the less significant words of the source register in the register file ERG through the latch unit ELT6 and further through the clocked gate ECB3 and are outputted to the less significant 16 bits of the first data bus IDB1.

When the central processing unit CPU3 issues the control signal for instructing the data inputting operation using the third data bus XDB1 at the word unit, EMVX is enabled (high) and EDIOX=low, so that the first data execution unit EX31 executes the operation to fetch the word data in the third data bus XDB1. When the control signal ECT23 is enabled, the word data in the third data bus XDB1 pass through the selector EMX8 and further through the clocked gate ECB1 with ECT29 being enabled, and are fetched by the register file ERG, so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU3 issues the control signal for instructing the data inputting operation using the third data bus XDB1 at the word unit, EMVX is enabled (high), EDIOX=high and EDLI=low, so that the first data execution unit EX31 executes the operation to output the word data to the third data bus XDB1. When the control signal ECT31 is enabled, the data to be outputted pass from the more significant words of the source register in the register file ERG through the latch unit ELT6 and further through the selector EMX9 with the ECT27 being enabled, and are outputted to the third data bus XDB1.

When the central processing unit CPU3 issues the control signal for instructing the data inputting operation using the fifth data bus YDB1 at the word unit, EMVY is enabled (high) and EDIOY=low, so that the first data execution unit EX31 executes the operation to fetch the word data in the fifth data bus YDB1. When the control signal ECT24 is enabled, the word data in the fifth data bus YDB1 pass through the clocked gate ECB4 and further through the clocked gate ECB& with ECT30 being enabled, and are fetched by the register file ERG, so that they are inputted to the more significant words of the designated destination register. Simultaneously with this, all zero data are outputted from the clocked gate ECB7 and are fetched by the register file ERG so that they are inputted to the less significant words of the designated destination register.

When the central processing unit CPU3 issues the control signal for instructing the data inputting operation using the fifth data bus YDB1 at the word unit, EMVY is enabled (high), EDIOY=high and EDLI=low, so that the first data execution unit EX31 executes the operation to output the word data to the fifth data bus YDB1. When the control signal ECT31 is enabled, the data to be outputted pass from the more significant words of the source register in the register file ERG through the latch unit ELT6 and further through the clocked gate ECB5 with the ECT28 being enabled, and are outputted to the fifth data bus YDB1.

The data transfer operations at the word unit using the third data bus XDB1 and the data transfer operations at the word unit using the fifth data bus YDB1 can be executed in parallel. Therefore, the hardwares for the two are given independent structures. On the other hand, the data transfer operations using the first data bus IDB1 is not anticipated by the operations parallel to the remaining data transfer operations so that they share the resources in this embodiment with the hardware of the data transfer operations at the word unit using the third data bus XDB1. It is, however, needless to say that the resources can be used commonly with the data transfer operations using the fifth data bus YDB1.

(2) Operations in Mode 3

When the mode state signal MD[1:0] indicates Mode 3, the control unit E1DEC1 disables the operation enable signal EN. From now on, the first data execution unit EX31 will not execute the operation but hold the disable state till the Mode is changed, no matter what operation is instructed by the central processing unit CPU3. In this mode, the control issued by the central processing unit CPU3 is effective in the second data execution unit EX32.

[Operations of Data Execution Unit EX12]

Here will be described the detailed operations of the second data execution unit EX32.

FIG. 51 shows a truth table enumerating the functions of the control unit E5DEC1. The timing is identical to that of the first data execution unit EX31.

(1) Operations in Mode 1

When the mode state signal MD[1:0] indicates Mode 1, the control unit E5DEC1 disables the operation enable signal EN. From now on, the second data execution unit EX12 will not execute the operation but hold the disable state till the Mode is changed, no matter what operation is instructed by the central processing unit CPU3. In this mode, the control issued by the central processing unit CPU3 is effective in the first data execution unit EX31.

(2) Operations in Mode 2 and Mode 3

When the central processing unit CPU3 issues the control signal for instructing the data inputting operation at the word unit using the second data bus IDB2, EMV is enabled (high), EDIOX=low and EDLI=low, so that the second data execution unit EX12 executes the operation to fetch the word data at the less significant 16 bits of the second data bus IDB2. When the control signal ECT22 is enabled, the word data at the less significant 16 bits of the second data bus IDB2 pass through the selector EMX8 and further through the clocked gate ECB1 with ECT29 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU3 issues the control signal for instructing the data inputting operation at the word unit using the second data bus IDB2, EMV is enabled (high), EDIOX=high and EDLI=low, so that the second data execution unit EX32 executes the operation to output the word data to the less significant 16 bits of the second data bus IDB2. When the control signal ECT31 is enabled, the data to be outputted pass from the more significant words of the source register in the register file ERG through the latch unit ELT6 and further through the selector EMX9 with the ECT26 being enabled, and are outputted to the less significant 16 bits of the second data bus IDB2. Here, no output is made to the more significant 16 bits of the second data bus IDB2, but it is needless to say that the practice of the invention is not obstructed even with a function to expand the most significant bit of the output data while considering that the transfer destination is the register of 32 bits.

When the central processing unit CPU3 issues the control signal for instructing the data inputting operation at the long word unit, EMV is enabled (high), EDIOX=low and EDLI=high, so that the second data execution unit EX32 executes the operation to fetch the long word data of the second data bus IDB2. When the control signal ECT21 is enabled, the word data at the more significant 16 bits of the second data bus IDB2 pass through the selector EMX8 and further through the clocked gate ECB1 with ECT29 being enabled, and are fetched by the register file ERG so that they are inputted to the more significant words of the designated destination register. Simultaneously with this, the word data at the less significant 16 bits of the second data bus IDB2 are inputted from the selector EMX2 and are fetched through the clocked gate ECB2 by the register file ERG so that they are inputted to the less significant words of the designated destination register.

When the central processing unit CPU3 issues the control signal for instructing the data inputting operation at the long word unit, EMV is enabled (high), EDIOX=high and EDLI=high, so that the second data execution unit EX32 executes the operation to output the long word data to the second data bus IDB2. When the control signal ECT31 is enabled, the data to be outputted pass from the more significant words of the source register in the register file ERG through the latch unit ELT6 and further through the selector EMX9 with the ECT25 being enabled, and are outputted to the more significant 16 bits of the second data bus IDB2. Simultaneously with this, the data to be outputted pass from the less significant words of the source register in the register file ERG through the latch unit ELT6 and further through the clocked gate ECB3 and are outputted to the less significant 16 bits of the second data bus IDB2.

When the central processing unit CPU3 issues the control signal for instructing the data inputting operation at the word unit using the fourth data bus XDB2, EMVX is enabled (high) and EDIOX=low, so that the second data execution unit EX32 executes the operation to fetch the word data in the fourth data bus XDB2. When the control signal ECT23 is enabled, the word data in the fourth data bus XDB2 pass through the selector EMX8 and further through the clocked gate ECB1 with ECT29 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU3 issues the control signal for instructing the data inputting operation in at the word unit using the fourth data bus XDB2, EMVX is enabled (high) and EDIOX=high, so that the second data execution unit EX32 executes the operation to output the word data to the fourth data bus XDB2. When the control signal ECT31 is enabled, the data to be outputted pass from the more significant words of the source register in the register file ERG through the latch unit ELT6 and further through the selector EMX9 with the ECT27 being enabled, and are outputted to the fourth data bus XDB2.

When the central processing unit CPU3 issues the control signal for instructing the data inputting operation at the word unit using the sixth data bus YDB2, EMVY is enabled (high) and EDIOY=low, so that the second data execution unit EX32 executes the operation to fetch the word data in the sixth data bus YDB2. When the control signal ECT23 is enabled, the word data in the sixth data bus YDB2 pass through the selector EMX8 and further through the clocked gate ECB1 with ECT29 being enabled, and are fetched by the register file ERG so that they are inputted to the more significant words of the designated destination register. Simultaneously with this, all zero data are outputted from the selector EMX2 and are fetched through the clocked gate ECB2 by the register file ERG so that they are inputted to the less significant words of the designated destination register.

When the central processing unit CPU3 issues the control signal for instructing the data inputting operation in at the word unit using the sixth data bus YDB2, EMVY is enabled (high) and EDIOY=high, so that the second data execution unit EX32 executes the operation to output the word data to the sixth data bus YDB2. When the control signal ECT31 is enabled, the data to be outputted pass from the more significant words of the source register in the register file ERG through the latch unit ELT6 and further through the clocked gate ECB5 with the ECT28 being enabled, and are outputted to the sixth data bus YDB2.

The data transfer operations at the word unit using the fourth data bus XDB2 and the data transfer operations at the word unit using the sixth data bus YDB2 can be executed in parallel as in the first data execution unit EX31. Therefore, the hardwares for the two are given independent structures. On the other hand, the data transfer operations using the second data bus IDB2 is not anticipated by the operations parallel to the remaining data transfer operations so that they share the resources in this embodiment with the hardware of the data transfer operations at the word unit using the fourth data bus XDB2. It is, however, needless to say that the resources can be used commonly with the data transfer operations using the sixth data bus YDB2.

In the microcomputer having the multi-bus structure of this embodiment thus far described, too, by applying the invention, the source data necessary for the operations can be supplied without delay to sufficiently exhibit the effect of a high performance by the two parallel execution function in response to the single instruction without being obstructed by the data transfer. Moreover, no problem arises in the consistency with the ordinary single operation.

<Embodiment 4>

Figure 52:
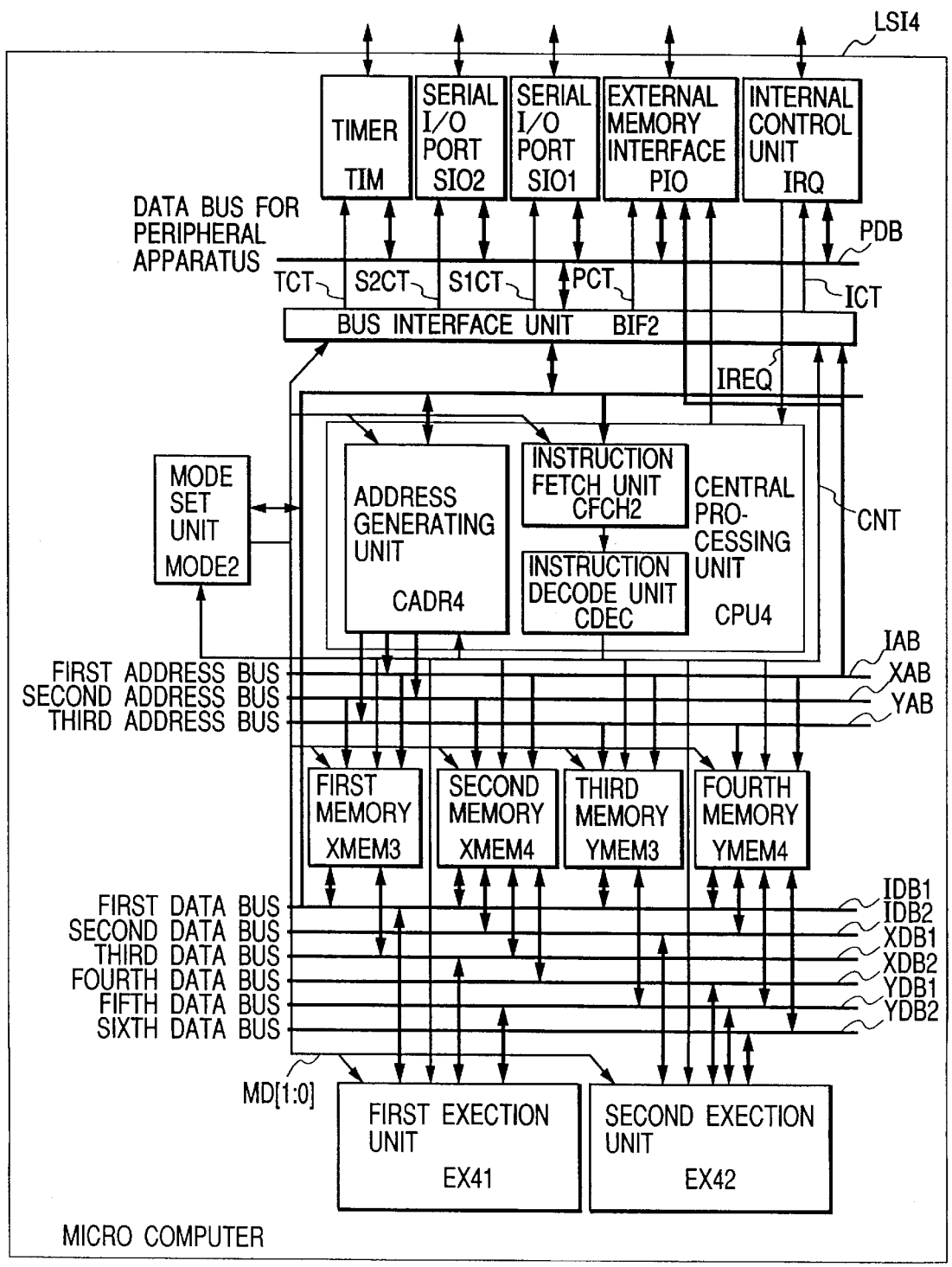
FIG. 52 shows a fourth embodiment of the one-chip microcomputer according to the invention.

FIG. 52 is a diagram showing the entire construction of a microcomputer of a fourth embodiment of the invention. The entire construction of this embodiment relates to a construction having the four on-chip memories and the six data buses, as in the third embodiment shown in FIG. 34. In FIG. 52: letters LSI4 designates a microcomputer according to the invention; letters CPU4 a central processing unit including a circuit for fetching and decoding an instruction to generate a desired control signal; letters CADR4 a first address generating unit included in CPU4 and having a function to generate the two designated addresses at the maximum simultaneously; letters XMEM3 a first on-chip memory packaged over the chip; letters XMEM4 a second on-chip memory packaged over the chip; YMEM3 a third on-chip memory packaged over the chip; letters YMEM4 a fourth on-chip memory packaged over the chip; letters EX41 a first data execution unit for executing the data operations; letters EX42 a second data execution unit for executing the data operations; letters IDB1 a first data bus connected with XMEM3, XMEM4, YMEM3, YMEM4, EX41, MODE2 and a bus interface unit BIF2 and used for the data transfer; letters IDB2 a second data bus connected with XMEM4, YMEM4 and EX42, and used for the data transfer; letters XDB1 a third data bus connected with XMEM3, XME4 and EX31 and used for the data transfer; letters XDB2 a fourth data bus connected with XMEM4 and EX42 and used for the data transfer; letters XDB1 a fifth data bus connected with YMEM3, YMEM4 and EX31 used for the data transfer; and letters YDB2 a sixth data bus connected with YMEM4 and EX42 and used for the data transfer. The remaining reference letters are identical to those of FIG. 1.

This embodiment is a modification of the third embodiment, and its detailed operations would be apparent from the description of the third embodiment. Thus, here are omitted a more detailed circuit diagram and its description of the individual modules.

<Embodiment 5>

Figure 53:
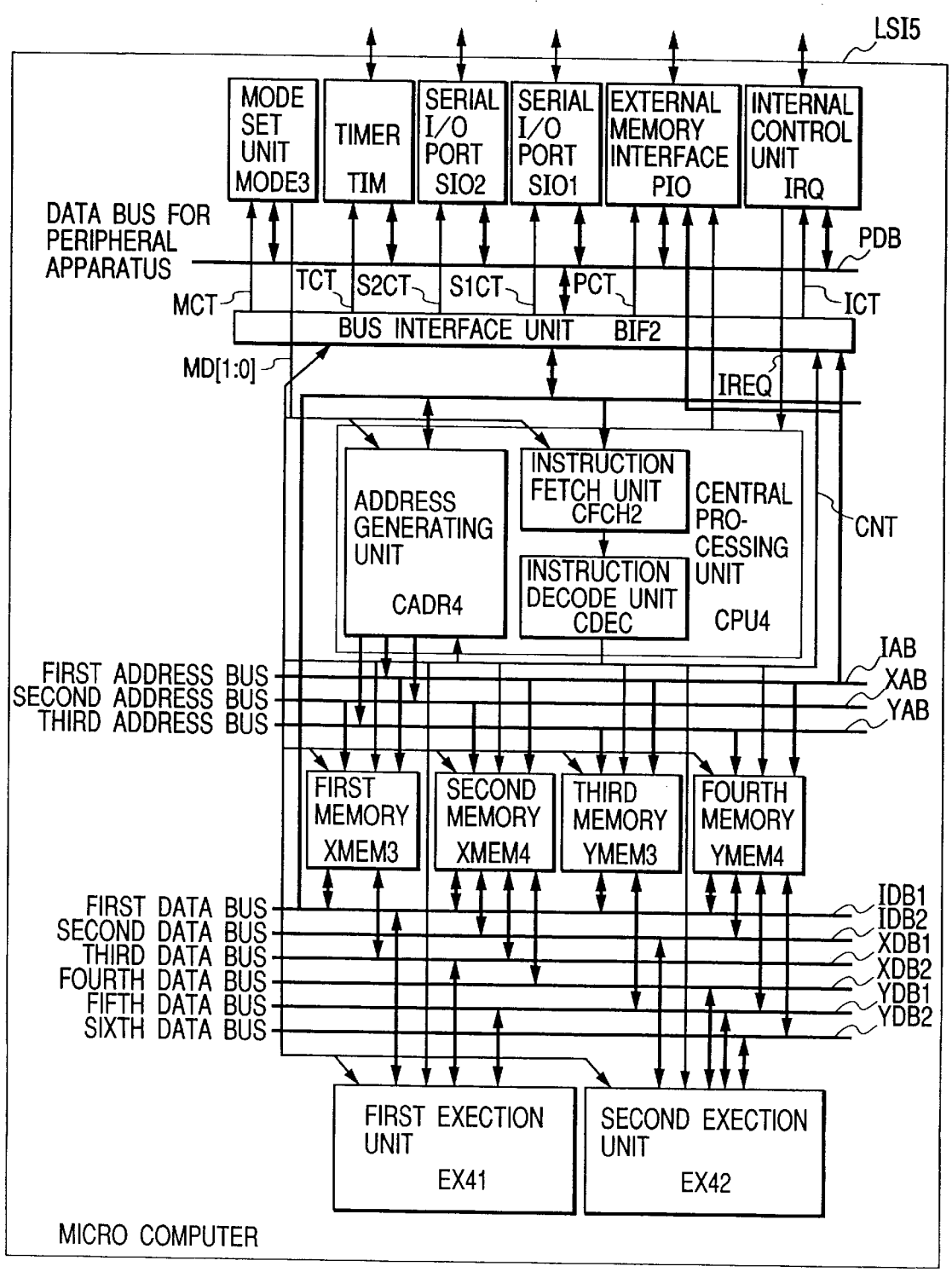
FIG. 53 shows a fifth embodiment of the one-chip microcomputer according to the invention.

FIG. 53 is a diagram showing the entire construction of a microcomputer according to a fifth embodiment of the invention. This embodiment relates to a construction in which the mode set circuit is defined as one of the peripheral modules, and indicates that the mode set circuit should not be limited to the on-chip module. Since the mode set circuit is a module to be constructed of the mode register, it is apparent that the construction of this embodiment could be easily realized if the mode register is defined as the memory map register. Here, FIG. 53 is based on the fourth embodiment but could naturally be applied to the embodiments of FIGS. 1, 23 and 34.

<Embodiment 6>

Figure 54:
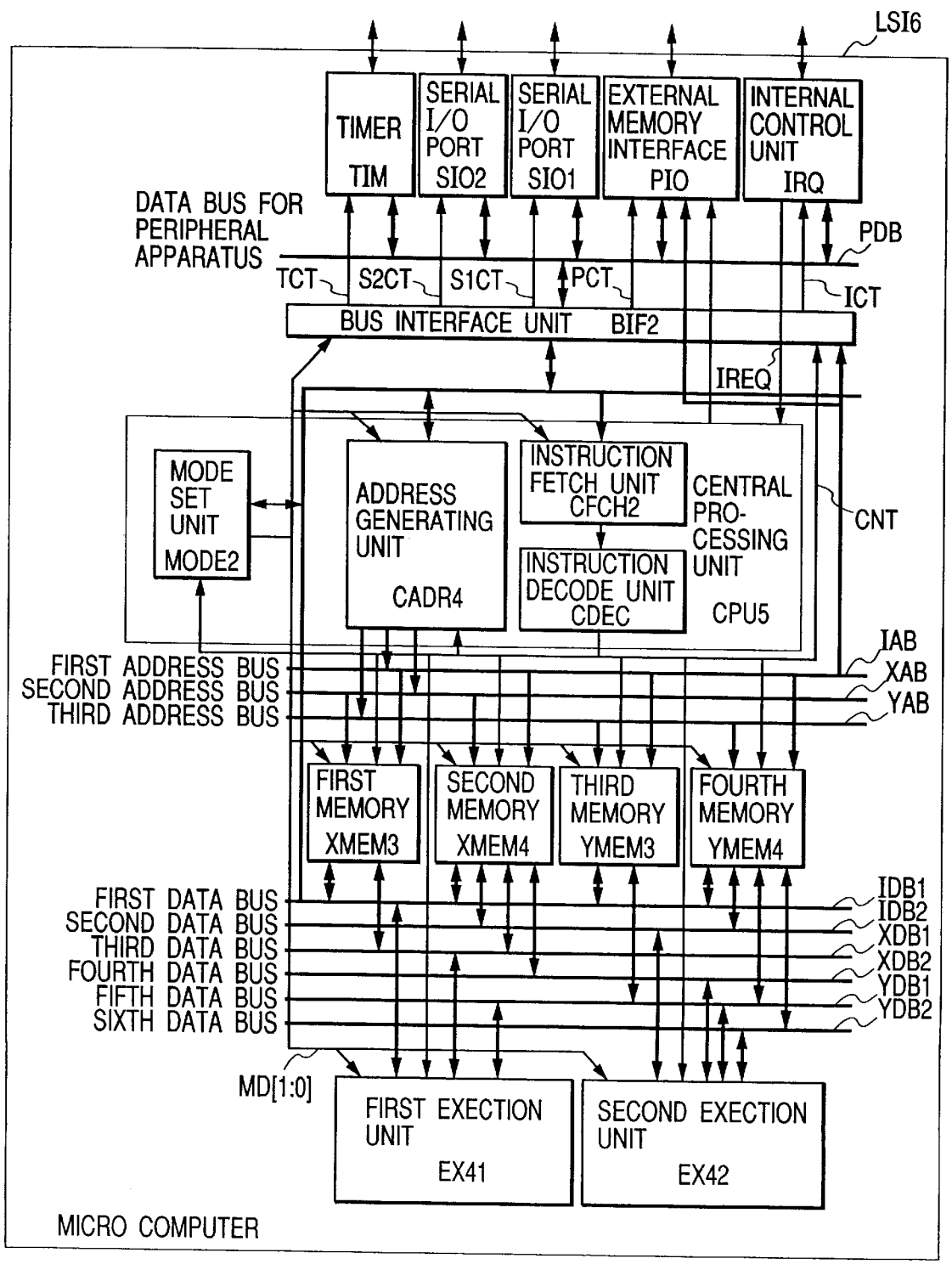
FIG. 54 shows a sixth embodiment of the one-chip microcomputer according to the invention.

FIG. 54 is a diagram showing the entire construction of a microcomputer according to a sixth embodiment of the invention. In this embodiment, the mode set circuit is exemplified by a register forming part of the central processing unit CPU5. This embodiment is also based as in FIG. 53 on the fourth embodiment of FIG. 52 but could naturally be applied to the embodiments shown in FIGS. 1, 23 and 34.

<Embodiment 7>

Figure 57:
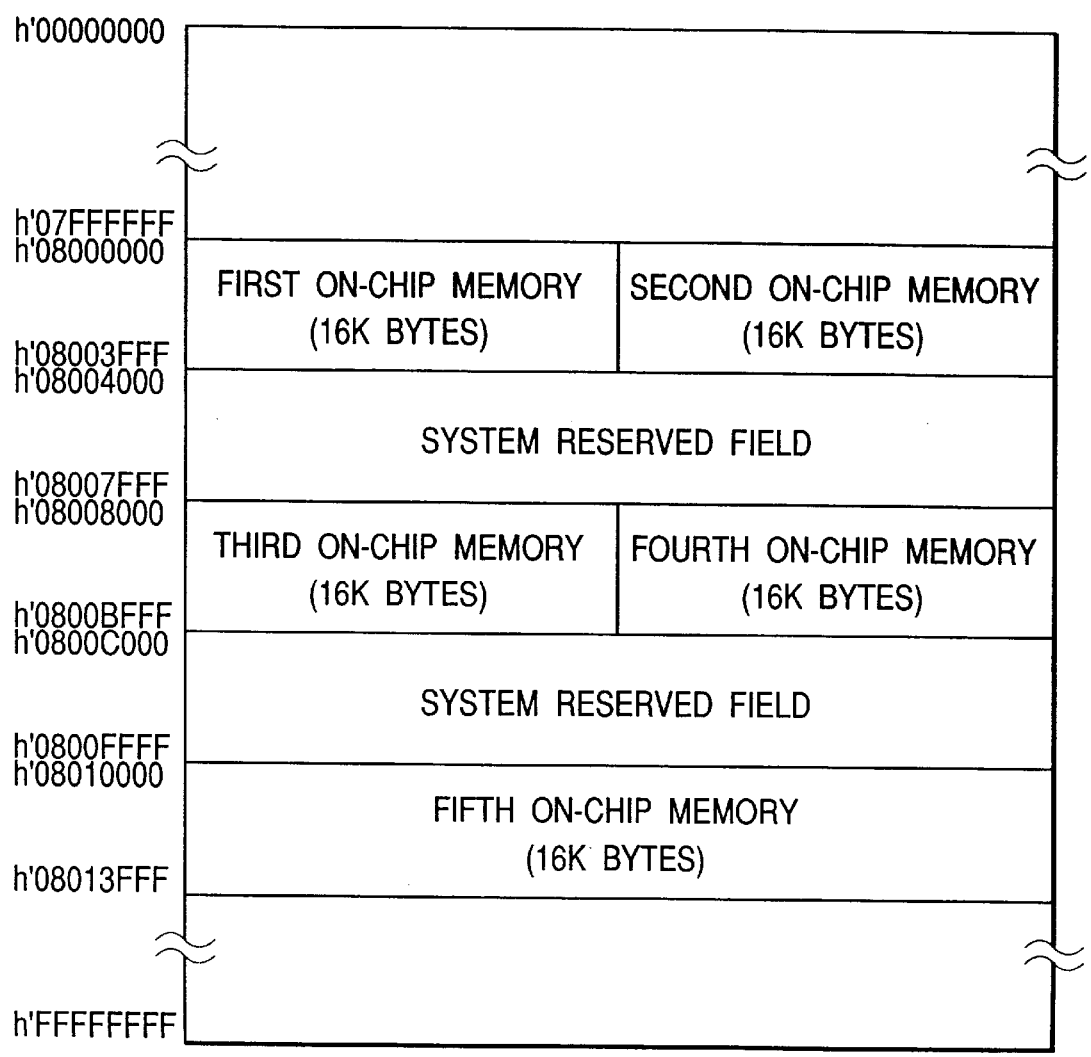
FIG. 57 shows a sample of the mapping over the address space of the first to fifth on-chip memories in Mode 2 and for the data transfer operations between the on-chip memory and the data execution unit.
Figure 58:
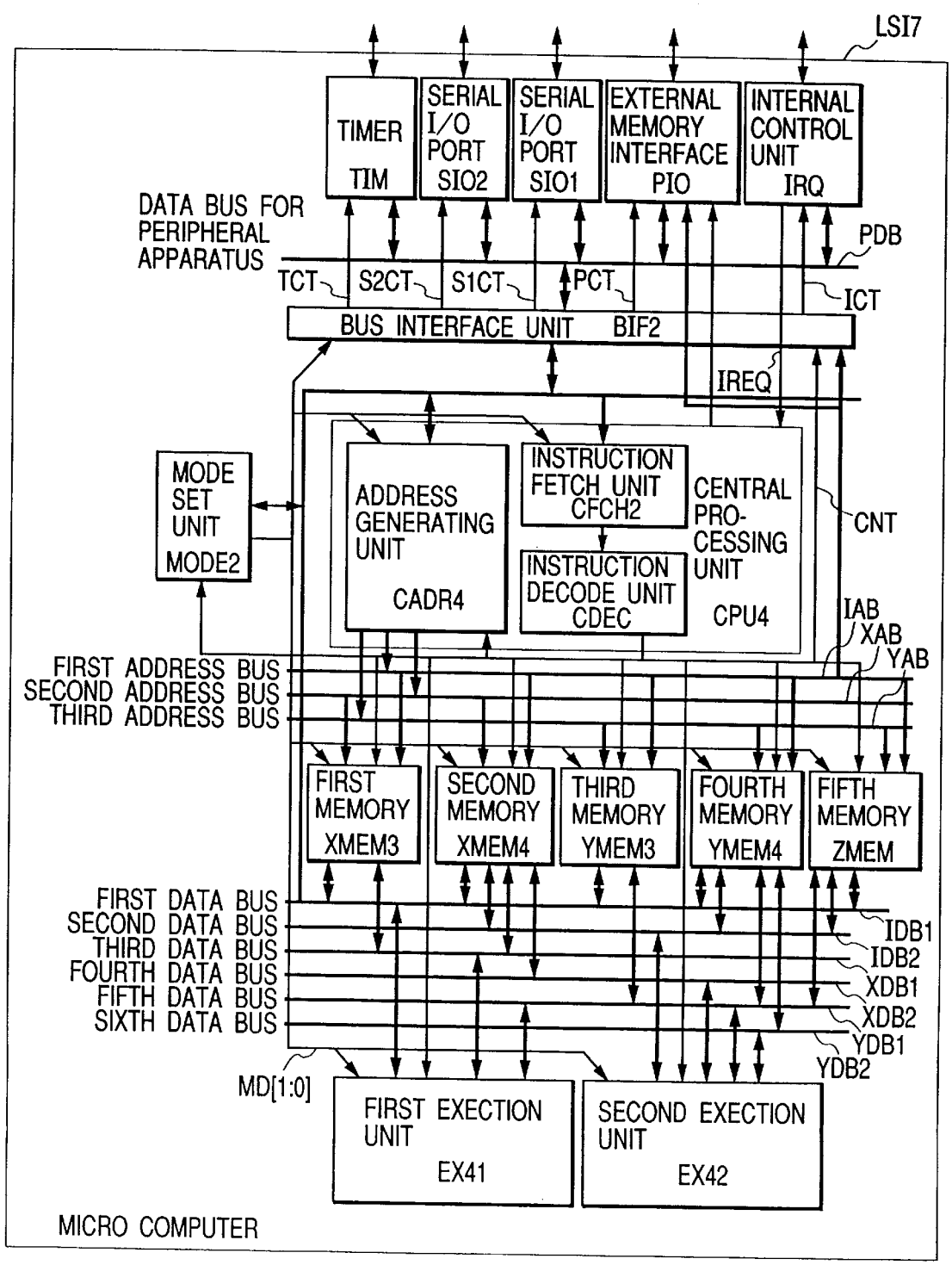
FIG. 58 shows a seventh embodiment of the one-chip microcomputer according to the invention.

FIG. 58 is a diagram showing the entire construction of a microcomputer according to a seventh embodiment of the invention. In this embodiment, an on-chip memory ZMEM is added to the aforementioned four memories. This embodiment is also based on the fourth embodiment of FIG. 52. With the memory mapping shown in FIG. 57, for example, when the two addresses generated from the address generating unit CADR4 are over the address space of the first on-chip memory XMEM3 and the second on-chip memory XMEM4 and over the address space of the fifth on-chip memory ZMEM, the corresponding addresses of XMEM3 and XMEM4 are simultaneously accessed to, so that the data read out from XMEM3 are outputted to the third data bus XDB1 whereas the data read out from XMEM4 are outputted to the fourth data bus XDB2. In parallel with this, the corresponding address of ZMEM is accessed to, so that the data read out from ZMEM are outputted to the fifth data bus YDB1. The data outputted to XDB1 are transferred to the destination operand in the first data execution unit EX41, as designated by an instruction, and the data outputted to XDB2 are transferred to the destination operand in the second data execution unit EX42, as designated by the same instruction. In parallel with this, moreover, the data outputted to YDB1 are transferred to the destination operands in the first data execution unit EX41 and the second data execution unit EX42, as designated by the same instruction. The data thus transferred to the destination operands can be employed as the sources to execute the operations having been described in the first embodiment.

The operations in this embodiment are characterized in that one of the source data of the operations in the first data execution unit EX41 and the second data execution unit EX42 is shared inbetween. As a result, the data shared between EX41 and EX42, i.e., the data read out from ZMEM can be employed as a filter coefficient so that an execution of the parallel filter operations can be made for the data of the two different memories XMEM3 and XMEM4. In this embodiment, the number of memories has to be enlarged in the hardware manner so as to store the filter coefficient. When the number of filter coefficients is not so large that the memories can be doubly used for the common data, the parallel filter operations can be realized without taking the construction of this embodiment. In the foregoing third to sixth embodiments, moreover, the filter operations can also be executed in Mode 2 if the filter coefficients are stored in the specific address space of the third memory and the fourth memory, for example. In the foregoing third to sixth embodiments, moreover, the filter operation coefficients can be latched/outputted as in the fifth memory of the embodiment 5 by changing the truth values of the control unit E4DEC1 or E5DEC1 in the data execution unit such that the third memory is arranged over the address space different from that of the fourth memory. As a result, the memories need neither be increased in the hardware manner nor doubly latched the common data in the two memories so that the parallel filter operations can be realized while spacing the memories.

In the foregoing description of the first to seventh embodiments, the means for changing the contents of the mode registers in the mode set circuits have been exemplified by writing the specific data by the data transfer operations, but the invention should not be limited by such means. Specifically, the invention may be provided with signals indicating the mode states and any means for changing the states. It is apparent that the invention is provided with mode setting instructions, for example, so that the contents of the registers may be directly changed by the instructions. Moreover, the invention may be provided with a function to switch a mode automatically when a specific interrupt demand is accepted.

In the foregoing description of the first to seventh embodiments, a plurality of operations have been separately used for the same instruction by switching the modes. With a surplus instruction code length, the operation mode designating field may be formed over the instruction codes, as shown in FIG. 55, to control the ordinary operations and the SIMD type parallel operations for the individual instructions. In this case, the instruction codes are made longer. In the operations required for switching the operation modes frequently, however, there is an advantage that it is unnecessary to insert the data transfer instructions for switching the modes or the mode switching instructions at each time.

By applying the foregoing third to seventh embodiments, moreover, the multiply and accumulation operations such as the filtering operations can be executed in parallel by using a plurality of execution units to realize the multi-modem operating in parallel to a plurality of terminals, for example.

According to the invention, as has been described hereinbefore, it is possible to realize a microcomputer which can feed the source data necessary for the operations while retaining the consistency in the instruction lines between the ordinary single operations and the SIMD type parallel operations. It is further possible to exhibit the high performance to the maximum at the SIMD type parallel operations without being obstructed in the data transfer.

What is claimed is:

1. A microcomputer comprising:
   a central processing unit including an address generating unit;
   a first memory and a second memory adapted to be individually fed with a common address from said address generating unit;
   a first execution unit coupled to said first memory and said second memory; and
   a second execution unit coupled to said first memory and said second memory and mounted together with said central processing unit, said first memory, said second memory and said first execution unit on a common semiconductor substrate,
   wherein said microcomputer is provided with:
   a first operating mode, in which data are fed from one of said first and second memories to said first execution unit and in which said first execution unit executes the operations whereas said second execution unit interrupts the operations; and
   a second operating mode, in which the data are fed from said first memory to said first execution unit and fed from said second memory to said second execution unit and in which said first execution unit and said second execution unit execute the operations.

2. A microcomputer according to claim 1,
   wherein in said first operating mode, said first memory and said second memory are address-mapped to different spaces, and
   wherein in said second operating mode, said first memory and said second memory are address-mapped to identical spaces.

3. A microcomputer according to claim 1,
   wherein each of said first memory and said second memory includes an address decoder and a control unit,
   wherein the common address to be fed to said first memory and said second memory is composed of a plurality of bits, a portion of which are partially inputted to said control units and the remaining one of which are inputted to said address decoders,
   wherein in said first operating mode, one of said first memory and said second memory is selected on the basis of said portion of bits,
   wherein the control unit contained in said selected memory feeds the data corresponding to said remaining bits, and
   wherein in said second operating mode, the data corresponding to said remaining bits are fed from said first memory and said second memory.

4. A microcomputer according to claim 1, further comprising:
   a mode set circuit including means for latching information on which of said first one or said second one said operating mode belongs to.

5. A microcomputer according to claim 4,
   wherein the information on which operating mode is set on the basis of either a control signal generated as a result of decoding a mode select instruction for setting said mode state or a control signal generated by an interrupt demand.

6. A microcomputer according to claim 1,
   wherein each of said first execution unit and said execution unit includes output means for outputting the data selectively to the outside of said execution unit, and
   wherein in said first operating mode, the output means of said second execution unit inhibits the data output to the outside of said second execution unit.

7. A microcomputer according to claim 1,
   wherein each of said first execution unit and said second execution unit includes a multiplier and an arithmetic logic unit.

8. A microcomputer according to claim 7,
   wherein each of said first execution unit and said second execution unit includes a register file having a plurality of registers,
   wherein each of the data to be latched in said register files has a bit length of 2n bits,
   wherein one input data of said multiplier has a bit length of n bits, and
   wherein one input data of said arithmetic logic unit has a bit length of 2n bits.

9. A microcomputer according to claim 8,
   wherein each of the data to be latched in said register files has a bit length of 32 bits,
   wherein one input data of said multiplier has a bit length of 16 bits, and
   wherein one input data of said arithmetic logic unit has a bit length of 16 bits.

10. A microcomputer according to claim 8,
    wherein each of said first execution unit and said second execution unit includes transmission means for transmitting the data selectively from the outside of said execution unit to said register files, and
    wherein in said first operating mode, said second execution unit inhibits the transmission of the data to said register files.

11. A microcomputer according to claim 7,
    wherein each of said first execution unit and said second execution unit includes means for interrupting the operation of at least one of said multiplier and said arithmetic logic unit, and wherein in said first operating mode, said second execution unit interrupts at least one of the operations of said multiplier and said arithmetic logic unit.

12. A microcomputer according to claim 11,
wherein the data of the operation result are transmitted from such one of said first execution unit and said second execution unit as has operated to one of said first memory and said second memory.

13. A microcomputer according to claim 12,
wherein in said first operating mode, the data of said operation result are transmitted to that other than such one of said first memory and said second memory as has fed the data of said operations from said first execution unit.

14. A microcomputer according to claim 1, further provided with a third operating mode in which the data are fed from one of said first and second memories to said second execution unit and in which said second execution unit executes operation whereas said first execution unit interrupts the operations.

15. A microcomputer comprising:
a central processing unit including an address generating unit;
an address bus to be fed with an address from said address generating unit;
a first memory connected with said address bus;
a second memory connection with said address bus;
a first data bus connected with said first memory and said second memory;
a second data bus connected with said first memory and said second memory;
a first execution unit connected with said first data bus; and
a second execution unit connected with said second data bus,
wherein said microcomputer is provided with:
a first operating mode, in which data are fed from one of said first memory and said second memory to said first execution unit and in which said first execution unit executes the operations whereas said second execution unit interrupts the operations; and
a second operating mode, in which the data are fed from said fist memory to said first execution unit, in which the data are fed from said first memory to said first execution unit and fed from said second memory to said second execution unit and in which said first execution unit and said second execution unit execute the operations.

16. A microcomputer according to claim 15,
wherein each of said first memory and said second memory includes an address decoder and a control unit,
wherein the common address to be fed to said first memory and said second memory is composed of a plurality of bits, a portion of which are partially inputted to said control units and the remaining one of which are inputted to said address decoders,
wherein in said first operating mode, one of said first memory and said second memory is selected on the basis of said portion of bits,
wherein the control unit contained in said selected memory feeds the data corresponding to said remaining bits, and
wherein in said second operating mode, the data corresponding to said remaining bits are fed from said first memory and said second memory.

17. A microcomputer according to claim 15, further comprising:
a mode set circuit including means for latching information on which of said first one or said second one said operating mode belongs to.

18. A microcomputer according to claim 17,
wherein in said first operating mode, the data are fed to said first execution unit through said first data bus on the basis of the information latched by said means.

19. A microcomputer according to claim 15,
wherein each of said first execution unit and said execution unit includes output means for outputting the data selectively to said first and second data buses, and
wherein in said first operating mode, the output means of said second execution unit inhibits the data output to said selected data bus.

20. A microcomputer according to claim 15,
wherein each of said first execution unit and said second execution unit includes a multiplier and an arithmetic logic unit.

21. A microcomputer according to claim 20,
wherein each of said first execution unit and said second execution unit includes: a register file having a plurality of registers; and transmission means for transmitting the data selectively from the outside of said execution unit to said register files, and
wherein in said first operating mode, said second execution unit inhibits the transmission of the data to said register files.

22. A microcomputer according to claim 20,
wherein each of said first execution unit and said second execution unit includes means for interrupting the operation of at least one of said multiplier and said arithmetic logic unit, and
wherein in said first operating mode, said second execution unit interrupts at least one of the operations of said multiplier and said arithmetic logic unit.

23. A microcomputer comprising:
a central processing unit;
a plurality of memories to be accessed to by addresses outputted by said central processing unit; and
a first execution unit and a second execution unit for operating on the basis of data to be fed from one of said plurality of memories,
wherein said microcomputer is provided with:
a first operating mode in which one of said first execution unit and said execution unit executes operations whereas the other interrupts the operation;
a second operating mode in which both said first execution unit and said second execution unit execute the operations; and
an instruction set which is commonly used in both of said first operating mode and said second operating mode.

24. A microcomputer according to claim 23, further comprising:
means for latching the information on which of said operating modes.

25. A microcomputer according to claim 24,
wherein said instruction set includes instructions for rewriting said latched information.

26. A microcomputer according to claim 23,
wherein said central processing unit includes an address generating unit,
wherein said microcomputer further comprises:

an address bus to be fed with an address from said address generating unit;

a first memory connected with said address bus;

a second memory connected with said address bus;

a first data bus connected with said first memory and said second memory; and a second data bus connected with said first memory and said second memory, wherein said first execution unit is connected with said first data bus, and wherein said second execution unit is connected with said second data bus.

27. A microcomputer comprising:

a central processing unit including an address generating unit;

a first memory, a second memory, a third memory and a fourth memory adapted to be individually fed with a common address from said address generating unit;

a first execution unit coupled to said first memory and said second memory; and a second execution unit coupled to said first memory and said second memory and mounted together with said central processing unit, said first memory, said second memory and said first execution unit on a common semiconductor substrate, wherein said microcomputer is provided with:

a first operating mode, in which data are fed from either any one or any two of said first to fourth memories to said first execution unit and in which said first execution unit executes the operations whereas said second execution unit interrupts the operations; and a second operating mode, either: in which the data are fed from any one of said first memory to said fourth memory to said first execution unit and are fed from any of the remaining ones of the memory, having fed the data to said first execution unit, to said second execution unit and in which said first execution unit and said second execution unit execute the operations; or in which the data are fed from any two of said first to fourth memories to said first first execution unit and are fed from the remaining two to said second execution unit and in which said first execution unit and said second execution unit execute the operations.

28. A microcomputer comprising:

a central processing unit including an address generating unit;

a first address bus, a second address bus and a third address bus to be fed with addresses from said address generating unit;

a first memory connected with said first address bus and said second address bus;

a second memory connection with said first address bus and said second address bus;

a third memory connected with said first address bus and said third address bus;

a fourth memory connected with said first address bus and said third address bus;

a first data bus connected with said first memory to said fourth memory;

a second data bus connected with said first memory to said fourth memory;

a third data bus connected with said first memory and said second memory;

a fourth data bus connected with said first memory and said second memory;

a fifth data bus connected with said third memory and said fifth memory;

a sixth data bus connected with said third memory and said fourth memory;

a first execution unit connected with said first data bus, said third data bus and said fifth data bus; and a second execution unit connected with said second data bus, said fourth data bus and said sixth data bus, and wherein said microcomputer is provided with:

a first operating mode, either: in which data are fed from any one of the memories, as connected with said third data bus or said fifth data bus, to said first execution unit and in which said first execution unit executes the operations whereas said second execution unit interrupts the operations;

or in which the data are fed either from either of the memories, as connected with said third data bus, or either of the memories, as connected with said fifth data bus, to said first execution unit and in which said first execution unit executes the operations whereas said second execution unit interrupts the operations; and a second operating mode, either: in which the data are fed through said third data bus or said fifth data bus from any one of said first to fourth memories to said first execution unit and are fed through said fourth data bus or said sixth data bus from such ones of said first to fourth memories, as have failed to feed the data to said first execution unit, to said second execution unit, and in which said first execution unit and said second execution unit execute the operations;

or in which the data are fed through said third data bus from one of said first memory and said second memory and through said fifth data bus from one of said third memory and said fourth memory to said first execution unit and are fed through said fourth data bus from the other of said first memory and said second memory and through said sixth data bus from the other of said third third memory and said fourth memory to said second execution unit and in which said first execution unit and said second execution unit execute the operations.

29. A microcomputer according to claim 28, further comprising:

a mode set circuit including means for latching information on which of said first one or said second one said operating mode belongs to, wherein said first memory and said second memory select either of said first data bus and said third data bus or said second data bus and said fourth data bus for the transmission of the data, on the basis of the information latched by said mode set circuit, and wherein said third memory and said fourth memory select either of said first data bus and said fifth data bus or said second data bus and said sixth data bus for the transmission of the data, on the basis of the information latched by said mode set circuit.

30. A microcomputer comprising:

a central processing unit including an address generating unit;

a first address bus, a second address bus and a third address bus to be fed with addresses from said address generating unit;

a first memory connected with said first address bus and said second address bus;

a second memory connection with said first address bus and said second address bus;

a third memory connected with said first address bus and said third address bus;

a fourth memory connected with said first address bus and said third address bus;

a first data bus connected with said first memory to said fourth memory;

a second data bus connected with said first memory to said fourth memory;

a third data bus connected with said first memory and said second memory;

a fourth data bus connected with said second memory;

a fifth data bus connected with said third memory and said fifth memory;

a sixth data bus connected with said fourth memory;

a first execution unit connected with said first data bus, said third data bus and said fifth data bus; and a second execution unit connected with said second data bus and said fourth to sixth data buses, and wherein said microcomputer is provided with:

a first operating mode, either: in which data are fed from any one of the memories, as connected with said third data bus or said fifth data bus, to said first execution unit and in which said first execution unit executes the operations whereas said second execution unit interrupts the operations;

or in which the data are fed either from either of the memories, as connected with said third data bus, or either of the memories, as connected with said fifth data bus, to said first execution unit and in which said first execution unit executes the operations whereas said second execution unit interrupts the operations; and a second operating mode, either: in which the data are fed through said third data bus from said first memory to said first execution unit and are fed through said fourth data bus from said second memory to said second execution unit, and in which said first execution unit and said second execution unit execute the operations;

in which the data are fed through said fifth data bus from said third memory to said first execution unit and are fed through said sixth data bus from said fourth memory to said second execution unit, and in which said first execution unit and said second execution unit execute the operations;

in which the data are fed from any one of the memories, as connected with said third data bus, to said first execution unit and are fed from any one of the memories, as connected with said fifth data bus, to said second execution unit, and in which said first execution unit and said second execution unit execute the operations;

or in which the data are fed through said third data bus to said first memory and through said fifth data bus to said first execution unit and are fed through said fourth data bus from said second memory and through said sixth data bus from said fourth memory to said second execution unit, and in which said first execution unit and said second execution unit execute the operations.

31. A microcomputer according to claim 27, further comprising:

an instruction set which is commonly used in both of said first operating mode and said second operating mode.

32. A microcomputer according to claim 31, further comprising:

means for latching the information on which of said operating modes.

33. A microcomputer according to claim 32, wherein said instruction set includes instructions for rewriting said latched information.

* * * * *